(12) United States Patent
Van Baelen et al.

(10) Patent No.: US 12,189,188 B2
(45) Date of Patent: *Jan. 7, 2025

(54) FRAME ASSEMBLIES FOR OPTICAL FIBER DISTRIBUTION ELEMENTS

(71) Applicant: COMMSCOPE CONNECTIVITY BELGIUM BVBA, Kessel-Lo (BE)

(72) Inventors: David Jan Irma Van Baelen, Winksele (BE); Wouter Vranken, Nieuwrode (BE); Heidi Bleus, Genk (BE); Willem Lea Marcel De Vis, Merchtem (BE); Geert Antoon Parton, Lubbeek (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,524

(22) Filed: Aug. 22, 2023

(65) Prior Publication Data

US 2024/0168237 A1 May 23, 2024

Related U.S. Application Data

(63) Continuation of application No. 17/900,289, filed on Aug. 31, 2022, now abandoned, which is a
(Continued)

(51) Int. Cl.
*G02B 6/00* (2006.01)
*G02B 6/36* (2006.01)
(Continued)

(52) U.S. Cl.
CPC ......... *G02B 6/3616* (2013.01); *G02B 6/3897* (2013.01); *G02B 6/4452* (2013.01); *G02B 6/4471* (2013.01)

(58) Field of Classification Search
CPC .. G02B 6/3616; G02B 6/3897; G02B 6/4452; G02B 6/4471
See application file for complete search history.

(56) References Cited

U.S. PATENT DOCUMENTS 2,805,106 A 9/1957 Penkala
2,864,656 A 12/1958 Yorinks
(Continued)

FOREIGN PATENT DOCUMENTS

AU 40995/85 4/1985
AU 55314/86 3/1986
(Continued)

OTHER PUBLICATIONS

International Search Report and Written Opinion of the International Searching Authority for International Patent Application No. PCT/EP2019/073279 mailed Oct. 9, 2019, 11 pages.
(Continued)

*Primary Examiner* — Jennifer Doan
(74) *Attorney, Agent, or Firm* — Merchant & Gould P.C.

(57) ABSTRACT

A telecommunications device fixation assembly includes a bracket configured to be mounted to a telecommunications fixture, the bracket defining at least one planar wall and a device holder configured to be removably mounted to the bracket, the device holder defining a device holding portion and a fixation portion, wherein the fixation portion defines at least one pocket configured to receive an edge of the planar wall of the bracket, the fixation portion further including an elastically flexible latch configured to snap fit to a portion of the planar wall of the bracket to fix the device holder to the bracket.

16 Claims, 126 Drawing Sheets

Related U.S. Application Data continuation of application No. 17/187,001, filed on Feb. 26, 2021, now Pat. No. 11,448,831, which is a continuation of application No. PCT/EP2019/073279, filed on Aug. 30, 2019.

(60) Provisional application No. 62/725,909, filed on Aug. 31, 2018.

(51) Int. Cl.
  *G02B 6/38* (2006.01)
  *G02B 6/44* (2006.01)

(56) References Cited

U.S. PATENT DOCUMENTS

| | | |
|---|---|---|
| 3,901,564 A | 8/1975 | Armstrong |
| 4,070,076 A | 1/1978 | Zwillinger |
| 4,172,625 A | 10/1979 | Swain |
| 4,320,934 A | 3/1982 | Röck et al. |
| 4,359,262 A | 11/1982 | Dolan |
| 4,373,776 A | 2/1983 | Purdy |
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,991,928 A | 2/1991 | Zimmer |
| 4,995,688 A | 2/1991 | Anton et al. |
| 5,024,498 A | 6/1991 | Becker et al. |
| 5,066,149 A | 11/1991 | Wheeler et al. |
| 5,067,678 A | 11/1991 | Henneberger et al. |
| 5,071,211 A | 12/1991 | Debortoli et al. |
| 5,100,221 A | 3/1992 | Carney et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,316,243 A | 5/1994 | Henneberger |
| 5,323,480 A | 6/1994 | Mullaney et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowskki et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacarne |
| 5,490,229 A | 2/1996 | Ghanderharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,613,030 A | 3/1997 | Hoffer et al. |
| 5,640,481 A | 6/1997 | Llewellyn et al. |
| 5,655,044 A | 8/1997 | Finzel et al. |
| 5,715,348 A | 2/1998 | Falkenberg et al. |
| 5,717,810 A | 2/1998 | Wheeler |
| 5,717,811 A | 2/1998 | Macken |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Rock |
| 5,887,106 A | 3/1999 | Cheeseman et al. |
| 5,917,984 A | 6/1999 | Röseler et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,027,252 A | 2/2000 | Erdman et al. |
| 6,044,194 A | 3/2000 | Meyerhoefer |
| 6,076,908 A | 6/2000 | Maffeo |
| 6,085,003 A | 7/2000 | Knight |
| 6,099,224 A | 8/2000 | Uchida et al. |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,256,444 B1 | 7/2001 | Bechamps et al. |
| 6,263,141 B1 | 7/2001 | Smith |
| 6,269,214 B1 | 7/2001 | Naudin et al. |
| 6,301,424 B1 | 10/2001 | Hwang |
| 6,360,050 B1 | 3/2002 | Moua et al. |
| 6,381,393 B1 | 4/2002 | Matthews et al. |
| 6,438,310 B1 | 8/2002 | Lance et al. |
| 6,439,523 B1 | 8/2002 | Chandler et al. |
| 6,480,660 B1 | 11/2002 | Reitmeier et al. |
| 6,496,638 B1 | 12/2002 | Andersen |
| 6,504,988 B1 | 1/2003 | Trebesch et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| 6,612,515 B1 | 9/2003 | Tinucci et al. |
| 6,625,374 B2 | 9/2003 | Holman et al. |
| RE38,311 E | 11/2003 | Wheeler |
| 6,677,520 B1 | 1/2004 | Kim et al. |
| 6,695,491 B1 | 2/2004 | Leeman et al. |
| 6,711,339 B2 | 3/2004 | Puetz et al. |
| 6,715,619 B2 | 4/2004 | Kim et al. |
| 6,748,155 B2 | 6/2004 | Kim et al. |
| 6,768,860 B2 | 7/2004 | Liberty |
| 6,796,437 B2 | 9/2004 | Krampotich et al. |
| 6,804,447 B2 | 10/2004 | Smith et al. |
| 6,809,258 B1 | 10/2004 | Dang et al. |
| 6,810,193 B1 | 10/2004 | Müller |
| 6,819,857 B2 | 11/2004 | Douglas et al. |
| 6,845,208 B2 | 1/2005 | Thibault et al. |
| 6,850,685 B2 | 2/2005 | Tinucci et al. |
| 6,865,331 B2 | 3/2005 | Mertesdorf |
| 6,870,734 B2 | 3/2005 | Mertesdorf et al. |
| 6,915,057 B2 | 7/2005 | Vincent et al. |
| 6,925,241 B2 | 8/2005 | Bohle et al. |
| 6,934,457 B2 | 8/2005 | Vincent et al. |
| 6,937,807 B2 | 8/2005 | Franklin et al. |
| 6,944,383 B1 | 9/2005 | Herzog et al. |
| 6,945,620 B2 | 9/2005 | Lam et al. |
| 6,968,111 B2 | 11/2005 | Trebesch et al. |
| 6,981,750 B2 | 1/2006 | Krampotich |
| 7,006,748 B2 | 2/2006 | Dagley et al. |
| 7,068,907 B2 | 6/2006 | Schray |
| 7,079,744 B2 | 7/2006 | Douglas et al. |
| 7,086,539 B2 | 8/2006 | Knudsen et al. |
| 7,116,777 B2 | 10/2006 | Knudsen et al. |
| 7,120,348 B2 | 10/2006 | Trebesch et al. |
| 7,171,099 B2 | 1/2007 | Barnes et al. |
| 7,231,125 B2 | 6/2007 | Douglas et al. |
| 7,267,491 B2 | 9/2007 | Luther et al. |
| 7,274,852 B1 | 9/2007 | Smrha et al. |

(56) References Cited

U.S. PATENT DOCUMENTS

| | | | |
|---|---|---|---|
| 7,302,153 B2 | 11/2007 | Thom | |
| 7,302,154 B2 | 11/2007 | Trebesch et al. | |
| 7,308,184 B2 | 12/2007 | Barnes et al. | |
| 7,362,942 B2 | 4/2008 | Beck | |
| 7,367,823 B2 | 5/2008 | Rapp et al. | |
| 7,373,071 B2 | 5/2008 | Douglas et al. | |
| 7,397,996 B2 | 7/2008 | Herzog et al. | |
| 7,406,240 B2 | 7/2008 | Murano | |
| 7,409,137 B1 | 8/2008 | Barnes | |
| 7,418,182 B2 | 8/2008 | Krampotich | |
| 7,437,049 B2 | 10/2008 | Krampotich | |
| 7,454,113 B2 | 11/2008 | Barnes | |
| 7,457,504 B2 | 11/2008 | Smrha et al. | |
| 7,460,757 B2 | 12/2008 | Hoehne et al. | |
| 7,463,811 B2 | 12/2008 | Trebesch et al. | |
| 7,480,438 B2 | 1/2009 | Douglas et al. | |
| 7,484,994 B2 | 2/2009 | Ko | |
| 7,496,268 B2 | 2/2009 | Escoto et al. | |
| 7,499,623 B2 | 3/2009 | Barnes et al. | |
| 7,567,744 B2 | 7/2009 | Krampotich et al. | |
| 7,570,860 B2 | 8/2009 | Smrha et al. | |
| 7,570,861 B2 | 8/2009 | Smrha et al. | |
| 7,599,599 B2 | 10/2009 | Herzog et al. | |
| 7,664,361 B2 | 2/2010 | Trebesch et al. | |
| 7,672,561 B1 | 3/2010 | Keith et al. | |
| 7,689,089 B2 | 3/2010 | Wagner et al. | |
| 7,706,656 B2 | 4/2010 | Zimmel | |
| 7,715,681 B2 | 5/2010 | Krampotich et al. | |
| 7,747,125 B1 | 6/2010 | Lee et al. | |
| RE41,460 E | 7/2010 | Wheeler | |
| 7,751,674 B2 | 7/2010 | Hill | |
| 7,764,859 B2 | 7/2010 | Krampotich et al. | |
| 7,856,166 B2 | 12/2010 | Biribuze et al. | |
| 7,869,683 B2 | 1/2011 | Barnes et al. | |
| 7,876,993 B2 | 1/2011 | Krampotich et al. | |
| 7,889,961 B2 | 2/2011 | Cote et al. | |
| 7,942,590 B2 | 5/2011 | Lu et al. | |
| 7,978,957 B2 | 7/2011 | Sano et al. | |
| 8,027,558 B2 | 9/2011 | Barnes et al. | |
| 8,041,175 B2 | 10/2011 | Krampotich et al. | |
| 8,059,932 B2 | 11/2011 | Hill et al. | |
| 8,078,030 B2 | 12/2011 | Trebesch et al. | |
| 8,179,684 B2 | 5/2012 | Smrha et al. | |
| 8,195,022 B2 | 6/2012 | Coburn et al. | |
| 8,285,104 B2 | 10/2012 | Davis et al. | |
| 8,315,498 B2 | 11/2012 | Redmann et al. | |
| 8,452,149 B2 | 5/2013 | Krampotich et al. | |
| 8,494,329 B2 | 7/2013 | Nhep et al. | |
| 8,526,774 B2 | 9/2013 | Krampotich et al. | |
| 8,559,785 B2 | 10/2013 | Barlowe et al. | |
| 8,600,208 B2 | 12/2013 | Badar et al. | |
| 8,639,081 B2 | 1/2014 | Barnes et al. | |
| 8,655,136 B2 | 2/2014 | Trebesch et al. | |
| 8,690,593 B2 | 4/2014 | Anderson et al. | |
| 8,731,361 B2 | 5/2014 | Anderson et al. | |
| 8,737,795 B2 | 5/2014 | Isuhara | |
| 8,801,299 B2 | 8/2014 | Shimotsu et al. | |
| 8,816,222 B2 | 8/2014 | Pimentel | |
| 8,861,919 B2 | 10/2014 | Alston et al. | |
| 8,864,085 B2 | 10/2014 | He et al. | |
| 8,885,998 B2 | 11/2014 | Marcouiller et al. | |
| 8,903,216 B2 | 12/2014 | Thompson et al. | |
| 9,081,164 B2 | 7/2015 | Badar et al. | |
| 9,128,262 B2 | 9/2015 | Campbell et al. | |
| 9,435,975 B2 | 9/2016 | Ott | |
| 9,521,766 B2 | 12/2016 | Claeys et al. | |
| 9,541,726 B2 | 1/2017 | Geens et al. | |
| 9,568,699 B2 | 2/2017 | Geens et al. | |
| 9,575,275 B2 | 2/2017 | Blackwell, Jr. et al. | |
| 9,829,642 B2 | 11/2017 | Geens et al. | |
| 9,846,291 B2 | 12/2017 | Montgelas et al. | |
| 9,958,631 B2 | 5/2018 | Geens et al. | |
| 10,107,984 B2 | 10/2018 | Geens et al. | |
| 10,126,515 B2 | 11/2018 | Geens et al. | |
| 10,261,279 B1 | 4/2019 | Potter et al. | |
| 10,261,281 B2 | 4/2019 | Geens et al. | |
| 10,345,546 B2 | 7/2019 | Geens et al. | |
| 10,409,020 B2 | 9/2019 | Geens et al. | |
| 10,606,007 B2 | 3/2020 | Vermeulen et al. | |
| 10,732,373 B2 | 8/2020 | Geens et al. | |
| 10,746,950 B2 | 8/2020 | Geens et al. | |
| 10,830,977 B2 | 11/2020 | Geens et al. | |
| 10,908,375 B2 | 2/2021 | Geens et al. | |
| 11,002,936 B2 | 5/2021 | Geens et al. | |
| 11,092,766 B2 | 8/2021 | Geens et al. | |
| 11,320,618 B2 | 5/2022 | Geens et al. | |
| 11,409,067 B2 | 8/2022 | Van Baelen et al. | |
| 11,428,886 B2 * | 8/2022 | Cams | H02G 3/10 |
| 11,448,831 B2 | 9/2022 | Van Baelen et al. | |
| 11,448,844 B2 | 9/2022 | Van Baelen et al. | |
| 11,448,845 B2 | 9/2022 | Van Baelen et al. | |
| 11,579,395 B2 | 2/2023 | Geens et al. | |
| 11,614,594 B2 | 3/2023 | Geens et al. | |
| 11,982,855 B2 | 5/2024 | Geens et al. | |
| 11,988,887 B2 | 5/2024 | Geens et al. | |
| 2001/0001270 A1 | 5/2001 | Williams Vigliaturo | |
| 2002/0131749 A1 | 9/2002 | Swenson et al. | |
| 2002/0131750 A1 | 9/2002 | Holman et al. | |
| 2002/0159746 A1 | 10/2002 | Howell et al. | |
| 2002/0181922 A1 | 12/2002 | Xin et al. | |
| 2003/0007767 A1 | 1/2003 | Douglas et al. | |
| 2003/0020379 A1 | 1/2003 | Larsen et al. | |
| 2003/0119385 A1 | 6/2003 | Elliot et al. | |
| 2003/0128951 A1 | 7/2003 | Lecomte et al. | |
| 2003/0165315 A1 | 9/2003 | Trebesch et al. | |
| 2003/0174996 A1 | 9/2003 | Henschel et al. | |
| 2003/0190035 A1 | 10/2003 | Knudsen et al. | |
| 2004/0011750 A1 | 1/2004 | Kim et al. | |
| 2004/0136676 A1 | 7/2004 | Mertesdorf | |
| 2004/0175090 A1 | 9/2004 | Vastmans et al. | |
| 2004/0227443 A1 | 11/2004 | Sandoval | |
| 2004/0228582 A1 | 11/2004 | Yamada et al. | |
| 2004/0258384 A1 | 12/2004 | Trebesch et al. | |
| 2005/0017614 A1 | 1/2005 | Cirocco et al. | |
| 2005/0025444 A1 | 2/2005 | Barnes et al. | |
| 2005/0058421 A1 | 3/2005 | Dagley et al. | |
| 2005/0078929 A1 | 4/2005 | Iwanek | |
| 2005/0100301 A1 | 5/2005 | Solheid et al. | |
| 2005/0123261 A1 | 6/2005 | Bellekens et al. | |
| 2006/0013538 A1 | 1/2006 | Hodge et al. | |
| 2006/0093302 A1 | 5/2006 | Solheid et al. | |
| 2006/0104013 A1 | 5/2006 | Sakakibara et al. | |
| 2006/0116084 A1 | 6/2006 | Miki et al. | |
| 2006/0193586 A1 | 8/2006 | Hoehne et al. | |
| 2006/0275008 A1 | 12/2006 | Xin | |
| 2007/0003204 A1 | 1/2007 | Makrides-Saravanos et al. | |
| 2007/0030631 A1 | 2/2007 | Liang et al. | |
| 2007/0031099 A1 | 2/2007 | Herzog et al. | |
| 2007/0058918 A1 | 3/2007 | Trebesch et al. | |
| 2007/0109760 A1 | 5/2007 | Leung et al. | |
| 2007/0201806 A1 | 8/2007 | Douglas et al. | |
| 2007/0280618 A1 | 12/2007 | Xin et al. | |
| 2008/0019104 A1 | 1/2008 | Karstens | |
| 2008/0048935 A1 | 2/2008 | Yoshioka et al. | |
| 2008/0063350 A1 | 3/2008 | Trebesch et al. | |
| 2008/0124038 A1 | 5/2008 | Kowalczyk et al. | |
| 2008/0169116 A1 | 7/2008 | Mullaney et al. | |
| 2008/0175550 A1 | 7/2008 | Coburn et al. | |
| 2008/0205843 A1 | 8/2008 | Castonguay et al. | |
| 2008/0292260 A1 | 11/2008 | Weinegger et al. | |
| 2008/0298026 A1 | 12/2008 | Wang et al. | |
| 2009/0060439 A1 | 3/2009 | Cox et al. | |
| 2009/0067800 A1 | 3/2009 | Vazquez et al. | |
| 2009/0067802 A1 | 3/2009 | Hoehne et al. | |
| 2009/0097813 A1 | 4/2009 | Hill | |
| 2009/0129033 A1 | 5/2009 | Smrha et al. | |
| 2009/0136196 A1 | 5/2009 | Trebesch et al. | |
| 2009/0245746 A1 | 10/2009 | Krampotich et al. | |
| 2009/0274430 A1 | 11/2009 | Krampotich et al. | |
| 2009/0274431 A1 | 11/2009 | Krampotich et al. | |
| 2010/0061693 A1 | 3/2010 | Bran de Leon et al. | |
| 2010/0142910 A1 | 6/2010 | Hill et al. | |
| 2010/0150518 A1 | 6/2010 | Leon et al. | |
| 2010/0158465 A1 | 6/2010 | Smrha | |

(56) References Cited

U.S. PATENT DOCUMENTS

| | | |
|---|---|---|
| 2010/0195968 A1 | 8/2010 | Trebesch et al. |
| 2010/0266253 A1 | 10/2010 | Krampotich et al. |
| 2010/0309621 A1 | 12/2010 | Chang et al. |
| 2010/0310225 A1 | 12/2010 | Anderson et al. |
| 2010/0316346 A1 | 12/2010 | Krampotich et al. |
| 2010/0322578 A1 | 12/2010 | Cooke et al. |
| 2011/0019964 A1 | 1/2011 | Nhep et al. |
| 2011/0044020 A1 | 2/2011 | Hruby et al. |
| 2011/0123165 A1 | 5/2011 | Barth et al. |
| 2011/0188809 A1 | 8/2011 | LeBlanc et al. |
| 2011/0206336 A1 | 8/2011 | Krampotich et al. |
| 2011/0211329 A1 | 9/2011 | Dean, Jr. et al. |
| 2011/0211799 A1 | 9/2011 | Conner et al. |
| 2011/0211801 A1 | 9/2011 | McGranahan et al. |
| 2011/0217016 A1 | 9/2011 | Mullsteff |
| 2011/0228473 A1 | 9/2011 | Anderson et al. |
| 2011/0267794 A1 | 11/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0286712 A1 | 11/2011 | Puetz et al. |
| 2011/0317974 A1 | 12/2011 | Krampotich et al. |
| 2012/0014655 A1 | 1/2012 | Zimmel et al. |
| 2012/0057838 A1 | 3/2012 | Hill et al. |
| 2012/0093475 A1 | 4/2012 | Trebesch et al. |
| 2012/0230646 A1 | 9/2012 | Thompson et al. |
| 2013/0028567 A1 | 1/2013 | Parikh et al. |
| 2013/0034334 A1 | 2/2013 | Fariello et al. |
| 2013/0084050 A1 | 4/2013 | Vastmans et al. |
| 2013/0089292 A1 | 4/2013 | Ott et al. |
| 2013/0089298 A1 | 4/2013 | Holmberg et al. |
| 2013/0183018 A1 | 7/2013 | Holmberg |
| 2013/0287356 A1 | 10/2013 | Solheid et al. |
| 2013/0287357 A1 | 10/2013 | Solheid et al. |
| 2014/0072265 A1 | 3/2014 | Ott |
| 2014/0086545 A1 | 3/2014 | Solheid et al. |
| 2014/0126872 A1 | 5/2014 | Naudin et al. |
| 2014/0133819 A1 | 5/2014 | Trebesch et al. |
| 2014/0241691 A1 | 8/2014 | Solheid et al. |
| 2014/0301709 A1 | 10/2014 | Matz et al. |
| 2015/0117829 A1 | 4/2015 | Allen |
| 2015/0212286 A1 | 7/2015 | Vongseng et al. |
| 2015/0378106 A1 | 12/2015 | Allen et al. |
| 2015/0380918 A1 | 12/2015 | Kellerman |
| 2016/0109672 A1 | 4/2016 | Geens et al. |
| 2016/0309606 A1 | 10/2016 | Anderson et al. |
| 2017/0293099 A1 | 10/2017 | Alexi et al. |
| 2017/0371107 A1 | 12/2017 | Rudenick et al. |
| 2018/0123273 A1 | 5/2018 | Ishii et al. |
| 2019/0056559 A1 | 2/2019 | Leeman et al. |
| 2019/0072736 A1 | 3/2019 | Glatzl et al. |
| 2019/0293889 A1 | 9/2019 | Masuda et al. |
| 2020/0333544 A1* | 10/2020 | Vermeulen ......... G02B 6/44785 |
| 2021/0011243 A1 | 1/2021 | Geens et al. |
| 2021/0181430 A1 | 6/2021 | Van Baelen et al. |
| 2021/0181446 A1 | 6/2021 | Van Baelen et al. |
| 2021/0181447 A1 | 6/2021 | Van Baelen et al. |
| 2021/0181448 A1 | 6/2021 | Van Baelen et al. |
| 2021/0181449 A1 | 6/2021 | Van Baelen et al. |
| 2021/0271045 A1 | 9/2021 | Geens et al. |
| 2021/0278618 A1 | 9/2021 | Van Baelen et al. |
| 2021/0356686 A1 | 11/2021 | Geens et al. |
| 2022/0082774 A1 | 3/2022 | Van Baelen et al. |
| 2022/0221675 A1 | 7/2022 | Geens et al. |

FOREIGN PATENT DOCUMENTS

| | | |
|---|---|---|
| AU | 2010246577 A1 | 12/2010 |
| CN | 1133640 A | 10/1996 |
| CN | 1319194 A | 10/2001 |
| CN | 1448746 A | 10/2003 |
| CN | 201335897 Y | 10/2009 |
| CN | 101583256 A | 11/2009 |
| CN | 201878451 U | 6/2011 |
| CN | 102213810 A | 10/2011 |
| CN | 102483500 A | 5/2012 |
| CN | 102573377 A | 7/2012 |
| CN | 202372670 U | 8/2012 |
| CN | 202681151 U | 1/2013 |
| CN | 204087078 U | 1/2015 |
| CN | 108125426 A | 6/2018 |
| DE | 2735106 A1 | 2/1979 |
| DE | 2918309 A1 | 11/1980 |
| DE | 3308682 A1 | 9/1984 |
| DE | 3836273 A1 | 4/1990 |
| DE | 4413136 C1 | 5/1995 |
| DE | 29504191 U1 | 3/1996 |
| EP | 0146478 A2 | 6/1985 |
| EP | 0149250 A2 | 7/1985 |
| EP | 0356942 A2 | 3/1990 |
| EP | 0406151 A2 | 1/1991 |
| EP | 0464570 A1 | 1/1992 |
| EP | 0479226 A1 | 4/1992 |
| EP | 0196102 B1 | 3/1993 |
| EP | 0538164 A1 | 4/1993 |
| EP | 0563995 B1 | 10/1999 |
| EP | 1228389 B1 | 5/2003 |
| EP | 2093596 A2 | 8/2009 |
| EP | 2450729 A2 | 5/2012 |
| FR | 2531576 A1 | 2/1984 |
| FR | 2587127 A1 | 3/1987 |
| FR | 2678076 A1 | 12/1992 |
| JP | 59-74523 A | 4/1984 |
| JP | 60-169811 A | 9/1985 |
| JP | 61-55607 A | 3/1986 |
| JP | 61-90104 A | 5/1986 |
| JP | 2000-286574 A | 10/2000 |
| KR | 20-0337929 Y1 | 1/2004 |
| KR | 10-2008-0033420 A | 4/2008 |
| NZ | 556111 A | 2/2010 |
| RU | 45207 U1 | 4/2005 |
| WO | 91/10927 A1 | 7/1991 |
| WO | 95/07480 A1 | 3/1995 |
| WO | 96/10203 A1 | 4/1996 |
| WO | 99/00619 A1 | 1/1999 |
| WO | 99/38042 A1 | 7/1999 |
| WO | 03/005095 A2 | 1/2003 |
| WO | 2007/149215 A2 | 12/2007 |
| WO | 2008/048935 A2 | 4/2008 |
| WO | 2009/032330 A1 | 3/2009 |
| WO | 2011/100616 A2 | 8/2011 |
| WO | 2012/068013 A2 | 5/2012 |
| WO | 2012/112344 A1 | 8/2012 |
| WO | 2013/117598 A2 | 8/2013 |
| WO | 2014/005917 A2 | 1/2014 |
| WO | 2014/090843 A1 | 6/2014 |
| WO | 2014/118227 A1 | 8/2014 |
| WO | 2014/173896 A1 | 10/2014 |
| WO | 2014/173930 A1 | 10/2014 |
| WO | 2014/207210 A1 | 12/2014 |
| WO | 2015/055586 A1 | 4/2015 |
| WO | 2016/012550 A2 | 1/2016 |
| WO | 2016/043922 A1 | 3/2016 |
| WO | 2016/100384 A1 | 6/2016 |
| WO | 2016/156611 A1 | 10/2016 |
| WO | 2016/205201 A1 | 12/2016 |
| WO | 2017/081306 A1 | 5/2017 |
| WO | 2017/223072 A1 | 12/2017 |
| WO | 2018/017883 A1 | 1/2018 |
| WO | 2018/101222 A1 | 6/2018 |
| WO | 2018/144128 A2 | 8/2018 |
| WO | 2019/079326 A1 | 4/2019 |
| WO | 2020/046709 A1 | 3/2020 |
| WO | 2020/148296 A1 | 7/2020 |
| WO | 2021/156389 A1 | 8/2021 |

OTHER PUBLICATIONS

AT&T Product Bulletin 2987D-DLH-7/89, "High Density Interconnect System (HDIC)," Issue 2 (Copyright 1989).

"ITU Fiber Handbook" with English translation, 14 pages, Mar. 1992.

(56) References Cited

OTHER PUBLICATIONS

Northern Telecom Bulletin #91-004, Issue #2, May 1991.
"Precision Mechanical" with English translation, 5 pages.
Preface to the book "Structure, Installation, Connection and Protection of Communication Optical Fiber Cable," in Chinese with English Translation, 14 pages (Mar. 1992).
Complaint relating to Civil Action No. 5:11-cv-02509-JS, *ADC Telecommunications, Inc* v. *Opterna Am, Inc*. filed Apr. 11, 2011 (14 pages).
Complaint relating to Civil Action No. 1:11cv-735 (GBL-IDD), *ADC Telecommunications, Inc* v. *Opterna Am, Inc*. filed Jul. 12, 2011 (5 pages).
Plaintiff's Notice of Dismissal relating to Civil Action No. 5:11-cv-02509-JS, *ADC Telecommunications, Inc* v. *Opterna Am, Inc*. filed Jul. 12, 2011 (1 page).
Stipulation and Order of Dismissal relating to Civil Action No. 1:11-cv-735-GBL-IDD, *ADC Telecommunications, Inc* v. *Opterna Am, Inc*. filed Feb. 21, 2012 (2 pages).

\* cited by examiner

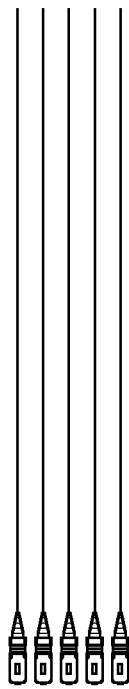
FIG. 10
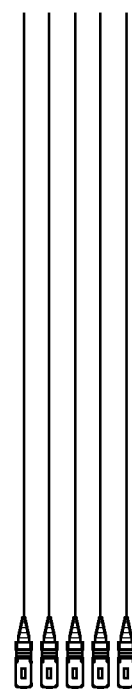
FIG. 11
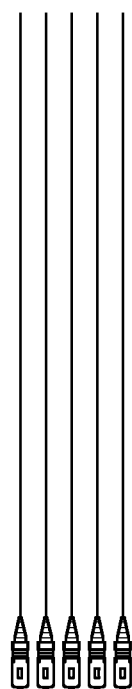
FIG. 12
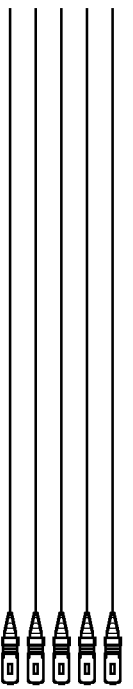
FIG. 13
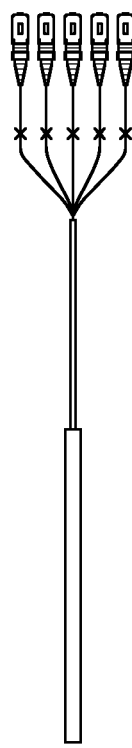
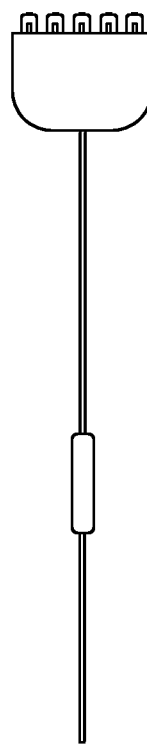
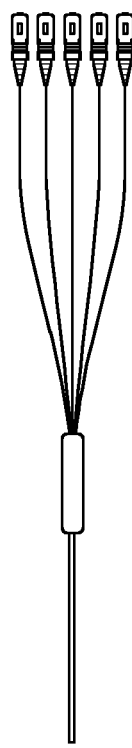
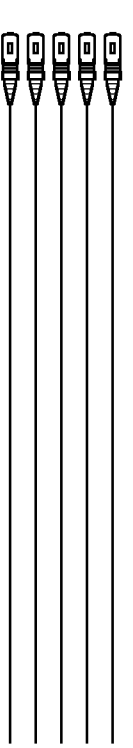

2116  2112  2100

2118  2112  2116  2100

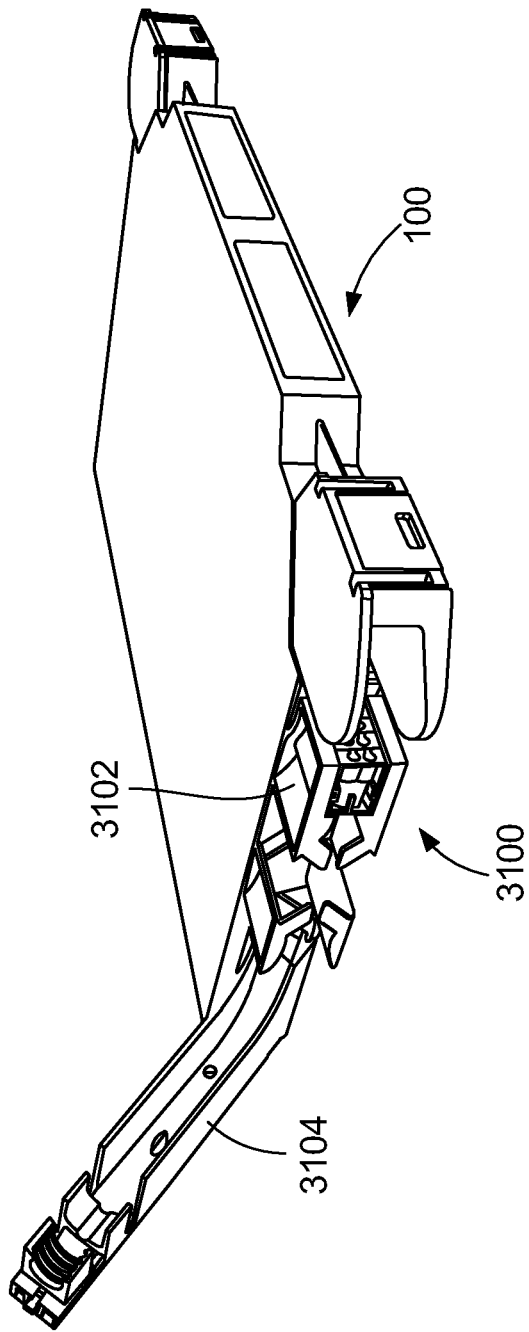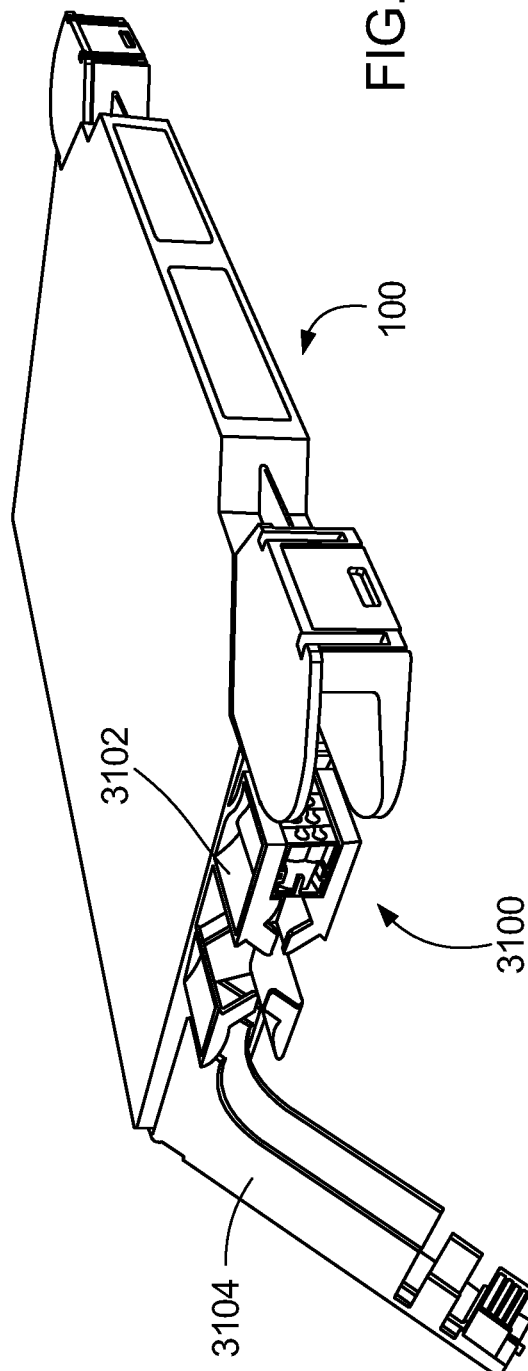

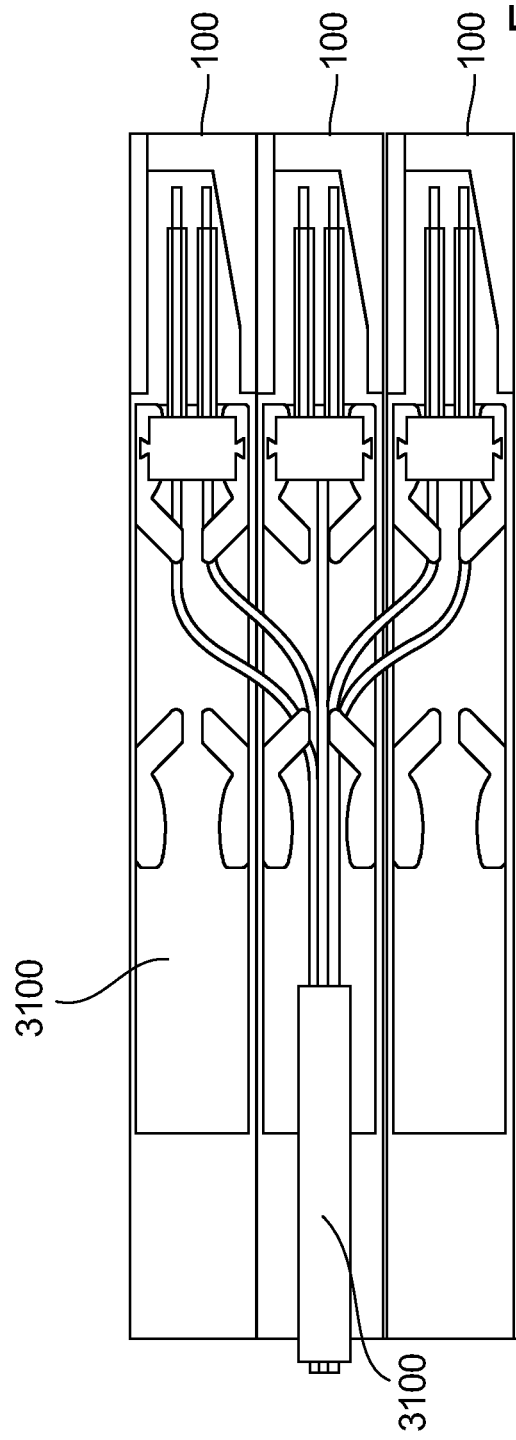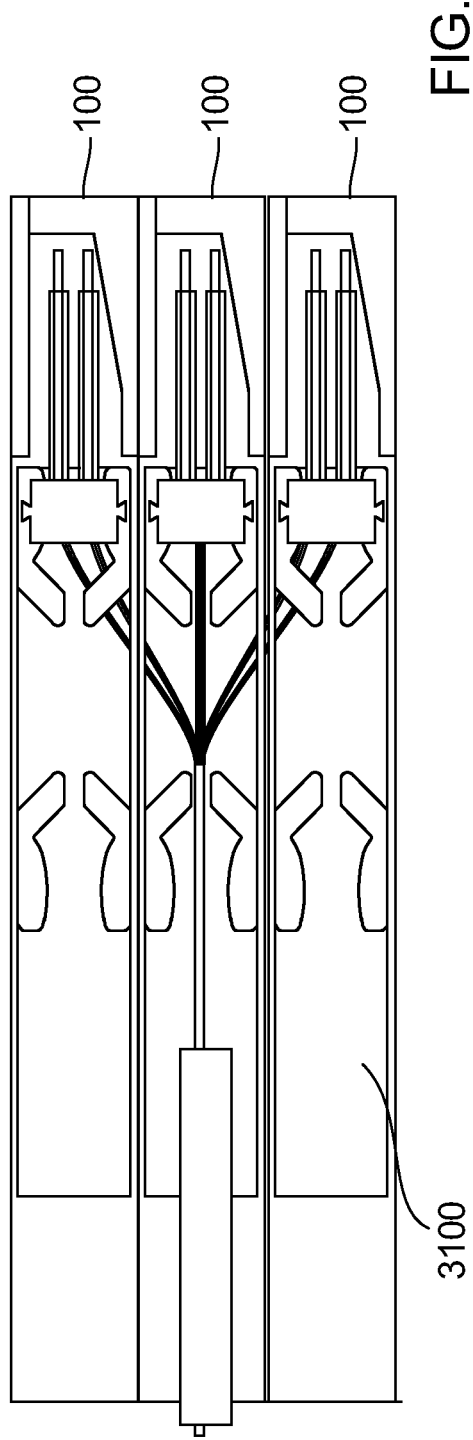

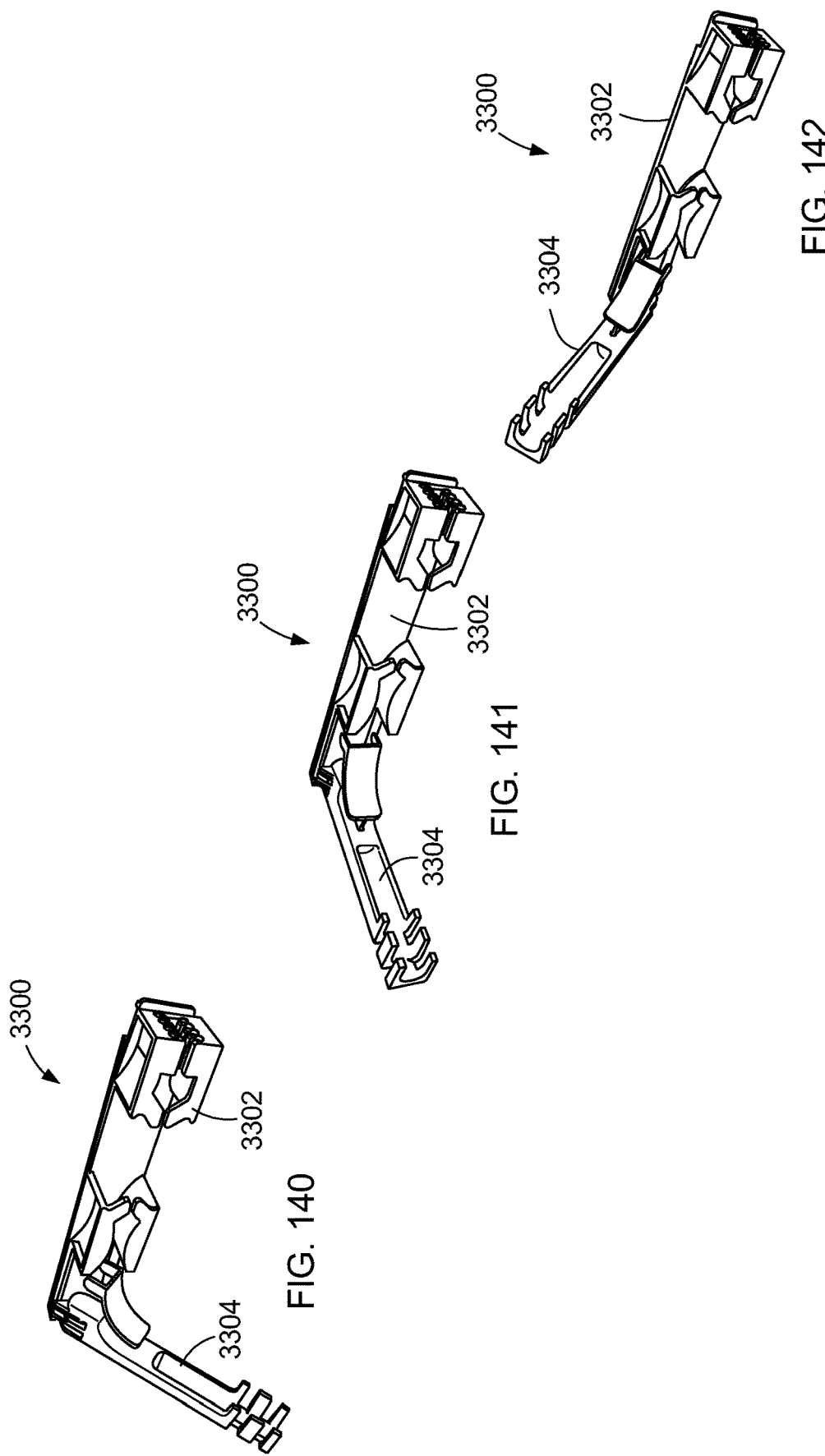

FRAME ASSEMBLIES FOR OPTICAL FIBER DISTRIBUTION ELEMENTS

CROSS-REFERENCE TO RELATED APPLICATION

This application is a Continuation of U.S. patent application Ser. No. 17/900,289, filed Aug. 31, 2022, now abandoned; which is a Continuation of U.S. patent application Ser. No. 17/187,001, filed on Feb. 26, 2021, now U.S. Pat. No. 11,448,831; which is a Continuation of PCT/EP2019/073279, filed on Aug. 30, 2019; which claims the benefit of U.S. Patent Application Ser. No. 62/725,909, filed on Aug. 31, 2018, the disclosures of which are incorporated herein by reference in their entireties. To the extent appropriate, a claim of priority is made to each of the above disclosed applications.

TECHNICAL FIELD

The present invention relates to optical fiber distribution systems, including frame assemblies and elements which populate such frame assemblies, and including components for managing and routing optical fiber cables to and from the mounted elements.

BACKGROUND

Optical fiber distribution systems include fiber terminations and other equipment which is typically frame or rack mounted. Various concerns exist for the optical fiber distribution systems, including density, ease of use, and cable management. There is a continuing need for improvements in the optical fiber distribution area.

SUMMARY

Certain implementations of a system in accordance with the examples of the disclosure include telecommunications frame assemblies where the frames of the assemblies support a plurality of optical fiber distribution elements, or other equipment and the cable routing associated with such equipment.

In one aspect, the disclosure is directed to a telecommunications frame assembly comprising a frame for housing a first set of fiber optic distribution devices in a vertically stacked arrangement on a right side of the frame and a second set of fiber optic distribution devices in a vertically stacked arrangement on a left side of the frame, wherein the frame defines top and bottom openings adjacent the outer edges of the frame at each of the right side and the left side for selectively leading cables to or from the fiber optic distribution devices to be mounted on the frame, the frame further defining a central vertical trough extending from a central top opening defined by the frame, wherein radius limiters are provided in vertically stacked arrangements at each of the right side and the left side of the frame for selectively guiding cabling between the first set and the second set of fiber optic distribution devices, wherein the radius limiters allow cabling to pass through the central trough between the right and left sides of the frame and/or into the central trough from either of the right and left sides of the frame for selective routing from or to the central top opening, the frame further defining a bottom trough that extends horizontally between the right and left sides of the frame, wherein each of the bottom openings adjacent the outer edges of the frame at the right and left sides communicate with the bottom trough and wherein the radius limiters at each of the right side and the left side of the frame also allow cabling to pass from the fiber optic distribution devices to the bottom trough.

In another aspect, the disclosure is directed to a telecommunications frame assembly comprising a frame for housing a set of fiber optic distribution devices in a vertically stacked arrangement along a central portion of the frame, wherein the frame defines a vertical trough adjacent an outer edge at a right side of the devices and a vertical trough adjacent an outer edge at a left side of the devices, wherein the frame defines top openings adjacent the outer edges of the frame at each of the right side and the left side of the frame communicating with the vertical troughs for selectively leading cables to or from the fiber optic distribution devices to be mounted at central portion of the frame, wherein at least one of the right side or the left side includes radius limiters provided in a vertically stacked arrangement within the vertical trough for leading cabling between the devices and the top openings, wherein at least one of the right side or the left side is also configured for mounting fiber fan-out fixation assemblies including fiber fan-out holders and brackets for removably mounting the fiber fan-out holders within the vertical trough.

In another aspect, the disclosure is directed to a mounting system for latching a cable management structure to a telecommunications fixture so as to prevent relative sliding between the cable management structure and the telecommunications fixture and relative separation between the cable management structure and the telecommunications fixture that is in a direction generally perpendicular to the direction of the relative sliding. The mounting system comprises a first locking feature in the form of first and second hook-like members separated apart, each defining a vertical slide portion and a vertical retention portion having a larger profile than the slide portion, the first locking feature also including an elastically flexible latch positioned between the first and second hook-like members and a second locking feature in the form of first and second slots configured to align with the first and second hook-like members of the first locking feature, wherein each of the first and second slots defines a receiver portion and a retention portion, wherein the receiver portion is sized to accommodate the larger retention portion of the hook-like member and the retention portion is sized to accommodate the slide portion but not the larger retention portion of the hook-like member, the second locking features also defining a latch opening configured to receive the flexible latch of the first locking feature for preventing relative sliding between the cable management structure and the telecommunications fixture once the vertical slide portion of each hook-like member has been slid through the retention portion of each slot and the retention portion of each hook-like member is out of alignment with the receiver portion of each slot.

In another aspect, the disclosure is directed to a cable management structure comprising a fixation portion including a locking feature in the form of first and second hook-like members separated apart, each defining a vertical slide portion and a vertical retention portion having a larger profile than the slide portion, the locking feature also including an elastically flexible latch positioned between the first and second hook-like members and a bend radius protection portion extending from the fixation portion, the bend radius protection portion defining a curved profile.

In another aspect, the disclosure is directed to telecommunications device fixation assembly comprising a bracket configured to be mounted to a telecommunications fixture, the bracket defining at least one planar wall, and a device holder configured to be removably mounted to the bracket, the device holder defining a device holding portion and a fixation portion, wherein the fixation portion defines at least one pocket configured to receive an edge of the planar wall of the bracket, the fixation portion further including an elastically flexible latch configured to snap fit to a portion of the planar wall of the bracket to fix the device holder to the bracket.

In another aspect, the disclosure is directed to a telecommunications device holder for fixedly mounting a telecommunications device to a fixture, the device holder comprising a device holding portion and a fixation portion, wherein the fixation portion defines at least one pocket configured to receive an edge of a wall, the fixation portion further including an elastically flexible latch configured to abut against another edge of the wall that is spaced apart from the edge of the wall received by the at least one pocket.

In another aspect, the disclosure is directed to a cable fixation structure for fixing at least a portion of a fiber optic cable to a telecommunications fixture against strain relief, the structure comprising a cable bracket portion and a base portion, wherein the cable bracket portion is configured for fixing the at least a portion of the fiber optic cable and the base is configured for routing fibers extending from the fiber optic cable. wherein the cable bracket portion is provided at an acute angle with respect to a vertical plane passing through a longitudinal axis defined by the base portion.

In another aspect, the disclosure is directed to cable fixation structure for fixing at least a portion of a fiber optic cable to a telecommunications fixture against strain relief, the structure comprising a base portion defining a series of pivot pins provided in a stepped configuration and a series of latch pins provided in a stepped configuration spaced apart from and corresponding to the pivot pins and a cable clamp portion pivotally mounted on a selected one of the pivot pins and configured to be latched on a corresponding one of the latch pins to clamp a cable against the base, wherein the cable clamp portion is removable and remountable on a selected pivot pin and can be latched on a corresponding latch pin depending upon the size and or the number of cables being fixed by the cable fixation structure.

In another aspect, the disclosure is directed to a cable management structure comprising a base portion for removable mounting on a telecommunications fixture, the base portion defining an upper guide portion and a lower guide portion separated by a cable channel, wherein a transverse slit defined between the upper and lower guide portions communicates with the cable channel for insertion of cables into the channel and a flexible portion that is elastically flexible and is biased to cover at least a portion of the slit for retaining cables within the channel.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIGS. 10-13 illustrate the types of cables on the fixed side of the elements that can be paired with the jumpers that are provided on the flexible side of the elements in a given frame of the cross-connect assembly.

FIG. 128 illustrates another example of a tube holder that can be slidably received by the base of the fixation structure of FIG. 121.

FIG. 129 is an example of another embodiment of a strength member fixation structure having features that are similar to that shown in FIGS. 121-128.

FIG. 130 illustrates a plurality of the strength member fixation structure shown in FIG. 129 shown mounted to sides of optical distribution elements in a vertically stacked arrangement.

FIG. 131 illustrates one of the optical distribution elements in isolation with the fixation structure of FIG. 130 mounted thereon with the cable bracket in an upwardly angled orientation.

FIG. 132 illustrates an optical distribution element in isolation with the fixation structure of FIG. 130 mounted thereon with the cable bracket in a downwardly angled orientation.

FIG. 133 illustrates another stack of optical distribution elements similar to that shown in FIGS. 130-132 with a plurality of the strength member fixation structures of FIG. 129 mounted to the sides thereof.

Figure 133:
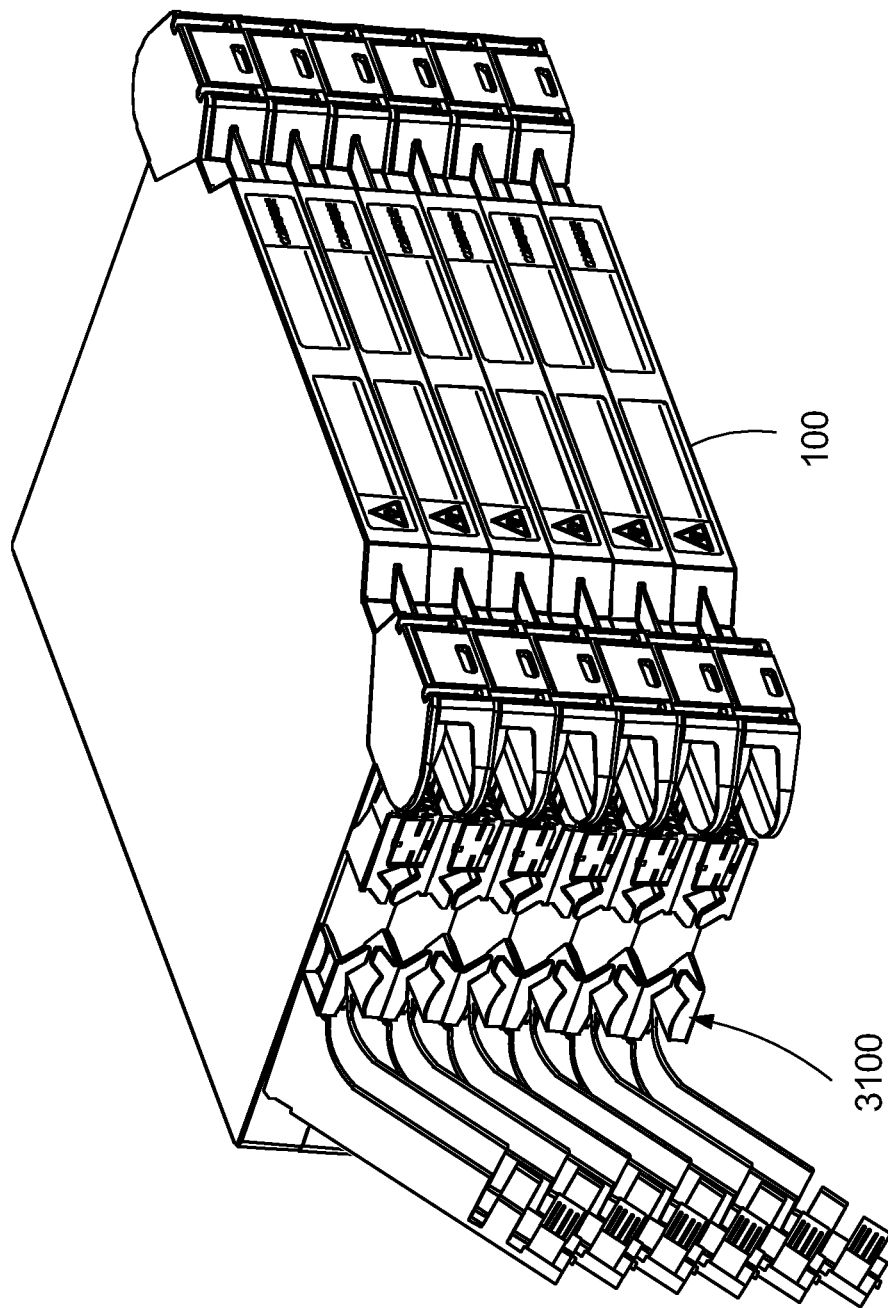
Figure 134:
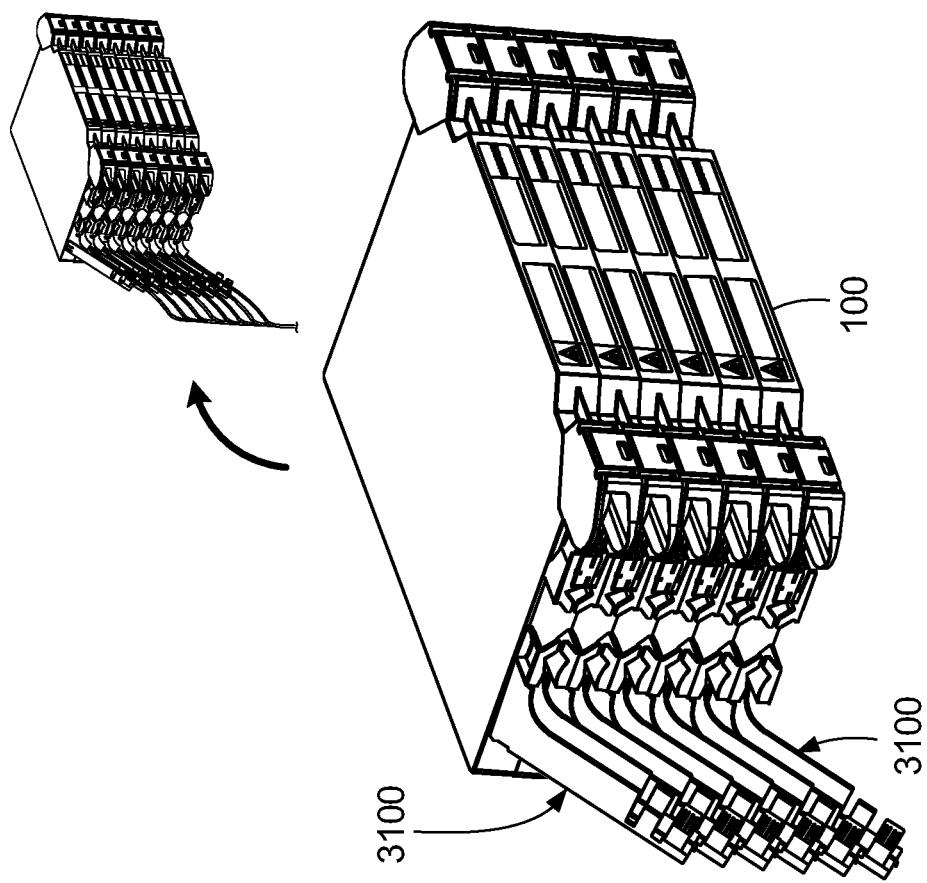

FIG. 134 schematically illustrates a stack of optical distribution elements similar to that shown in FIG. 133 where the strength member fixation structures are used to route fibers to respective elements from cabling mounted at each of the elements.

Figure 135:
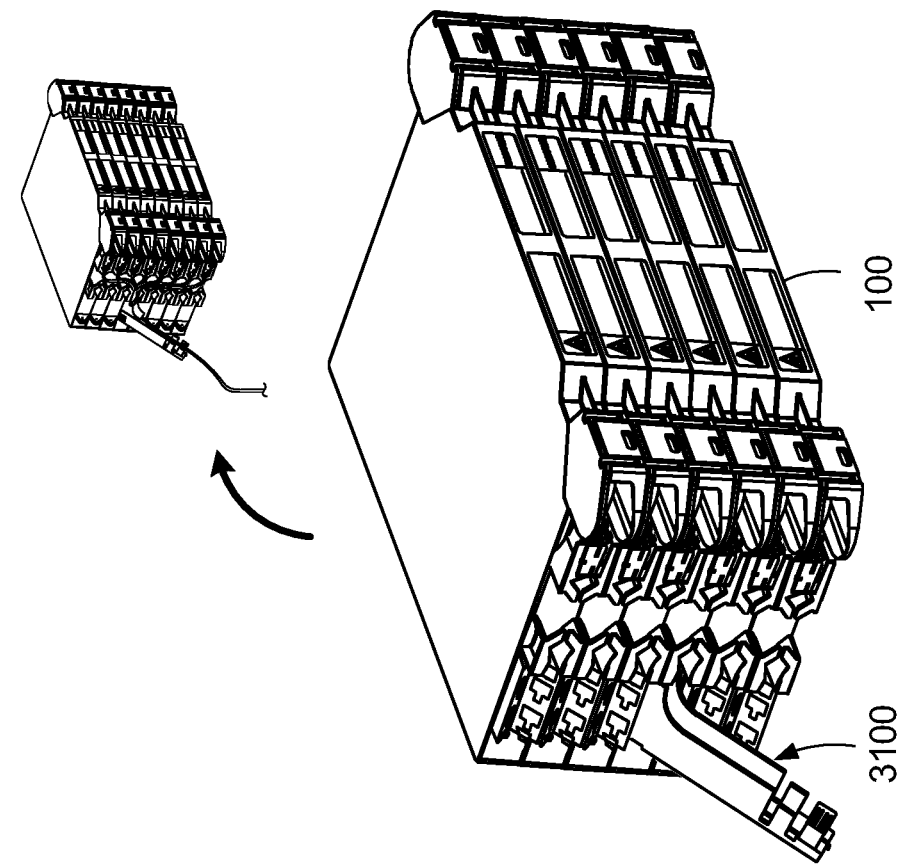

FIG. 135 schematically illustrates a stack of optical distribution elements similar to that shown in FIG. 134 but using a single strength member fixation structure to route fibers from a single cable to different elements within the stack.

Figure 129:
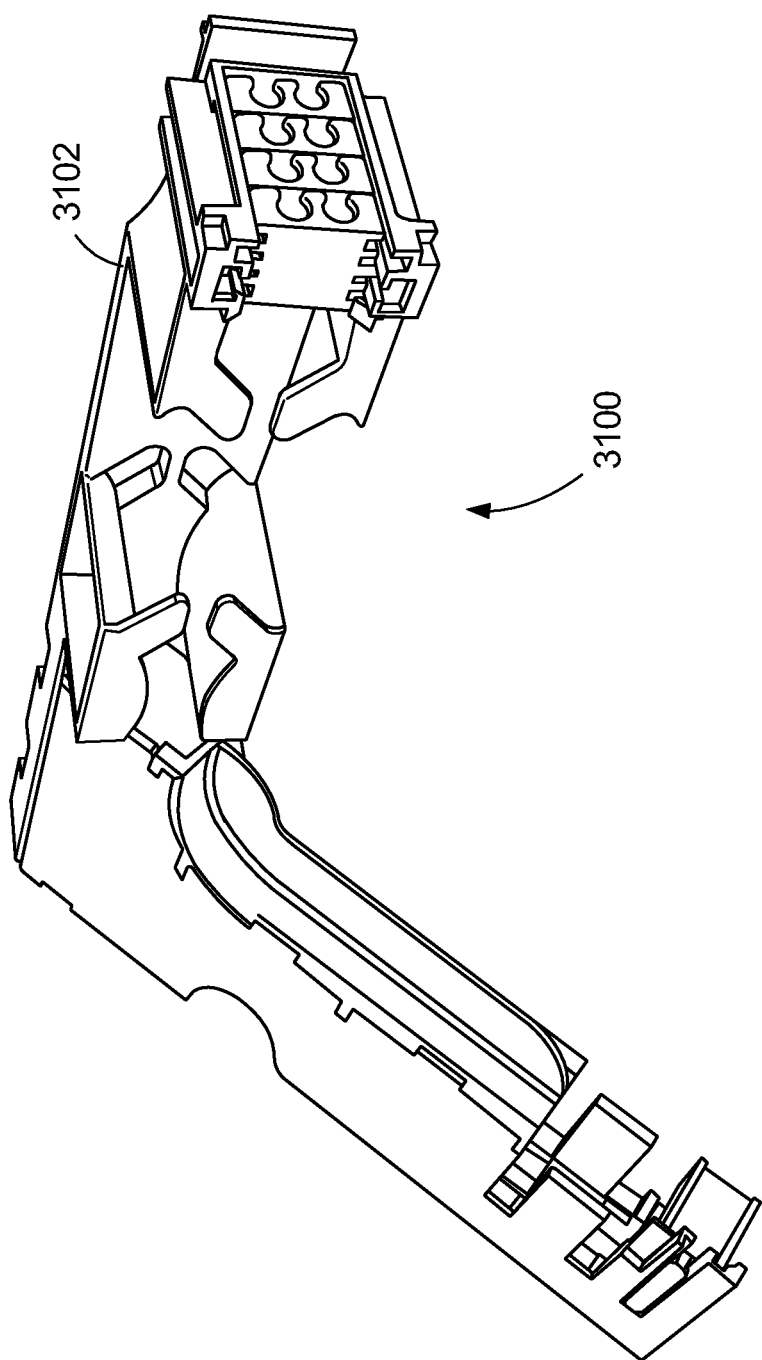
Figure 130:
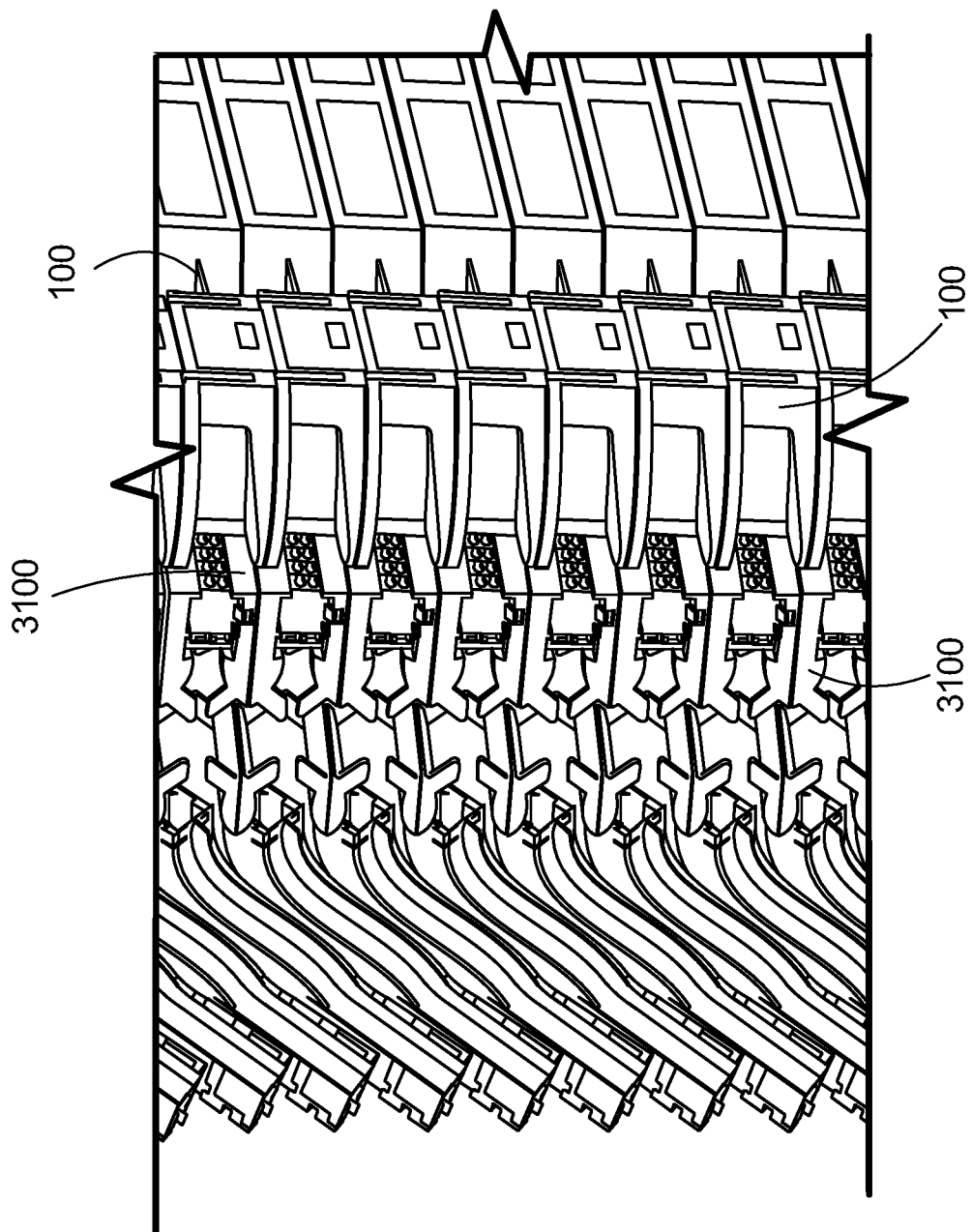

FIG. 136 schematically illustrates the use of the strength member fixation structures of FIG. 129 for routing of a plurality of fiber carrying tubes of a single cable to different optical distribution elements in a stack.

FIG. 137 schematically illustrates the use of the strength member fixation structures of FIG. 129 for routing the optical fibers of a single cable to different optical distribution elements in a stack.

Figure 138:
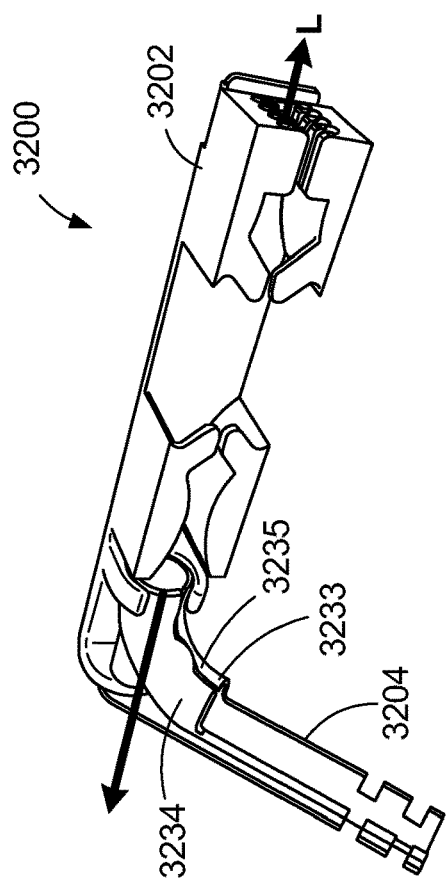

FIG. 138 is an example of another embodiment of a strength member fixation structure having features that are similar to that shown in FIGS. 121-137 but utilizing a free-hinging design between the base and the cable bracket.

Figure 139:
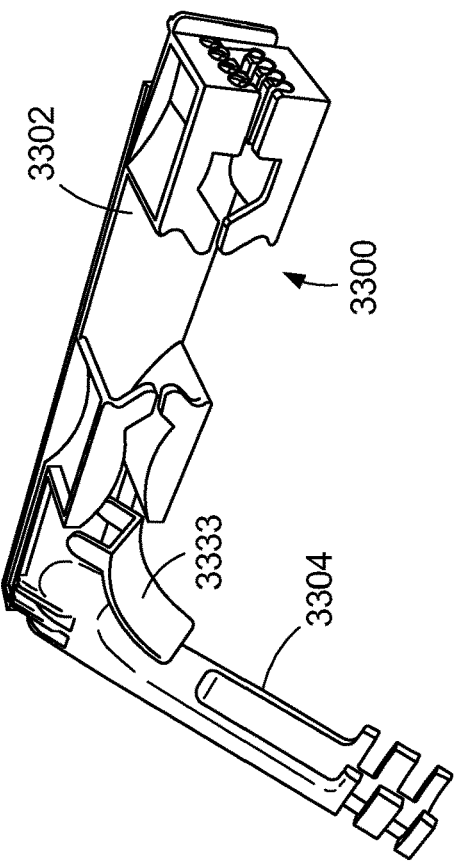

FIG. 139 is another embodiment of a strength member fixation structure utilizing a free-hinging design between the base and the cable bracket.

FIG. 140 illustrates the strength member fixation structure of FIG. 139 with the cable bracket at a downwardly angled orientation with respect to the base.

FIG. 141 illustrates the strength member fixation structure of FIG. 139 with the cable bracket orientated along the same horizontal plane with respect to the base.

FIG. 142 illustrates the strength member fixation structure of FIG. 139 with the cable bracket at an upwardly angled orientation with respect to the base.

Figure 143:
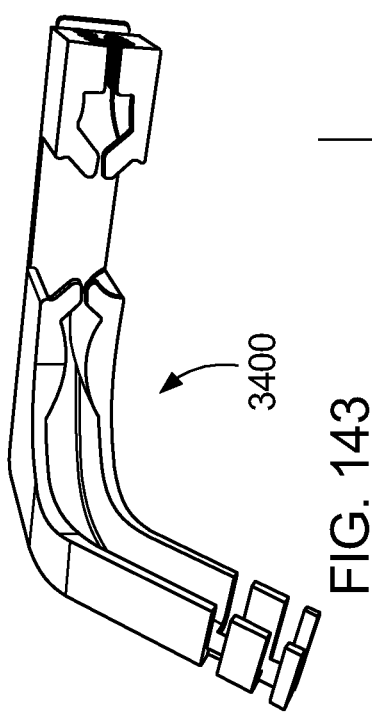

FIG. 143 is another embodiment of a strength member fixation structure having features similar to those shown in FIGS. 121-142 but utilizing a design where the cable bracket is integrally formed with and fixed to the base portion of the fixation structure at an angled orientation.

Figure 144:
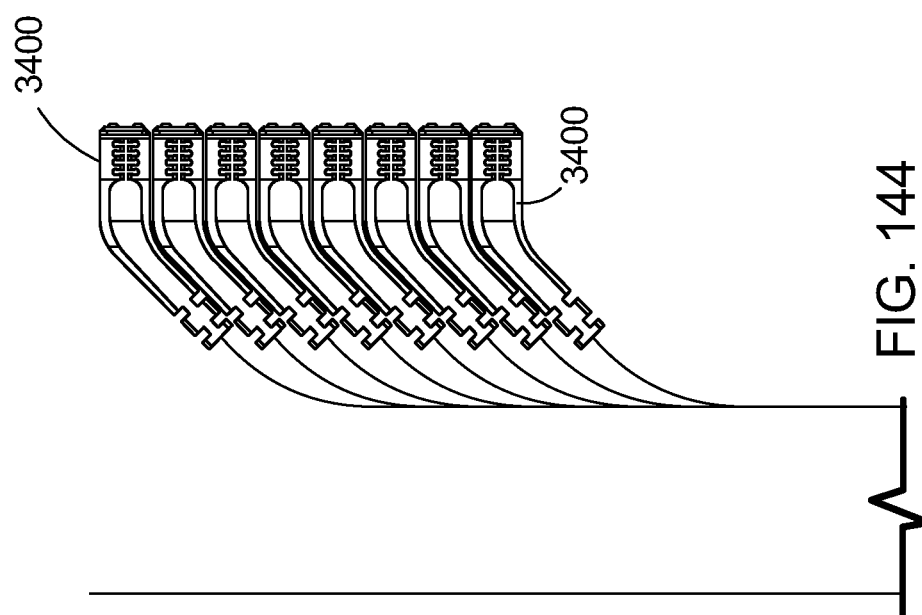

FIG. 144 illustrates a side view of a plurality of the fixation structures of FIG. 143 in a vertically stacked arrangement.

Figure 145:
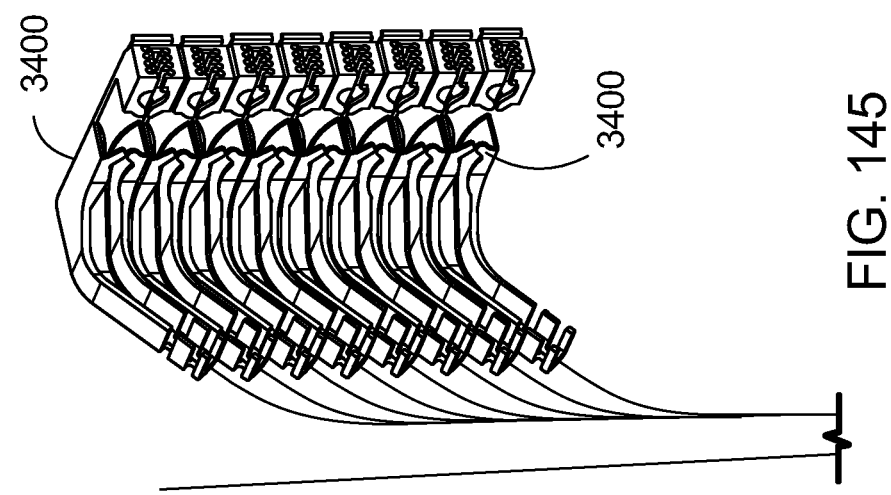

FIG. 145 illustrates a front perspective view of a plurality of the fixation structures of FIG. 143 in a vertically stacked arrangement.

Figure 146:
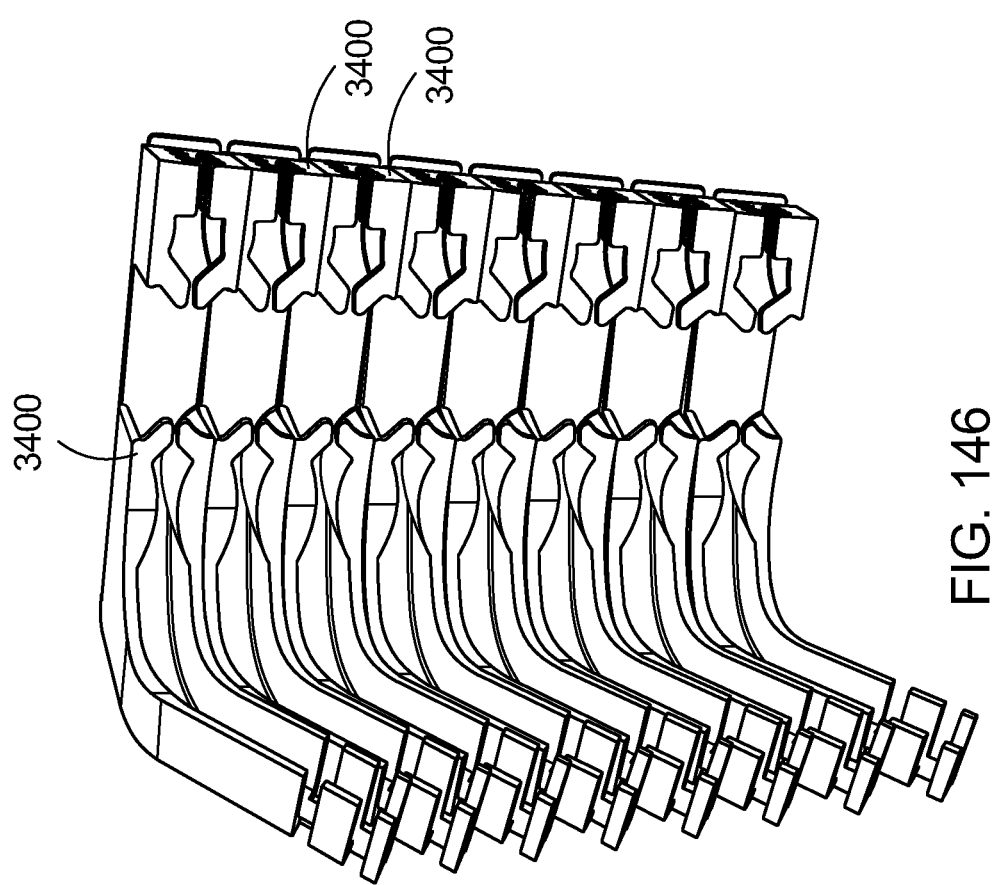

FIG. 146 illustrates another perspective view of a plurality of the fixation structures of FIG. 143 in a vertically stacked arrangement.

Figure 147:
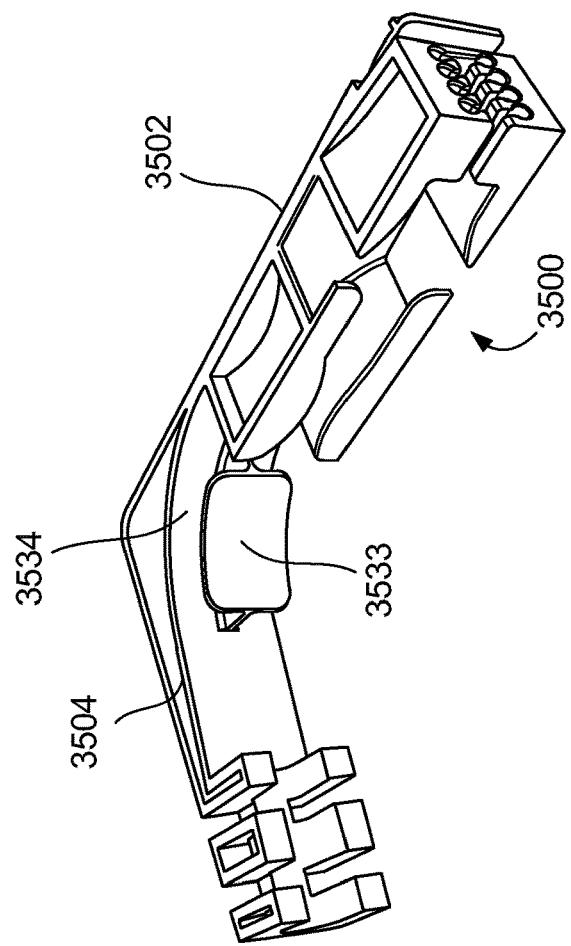

FIG. 147 is another embodiment of a strength member fixation structure having features similar to those shown in FIGS. 121-146 but utilizing a design where the cable bracket is integrally formed with and fixed to the base portion of the fixation structure, wherein the cable bracket and the base are aligned along a horizontal plane and wherein the cable bracket forms an angle with the base along a vertical plane that goes through a longitudinal axis defined by the base.

Figure 148:
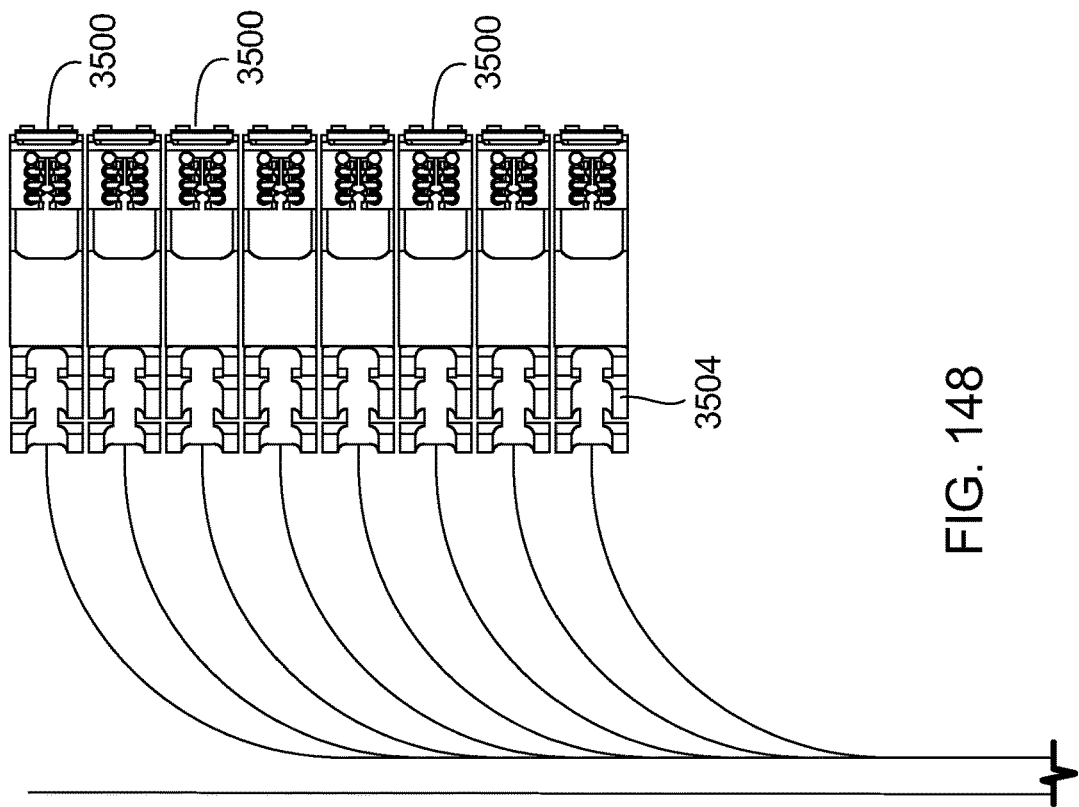

FIG. 148 illustrates a side view of a plurality of the fixation structures of FIG. 147 in a vertically stacked arrangement.

Figure 149:
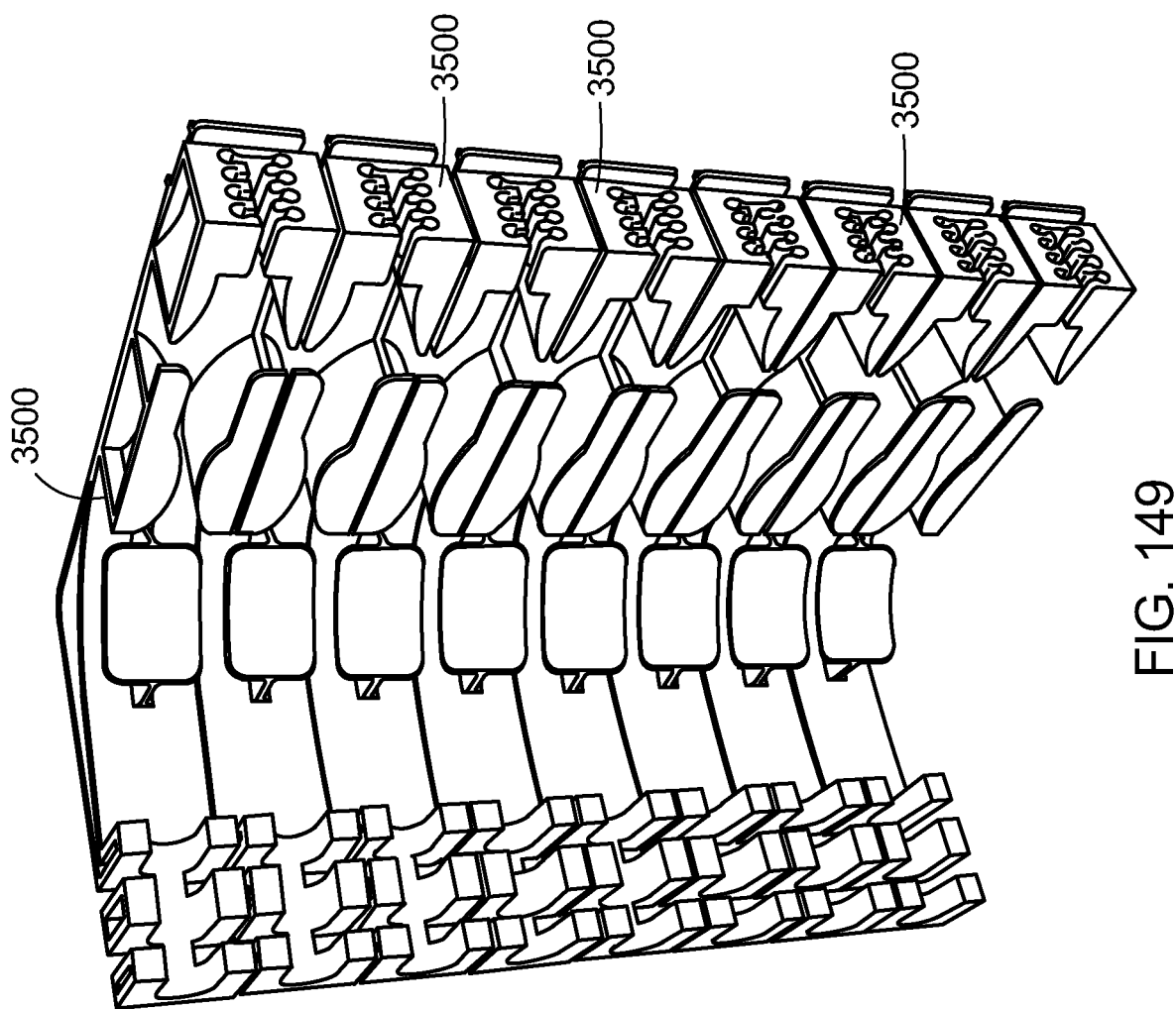

FIG. 149 illustrates a front perspective view of a plurality of the fixation structures of FIG. 147 in a vertically stacked arrangement.

Figure 150:
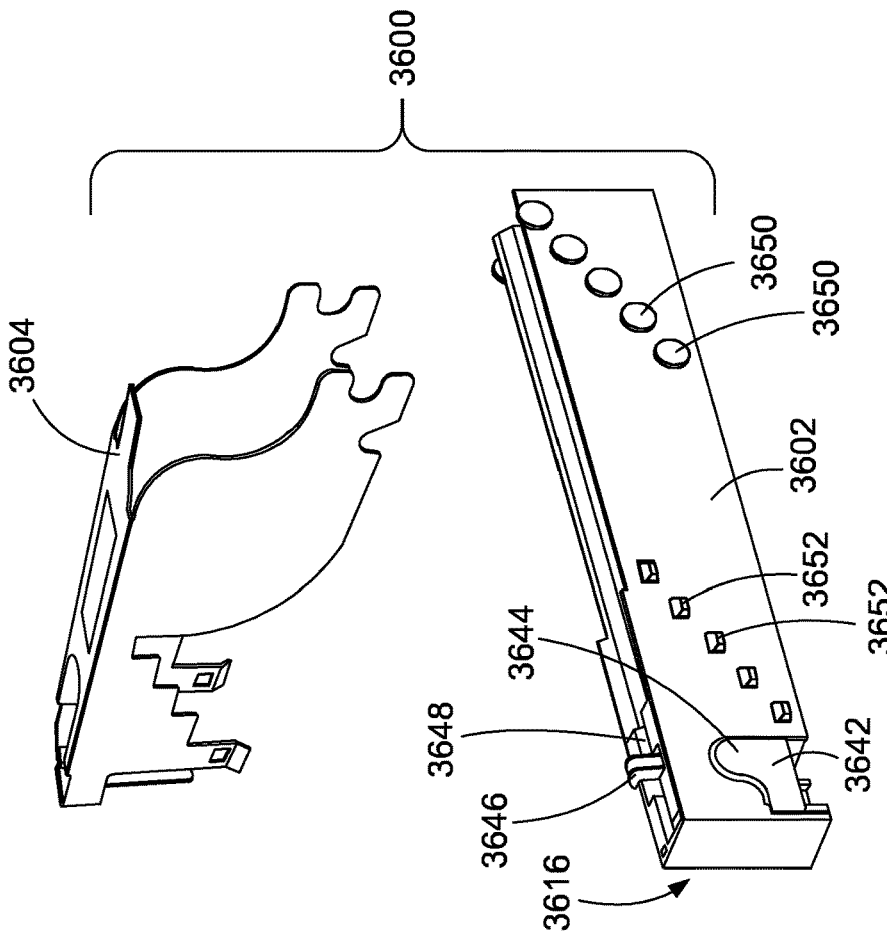

FIG. 150 is an example of another embodiment of a strength member fixation structure that provides a universal-type clamping mechanism for accommodating different sizes and numbers of cabling, the fixation structure shown in an exploded configuration.

Figure 151:
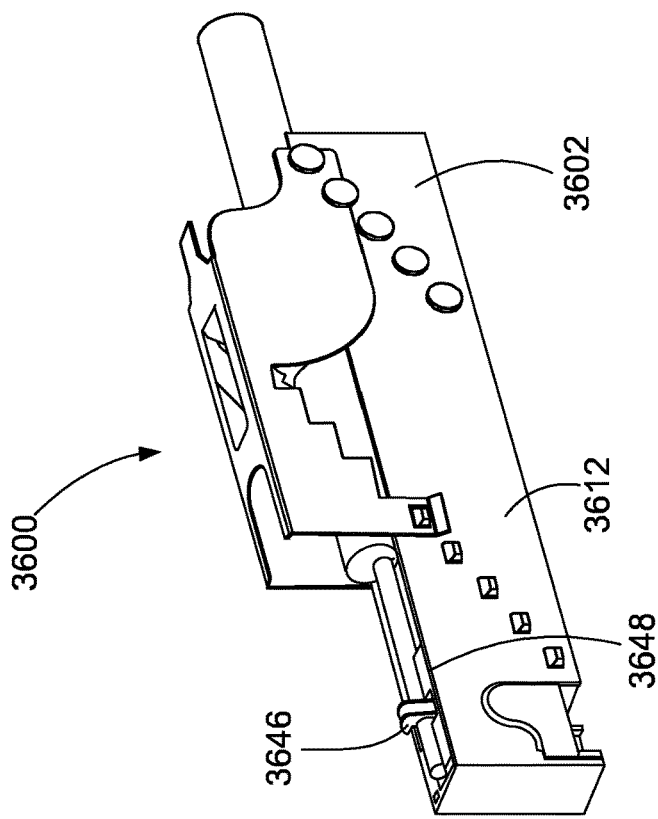

FIG. 151 illustrates the strength member fixation structure of FIG. 150 in an assembled configuration with the clamp portion in a pivoted down orientation with respect to the base for clamping a cable.

Figure 152:
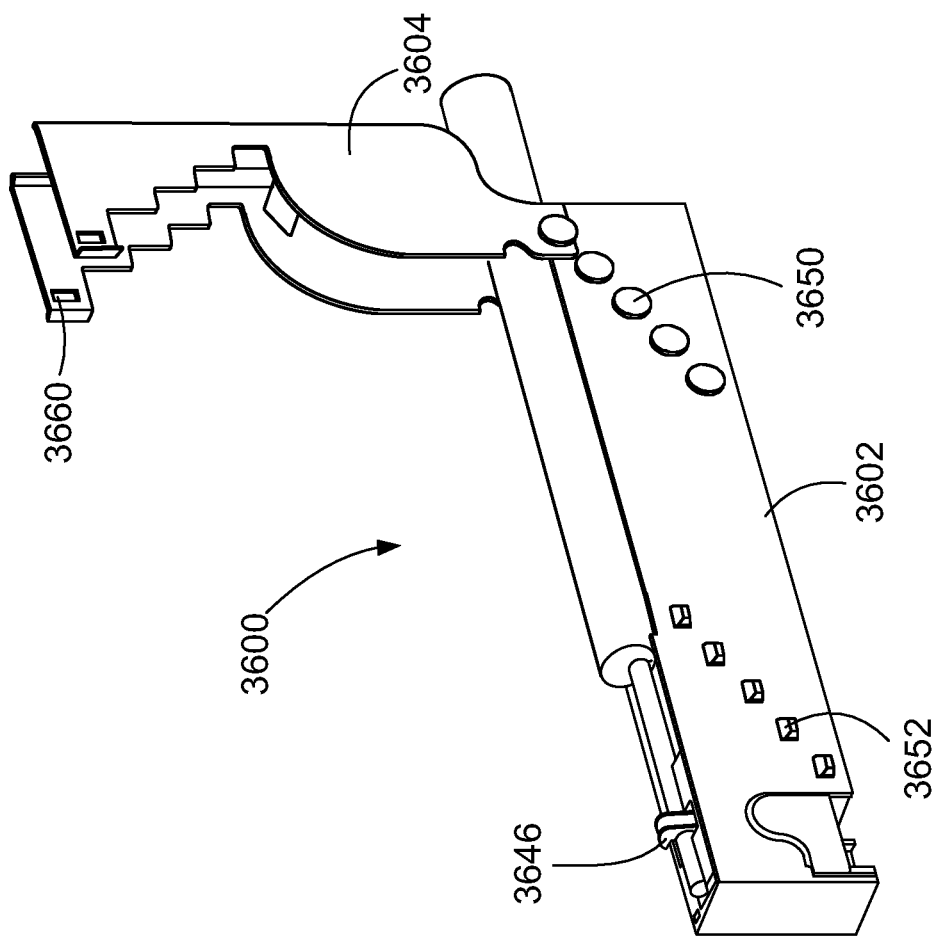
Figure 155:
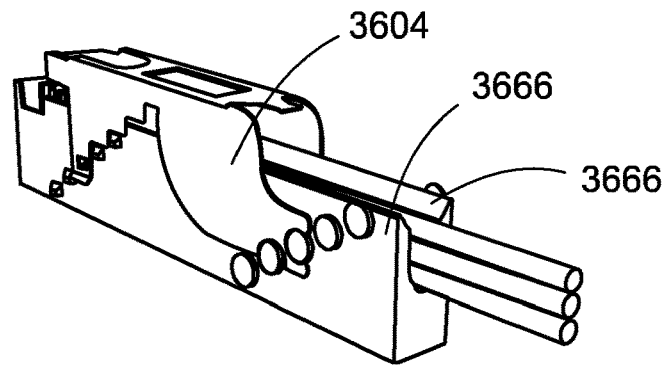
Figure 156:
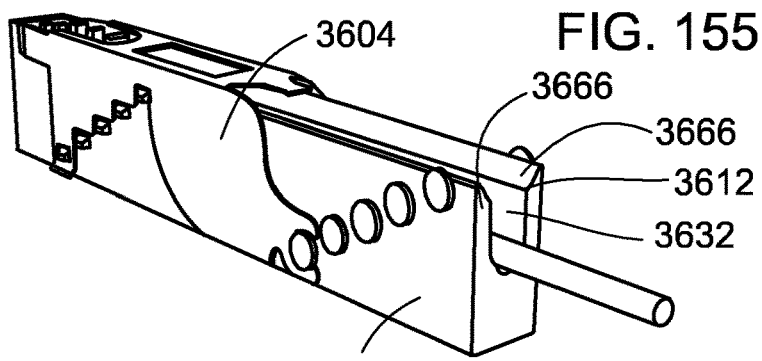
Figure 157:
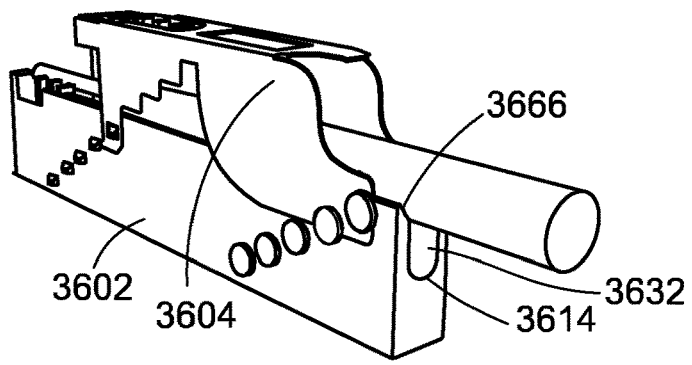
Figure 158:
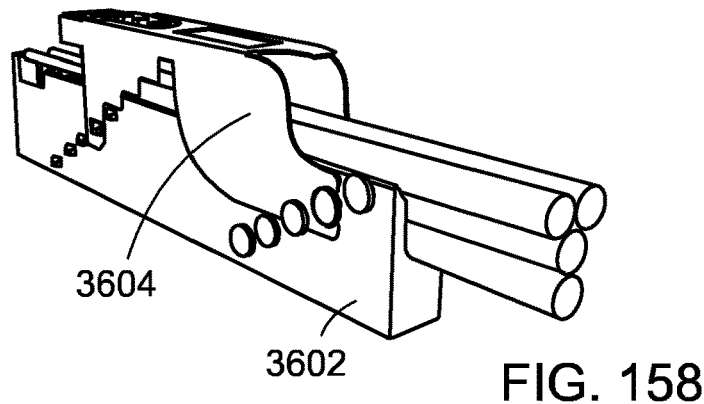

FIG. 152 illustrates the fixation structure of FIGS. 150-151 with the clamp portion in a non-clamped orientation.

Figure 153:
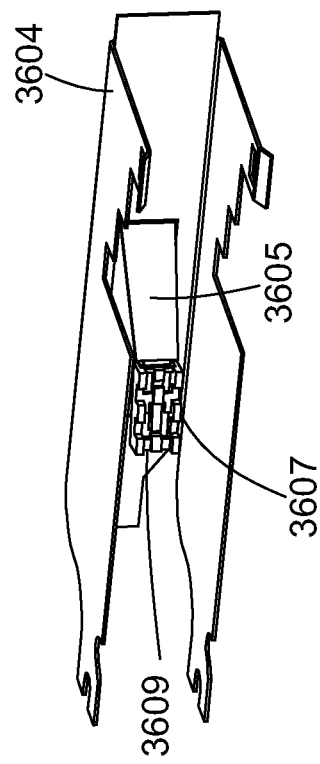

FIG. 153 illustrates a bottom perspective view of an example embodiment of the clamp portion of the fixation structure of FIGS. 150-152.

Figure 154:
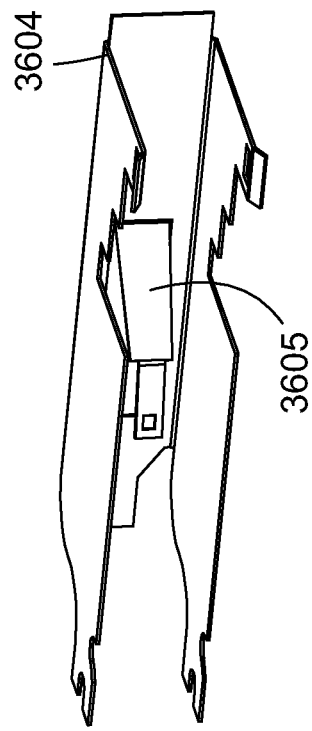

FIG. 154 illustrates a bottom perspective view of another example embodiment of the clamp portion of the fixation structure of FIGS. 150-152.

FIGS. 155-158 illustrate fixation structure of FIGS. 150-152 in various configurations for clamping various numbers and sizes of cables.

Figure 159:
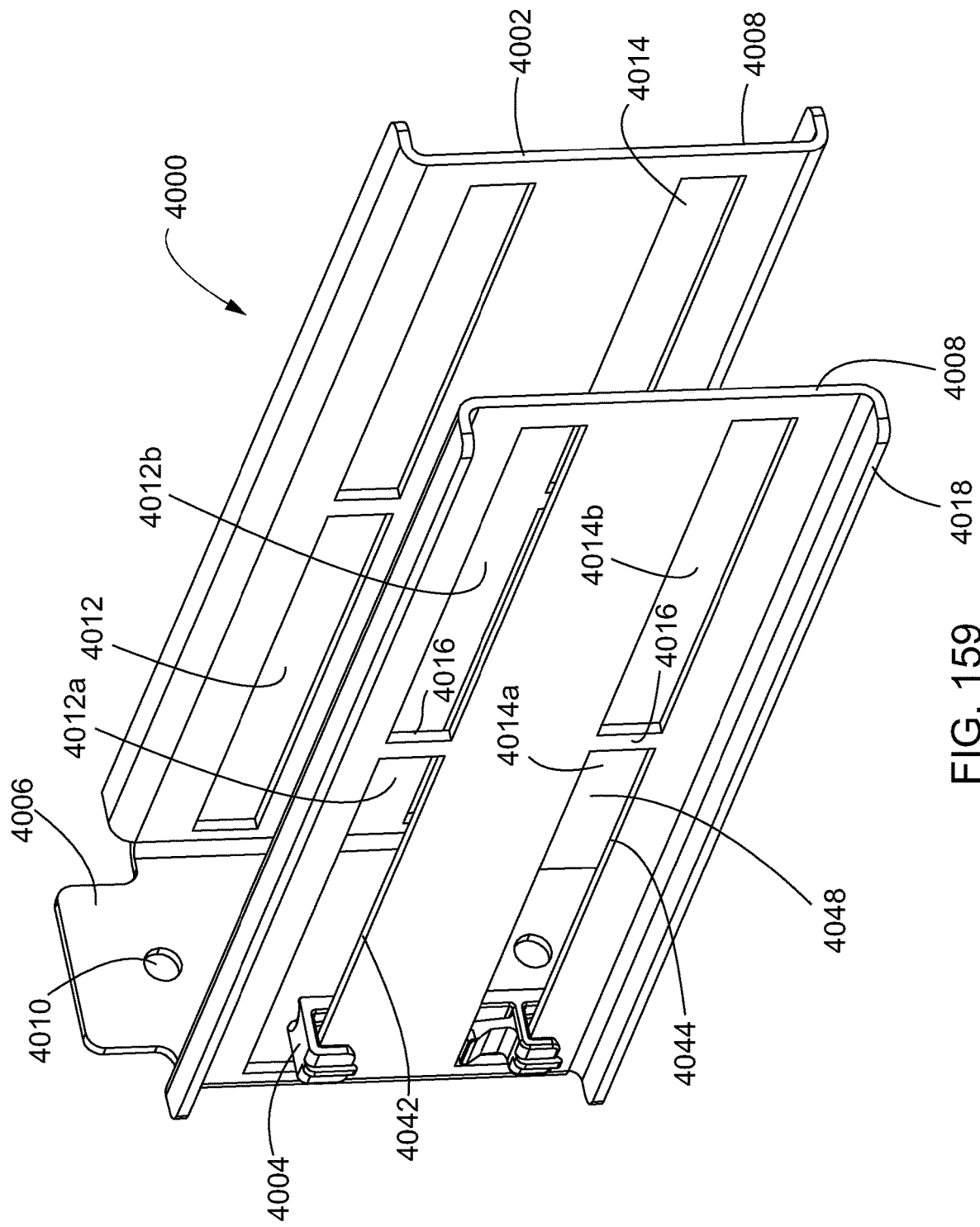

FIG. 159 is an example of a fan-out fixation assembly having features that are examples of inventive aspects in accordance with the present disclosure, the fixation assembly shown with a bracket and one fan-out holder mounted on the bracket.

Figure 160:
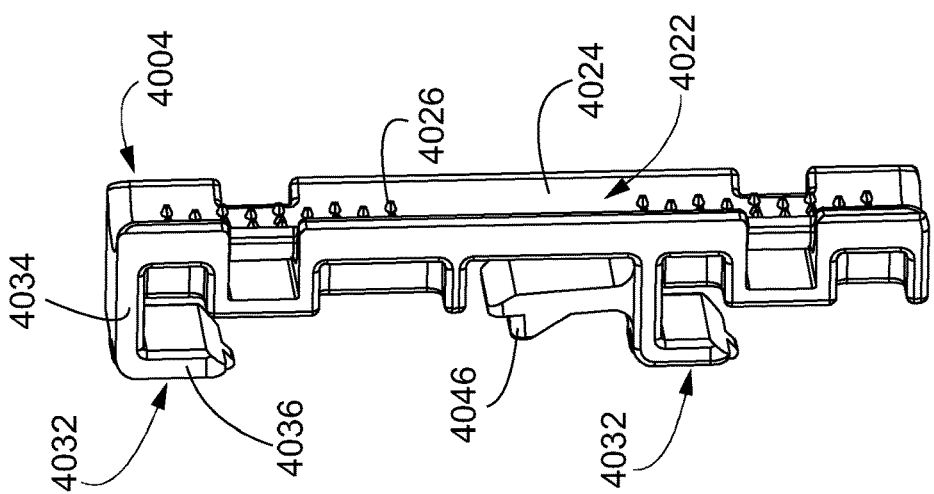

FIG. 160 illustrates a rear perspective view of the fan-out holder of the fixation assembly of FIG. 159.

Figure 161:
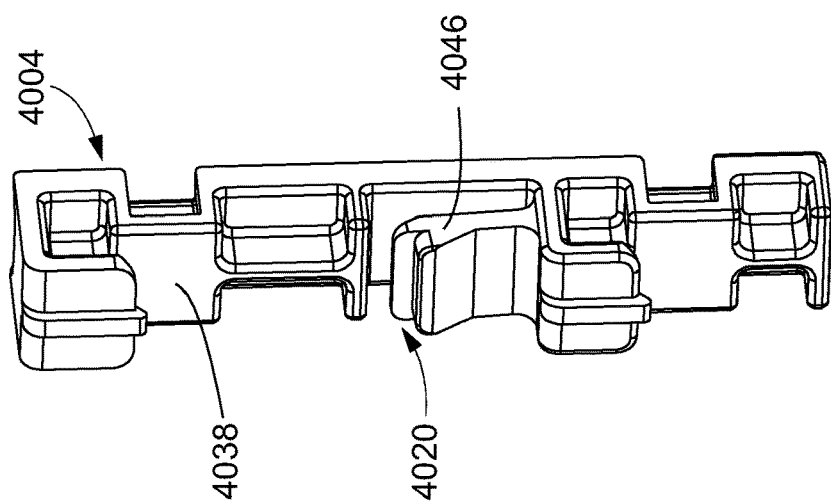

FIG. 161 illustrates a front perspective view of the fan-out holder of the fixation assembly of FIG. 159.

Figure 162:
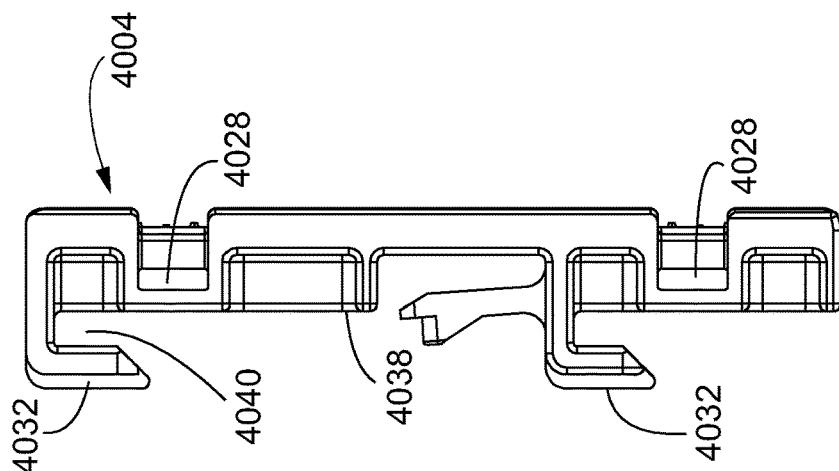

FIG. 162 illustrates a side view of the fan-out holder of the fixation assembly of FIG. 159.

Figure 163:
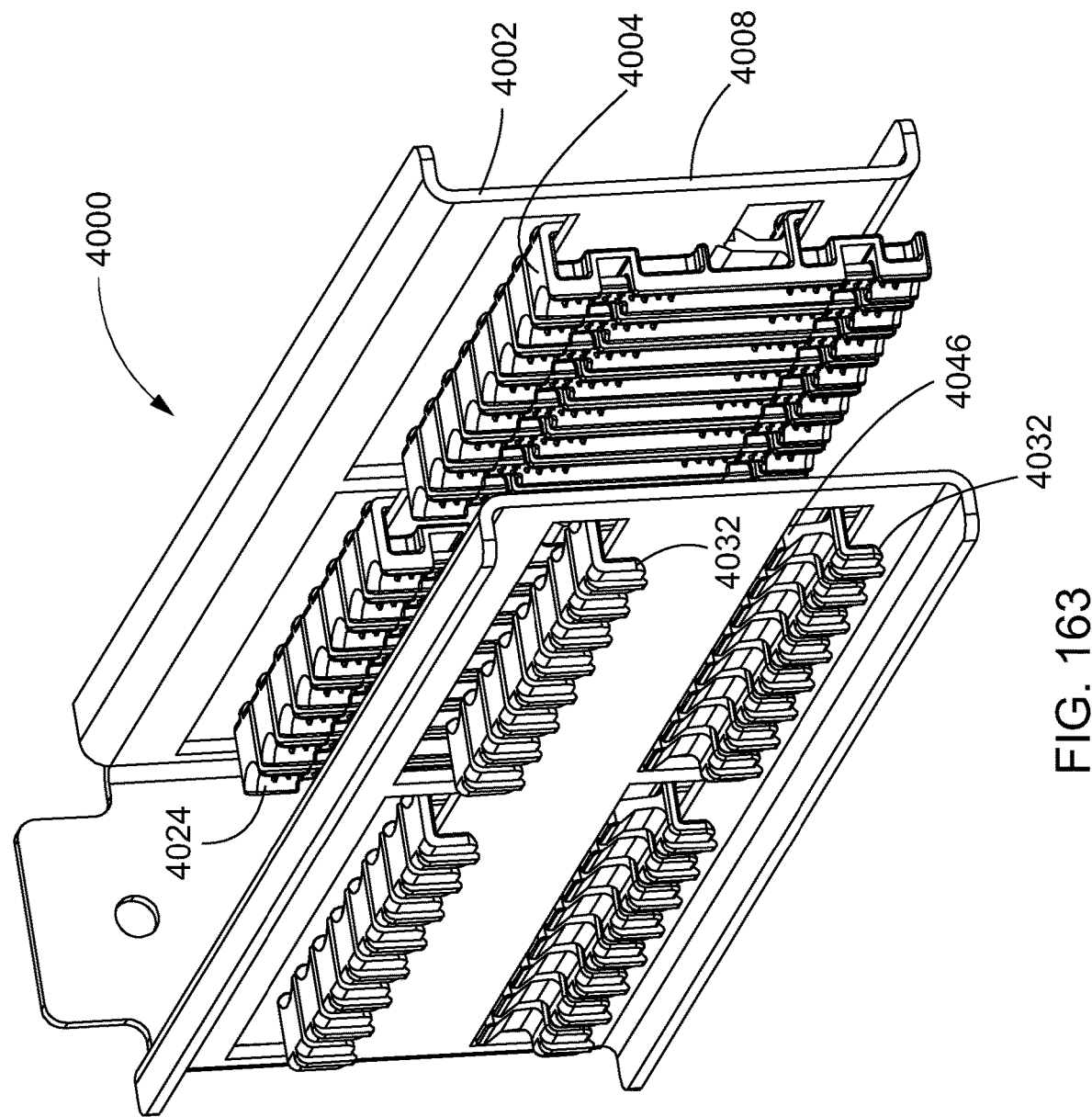

FIG. 163 illustrates the fan-out fixation assembly of FIG. 159 with the bracket thereof fully populated with the fan-out holders thereof.

Figures 164, 165:
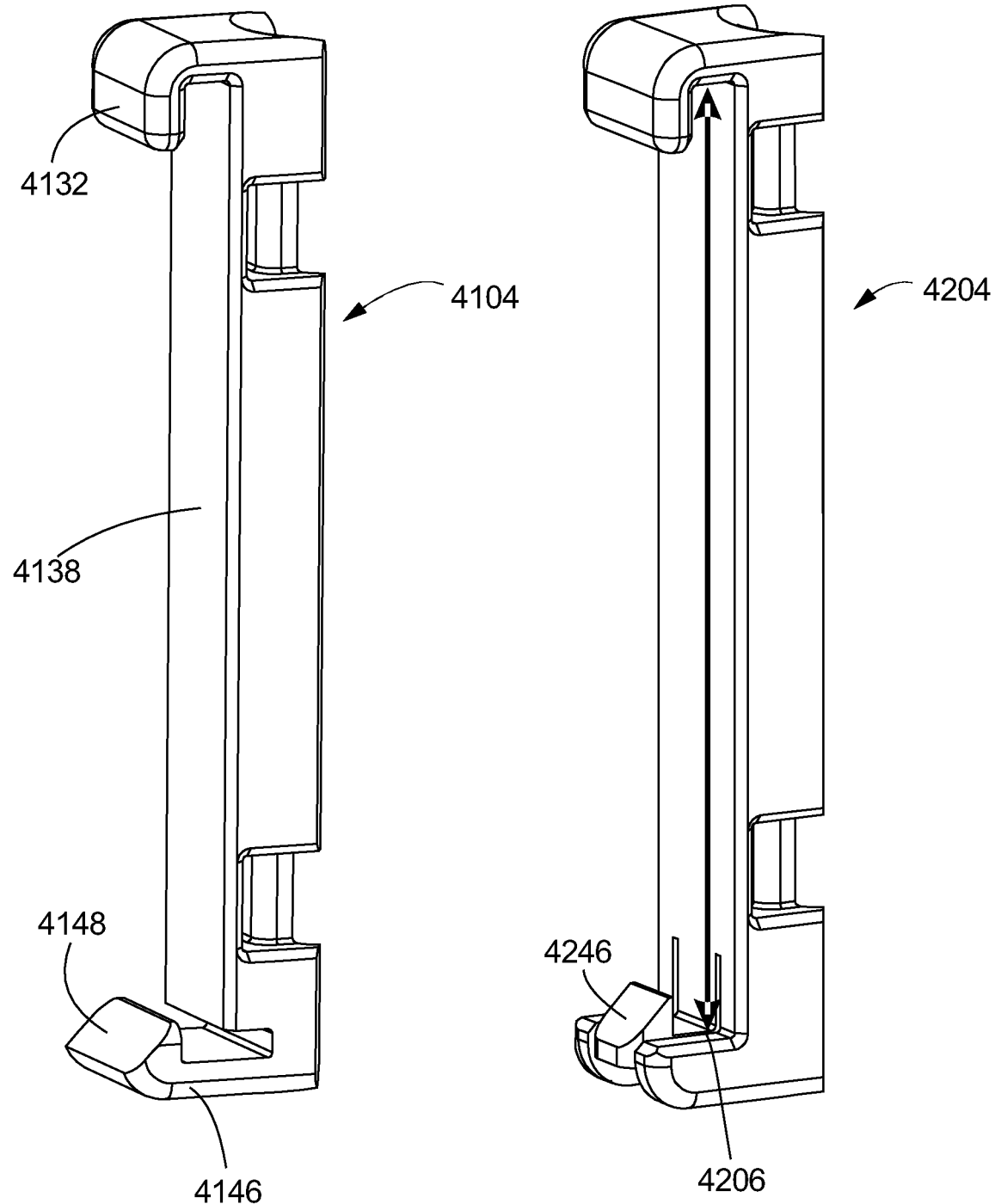

FIG. 164 is an example of another embodiment of a fan-out holder having features that are similar to that shown in FIGS. 160-162.

FIG. 165 is an example of yet another embodiment of a fan-out holder having features that are similar to that shown in FIG. 164.

Figure 166:
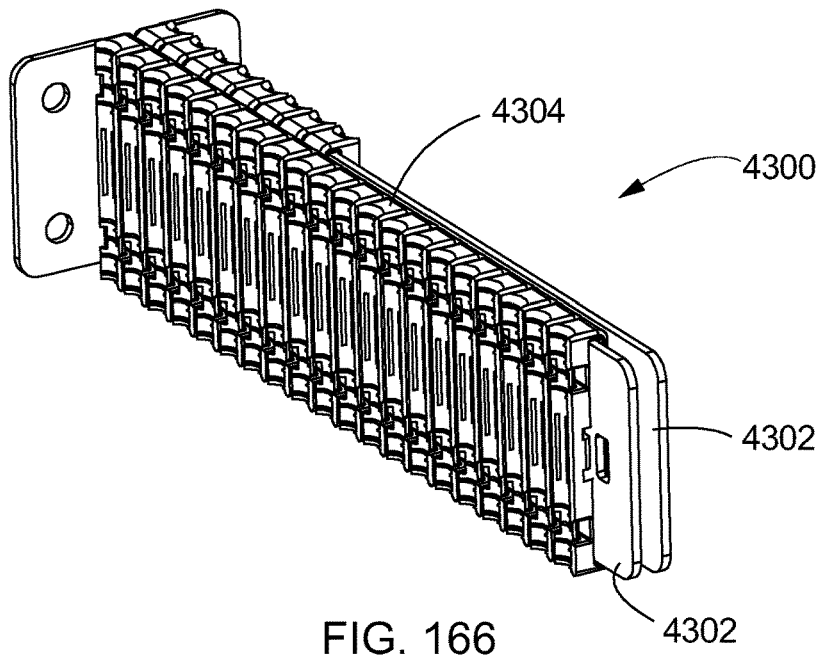

FIG. 166 illustrates another embodiment of a fan-out fixation assembly utilizing another bracket and fan-out holders.

Figures 167, 168:
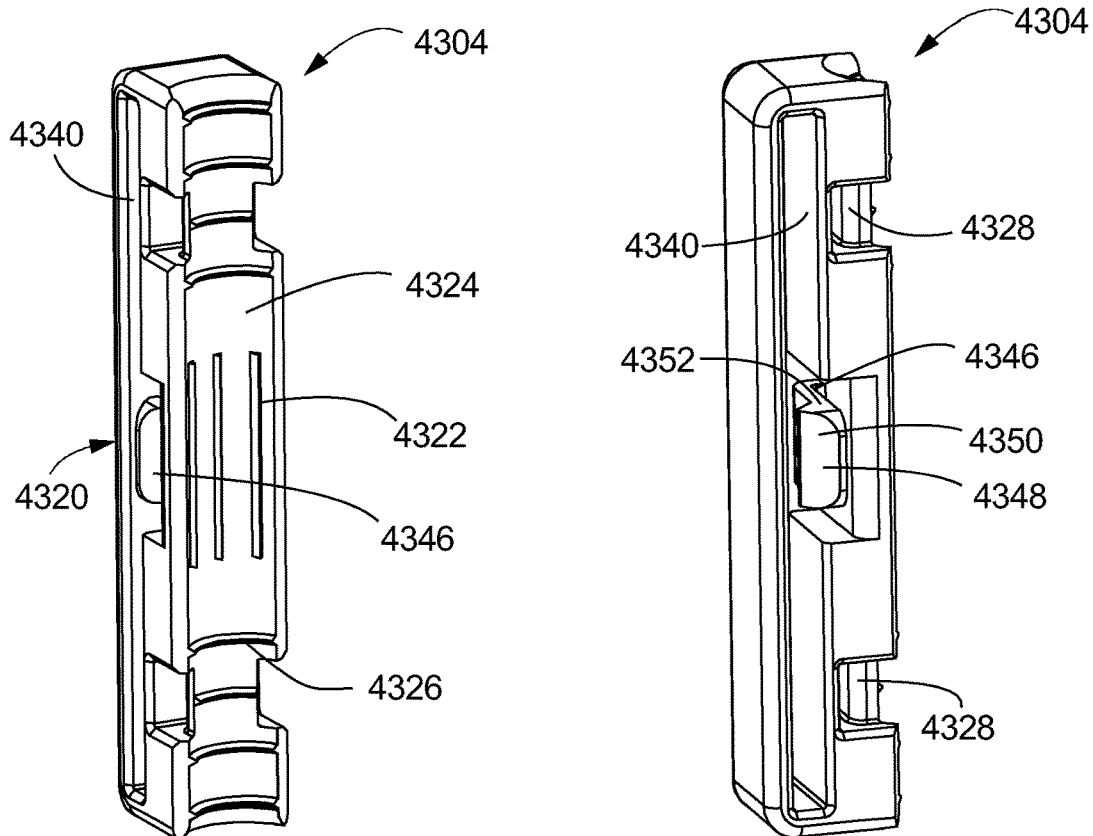

FIG. 167 is a rear perspective view of one of the fan-out holders that is used on the fan-out fixation assembly shown in FIG. 166.

FIG. 168 is a side perspective view of the fan-out holder of FIG. 167.

Figure 169:
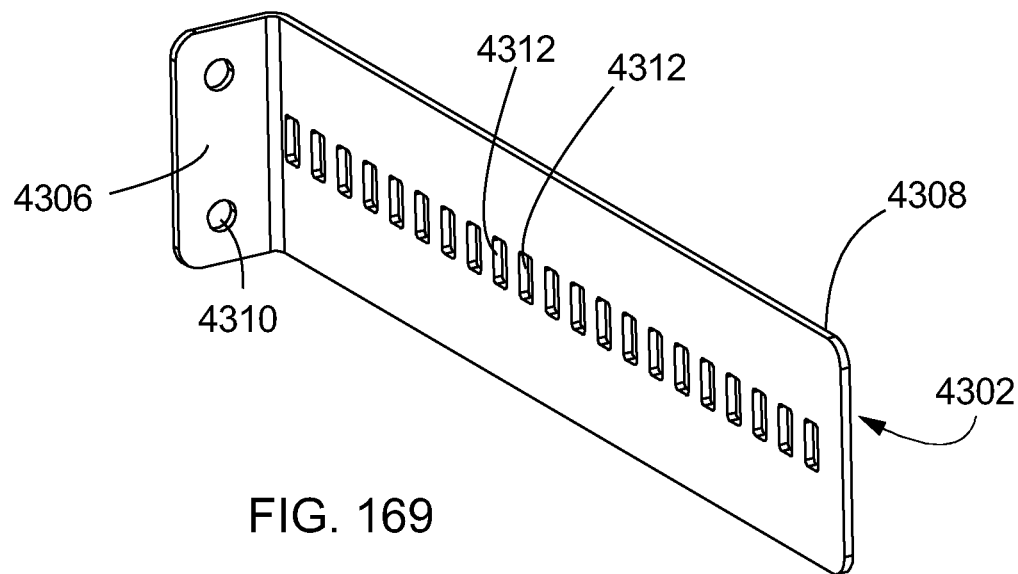

FIG. 169 illustrates the bracket of the fan-out fixation assembly of FIG. 166 in isolation.

Figure 170:
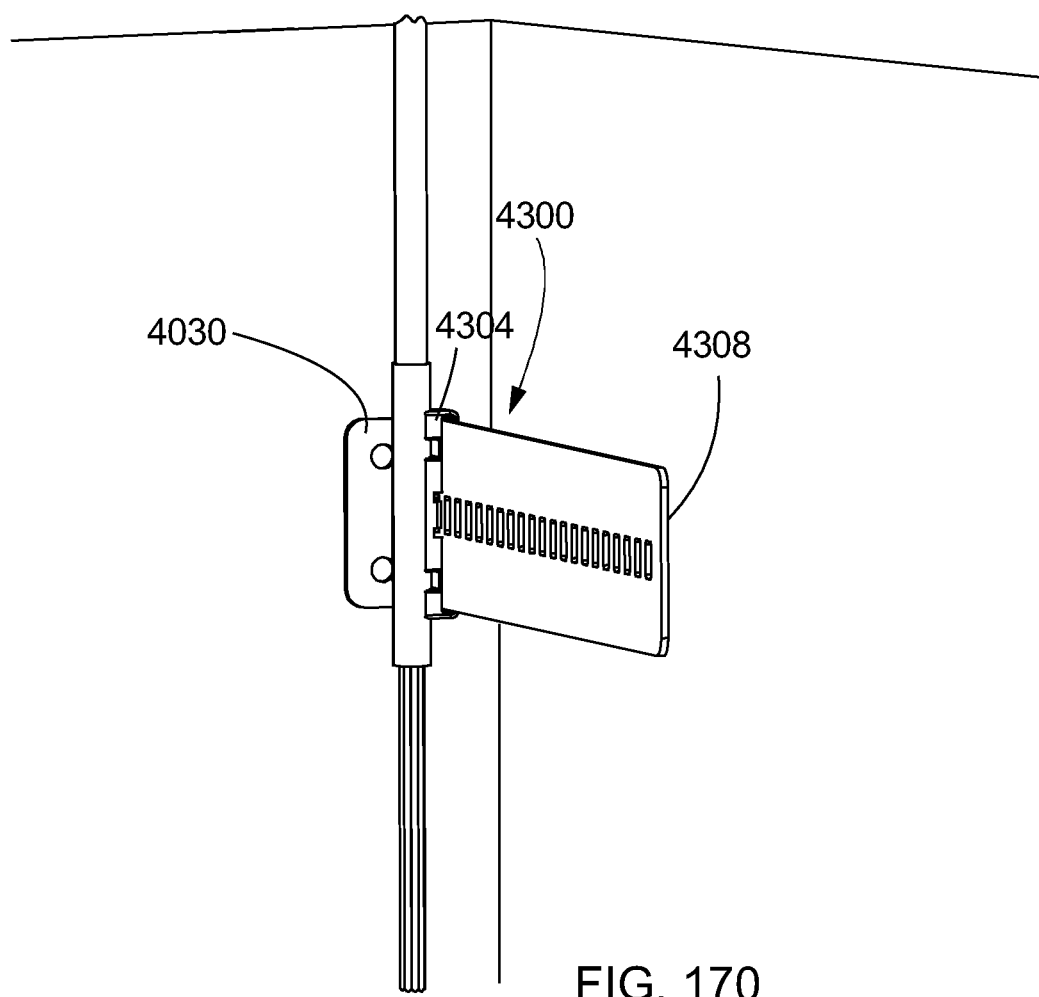

FIG. 170 illustrates the fan-out fixation assembly of FIG. 166 being used to fix a fan-out device to a telecommunications fixture.

Figure 171:
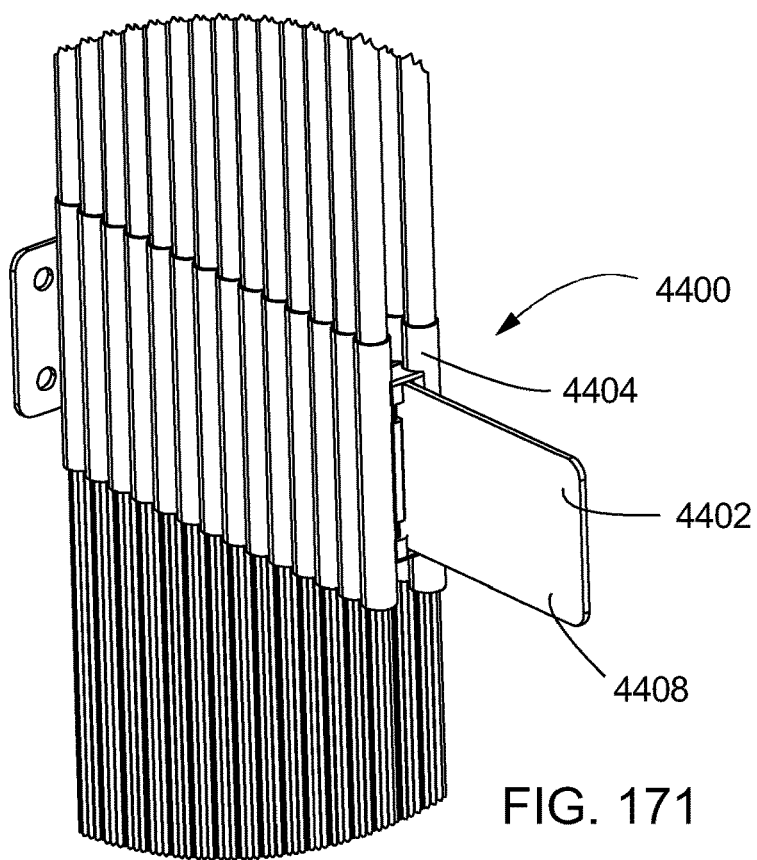

FIG. 171 illustrates another embodiment of a fan-out fixation assembly that utilizes a double-sided design.

Figure 172:
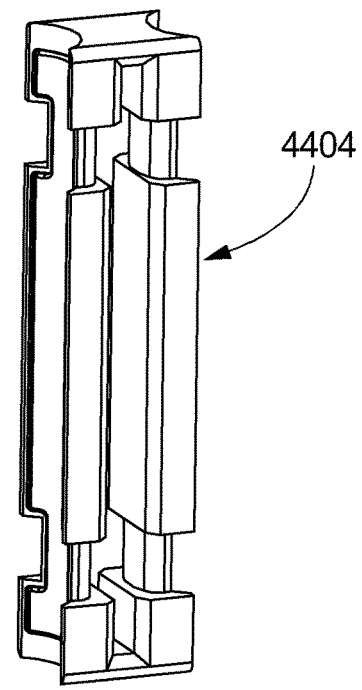

FIG. 172 is a side perspective view of one of the fan-out holders that is used on the fan-out fixation assembly shown in FIG. 171.

Figure 173:
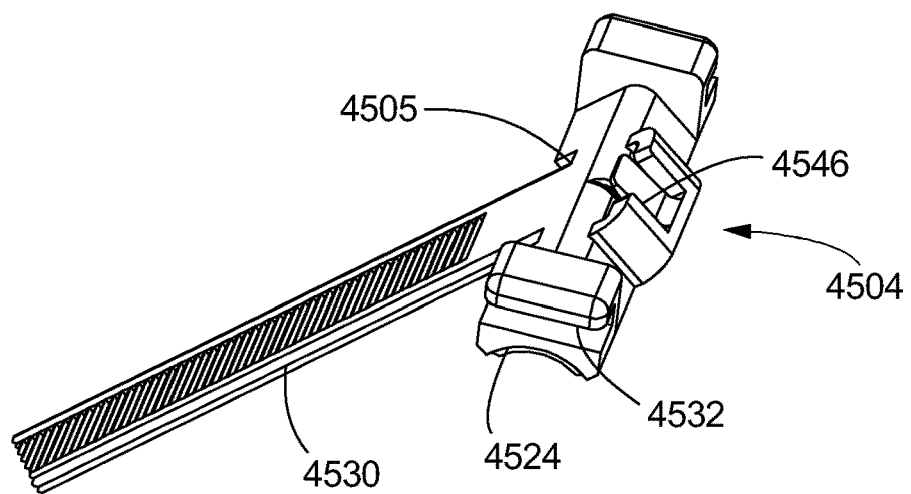

FIG. 173 is an example of another embodiment of a fan-out holder having features that are examples of inventive aspects in accordance with the present disclosure.

Figure 174:
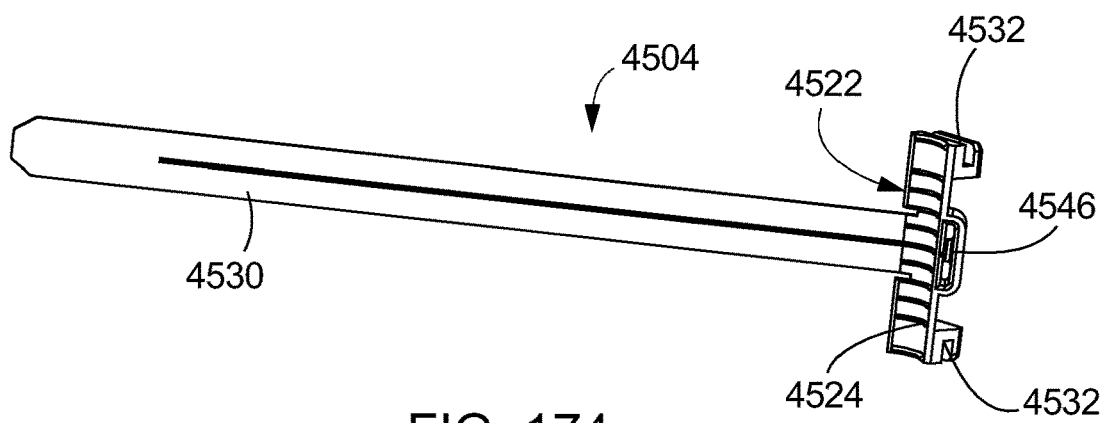

FIG. 174 illustrates the fan-out holder of FIG. 173 from a rear perspective view.

Figure 175:
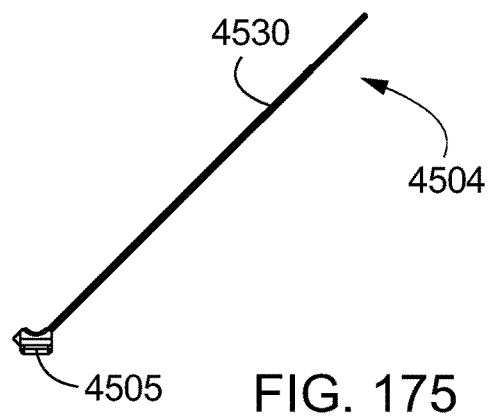

FIG. 175 illustrates a side view of the fan-out holder of FIG. 173.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
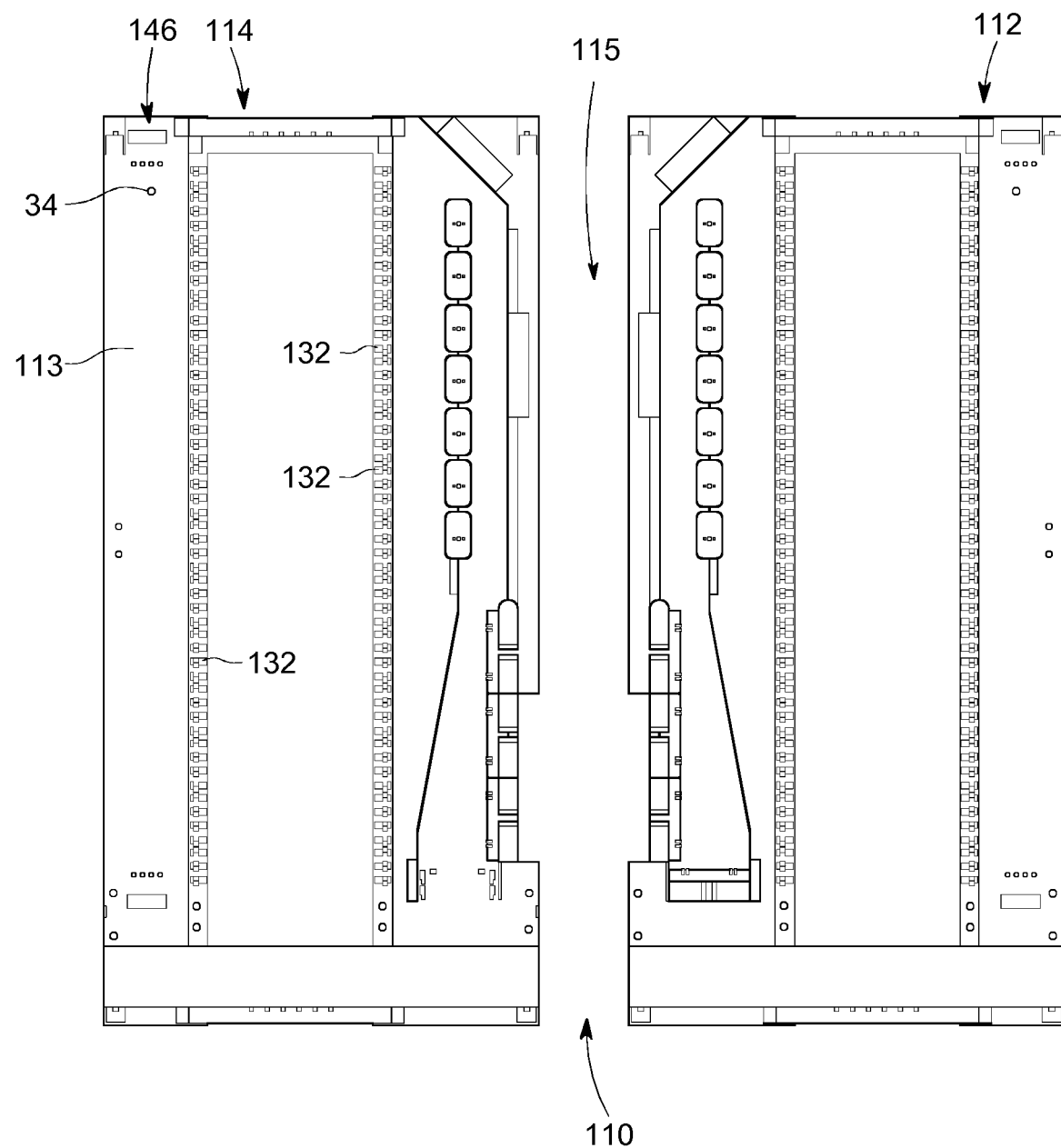
FIG. 1 is a front view of one embodiment of a telecommunications frame assembly having features that are examples of inventive aspects in accordance with the principles of the present disclosure, the frame assembly provided in the form of a cross-connect patching system.

With reference to FIG. 1, an example of an optical distribution frame or rack assembly 110 is shown. According to the depicted embodiment, the frame assembly 110 is provided as a cross-connect frame assembly formed from the combination of a right frame 112 and a left frame 114. The cross-connect frame assembly 110 is configured to allow interchangeable patching between devices supported by the right frame 112 and devices supported by the left frame 114.

Figure 2:
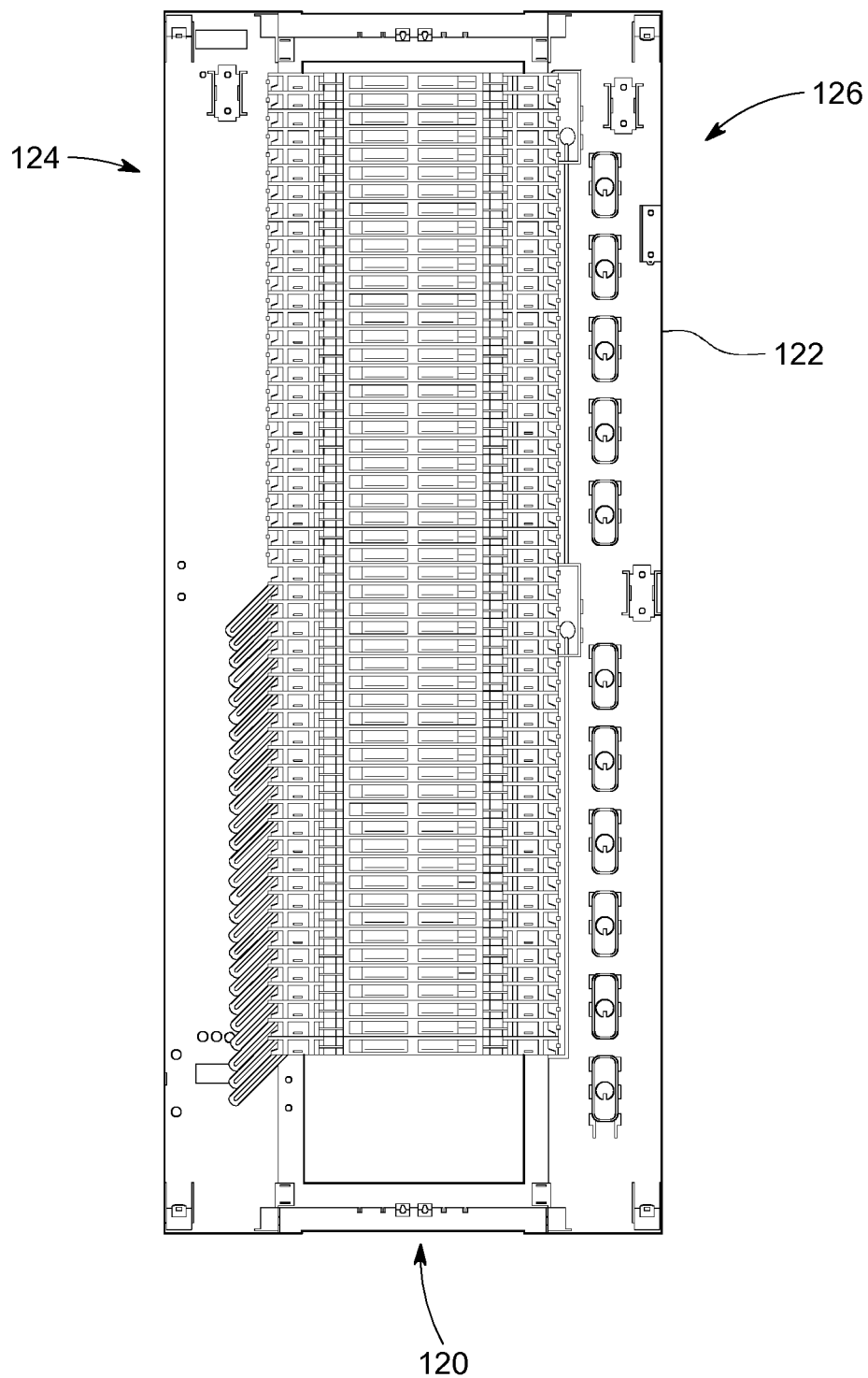
FIG. 2 is a front view of another embodiment of a telecommunications frame assembly having features that are examples of inventive aspects in accordance with the principles of the present disclosure, the frame assembly provided in the form of an inter-connect system.

FIG. 2 illustrates another example embodiment of an optical distribution frame or rack assembly 120 in accordance with the present disclosure. According to the depicted embodiment, the frame assembly 120 is provided as an inter-connect frame assembly that is designed for applications with little or no re-patching requirements, where the distribution devices mounted on the frame 122 of the frame assembly 120 define an outside plant (OSP) cable side 124 and an equipment cable side 126.

Figure 3:
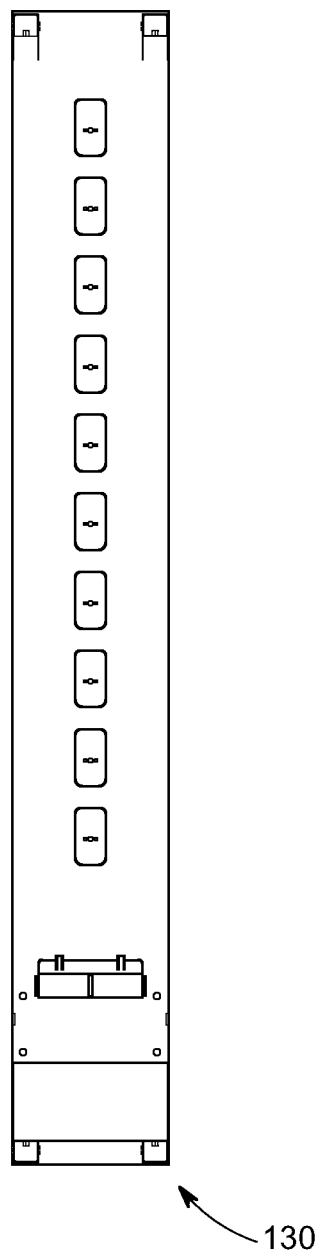
FIG. 3 is a front view of an overlength bay that can be used between two of the frame assemblies shown in FIG. 1 for guiding patch cabling between two of such frame assemblies.
Figure 4:
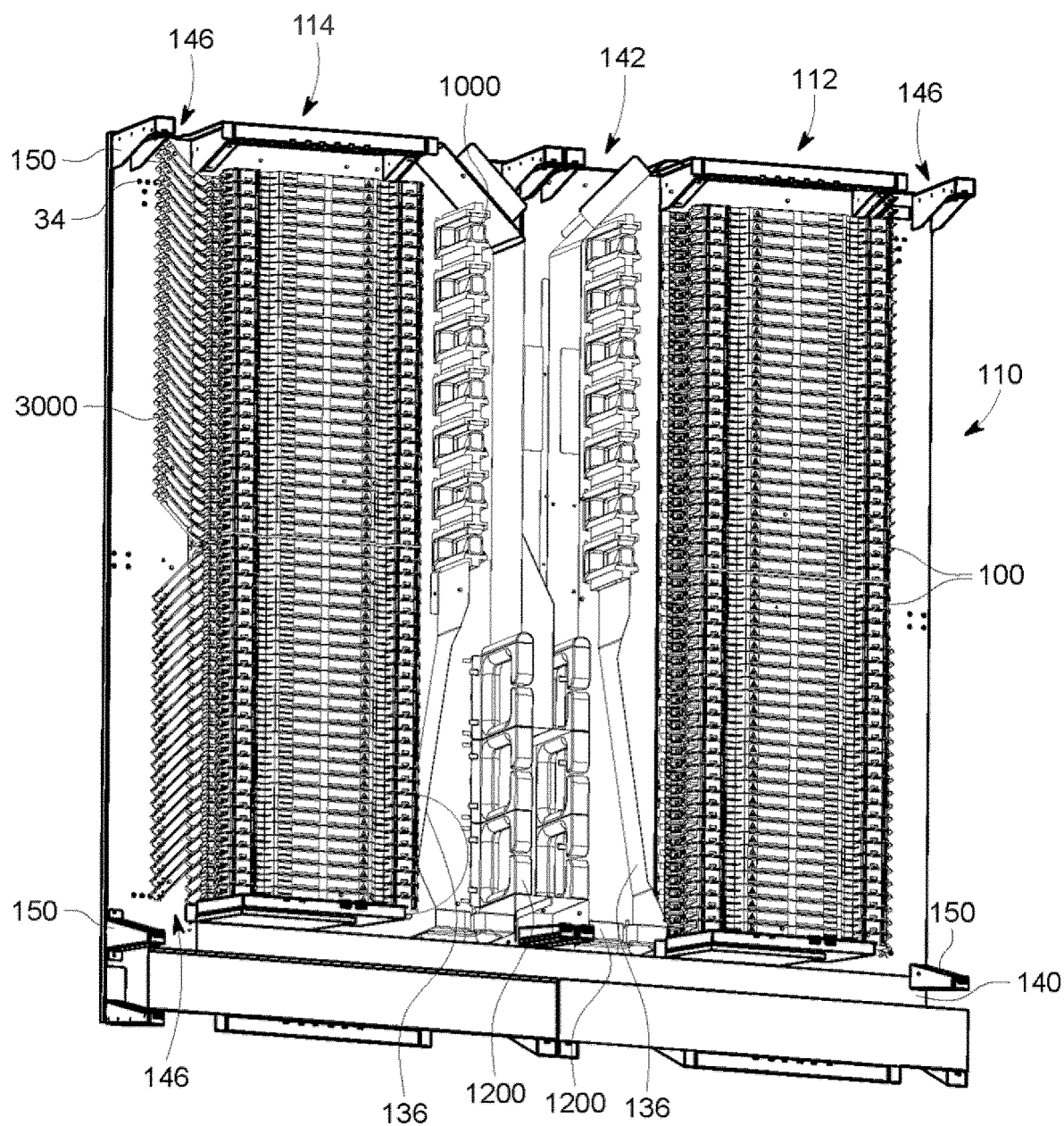
FIG. 4 is a front perspective view of the frame assembly of FIG. 1, shown populated with optical distribution elements.

FIG. 3 illustrates an overlength bay 130 that can be used between two of the cross-connect frame assemblies 110 shown in FIG. 1.

As noted above, each of the right and left frames 112, 114 of either the cross-connect assembly 110 or the frame 122 of the inter-connect assembly 120 is configured to support a plurality of optical fiber devices in the form of distribution elements 100, such as a sliding chassis type element. Such elements may be configured for use as patch panels to connect patch cables entering one side of the element 100 to an incoming cable, such as a distribution cable or a feeder cable entering an opposite side of the element 100. Examples of such elements 100 are described in PCT Patent Application Ser. Nos. PCT/EP2014/051714, filed Jan. 29, 2014; PCT/EP2014/063717, filed Jun. 27, 2014; and PCT/EP2015/066899, filed Jul. 23, 2015, the entireties of which are hereby incorporated by reference.

Each optical fiber distribution element 100 mounted to the optical distribution frame assemblies 110/120 is provided with a first side 102 and an opposite second side 104 at which cables may enter or exit the element 100.

The cross-connect assembly 110 is designed to allow patching between elements 100 supported by the right frame 112 and elements 100 supported by the left frame 114, where the first side 102 (e.g., left side) of each of the elements 100 in the left frame 114 and the second side 104 (e.g., right side) of each of the elements 100 in the right frame 112 are considered the fixed sides of the cross-connect assembly 110 and where the center portion 115 of the cross-connect assembly 110 is designed as the flexible side allowing re-patching of cabling between the elements 100 on the right and left frames 112, 114.

Figure 8:
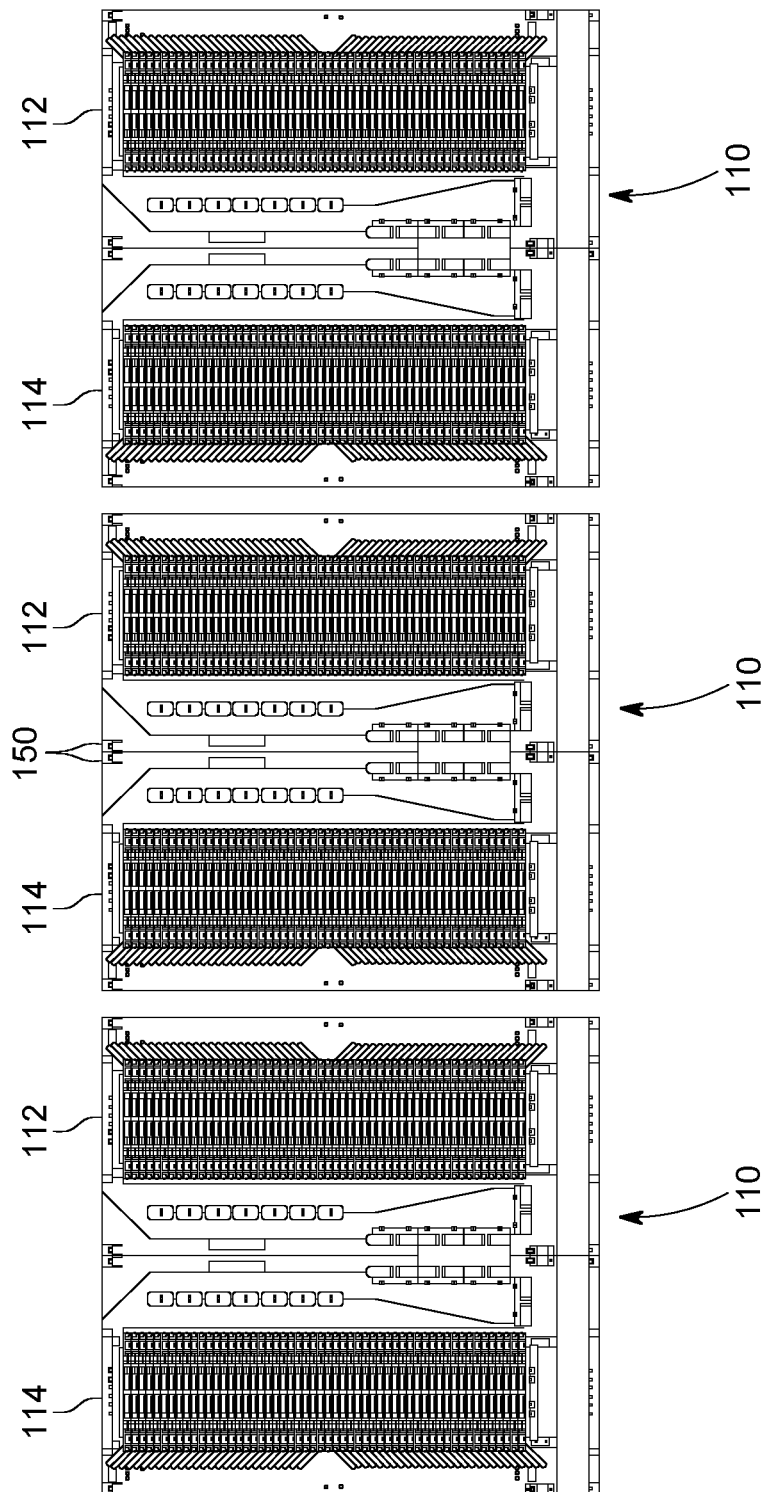
FIG. 8 illustrates a plurality of the cross-connect frame assemblies of FIG. 1 provided in a side-to-side stacked arrangement.
Figure 33:
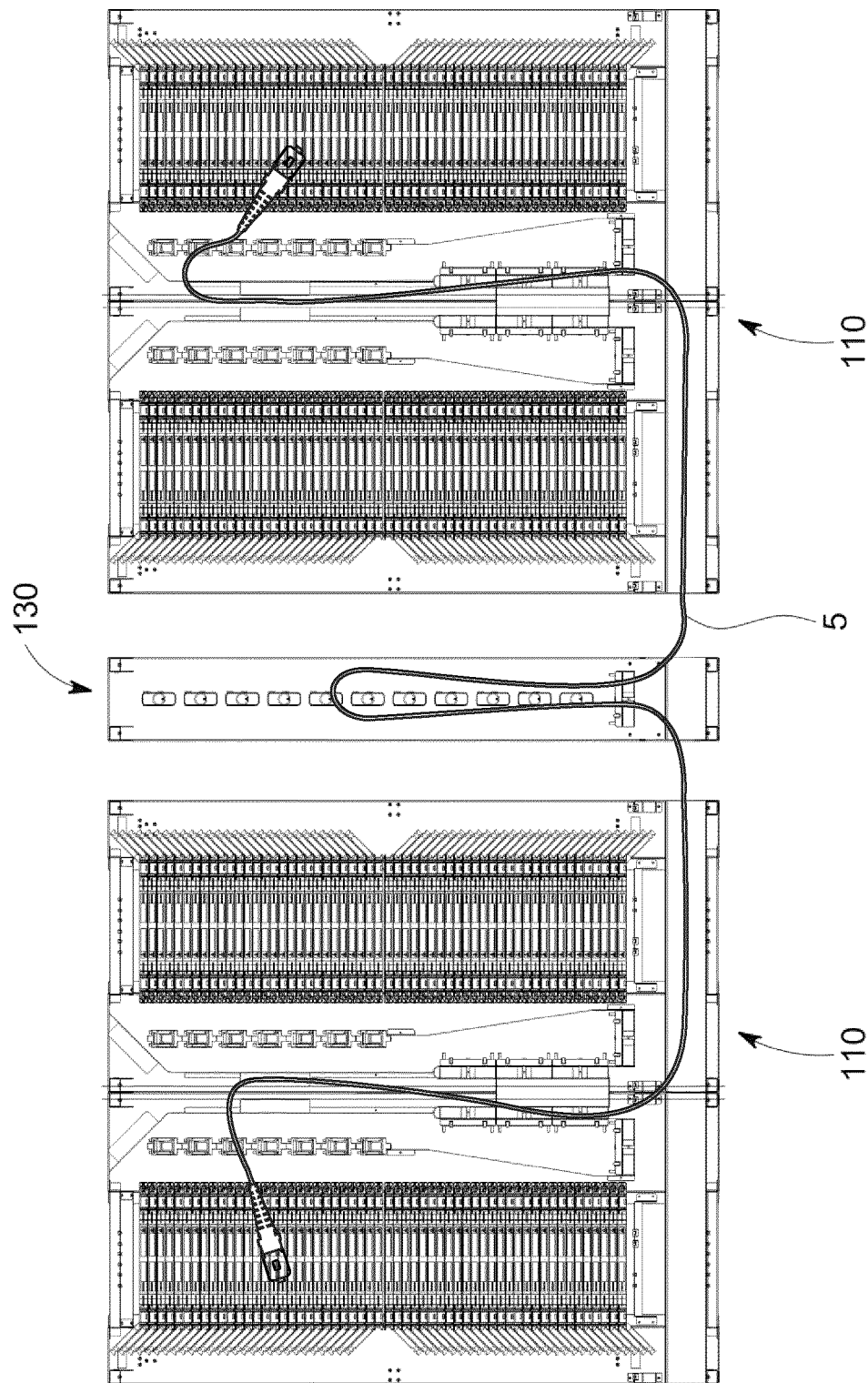
FIG. 33 illustrates the use of the overlength bay shown in FIG. 3 between two of the cross-connect frame assemblies for guiding patch cabling between two of such frame assemblies.

A number of cross-connect assemblies 110 can be stacked in a side-by-side configuration in a data center as shown in FIG. 8. An overlength bay such as the bay 130 illustrated in FIG. 3 can be used between two cross-connect assemblies 110 as shown in FIG. 33.

As noted above, the frame assembly 120 shown in FIG. 2 is provided as an inter-connect frame assembly that is designed for applications with little or no re-patching requirements for the elements 100 housed within its frame 122.

Now referring to FIGS. 1 and 4-33, examples of the cross-connect frame assembly 110 are illustrated. As shown, the cross-connect frame assembly 110 may be formed by a combination of the right frame 112 and the left frame 114 that are placed adjacent each other to facilitate cross-patching between the devices 100 mounted on the frames. It should be noted that features discussed for the left frame 114 mirror those for the right frame 112 and only one of the frames will be discussed in detail where applicable.

For a given frame, e.g., the left frame 114, the left side 113 of the frame 14 is designated as the fixed side and the right side 117 is designated as the flexible side, where interchangeable patching can occur.

The frame 114 defines a rear wall 12 with fastener openings 132 for the mounting of the distribution elements 100 in a vertically stacked arrangement.

The rear wall 12, at the left side 113 of the left frame 114 may also include fastener openings 34 for the mounting of fan-out holder brackets 4002 as will be discussed in further detail below for mounting of fan-outs.

Figure 6:
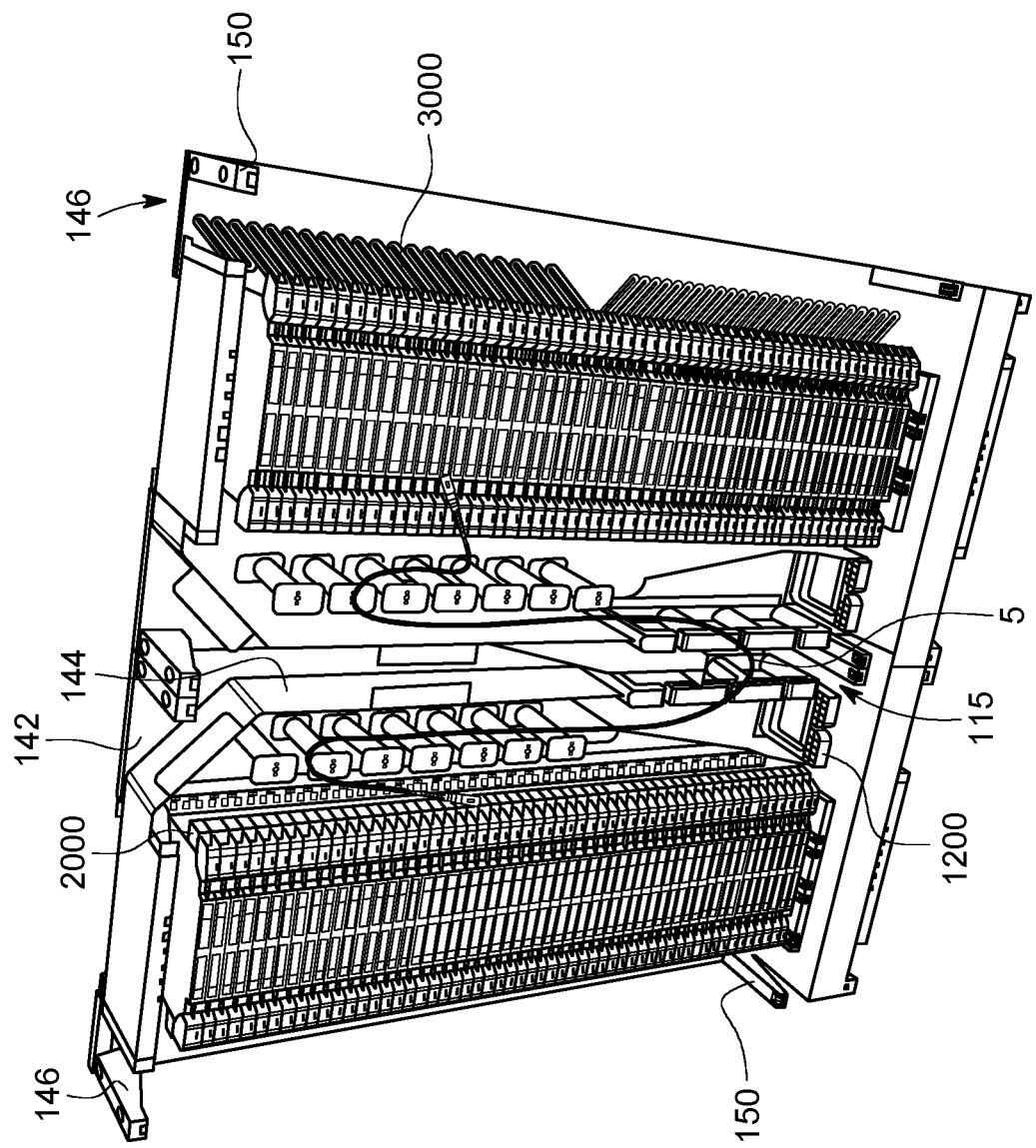
FIG. 6 illustrates an example cable patch routing between the right and left frames of the cross-connect frame assembly of FIG. 1.
Figure 7:
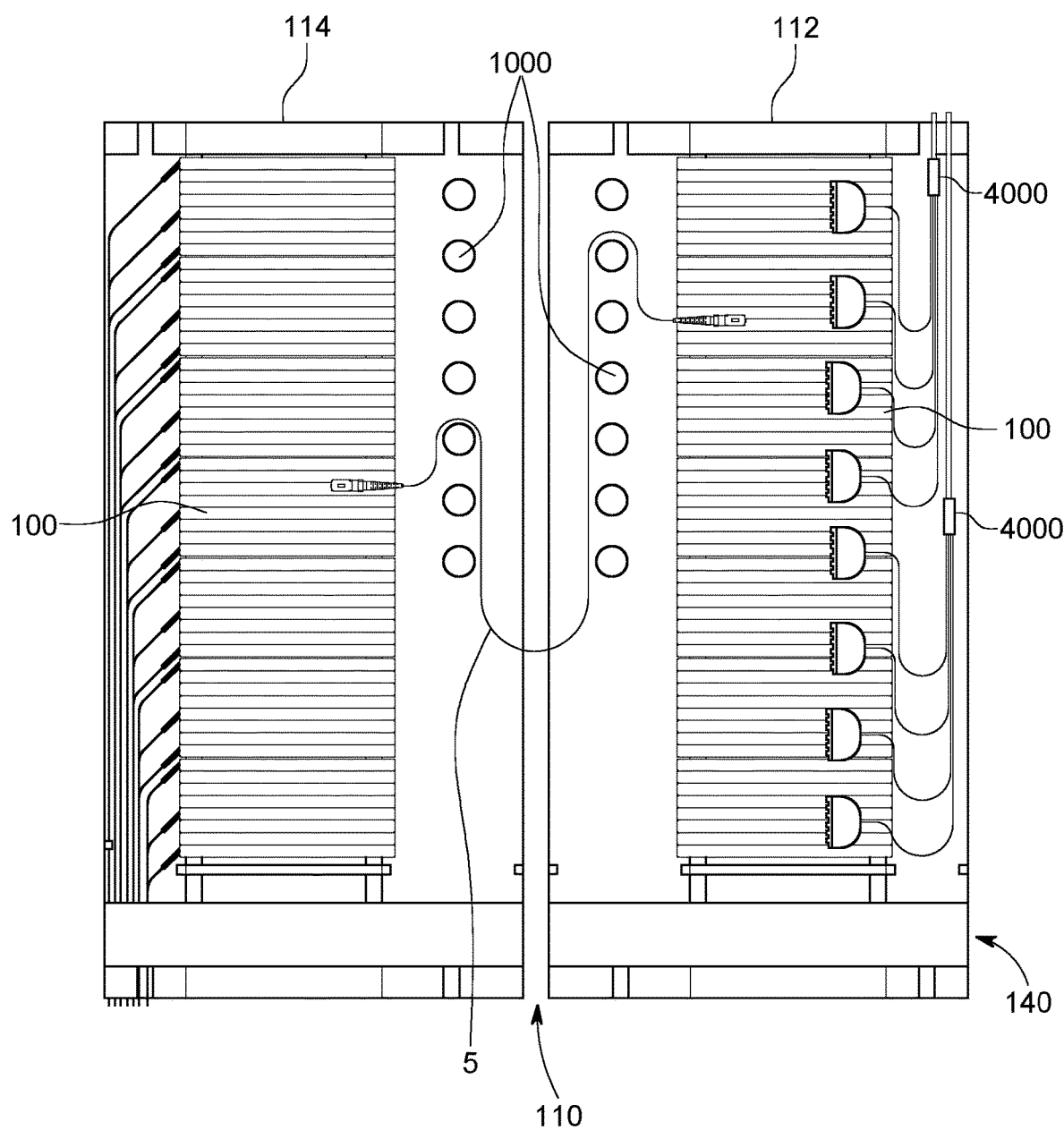
FIG. 7 schematically illustrates the cable patch routing physically shown in FIG. 6.

The right side 117 of the left frame 114 closer to the center 115 of the cross-connect frame assembly 110 are provided a series of overlength drums 1000, arranged in a vertical column for managing cables extending from the devices 100. The overlength drums 1000, as shown in FIGS. 6-7 and as discussed in further detail below, are configured to guide cables 5 from the devices 100 toward bundle collectors 1200 that are provided toward a bottom 134 of the left frame 114. The bundle collectors 1200 are also discussed in further detail below.

From the bundle collectors 1200 of the left frame 114, the patch cabling 5 can be passed to the bundle collectors 1200 of the right frame 112. From the bundle collectors 1200, the patch cabling 5 can be routed over the overlength drums 1000 provided on the right frame 112 and patched to the elements 100 supported by the right frame 112.

Figure 31:
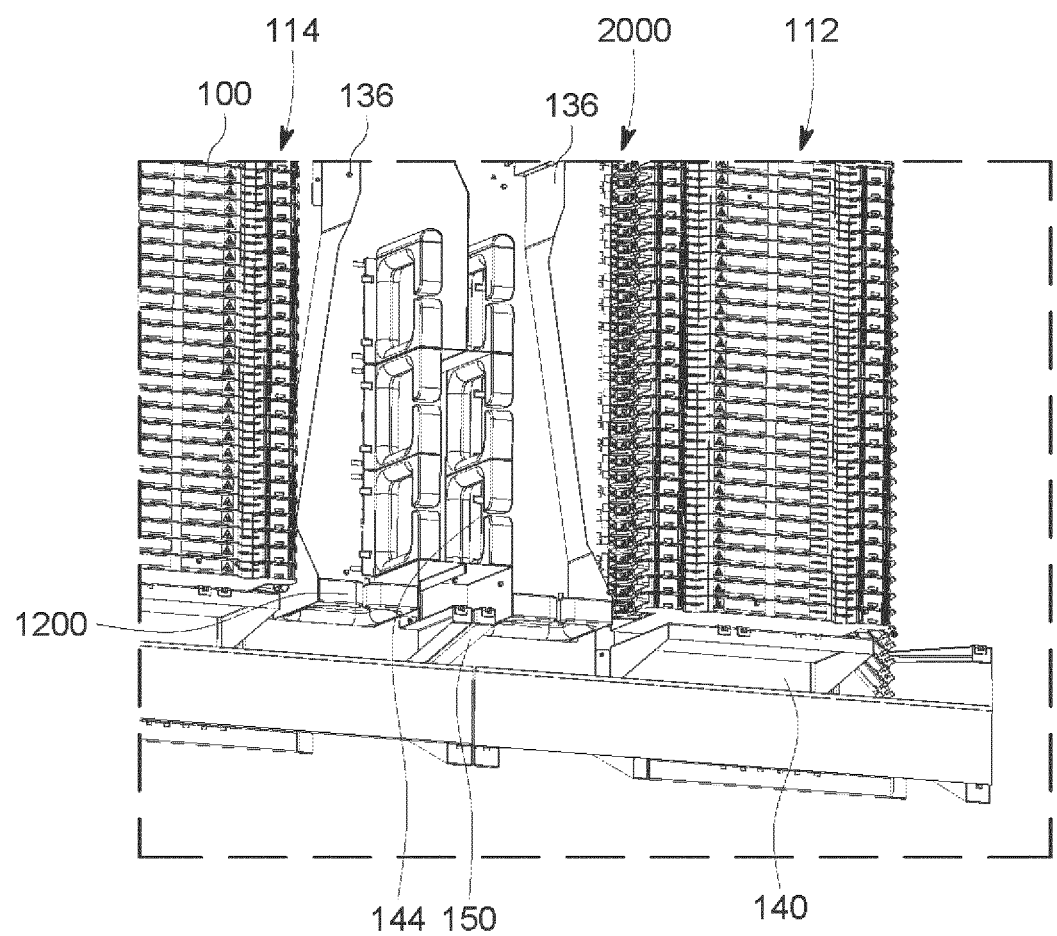
FIG. 31 illustrates the central region of the cross-connect frame assembly where bundle collectors are used to guide cabling between the right and left frames of the cross-connect assembly and toward the bottom through of the cross-connect assembly.
Figure 32:
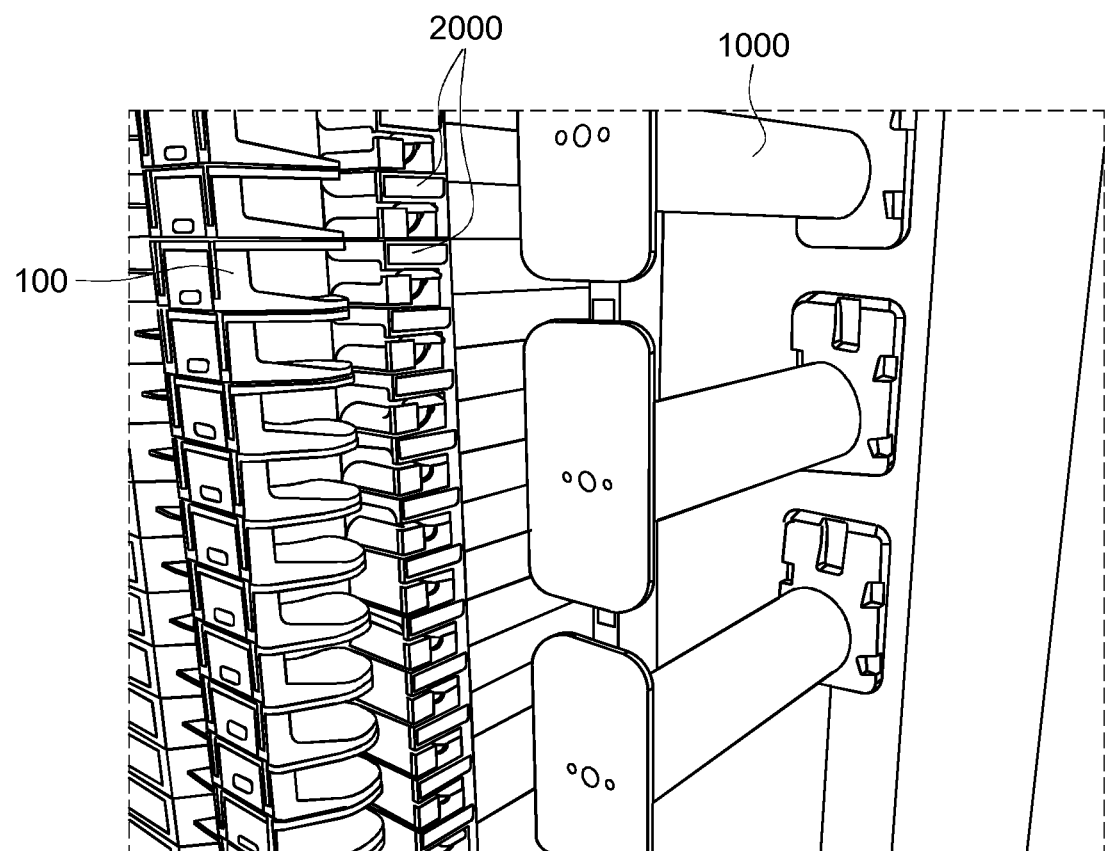
FIG. 32 illustrates the overlength drums used adjacent the central region of the cross-connect frame assembly for guiding cabling from the flexible sides of the frames toward the bundle collectors shown in FIG. 31.

Positioned underneath the overlength drums 1000 is provided a divider wall 136 for keeping the cables 5 that are being routed up toward the drums 1000 from the cables 5 being routed down from the drums 1000 toward the bundle collectors 1200. FIG. 31 illustrates the central region 115 of the cross-connect frame assembly 110 where bundle collectors 1200 are used to guide cabling between the right and left frames 112, 114 of the cross-connect assembly 110 and toward a bottom through 40 of the cross-connect assembly 10. FIG. 32 illustrates the overlength drums 1000 used adjacent the central region 115 of the cross-connect frame assembly 110 for guiding cabling 5 from the flexible sides of the frames 112, 114 toward the bundle collectors 1200 shown in FIG. 31.

A bottom trough 140 defined by the cross-connect frame assembly 110 can be used to route cables 5 between the right and left frames 112, 114 along the bottom of the frame assembly 110. Horizontally positioned bundle collectors 1200 on the left and right frames 114, 112 are designed to guide cables 5 toward the bottom through 140.

As shown, the cross-connect frame assembly 110 defines a central opening 142 at the top of the assembly 110 that leads in to a central trough 144 for cables 5 to be routed out of the assembly 110. Both the central opening 142 and the central trough 144 are formed by combining the right and left frames 112, 114 in a side-by-side arrangement. Cabling 5 can selectively be routed through the bundle collectors 1200, within the central trough 144, and out the top of the frame assembly 110 through the central opening 142.

Each of the right and left frames 112, 114 of the cross-connect assembly also defines openings 146 at the outer sides both at the top and the bottom for incoming cables 5 to be routed to the fixed sides of the elements 100.

As shown in FIGS. 1 and 4-33, the fixed sides of the frames 112, 114 may utilize fan-out fixation assemblies 4000 for guiding cables 5 to the elements 100. Such fan-out fixation assemblies 4000 are discussed in further detail below. And, at the outer sides of the elements 100, strength member fixation structures 3000 can be mounted to the elements 100 for fixing cabling 5 to the fixed sides of the elements 100. Examples of such strength member fixation structures 3000 are discussed in further detail below.

Each of the fiber distribution elements 100 may include cable management structures 2000 that can be used on the flexible patching sides thereof. It should be noted that the cable management structure 2000 can be designed to be mounted on either side 102/104 of an element 100, depending on whether the element 100 is mounted on the right frame or the left frame of the cross-connect assembly 110 since the flexible side of the cross-connect assembly is positioned toward the center. The cable management structures 2000 can also be used on either side of the interconnect assembly 120 as discussed above.

The cable management structures 2000 are designed as push-through cable management structures that keep cables 5 contained adjacent the elements 100 while providing bend radius protection to cables 5 extending away from the elements 100 as the cables 5 are guided toward the overlength drums 1000.

Examples of the cable management structures 2000 are discussed in further detail below.

Figure 5:
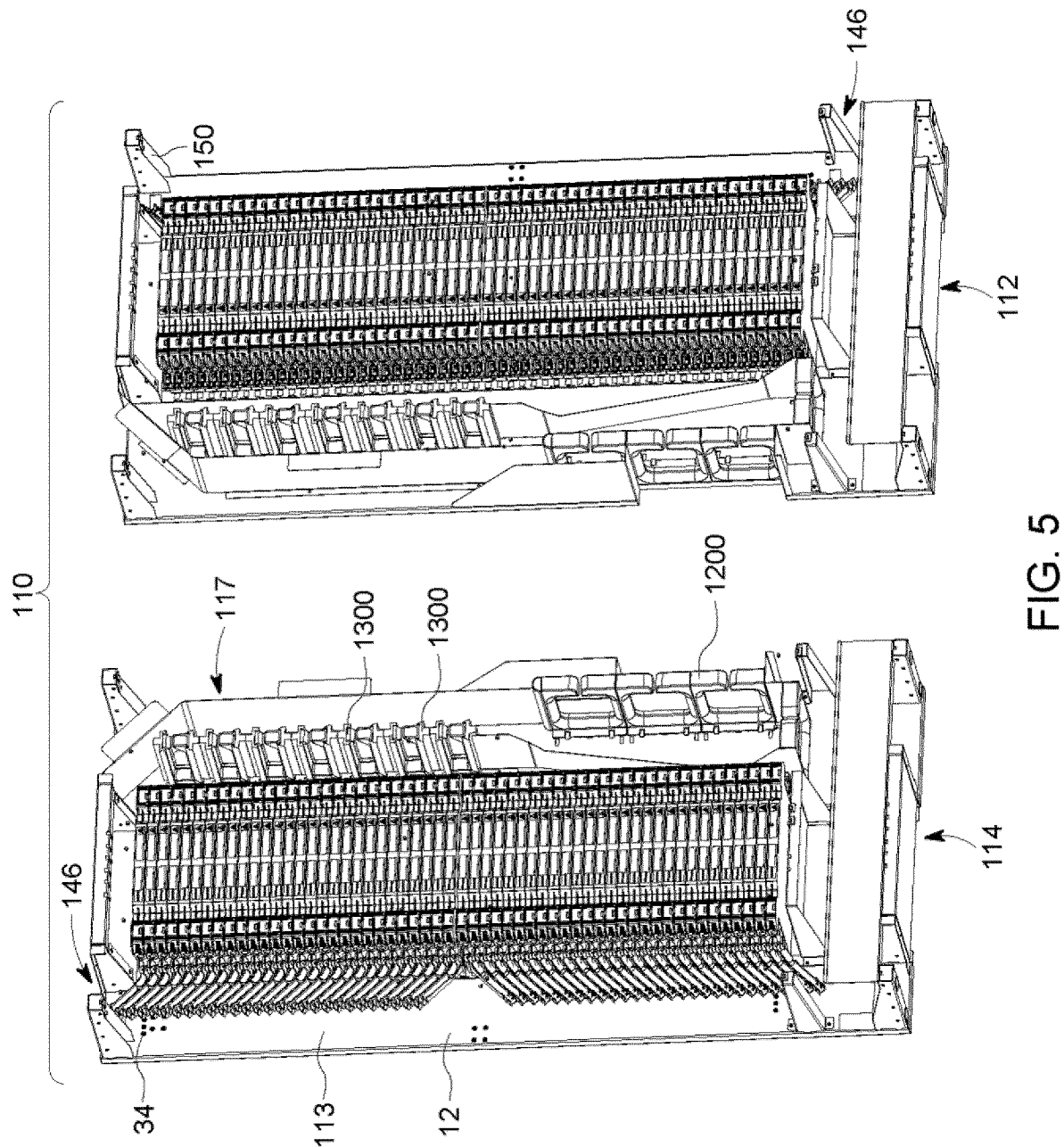
FIG. 5 illustrates the right and left frames forming the cross-connect frame assembly of FIG. 1 separated from each other, where the frames of the cross-connect assembly of FIG. 5 are also shown as using a different type of overlength drums in the form of slide drums.

FIG. 5 illustrates an example of a cross-connect frame assembly 110 that utilizes overlength drums in the form of slide drums 1300. Further details of such slide drums 1300 that provide an alternative cable routing solution are discussed below.

As shown, each of the right and left frames 112, 114 of the cross-connect assembly 110 may also include door mounts 150. The door mounts 150 are configured to receive the spring-loaded rods 152 of pivot doors 154 that can be used to cover and protect the internal parts of the cross-connect assembly 110 as shown in FIGS. 36-42 and discussed in further detail below.

Figure 9:
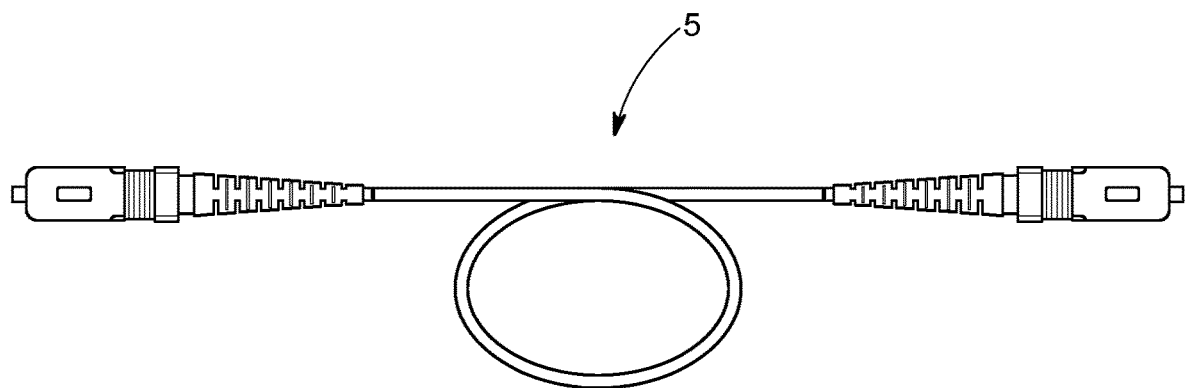
FIG. 9 is an example of a fixed-length fiber optic patch cable that can be patched between various elements on respective right and left frames of the cross-connect assembly of FIG. 1.

Regarding the cable routing provided by the cross-connect frame assembly 10, FIG. 6 illustrates an example cable patch routing between the right and left frames 112. 114 of the cross-connect frame assembly 110. FIG. 7 schematically illustrates the cable patch routing physically shown in FIG. 6. The cross-connect frame assembly 110 is designed such that the cable routing features for guiding the cabling 5 between the devices 100 on the left frame 114 and the devices on the right frame 112 allow the use of fixed length fiber optic patch cables 5 between various elements 100 on respective right and left frames 112, 114 of the cross-connect assembly 110. An example of a patch cable 5 is shown in FIG. 9. According to one example, the patch cable 5 used in the cross-connect assembly 110 may be about 4.5 meters or about 5 meters in length.

FIGS. 10-13 illustrate the types of cables 5 on the fixed side of the elements 100 that can be paired with the jumpers 5 that are provided on the flexible side of the elements 100 in a given frame 112/114 of the cross-connect assembly 110. FIG. 10 illustrates, for the fixed side, a cable 5 where fibers extending from can be spliced to the connectors within the elements 100. FIGS. 11 and 12 illustrate, for the fixed side, trunk cables 5 that are broken out using fan-outs. FIG. 13 illustrates, for the fixed side, individual jumper cables 5 that can be extended to the elements 100.

Figure 14:
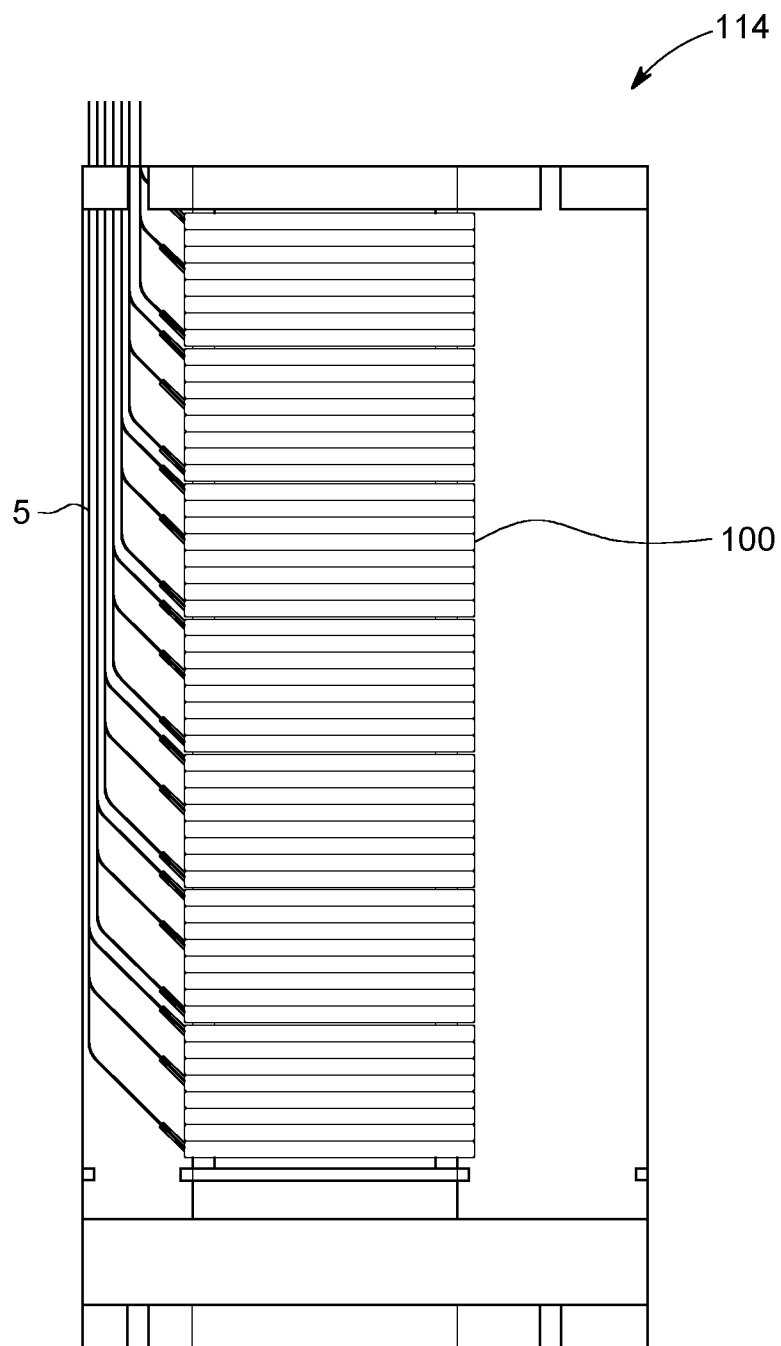
FIG. 14 is one example of the cable routing that can be used on the fixed side of a left frame of the cross-connect assembly, where the cables are directed from a top of the frame toward the elements.
Figure 15:
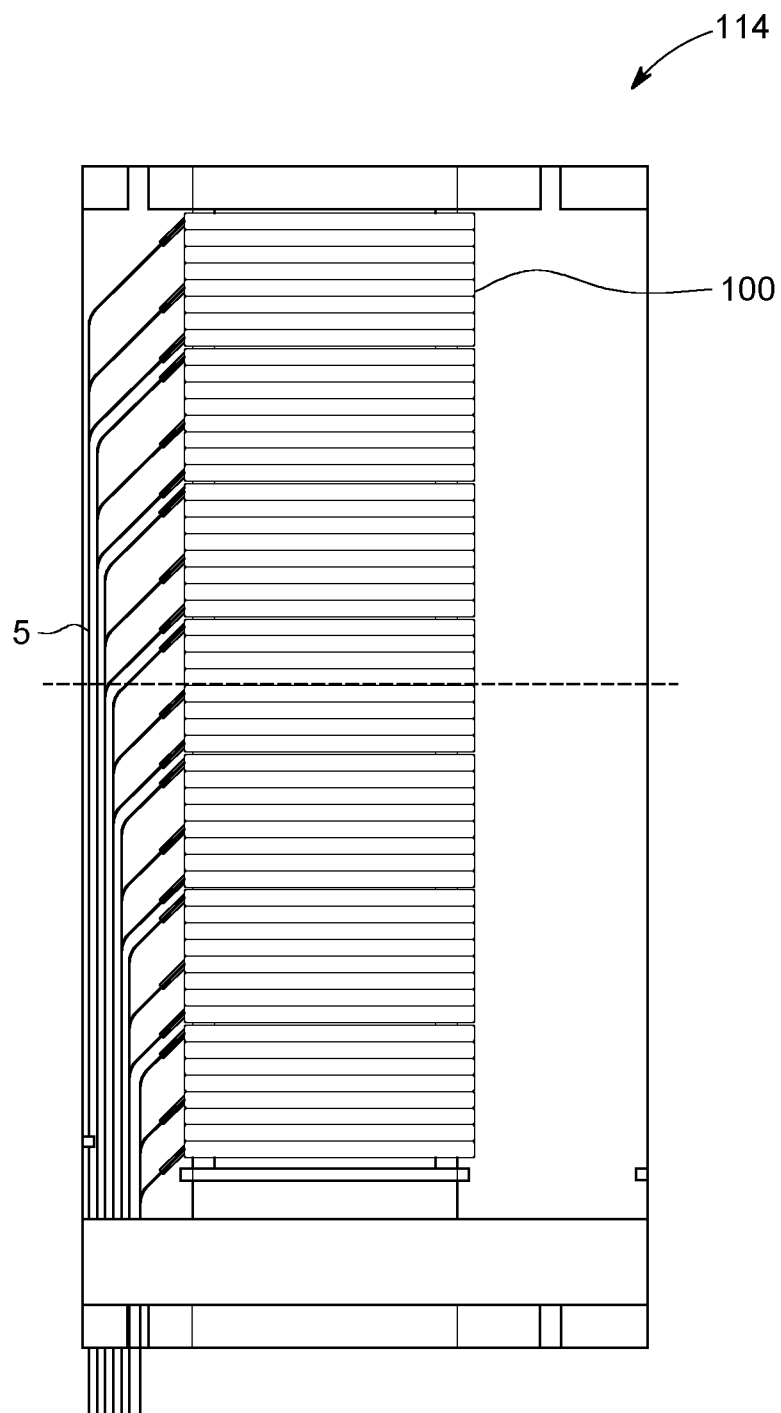
FIG. 15 is another example of the cable routing that can be used on the fixed side of a left frame of the cross-connect assembly, where the cables are directed from a bottom of the frame toward the elements.
Figure 16:
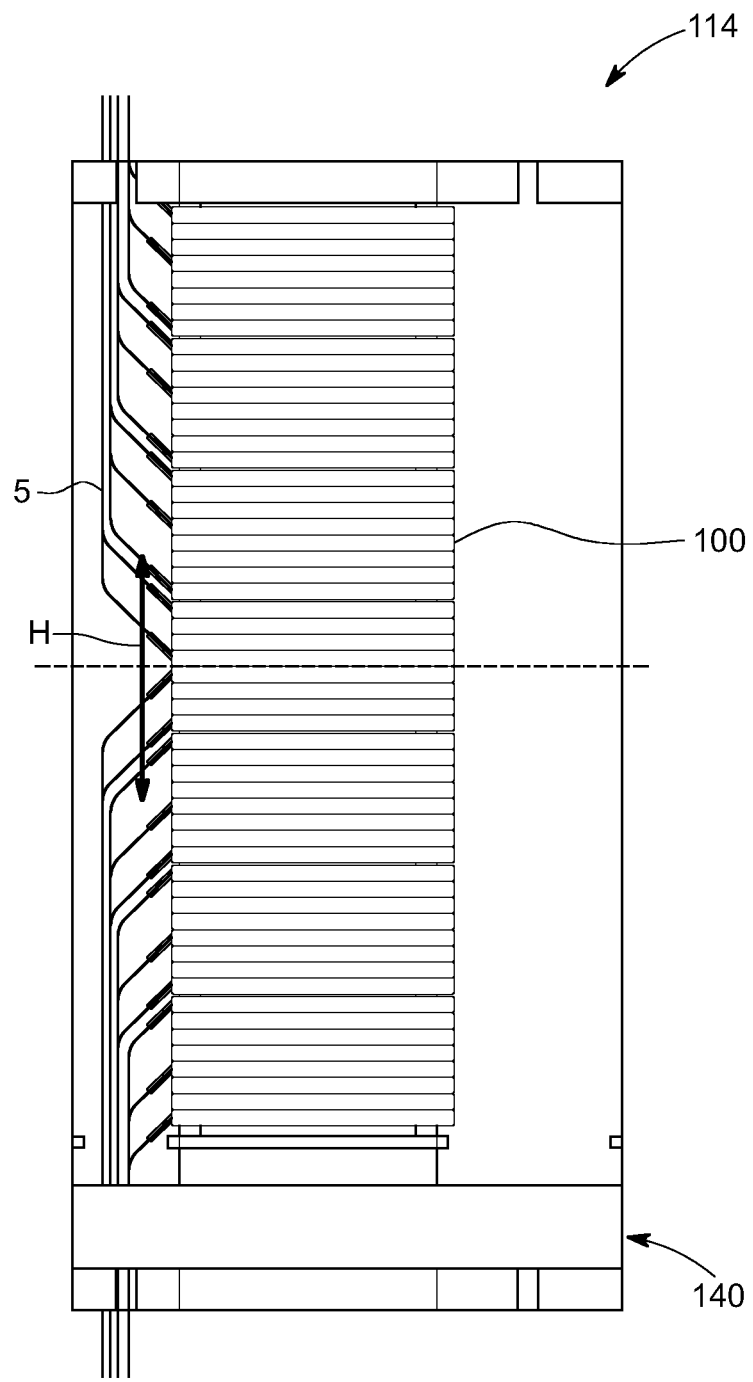
FIG. 16 is another example of the cable routing that can be used on the fixed side of a left frame of the cross-connect assembly, where the cables are directed from both the top and the bottom of the frame toward the elements, the schematic illustrating the split point for the up or down routing of the cables.
Figure 17:
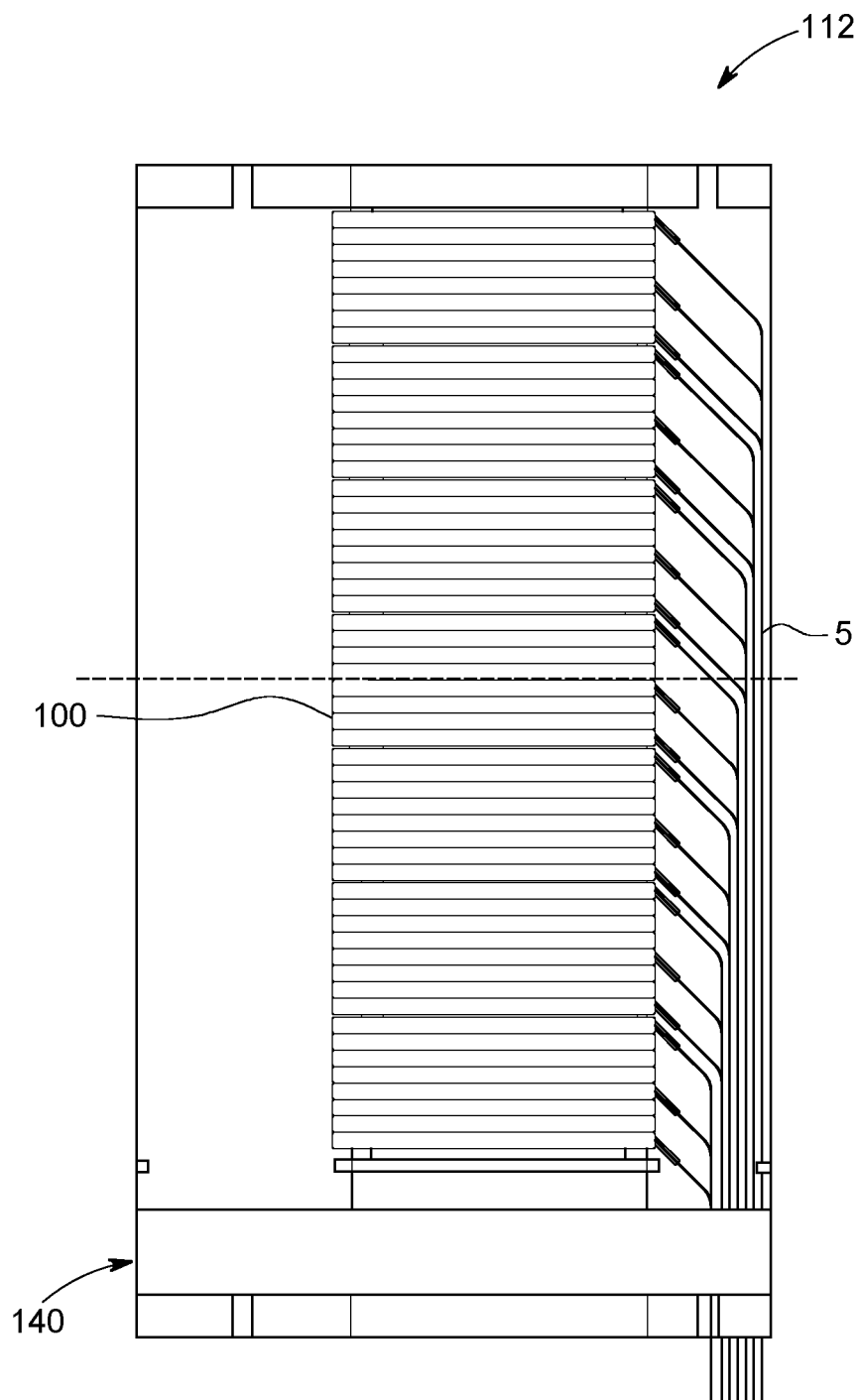
FIG. 17 is used to illustrate one example cable routing that can be used on the fixed side of a right frame of the cross-connect assembly, where the cables are directed toward a bottom of the frame from the elements.

FIG. 14 is one example of the cable routing that can be used on the fixed side of a left frame 114 of the cross-connect assembly 110, where the cables 5 are directed from the top opening 146 of the frame 114 toward the elements 100. FIG. 15 is another example of the cable routing that can be used on the fixed side of a left frame 114 of the cross-connect assembly 110, where the cables 5 are directed from the bottom opening 146 of the frame 114 toward the elements 100. FIG. 16 is another example of the cable routing that can be used on the fixed side of a left frame 114 of the cross-connect assembly 110, where the cables 5 are directed from both the top and the bottom openings 146 of the frame 114 toward the elements 100, the schematic illustrating the split point for the up or down routing of the cables 5. FIG. 17 is used to illustrate one example cable routing that can be used on the fixed side of a right frame 112 of the cross-connect assembly 110, where the cables 5 are directed toward a bottom of the frame from the elements 100. The routing illustrated in FIG. 17 essentially mirrors the routing illustrated in FIG. 14 for the left frame 114 of the cross-connect assembly 110. It should be noted that the routings illustrated in FIGS. 15 and 16 for the left frame 114 can also be mirrored for the right frame 112.

Figure 18:
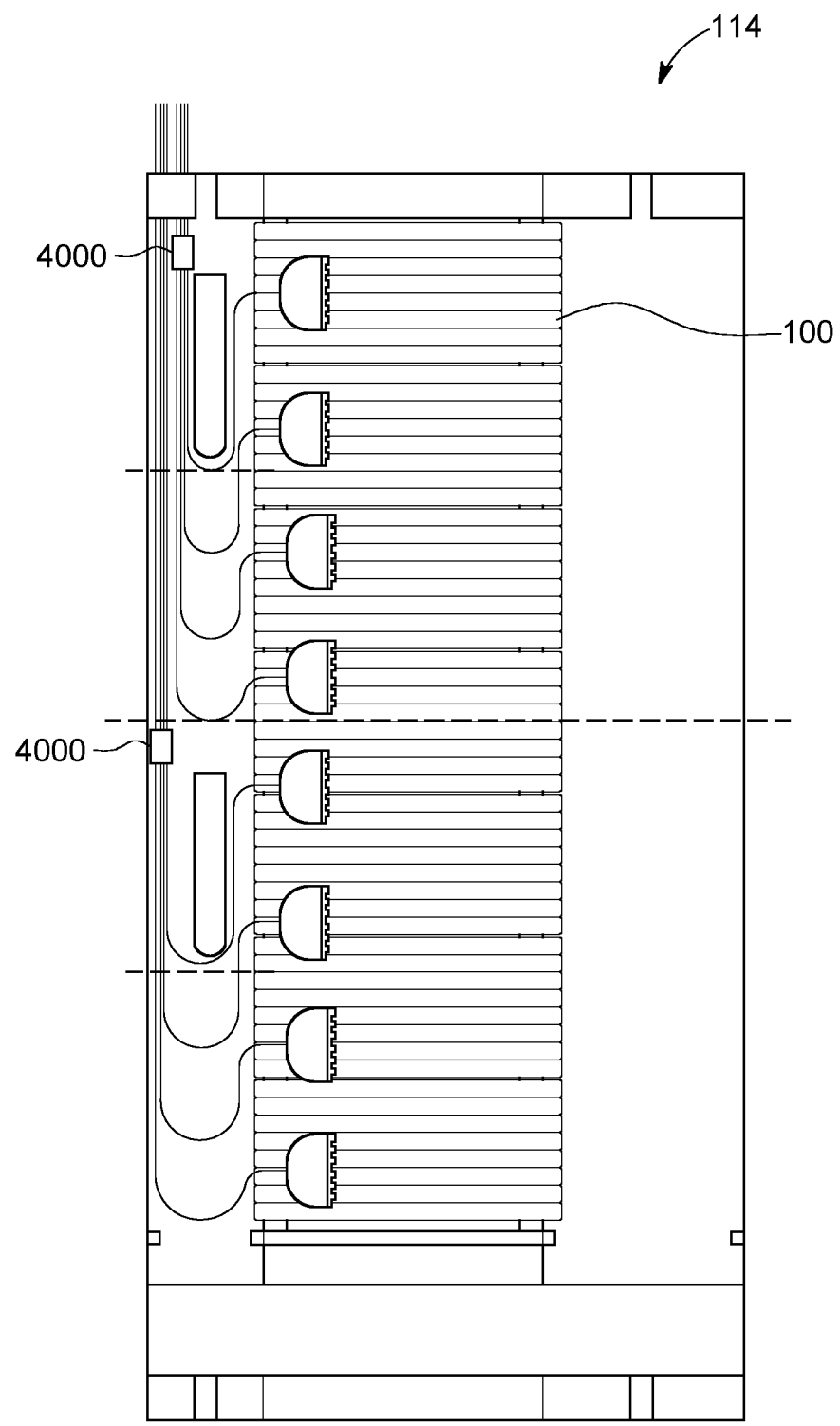
FIG. 18 is another example of the cable routing that can be used on the fixed side of a left frame of the cross-connect assembly, where the cables are directed from a top of the frame toward the elements and where the cables are trunk cables that are split out using fan-outs mounted to the frame.
Figure 19:
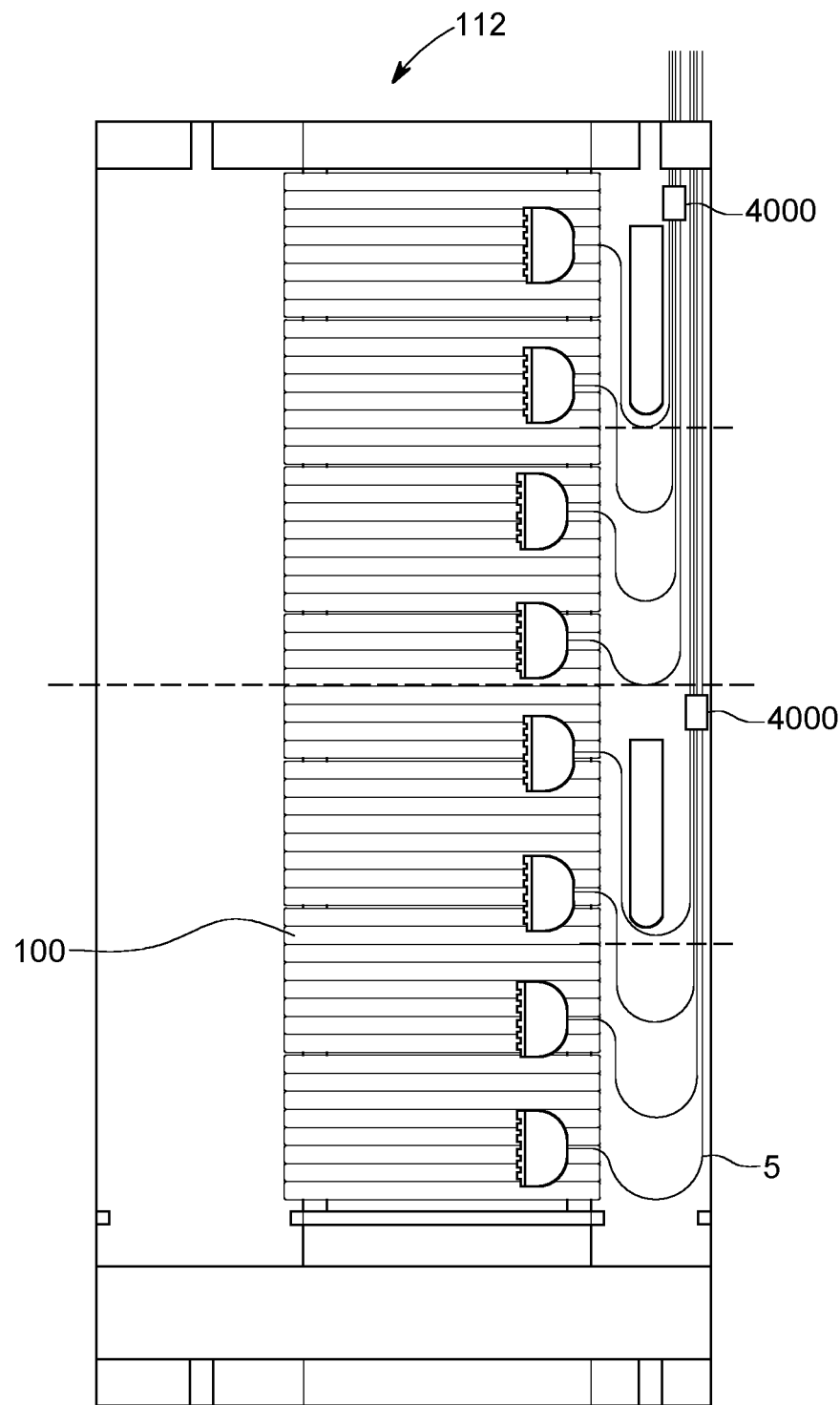
FIG. 19 illustrates a similar routing to that shown in FIG. 18 for trunk cables, however on the fixed side of a right frame of the cross-connect assembly.

FIG. 18 is another example of the cable routing that can be used on the fixed side of a left frame 114 of the cross-connect assembly 110, where the cables 5 are directed from a top of the frame 114 toward the elements 100 and where the cables 5 are trunk cables that are split out using fan-outs mounted with fan-out fixation assemblies 4000 to the frame 114. FIG. 19 illustrates a similar routing to that shown in FIG. 18 for trunk cables 5, however on the fixed side of a right frame 112 of the cross-connect assembly 110.

Figure 20:
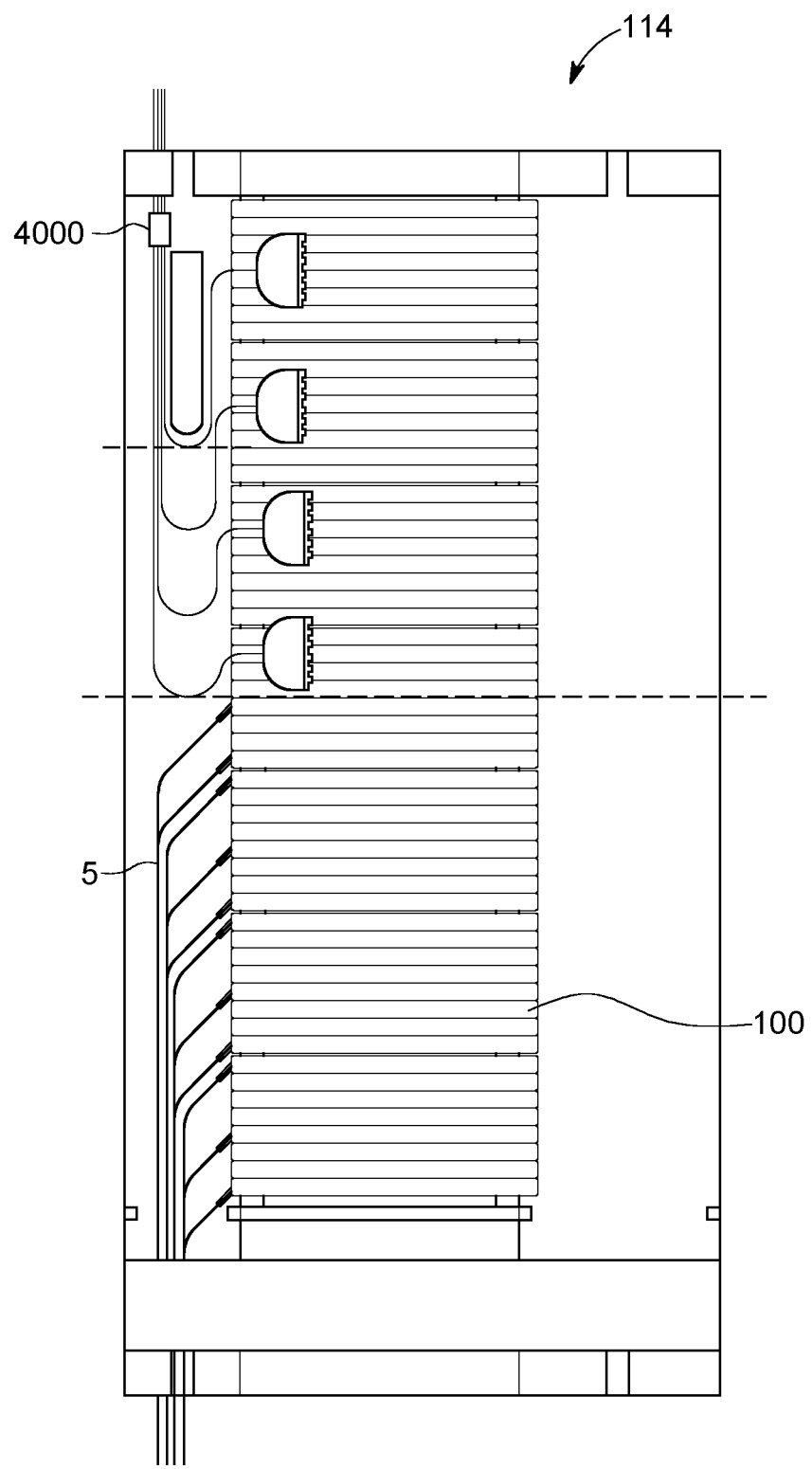
FIG. 20 illustrates an example cable routing that can be used on the fixed side of a left frame of the cross-connect assembly, where the cables are a combination of trunk cables that are split out using fan-outs mounted to the frame, directed from a top of the frame toward the elements and jumper cables directed to the elements from a bottom of the frame.
Figure 21:
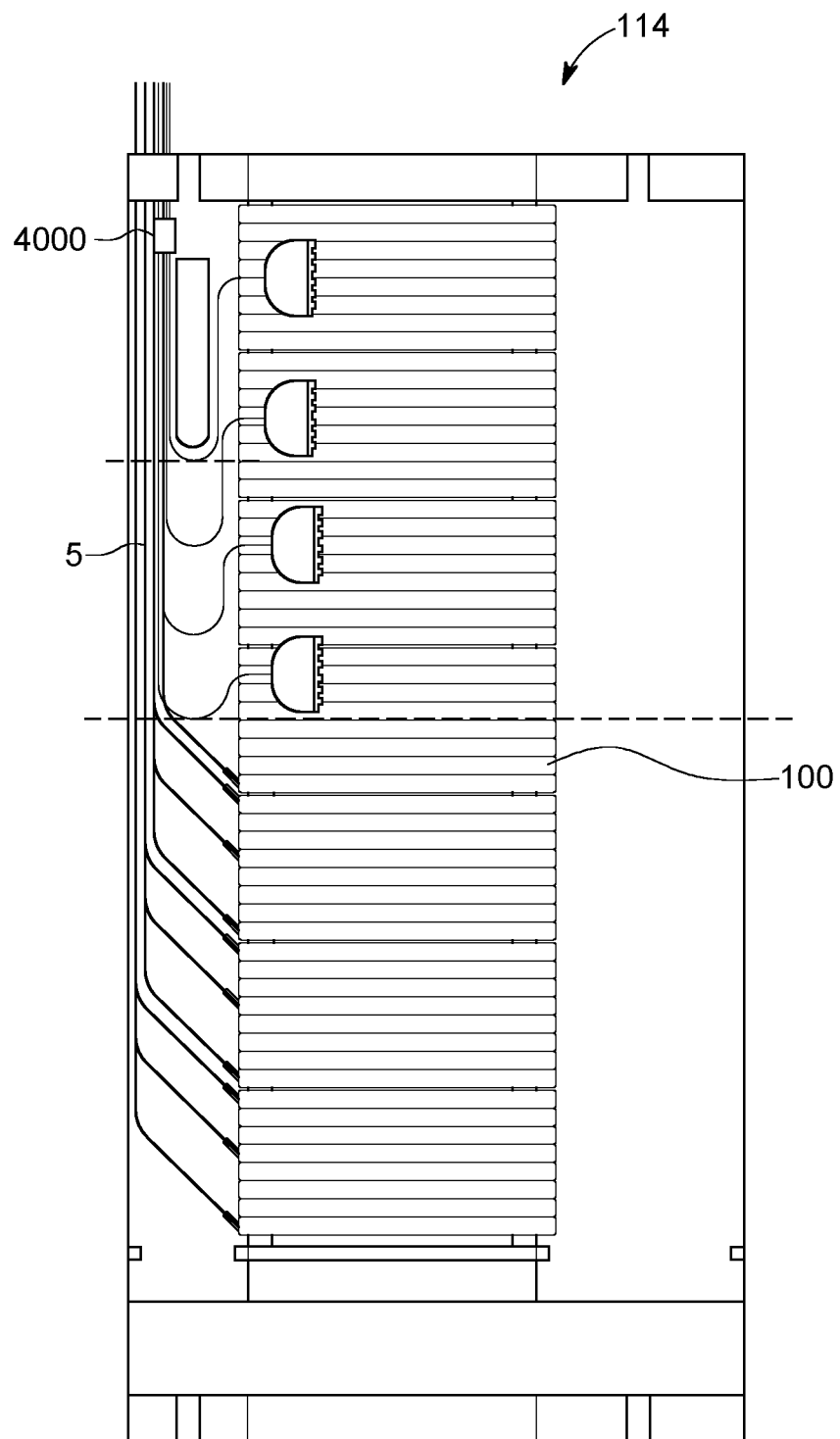
FIG. 21 illustrates an example cable routing for combination cabling similar to that shown in FIG. 20, where both the trunk cables and jumper cables are directed from a top of the frame toward the elements.

FIG. 20 illustrates an example cable routing that can be used on the fixed side of a left frame 114 of the cross-connect assembly 110, where the cables 5 are a combination of trunk cables that are split out using fan-outs mounted to the frame 114, directed from a top of the frame 114 toward the elements 100 and jumper cables directed to the elements 100 from a bottom of the frame 114. FIG. 21 illustrates an example cable routing for combination cabling 5 similar to that shown in FIG. 20, where both the trunk cables and jumper cables are directed from a top of the frame 114 toward the elements 100.

Figure 22:
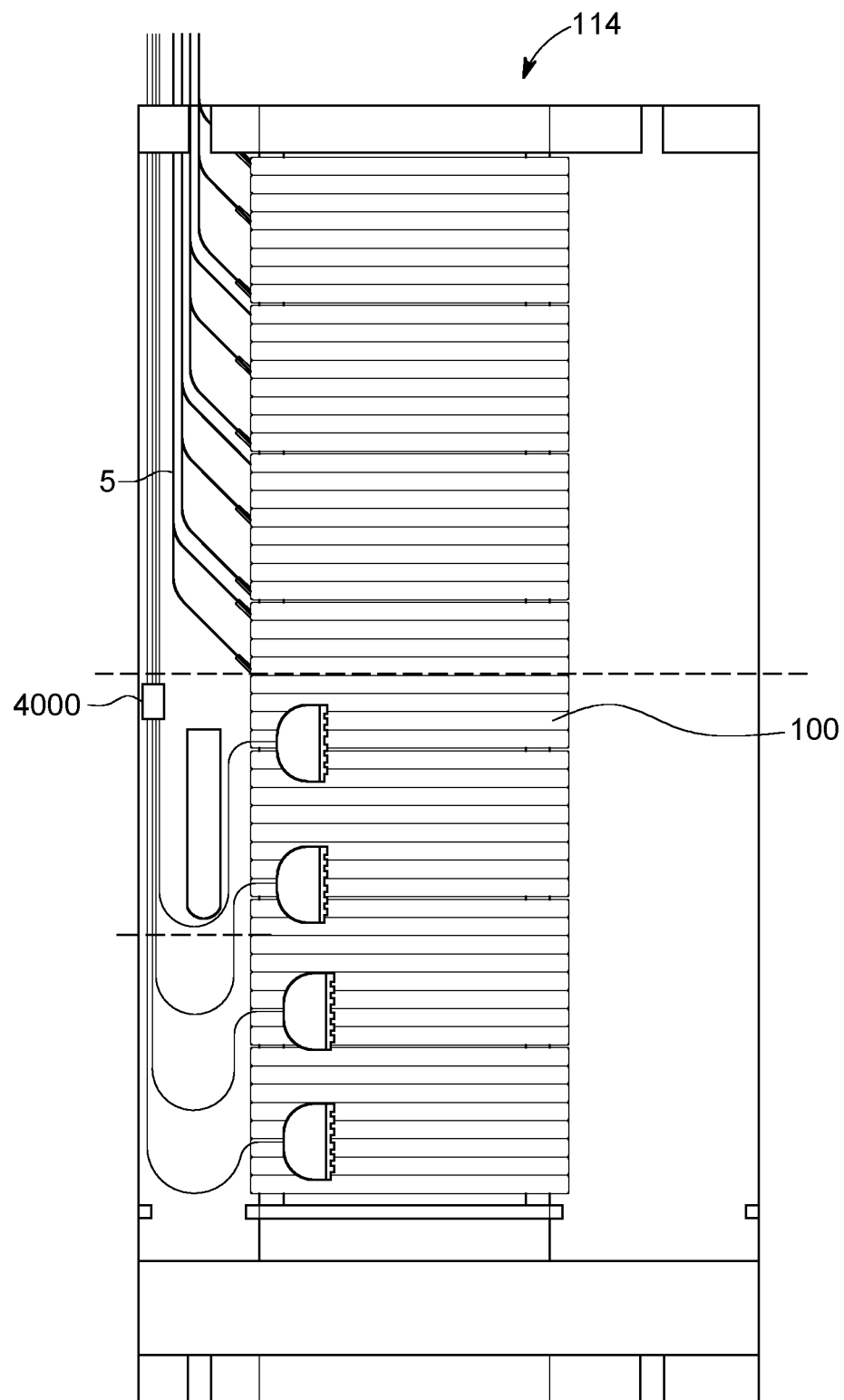
FIG. 22 illustrates an example cable routing for combination cabling similar to that shown in FIG. 21, where the jumper cables are directed to an upper set of distribution elements and trunk cables are directed to a lower set of distribution elements.

FIG. 22 illustrates an example cable routing for combination cabling 5 similar to that shown in FIG. 21, where the jumper cables are directed to an upper set of distribution elements 100 and trunk cables are directed to a lower set of distribution elements 100.

Figure 23:
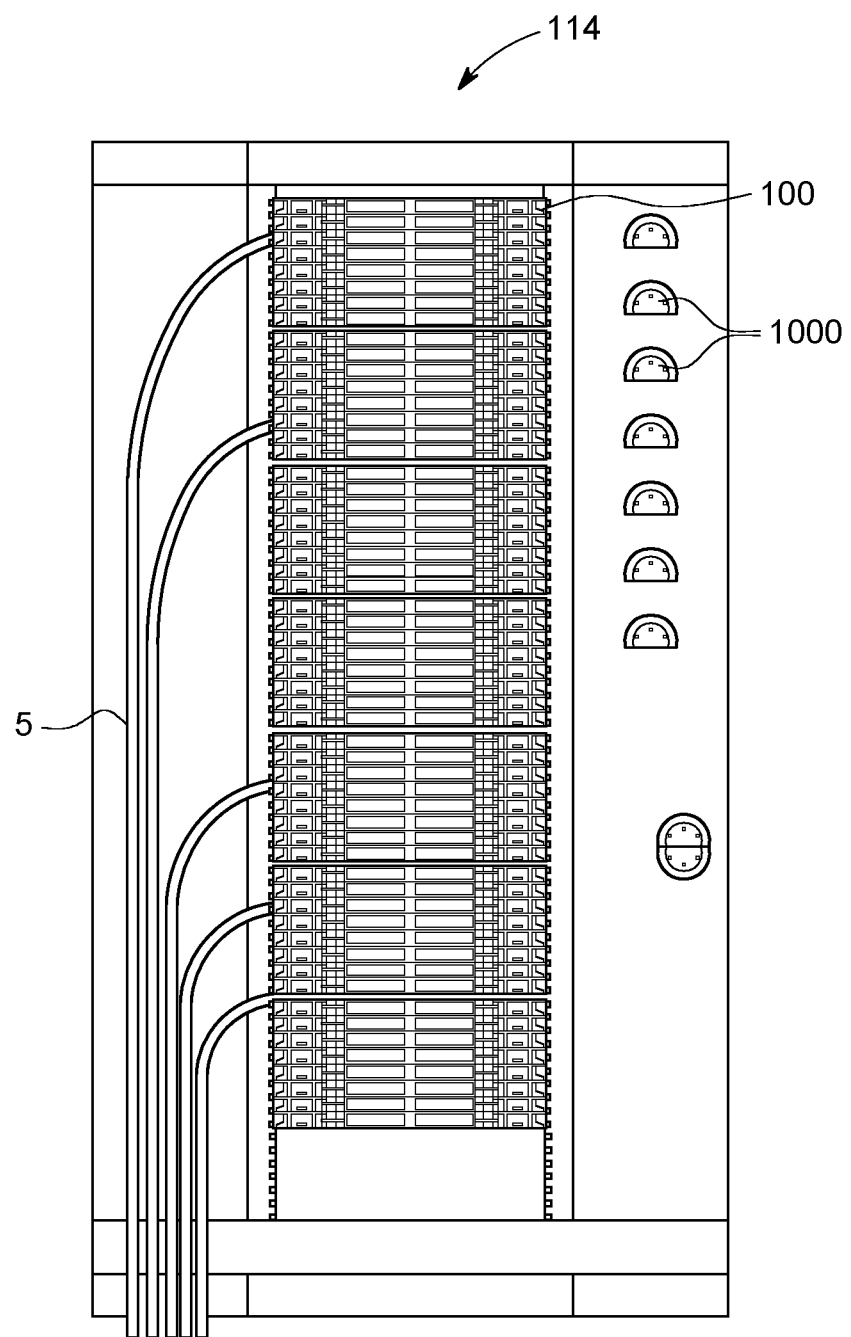
FIG. 23 illustrates an example cable routing for the fixed side of a left frame of the cross-connect assembly where a plurality of elements on different levels receive fibers to be spliced from a single OSP cable fixed at the side of one of the elements in a grouping.
Figure 24:
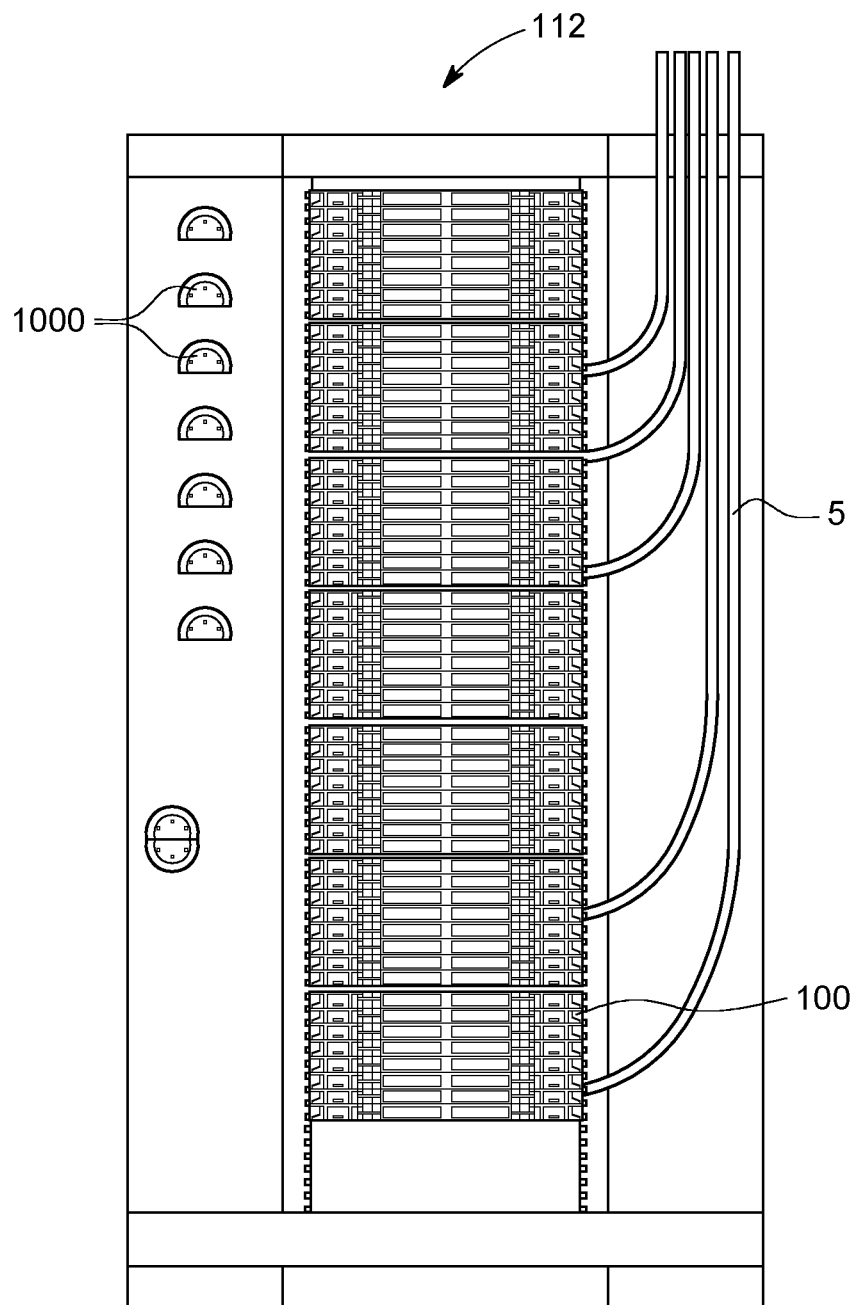
FIG. 24 illustrates an example cable routing similar to that shown in FIG. 23 for the fixed side of the right frame of the cross-connect assembly.

FIG. 23 illustrates an example cable routing for the fixed side of a left frame 114 of the cross-connect assembly 110 where a plurality of elements 100 on different levels receive fibers to be spliced from a single OSP cable 5 fixed at the side of one of the elements 100 in a grouping. FIG. 24 illustrates an example cable routing similar to that shown in FIG. 23 for the fixed side of the right frame 112 of the cross-connect assembly 110.

Figure 25:
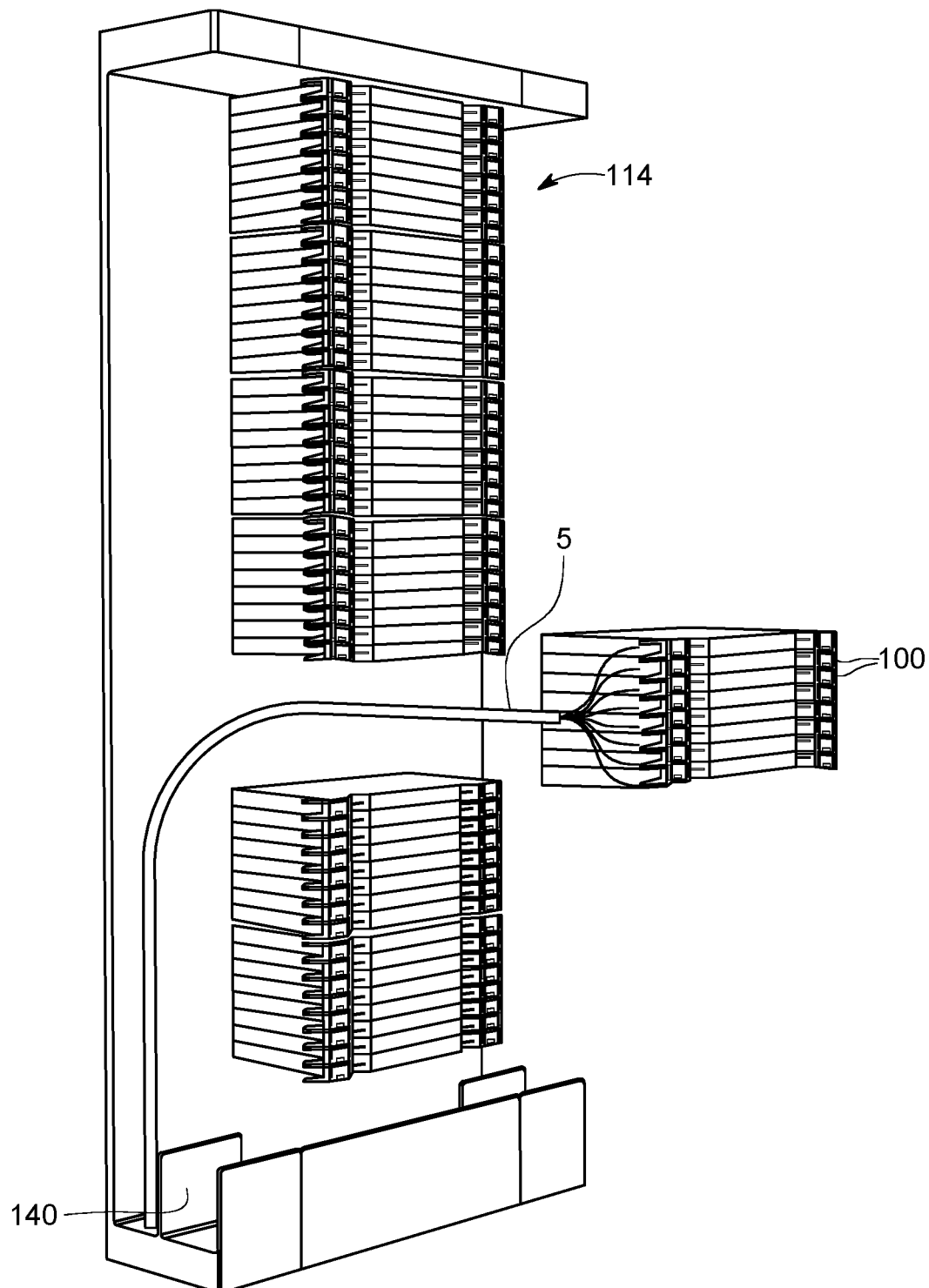
FIG. 25 illustrates the mounting of a group of elements where fibers to be spliced from a single OSP cable fixed at the side of the one of the elements is routed to all of the elements in the group, where the length of cabling is provided with enough slack to accommodate the mounting.

FIG. 25 illustrates the mounting of a group of elements 100 where fibers to be spliced from a single OSP cable 5 fixed at the side of the one of the elements 100 is routed to all of the elements 100 in the group, where the length of cabling 5 is provided with enough slack to accommodate the mounting.

Figure 26:
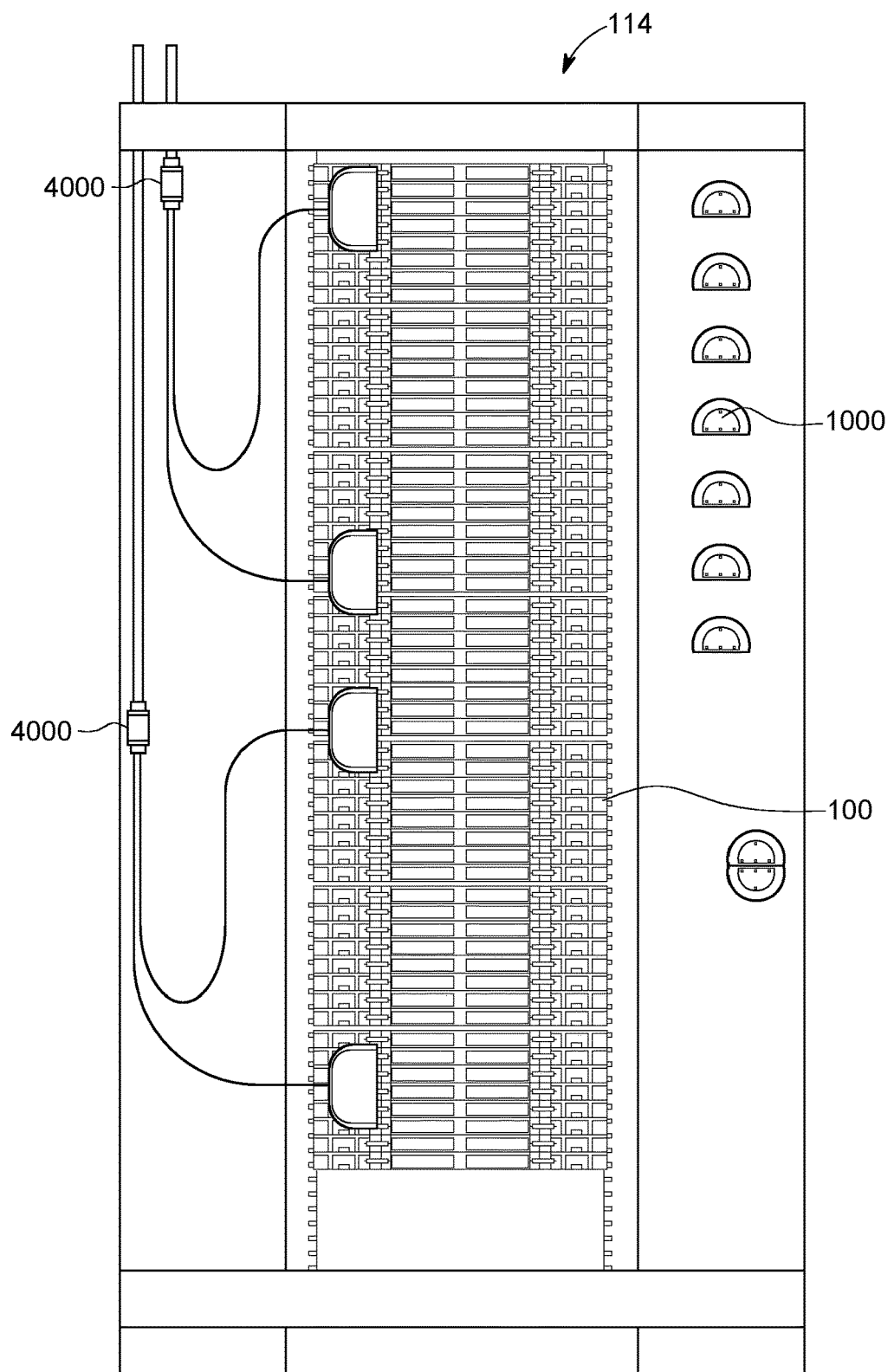
FIG. 26 illustrates the positioning of the fan-outs that can be mounted on the left frame of the cross-connect assembly for the trunk cables coming from a top of the frame.
Figure 27:
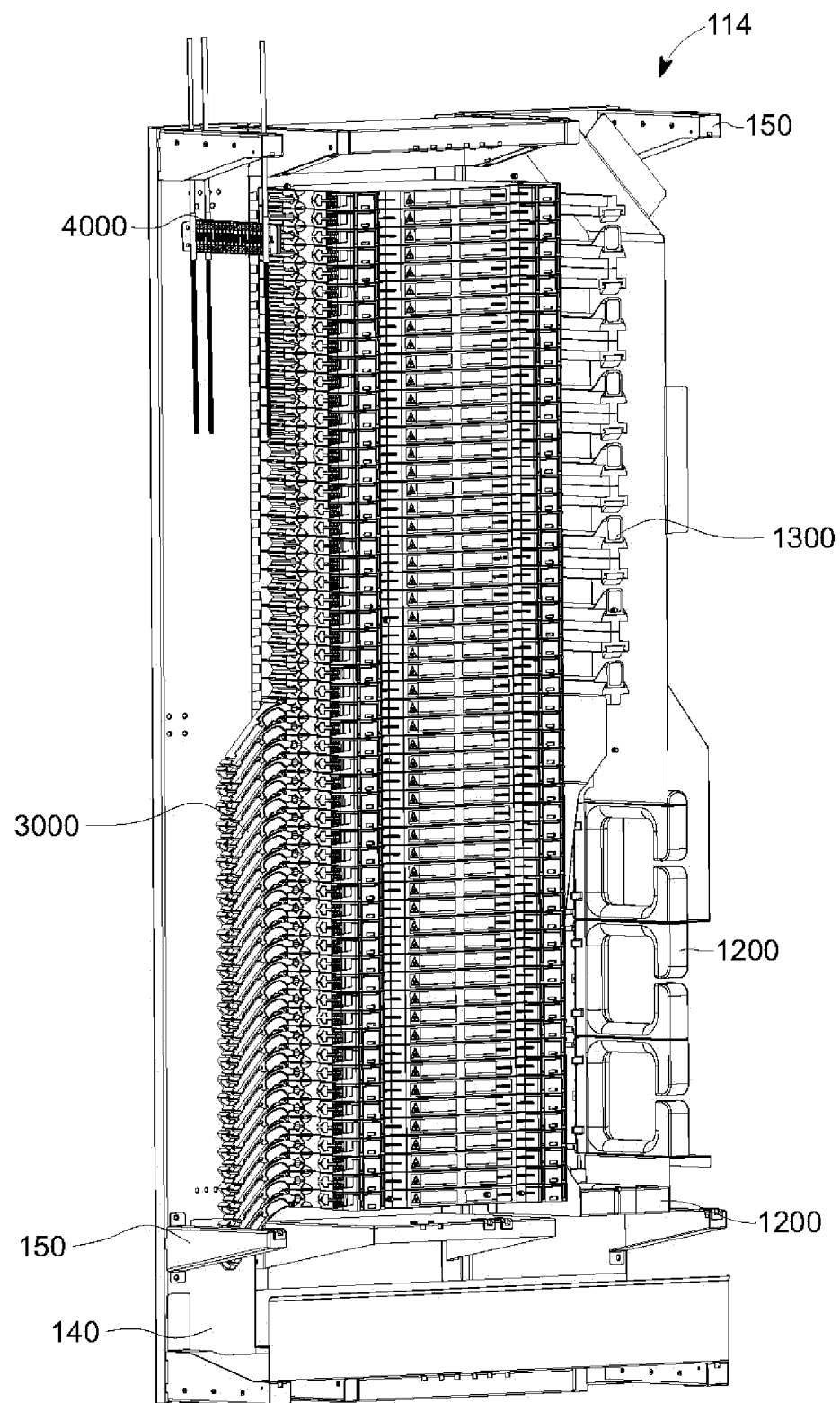
FIG. 27 illustrates a perspective view of the left frame of the cross-connect assembly with an example fan-out fixation assembly being used to break out trunk cables.

FIG. 26 illustrates the positioning of the fan-outs using fixation assemblies 4000 that can be mounted on the left frame 114 of the cross-connect assembly 110 for the trunk cables coming from a top of the frame 114 and FIG. 27 illustrates a perspective view of the left frame 114 of the cross-connect assembly 110 with an example fan-out fixation assembly 4000 being used to break out trunk cables. As noted previously, examples of fan-out fixation assemblies 4000 that can be used on the frames 112, 114 is illustrated in FIGS. 159-175.

Figure 28:
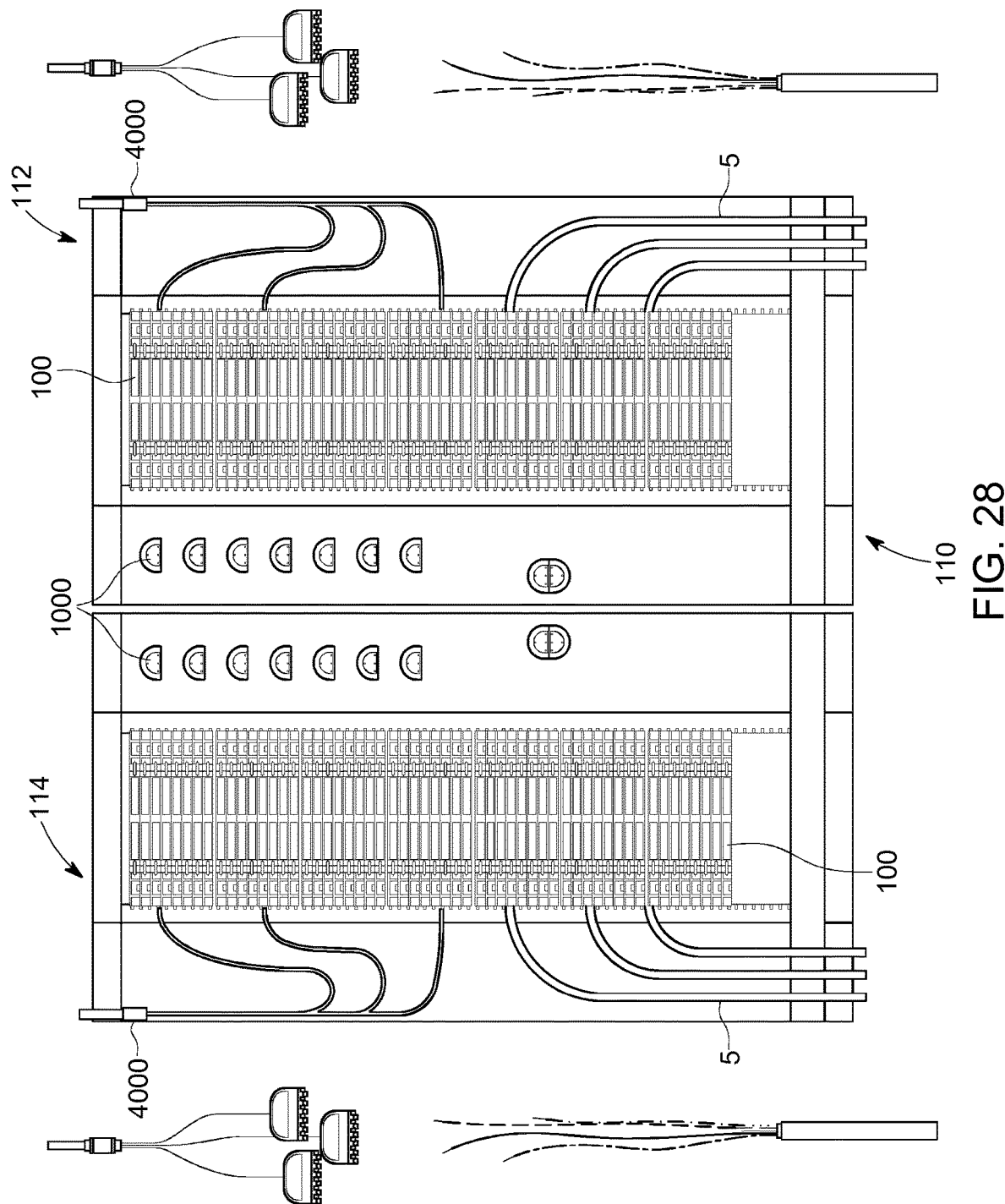
FIG. 28 illustrates a schematic showing the use of a combination of OSP splice cables directed to from the bottom of the cross-connect assembly toward the lower elements and trunk cables with fan-outs directed from the top of the cross-connect assembly toward the upper elements.
Figure 29:
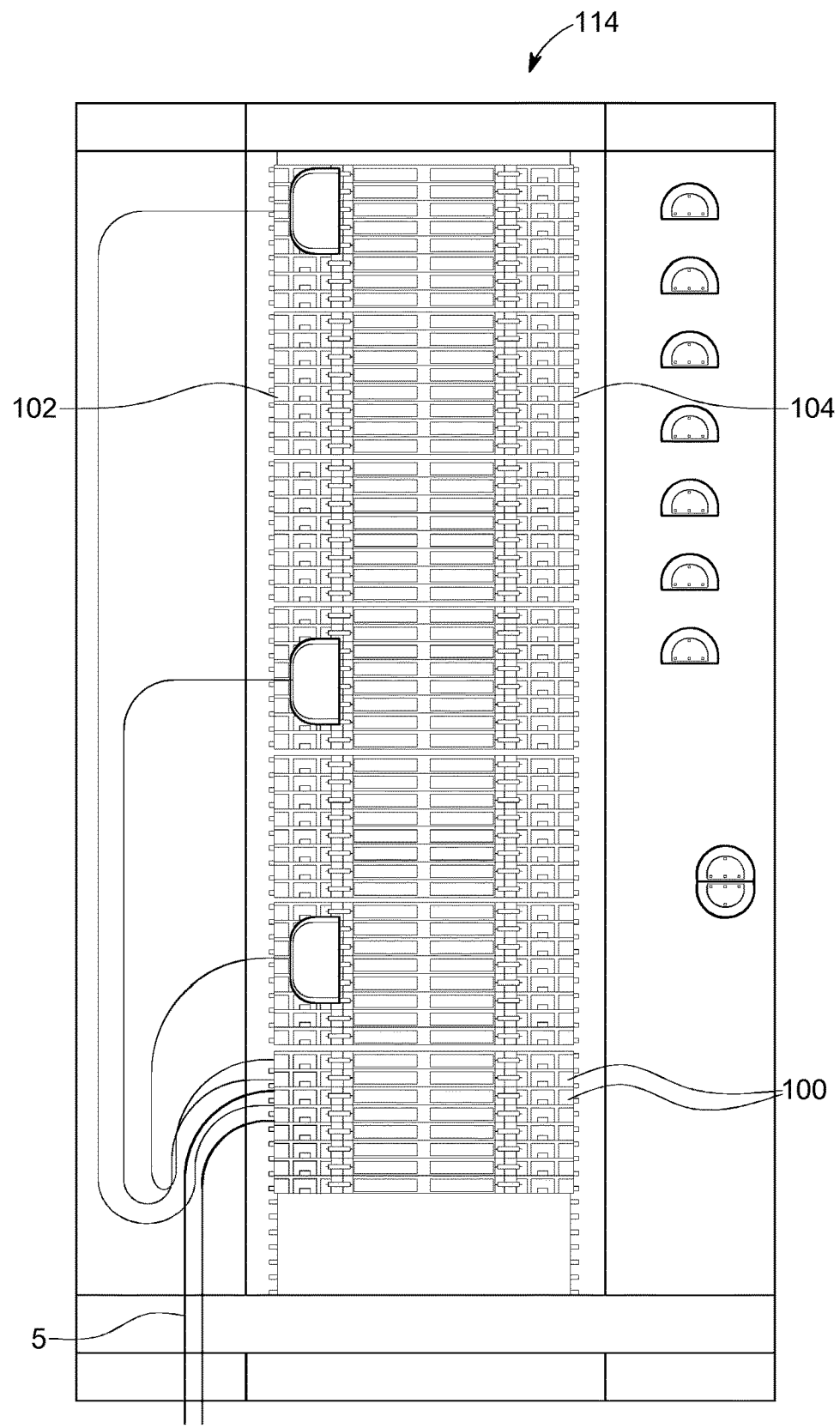
FIG. 29 illustrates a group of elements designated for splicing fibers from an OSP cable to other groups of elements within a frame at the fixed side of the cross-connect assembly.
Figure 30:
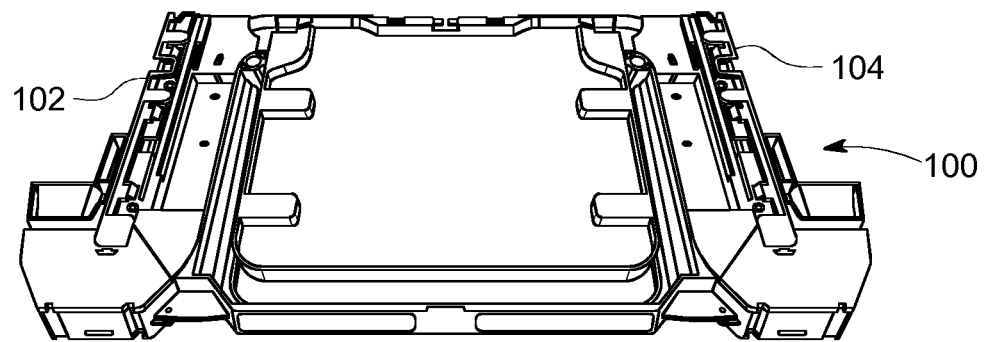
FIG. 30 illustrates a top perspective view of an example dedicated spliced element from the group shown in FIG. 29.

FIG. 28 illustrates a schematic showing the use of a combination of OSP splice cables directed to from the bottom of the cross-connect assembly 110 toward the lower elements 100 and trunk cables with fan-outs directed from the top of the cross-connect assembly 110 toward the upper elements 100. FIG. 29 illustrates a group of elements 100 designated for splicing fibers from an OSP cable to other groups of elements 100 within a frame 112/114 at the fixed side of the cross-connect assembly 110. An example of a dedicated splice element 100 is shown in FIG. 30.

Figure 34:
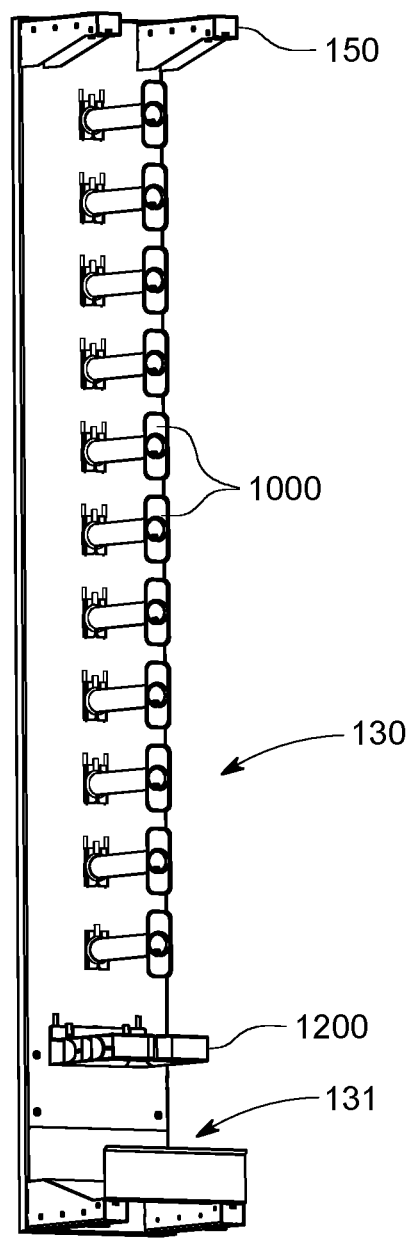
FIG. 34 is a perspective view of the overlength bay of FIG. 33 shown in isolation.
Figure 35:
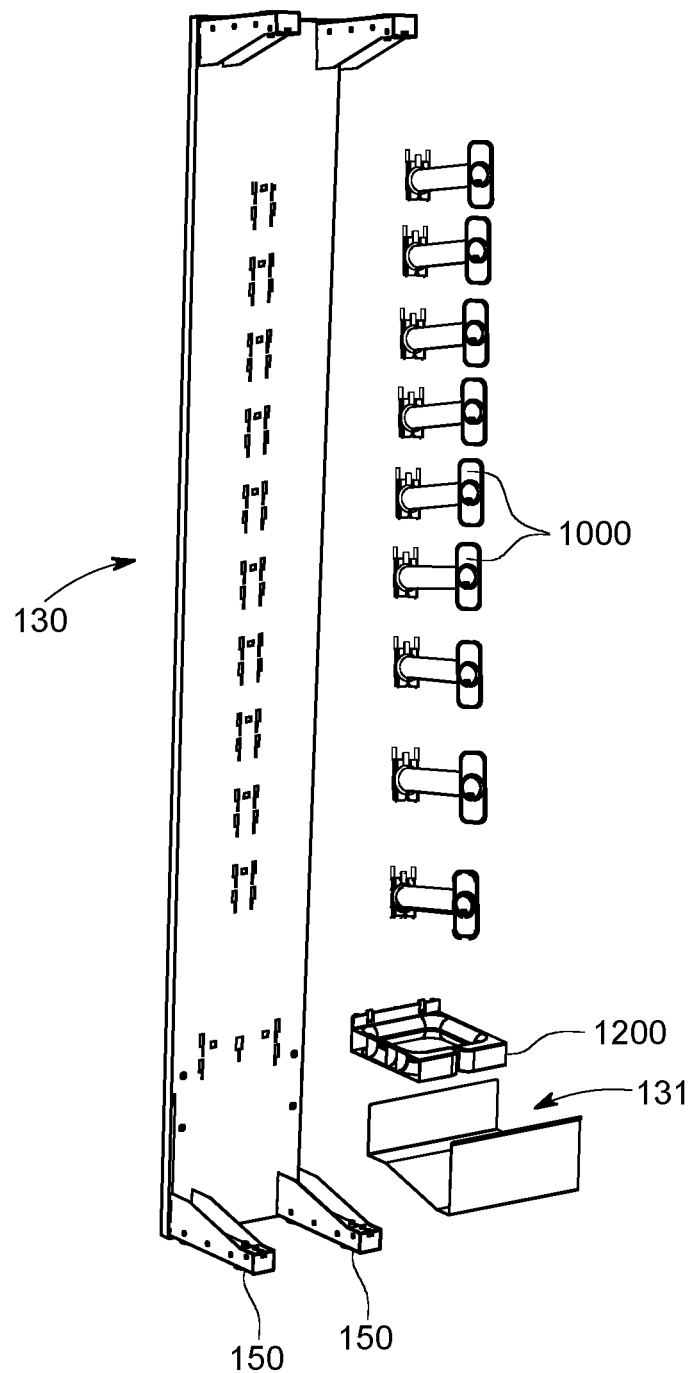
FIG. 35 illustrates the overlength bay of FIG. 34 in an unassembled configuration.
Figure 36:
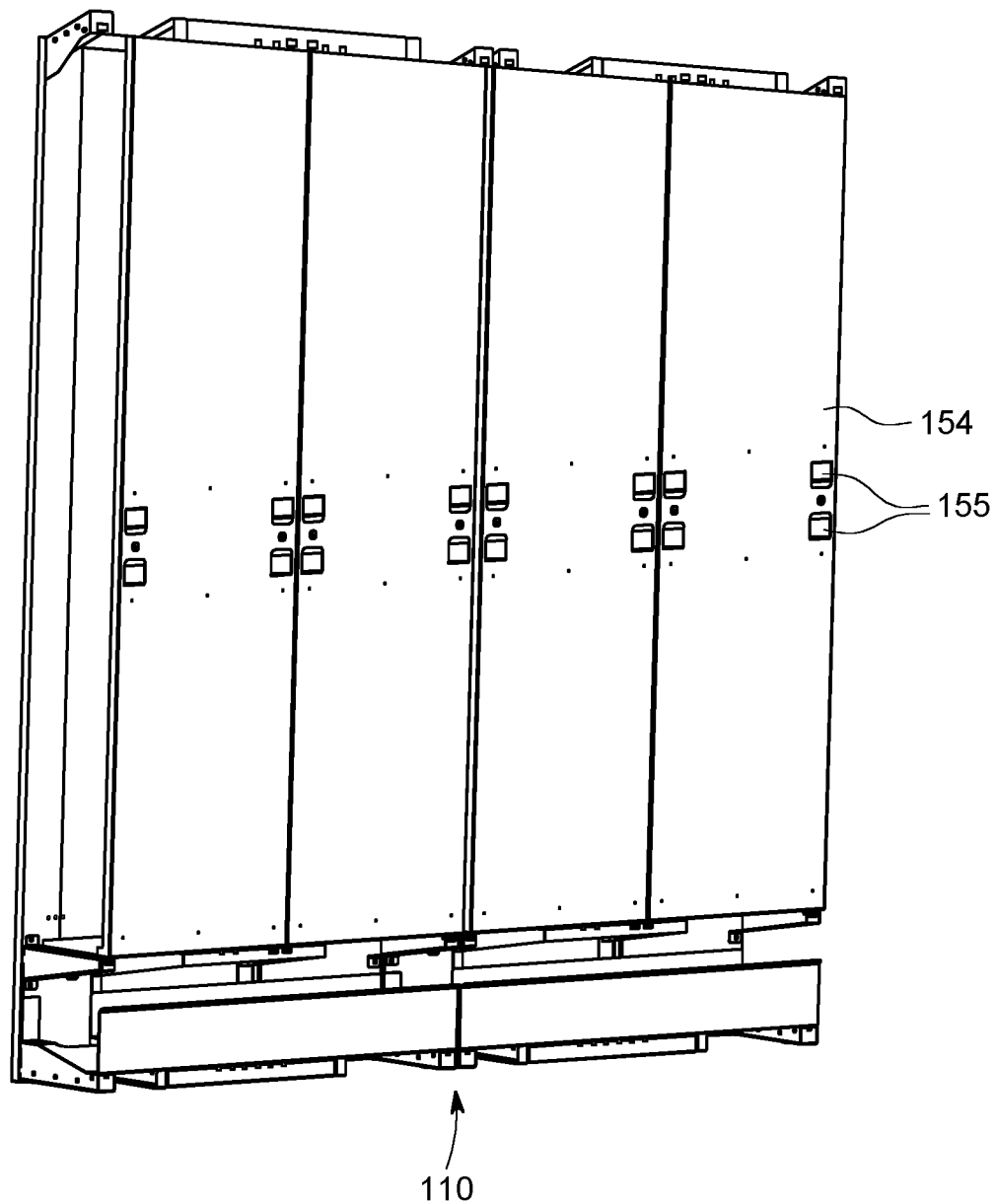
FIG. 36 illustrates the cross-connect assembly of FIG. 1 with pivot doors mounted thereon.
Figure 37:
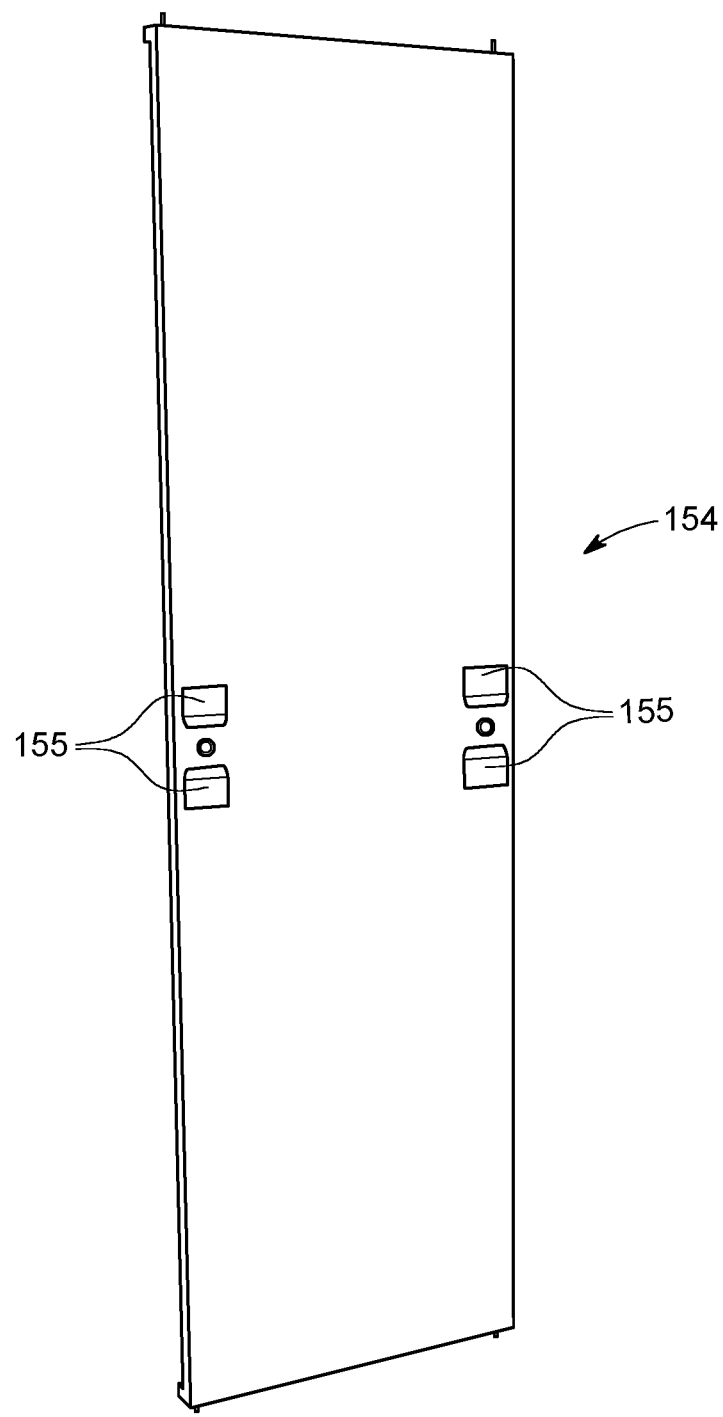
FIG. 37 illustrates one of the doors of FIG. 36 in isolation.
Figure 38:
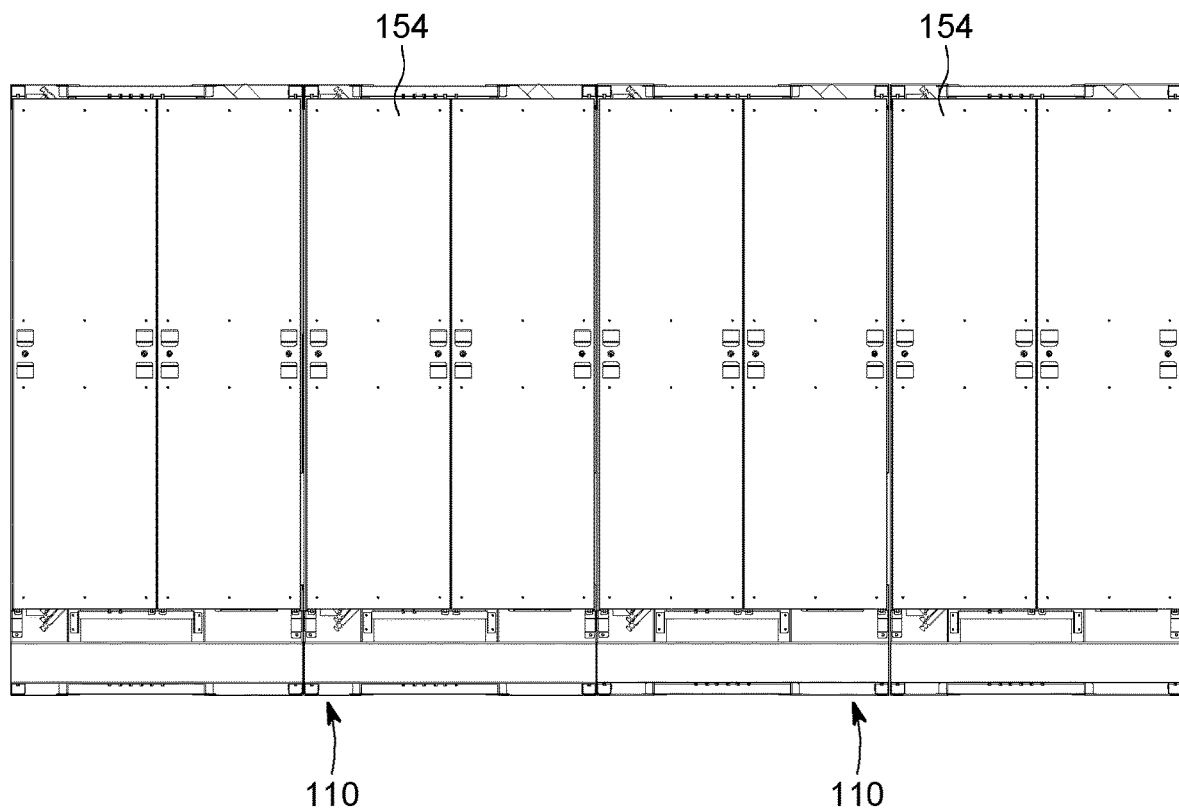
FIG. 38 illustrates two cross-connect assemblies stacked in a side-by-side configuration with pivot doors mounted thereon.
Figure 39:
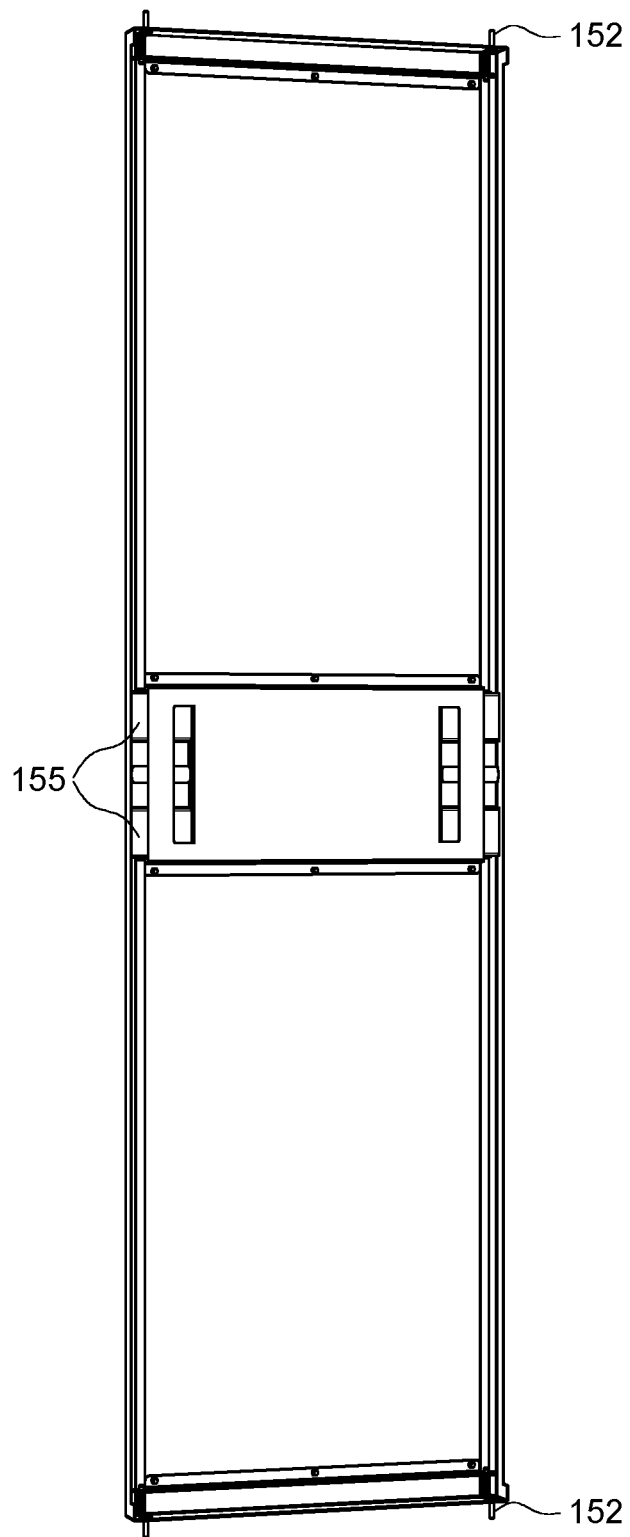
FIG. 39 is a rear perspective of the door of FIG. 37 illustrating the flat-rod door latch system.

As noted above, an overlength bay 130 can be used between two of the cross-connect frame assemblies 110. Such an overlength bay 130 is illustrated in FIG. 33 being used between two cross-connect assemblies 110. FIG. 34 is a perspective view of the overlength bay 130 of FIG. 33 shown in isolation and FIG. 35 illustrates the overlength bay 130 of FIG. 34 in an unassembled configuration. As shown, the overlength bay 130 includes a column of the overlength drums 1000 that are provided in a vertically stacked arrangement with a bundle collector 1200 positioned toward the bottom of the overlength bay 130. A bottom trough portion 131 of the overlength bay 130 is designed to continue the troughing system 140 provided by the cross-connect frame assemblies 110 when the overlength bay 130 is positioned between them. Door mounts 150, similar to those used on the right and left frames 112, 114 of the cross-connect assembly 110 are also provided on the overlength bay 130 for providing coverage for the internal features if needed.

The doors 154 for use on the frame assemblies 110, 120, 130 are discussed herein with reference to FIGS. 36-42. The doors 154 include upper and lower spring loaded rods 152 that are insertable into rod receivers 156 that are provided on the door mounts 150. As shown, each rod receiver 156 defines a channel 158 with a tapered surface 159 that allows guiding of a door rod 152 into the channel 158 where the spring-loaded rod 152 can snap into a hinge opening 157 after riding along the tapered surface 159.

The spring-loaded rods 152 of the doors 154 allow the doors 154 to be pivotally opened in either direction. Each door 154 includes left and right squeeze handles 155. The handles 155 form part of a door latch system that allows a given door 154 to be pivotally opened in a selected direction. The pair of handles 155 on the right side of the door 154 are coupled to upper and lower spring-loaded rods 152 on the right side. And, the pair of handles 155 on the left side of the door 154 are coupled to upper and lower spring-loaded rods 152 on the left side Pressing a set of either the right or the left handles 155 toward each other moves the upper rod 152 downwardly and moves the lower rod 152 upwardly. When the rods 152 clear the hinge openings 157, the rods 152 can move out of the channels 158 and the door 154 is free to swing out, pivoting about the rods 152 that are positioned on the opposite side.

Figure 42:
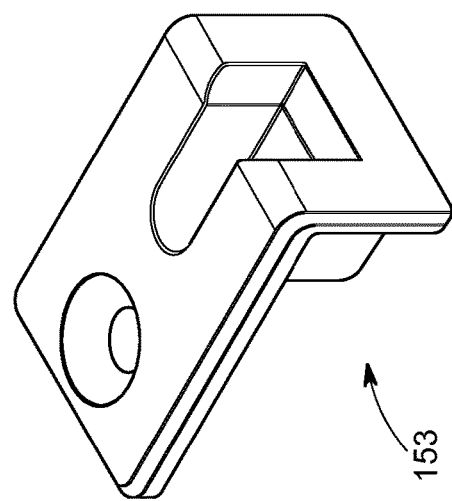
FIG. 42 illustrates another version of a rod receiver for mounting on the door mounts of the frame assemblies.
Figure 40:
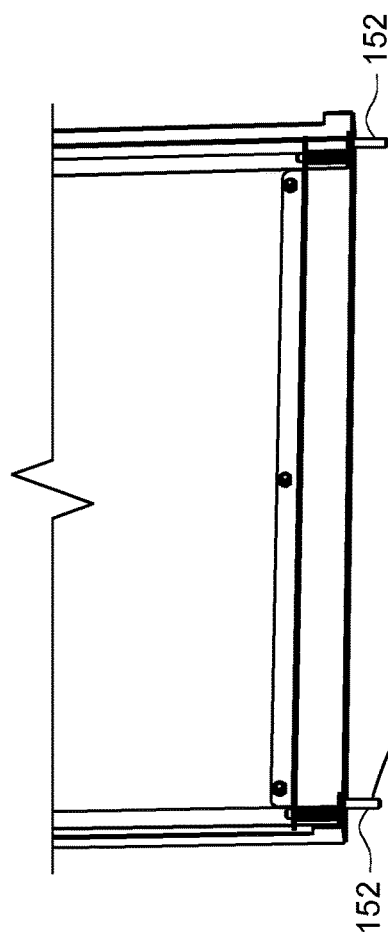
FIG. 40 illustrates a close-up view of the spring-loaded rods of the door latch system of FIG. 39, each of which is activated by the corresponding door handle.
Figure 41:
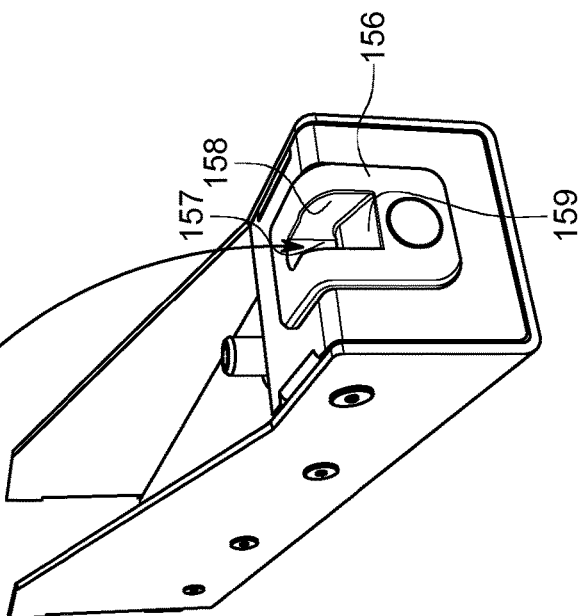
FIG. 41 illustrates one of the door mounts that are configured to be mounted on various locations on the frame assemblies of the present disclosure for receiving the pivot doors for the assemblies.
Figure 43:
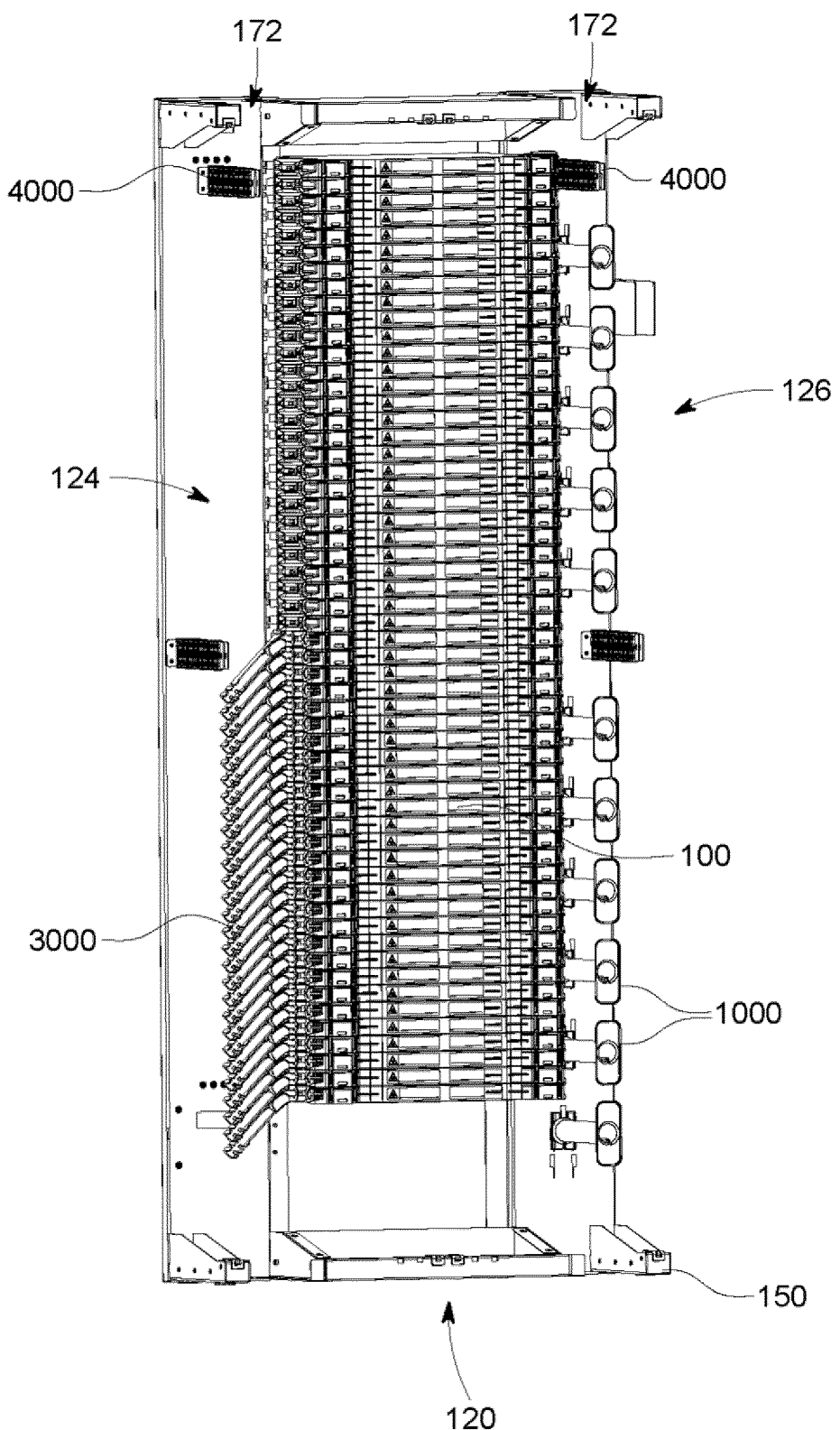
FIG. 43 is a left perspective view of the inter-connect frame assembly of FIG. 2.
Figure 44:
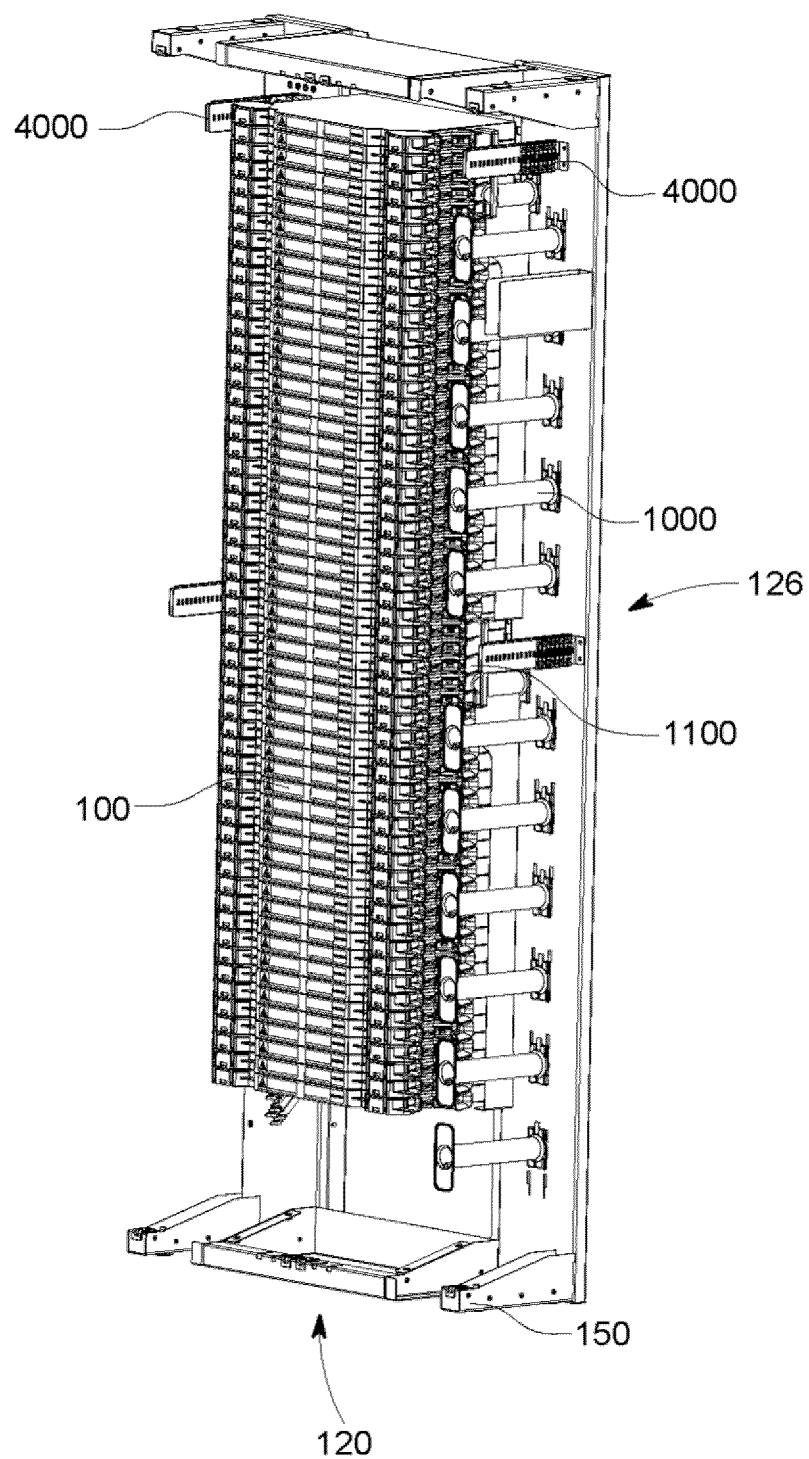
FIG. 44 is a right perspective view of the inter-connect frame assembly of FIG. 43.

In the same manner, the door 154 can be pivoted pivotally opened in the other direction. It should be noted that a door 154 can be entirely removed from a frame assembly 110/120/130 if both sets of handles 155 on the right and left sides are squeezed together, removing all four spring-loaded rods 152 from the hinge openings 157. FIG. 42 illustrates another version of a rod receiver 153 for mounting on the door mounts 150 of the frame assemblies 110/120/130.

Figure 55:
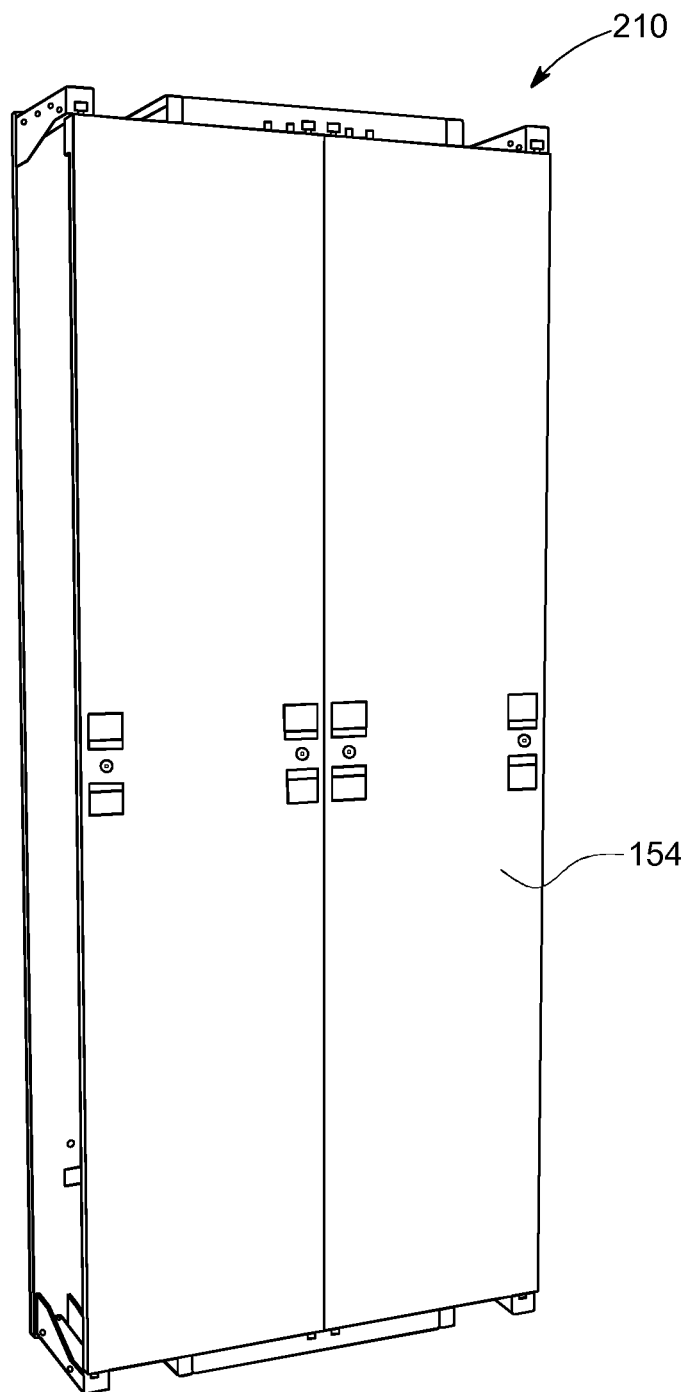
FIG. 55 illustrates the inter-connect assembly of FIG. 2 with pivot doors mounted thereon.

It should be noted that the doors 154 for the inter-connect frame 120 assembly can be configured similar to the doors 154 for the cross-connect assembly 110. However, as shown in FIG. 55, the door mounts 150 on the inter-connect frame 122 are mounted adjacent the floor in a data-center, and, thus, the doors 154 can extend all the way down to the floor since a bottom trough is not utilized in an inter-connect application.

The inter-connect frame assembly 120 is shown in closer detail in FIGS. 2 and 43-54. As noted above, the inter-connect frame assembly 120 is designed for applications with little or no re-patching requirements, where the mounted distribution devices 100 define an OSP cable side 124 and an equipment cable side 126.

In the depicted example, the left side of the inter-connect frame 122 may be designated and configured as the OSP side 124 and the right side may be designated and configured as the equipment side 126. At both the OSP side 124 and the equipment side 126, the frame defines top openings 172 for incoming and outgoing cables 5.

Figure 45:
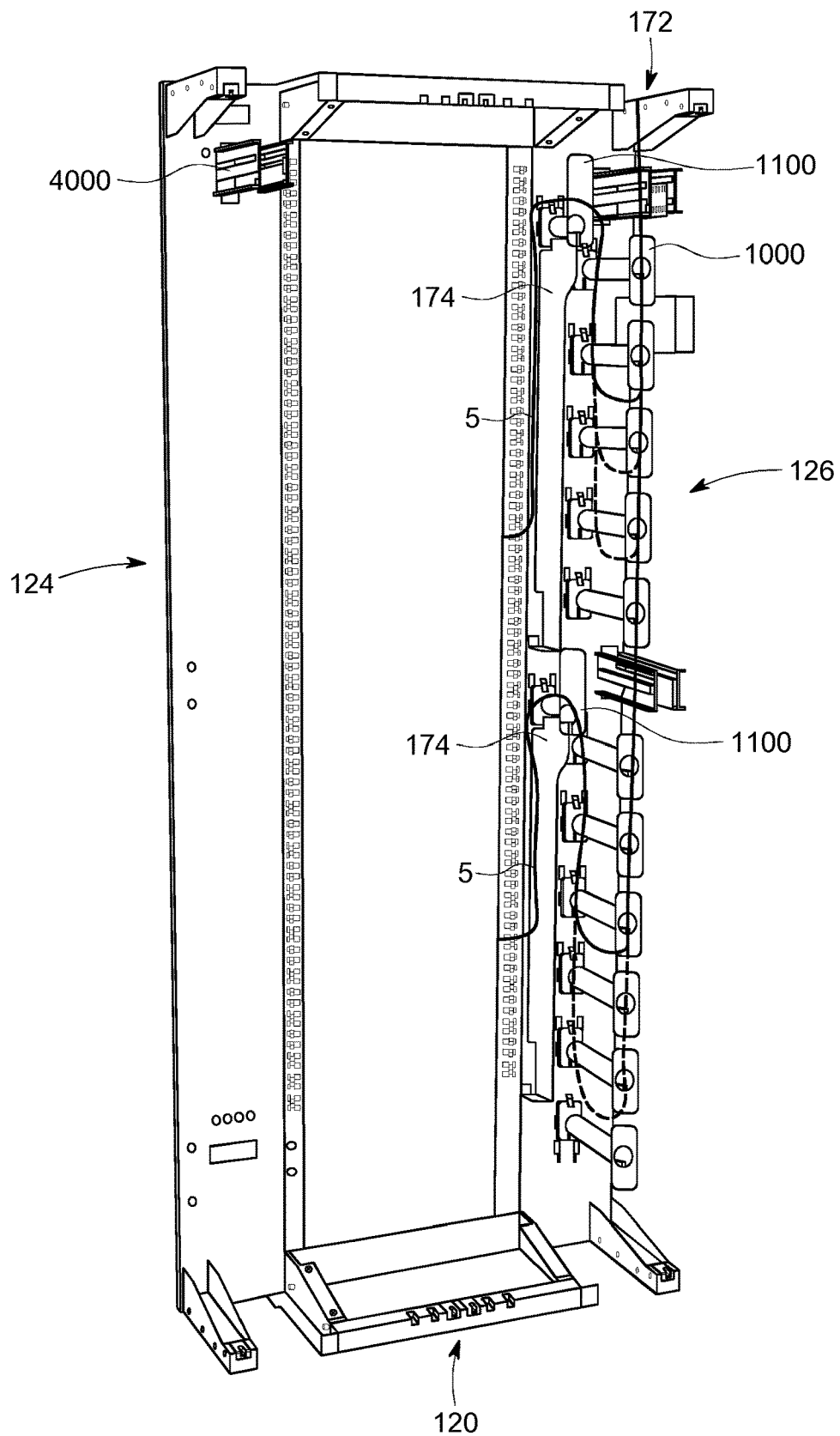
FIG. 45 illustrates an example routing for cabling on the equipment side of the inter-connect frame where a combination of hook drums and overlength drums are used to guide cabling from the elements toward the top of the frame.

It should be noted that the left OSP side 124 of the inter-connect frame 122 may be configured in a similar manner as the fixed side of the frames 112, 114 of the cross-connect assembly 110. The equipment side 126 utilizes, in addition to overlength drums 1000 that are provided in a vertical stack, upper and lower hook drums 1100. The hook drums 1100 are configured to guide cabling 5 from the elements 100 downwardly and around the bottom sides of the overlength drums 1000 as shown in FIG. 45. Dividers 174 can be provided to separate cables 5 coming from the elements 100 and cables 5 that have been routed around the hook drums 1100. Examples of the hook drums 1100 are discussed in further detail below.

Fan-out fixation assemblies similar to fixation assemblies 4000 noted above may be used at the right and left side 126, 124 of the inter-connect frame 122.

FIGS. 46-52 illustrate the types of cables 5 on the OSP side 124 of the elements 100 that can be paired with the types of cables 5 on the equipment side 126 of the elements 100 that are provided on the inter-connect frame 122.

Figure 46:
FIGS. 46-52 illustrate the types of cables on the OSP side of the elements that can be paired with the types of cables on the equipment side of the elements that are provided on the inter-connect frame.
Figure 47:
Figure 48:
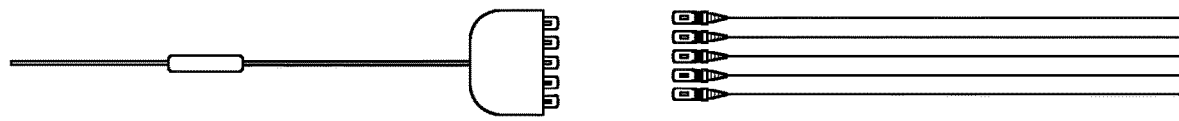
Figure 49:
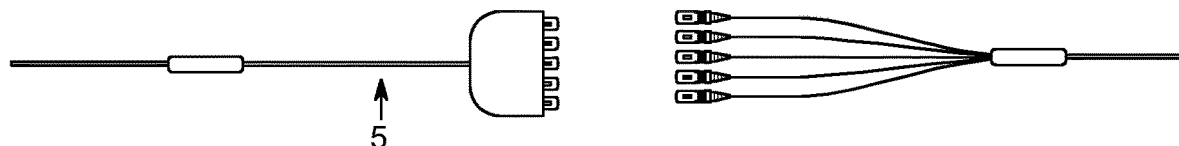
Figure 50:
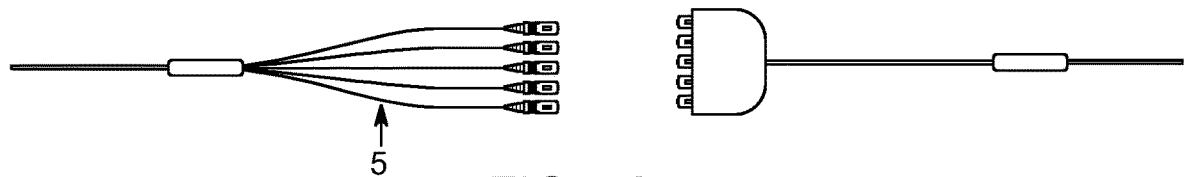
Figure 51:
Figure 52:
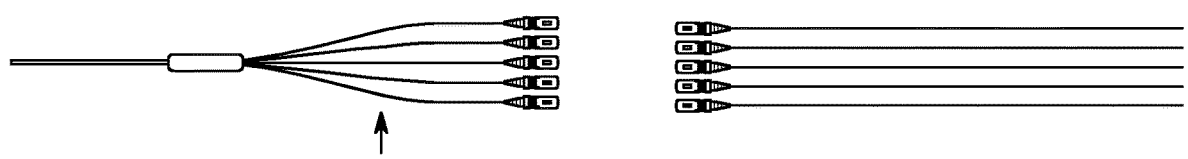

As shown in FIG. 46, splice cables at the OSP side 124 can be paired with individual jumpers at the equipment side 126. As shown in FIG. 47, splice cables at the OSP side 124 can be paired with trunk cables utilizing fan-outs at the equipment side 126. As shown in FIG. 48, trunk cables utilizing fan-outs at the OSP side 124 can be paired individual jumpers at the equipment side 126. As shown in FIGS. 49-51, trunk cables utilizing fan-outs at the OSP side 124 can be paired with trunk cables utilizing fan-outs at the equipment side 126. And, as shown in FIG. 52, trunk cables utilizing fan-outs at the OSP side 124 can be paired with individual jumpers at the equipment side 126.

Figure 53:
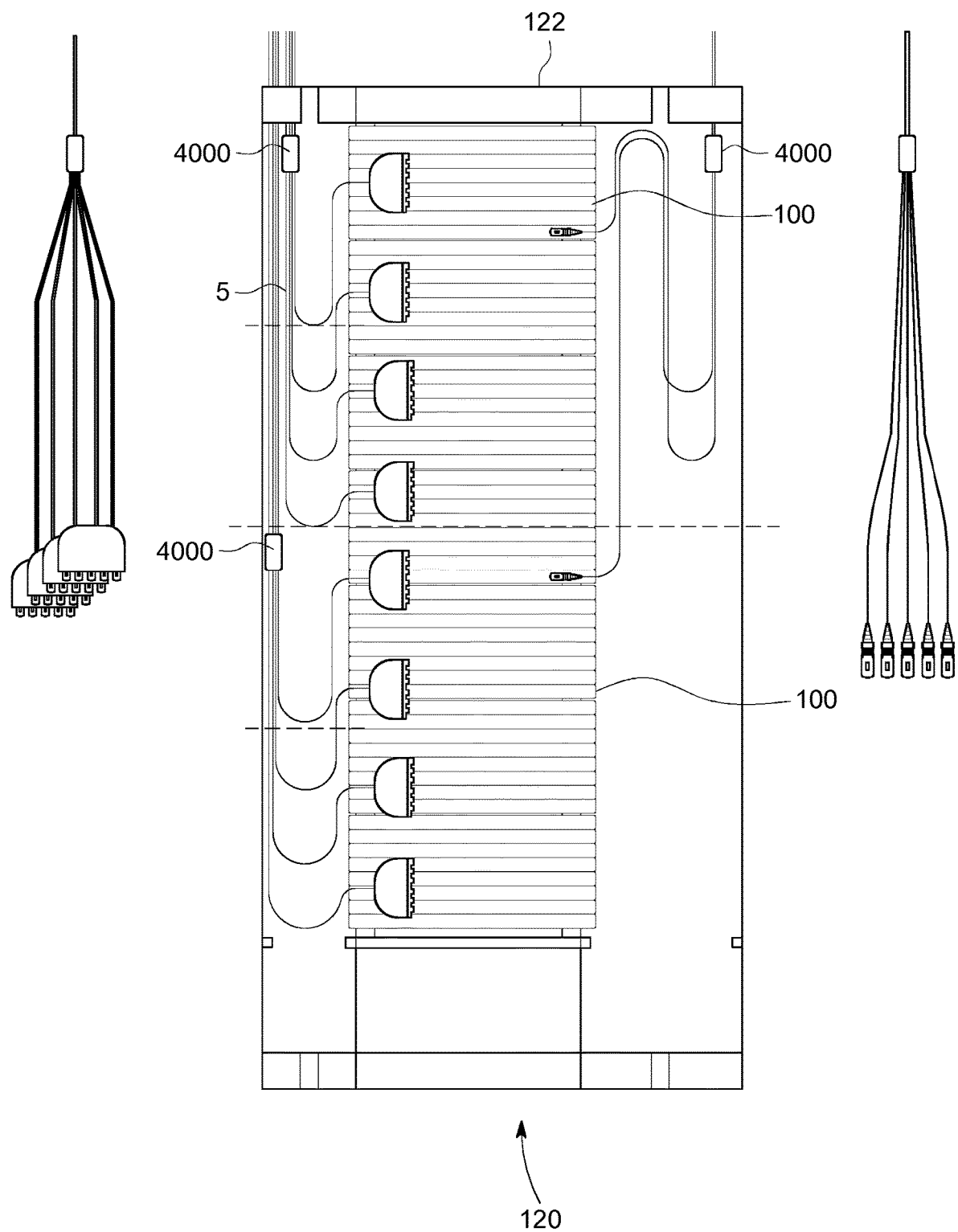
FIG. 53 schematically illustrates one example of the cable routing that can be used on the inter-connect frame for trunk cables on the OSP side and trunk cables on the equipment side.
Figure 54:
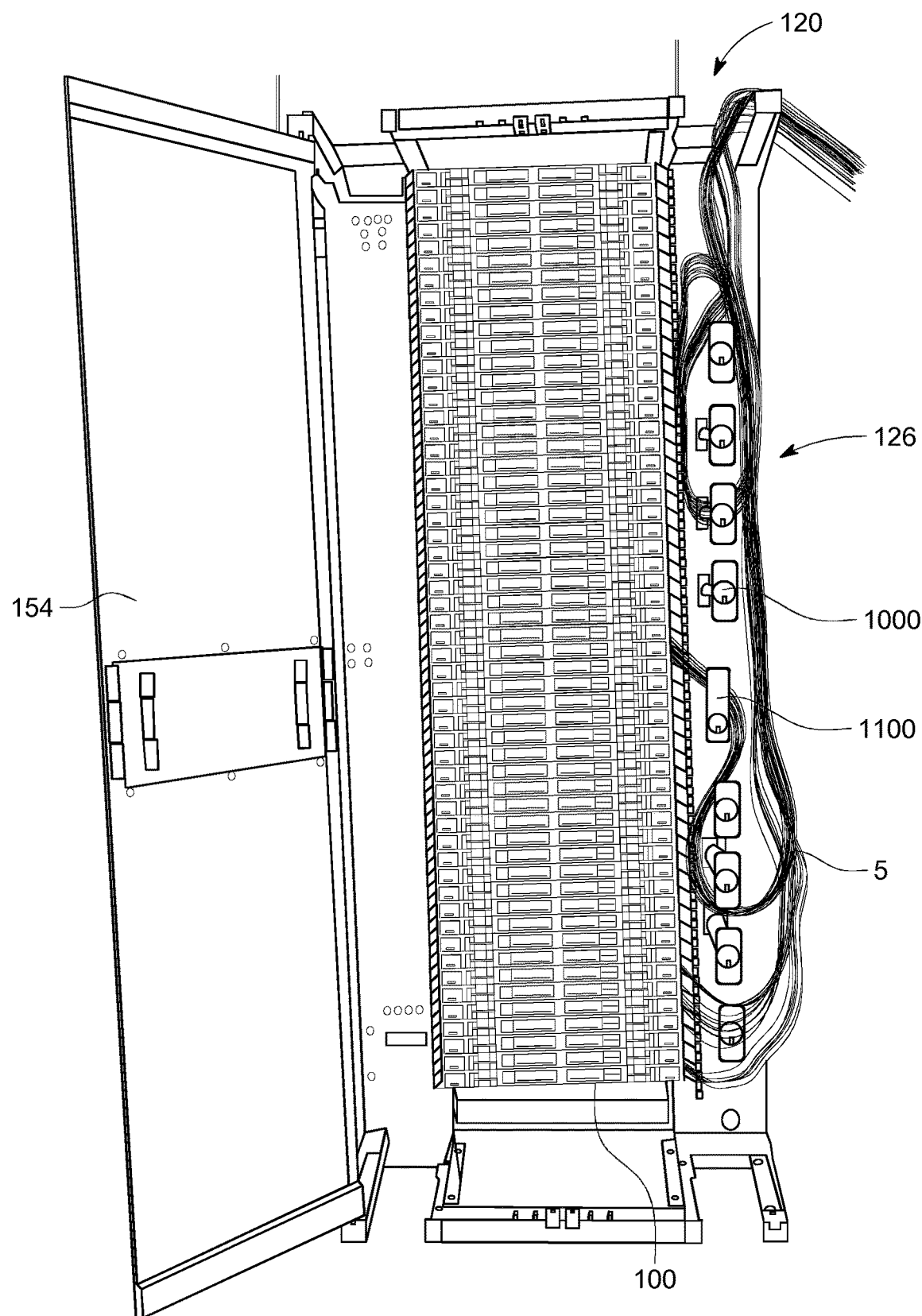
FIG. 54 physically illustrates an example cable routing on the equipment side of the inter-connect assembly.

FIG. 53 schematically illustrates one example of the cable routing that can be used on the inter-connect frame 122 for trunk cables on the OSP side 124 and trunk cables on the equipment side 126. FIG. 54 physically illustrates an example cable routing on the equipment side 126 of the inter-connect assembly 120, where the hook drums 1100 and the overlength drums 1000 are illustrated as being utilized.

Referring now to FIGS. 56-69, alternative examples of either the cross-connect assembly or the inter-connect assembly and the modular packaging for such assemblies is illustrated.

Figure 56:
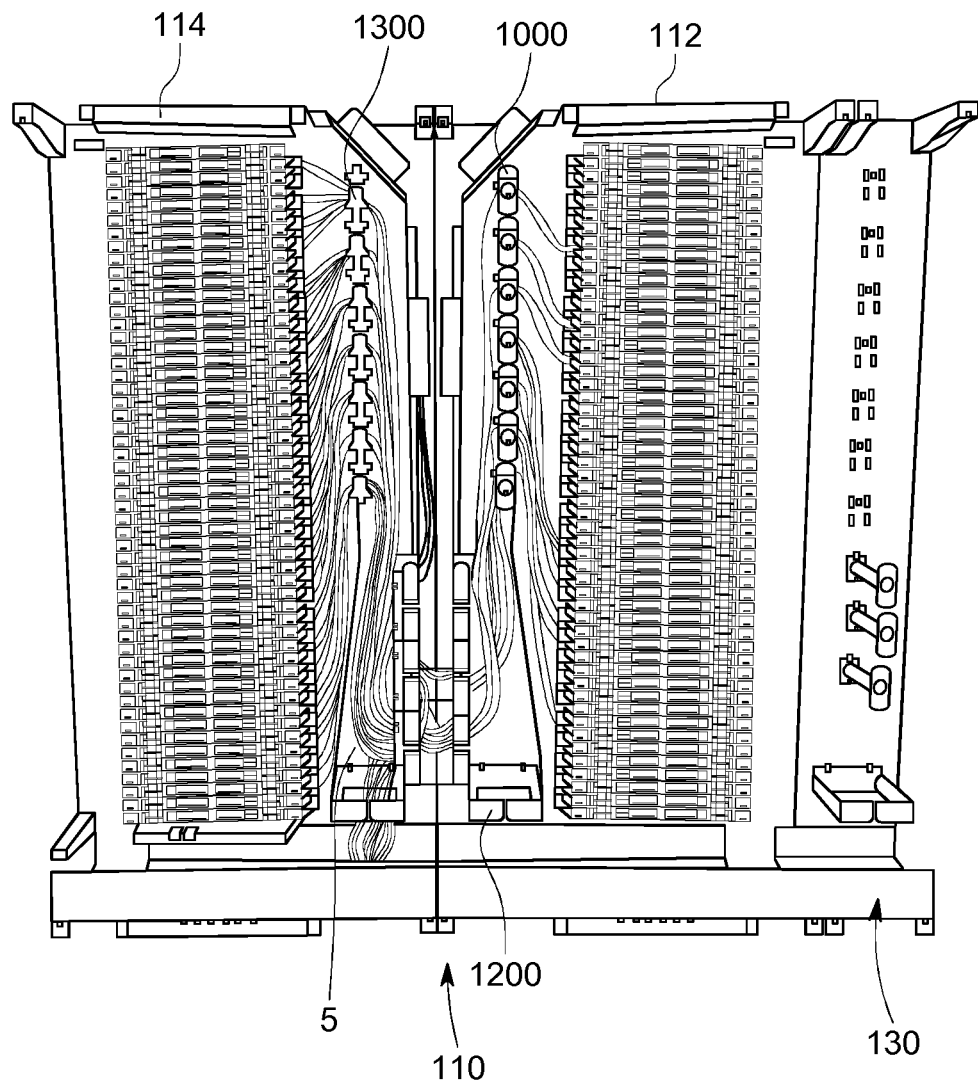
FIG. 56 illustrates an example cable routing on the cross-connect assembly of FIG. 1 using a combination of different types of overlength drums at the center of the assembly including fixed drums and slide drums.

For example, FIG. 56 illustrates an example cable routing on the cross-connect assembly 110 using a combination of different types of overlength drums at the center of the assembly including fixed drums 1000 and slide drums 1300.

Figure 57:
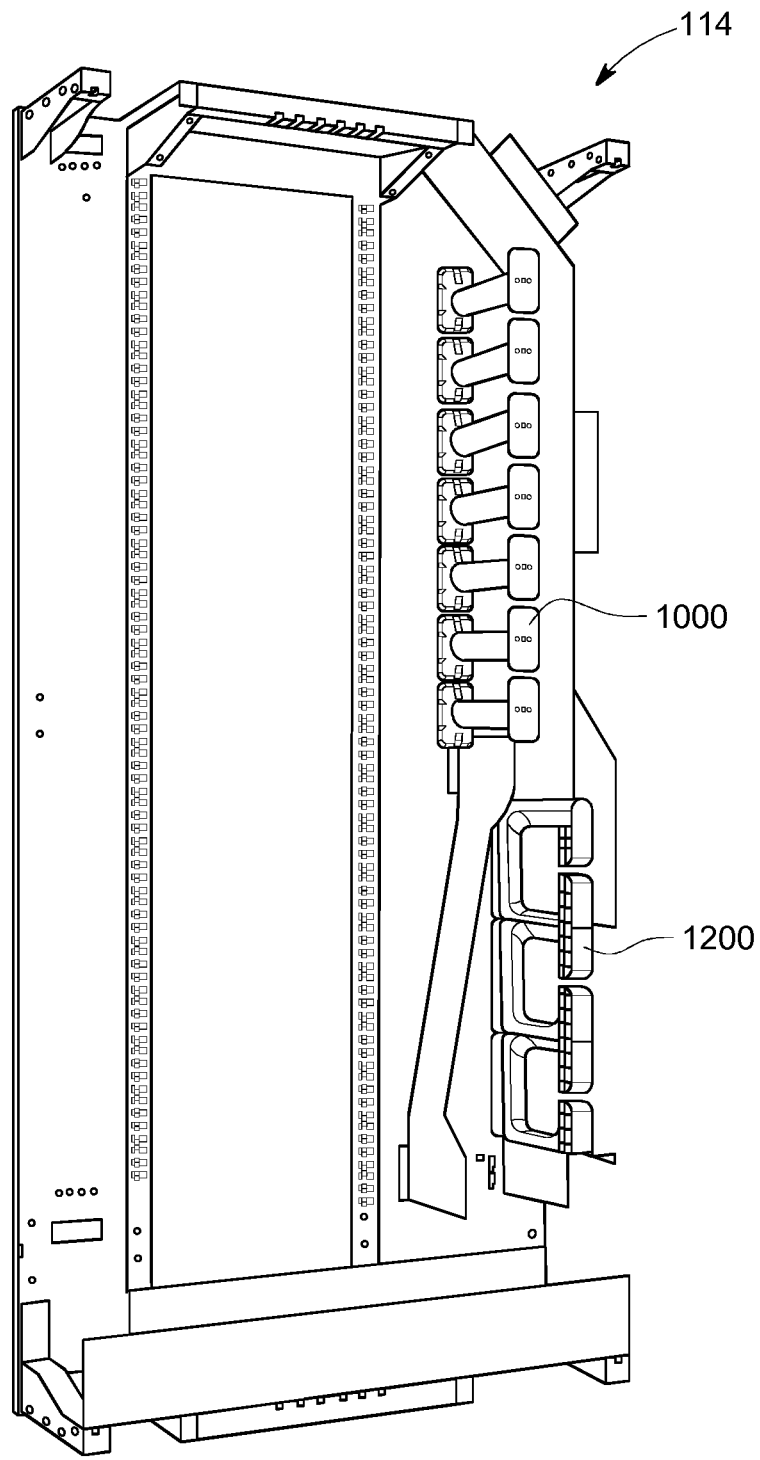
FIG. 57 illustrates the left frame of the cross-connect frame assembly in an empty configuration without any of the mounted distribution elements, ready to be disassembled for packaging.
Figure 58:
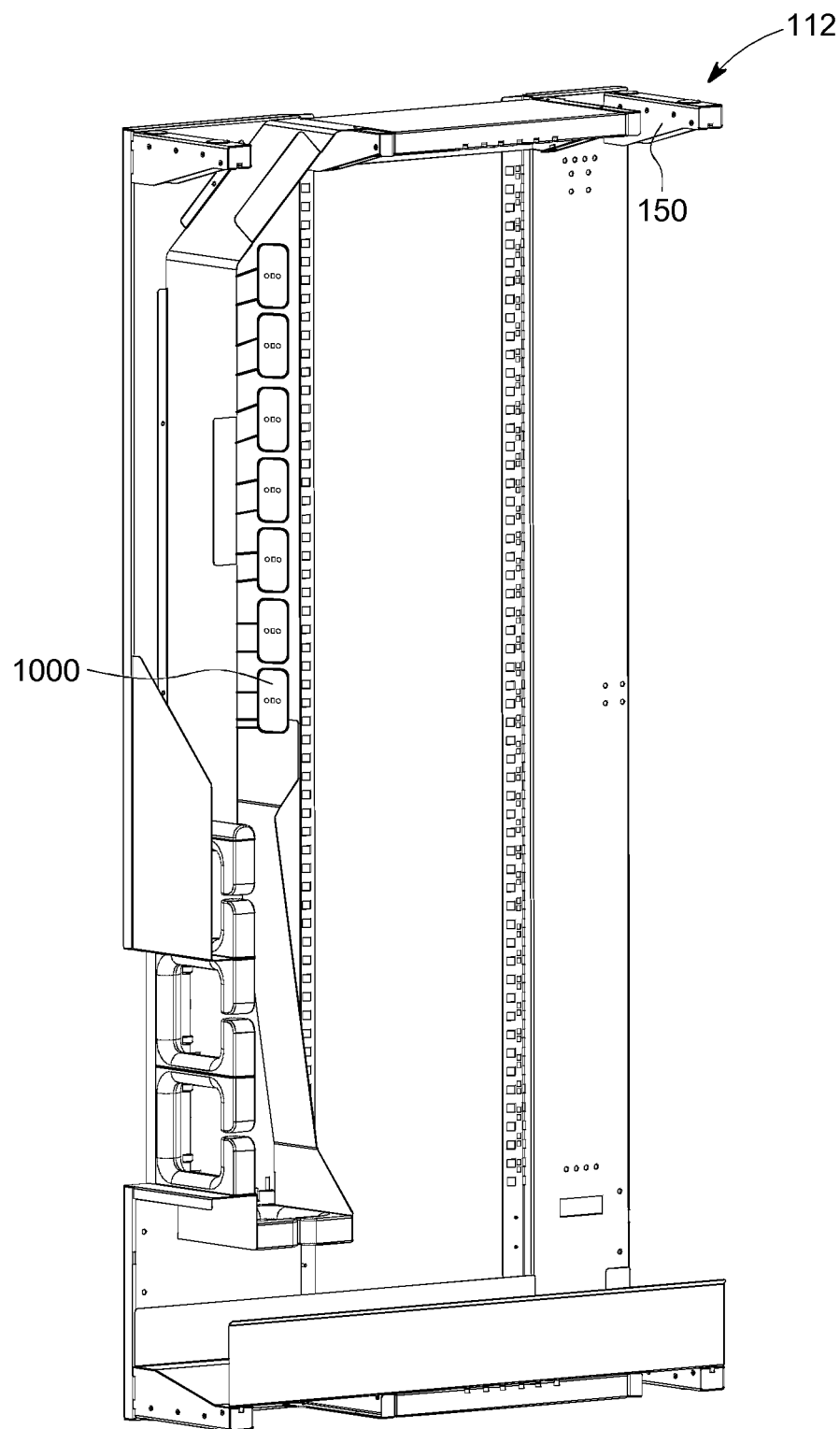
FIG. 58 illustrates the right frame of the cross-connect frame assembly in an empty configuration without any of the mounted distribution elements, ready to be disassembled for packaging.

FIGS. 57-64 relate to the packaging of the frame assemblies 110, 120, 130 of the present disclosure. FIG. 57 illustrates the left frame 114 of the cross-connect frame assembly 110 in an empty configuration without any of the mounted distribution elements 100, ready to be disassembled for packaging and FIG. 58 illustrates the right frame 112 of the cross-connect frame assembly 110 in an empty configuration without any of the mounted distribution elements 100, ready to be disassembled for packaging.

Figure 59:
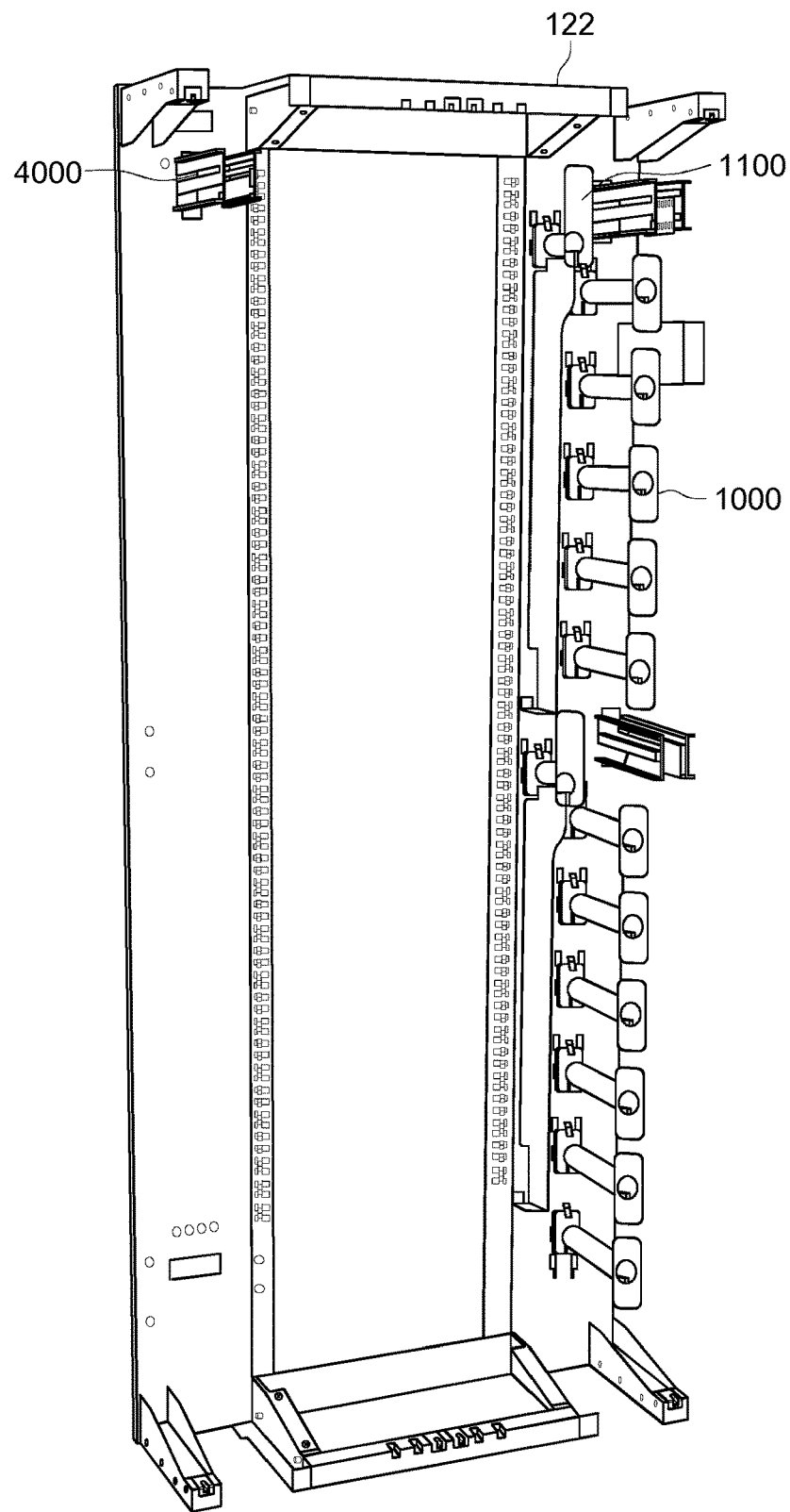
FIG. 59 illustrates the frame of the inter-connect assembly in an empty configuration without any of the mounted distribution elements, ready to be disassembled for packaging.
Figure 60:
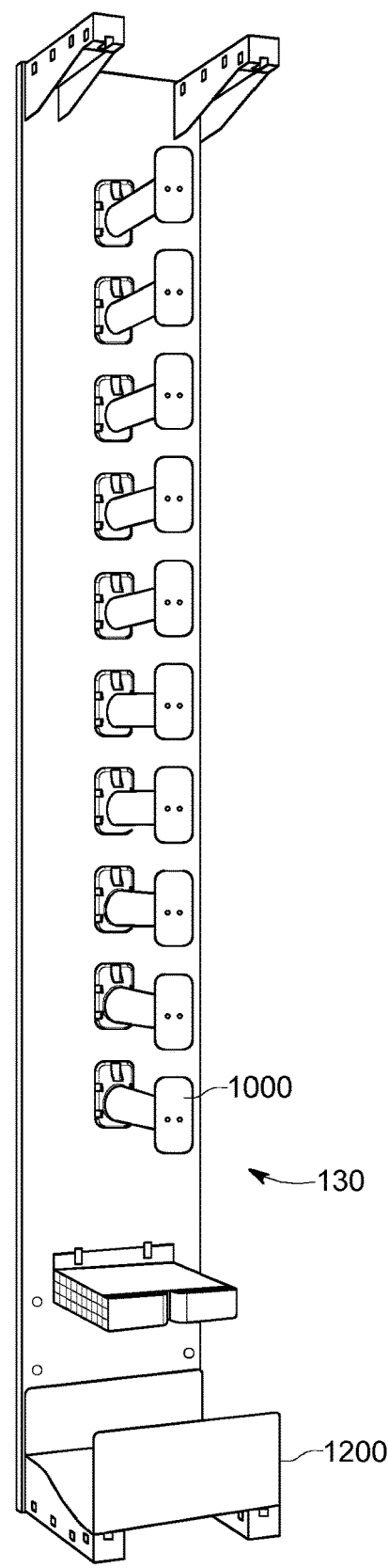
FIG. 60 illustrates another perspective view of the overlength bay, ready to be disassembled for packaging.
Figure 61:
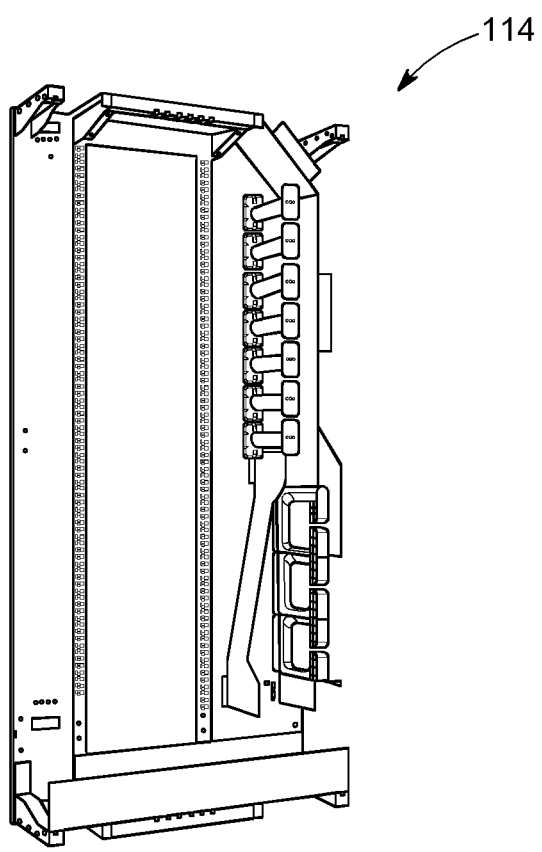
FIG. 61 illustrates another perspective view of the left frame of the cross-connect frame assembly, ready to be disassembled for packaging.
Figure 62:
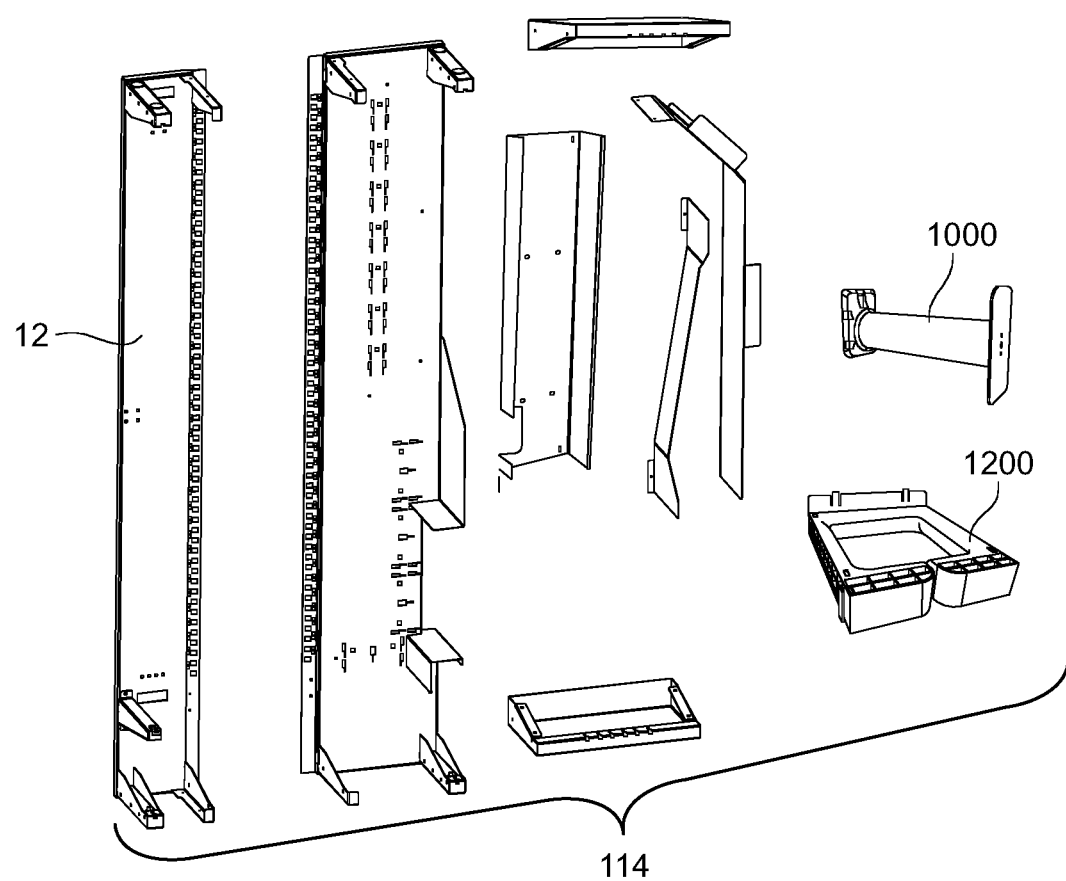
FIG. 62 illustrates the left frame of FIG. 61 in a disassembled configuration, ready for packaging.
Figure 63:
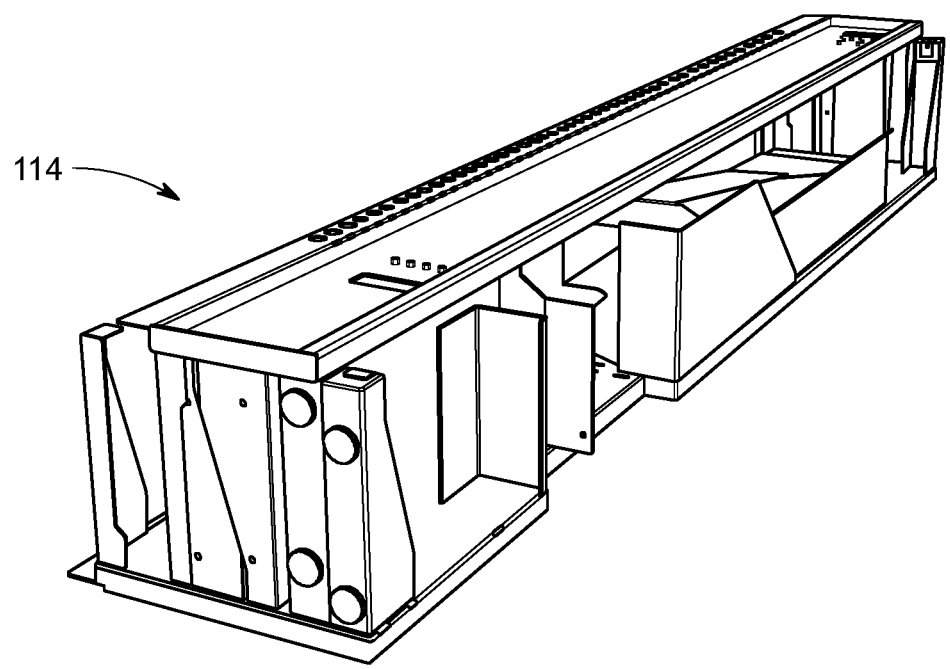
FIG. 63 illustrates parts of the disassembled frame of FIG. 62 organized for placement into a packaging box.
Figure 64:
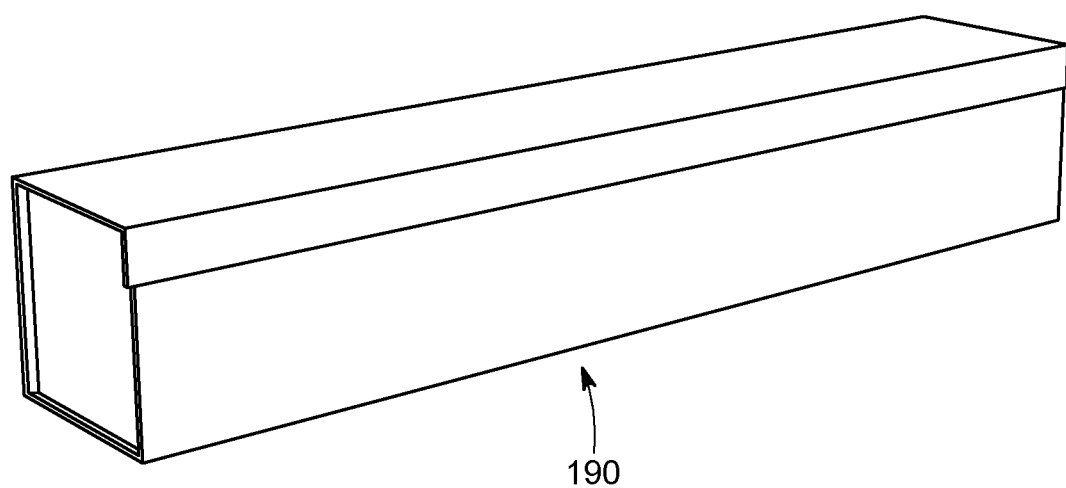
FIG. 64 illustrates the packaging box for use in transporting the frame of FIGS. 61-63.

FIG. 59 illustrates the frame 122 of the inter-connect assembly 120 in an empty configuration without any of the mounted distribution elements 100, ready to be disassembled for packaging. FIG. 60 illustrates another perspective view of the overlength bay 130, ready to be disassembled for packaging. FIG. 61 illustrates another perspective view of the left frame 114 of the cross-connect frame assembly 110, ready to be disassembled for packaging. FIG. 62 illustrates the left frame 114 of FIG. 61 in a disassembled configuration, ready for packaging. FIG. 63 illustrates parts of the disassembled frame 114 of FIG. 62 organized for placement into a packaging box 190. And, FIG. 64 illustrates the packaging box 190 for use in transporting the frame 114 of FIGS. 61-63.

Figure 65:
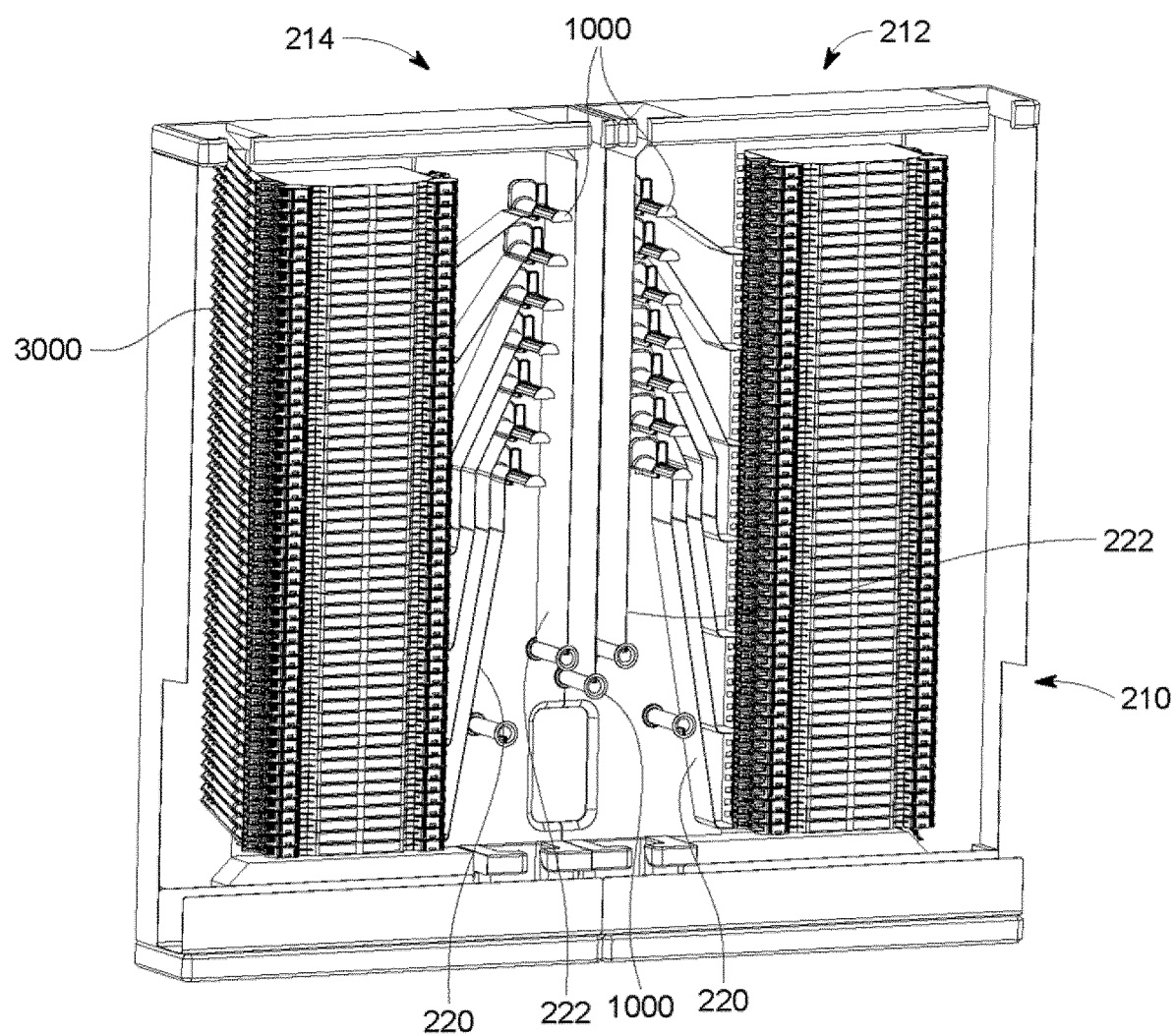
FIG. 65 is an alternative of a cross-connect frame assembly having features that are similar to that shown in FIG. 1, where the right and left frames utilize separating fins for forced routing between the flexible sides of the frames.
Figure 66:
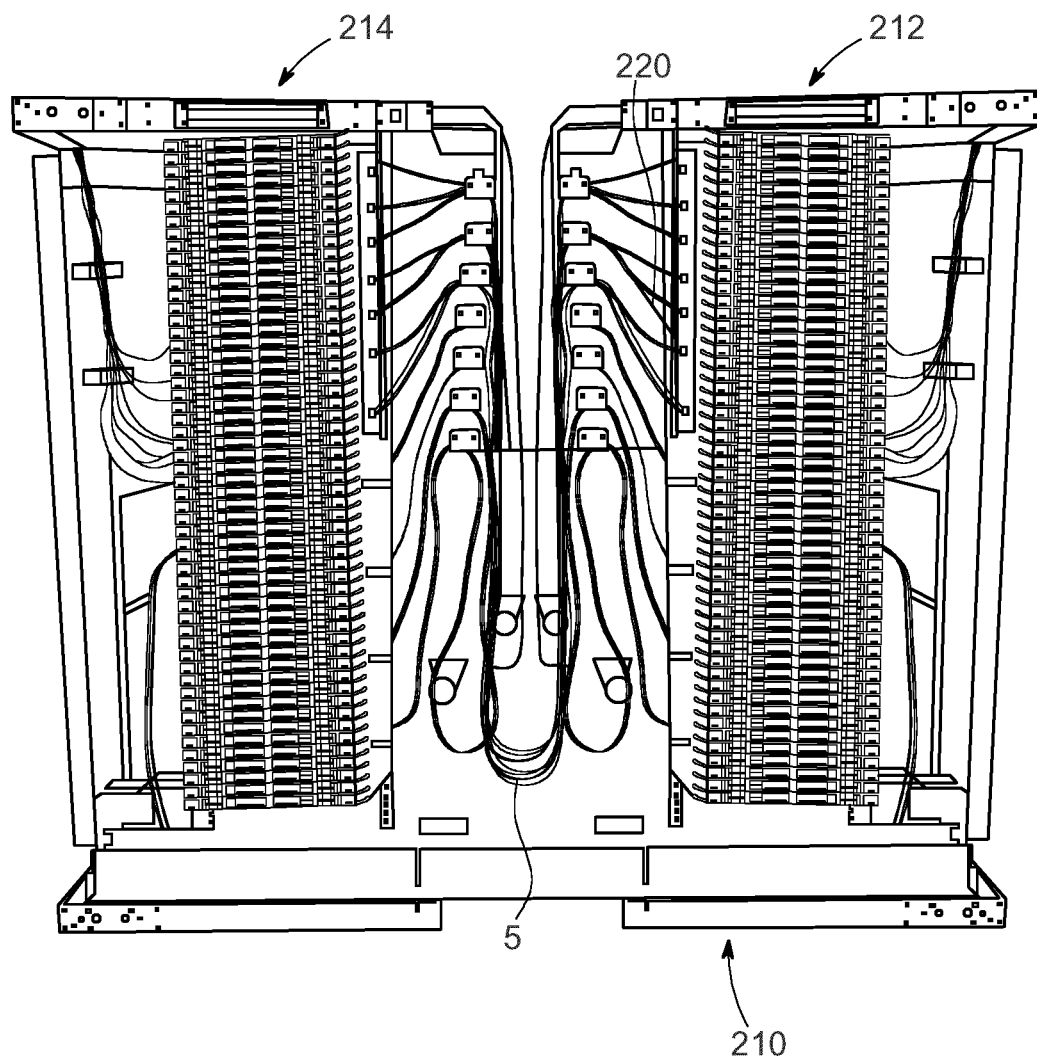
FIG. 66 illustrates an example cable routing utilizing the separating fins of the cross-connect frame assembly of FIG. 65.

FIG. 65 illustrates an alternative embodiment of a cross-connect frame assembly 210 having features that are similar to the assembly 110 shown in FIG. 1. where the right and left frames 212, 214 utilize separating fins 220 for forced routing between the flexible sides of the frames 212, 214. As shown, the fins 220 are designed to provide an error-proof method as the patch cables 5 are guided toward and around the overlength drums 1000 at the left and right frames 214, 212. Toward the center 215 at each of the left and right frames 214, 212 are also provide vertical dividers 222 for keeping cabling 5 organized as the cabling 5 extends around further overlength drums 1000 provided at the center bottom of the frame assembly 210. FIG. 66 illustrates an example cable routing utilizing the separating fins 220 of the cross-connect frame assembly 210 of FIG. 65 and FIG. 67 illustrates the separating fins 220 of FIGS. 65-66 in closer detail.

Figure 67:
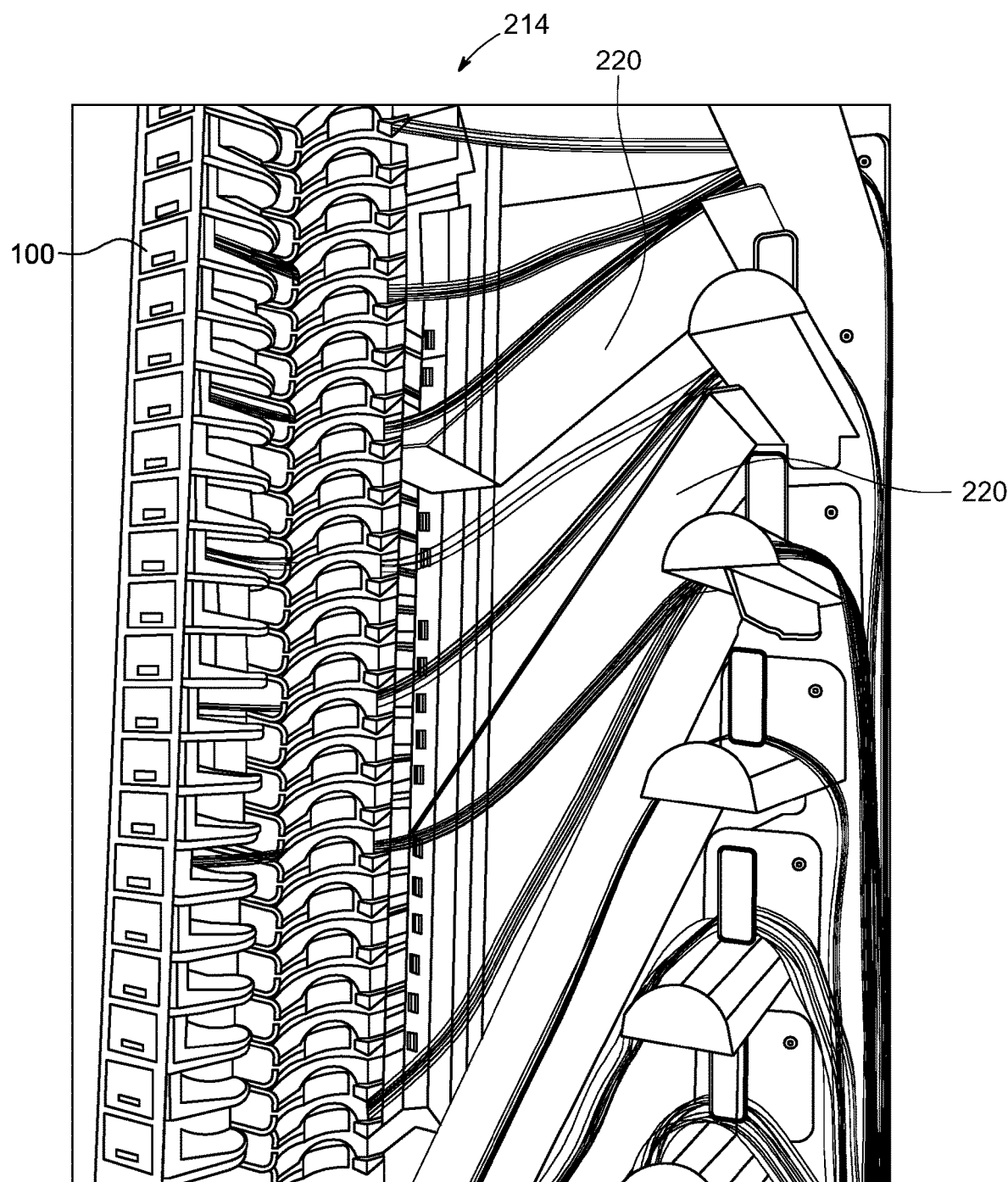
FIG. 67 illustrates the separating fins of FIGS. 65-66 in closer detail.
Figure 68:
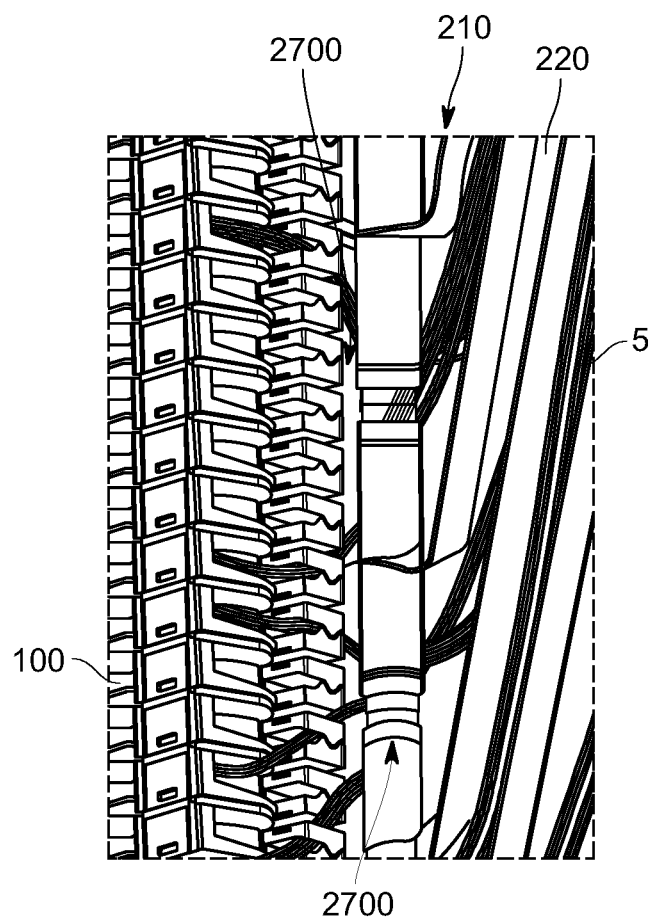
FIG. 68 illustrates push-through type cable management structures that can be used with the separating fins of the cross-connect frame assembly of FIGS. 65-67 for keeping cable bundles organized.

FIG. 68 illustrates push-through type cable management structures 2700 that can be used with the separating fins 220 of the cross-connect frame assembly 210 of FIGS. 65-67 for keeping cable bundles 5 organized. Such cable management structures 2700 and similar structures utilizing push-through designs are discussed below and illustrated in FIGS. 118-120.

Figure 69:
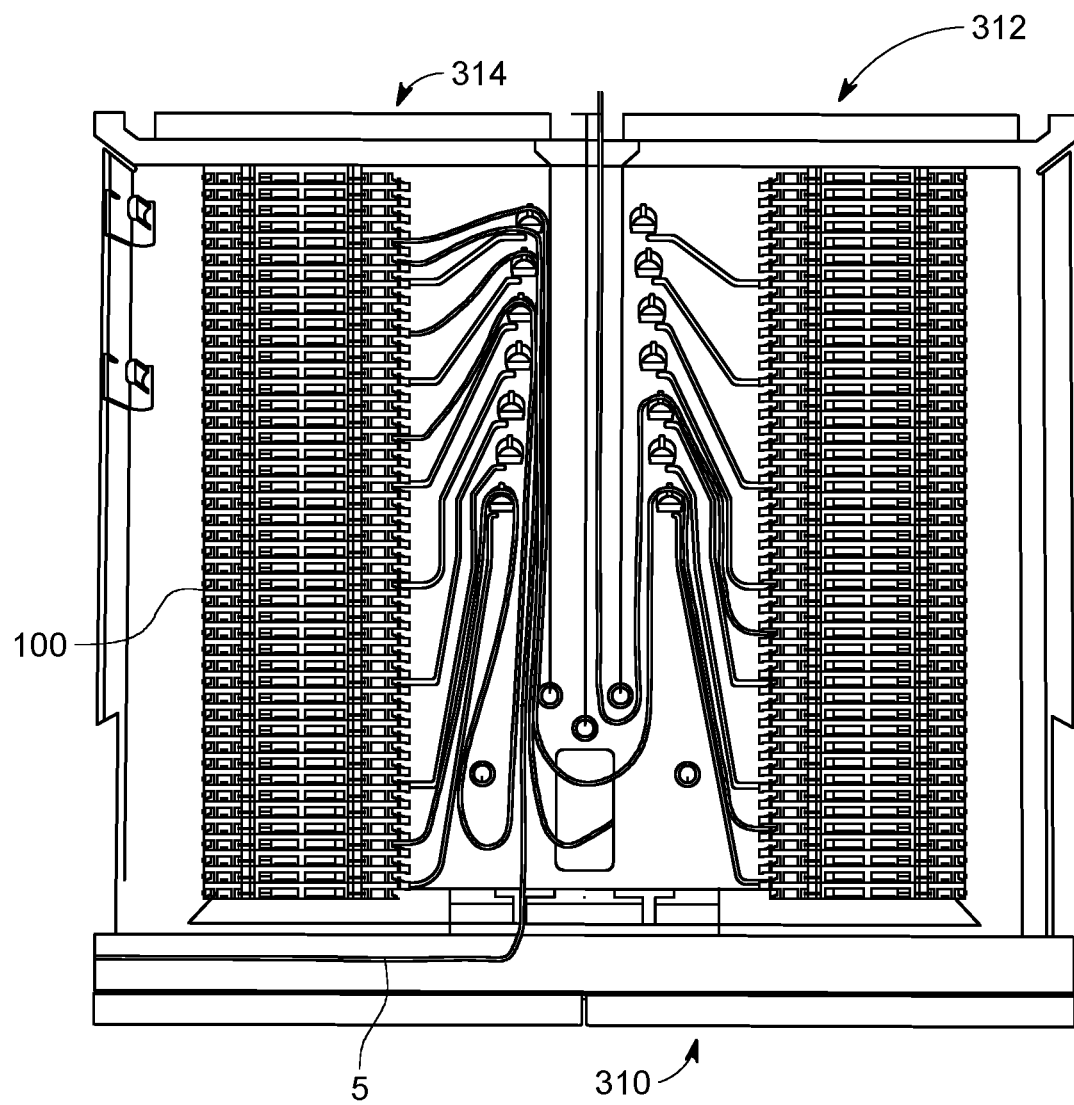
FIG. 69 illustrates a color-coding concept that can be used to keep track of the cable routings between the flexible sides of the frames on another example cross-connect system.
Figure 70:
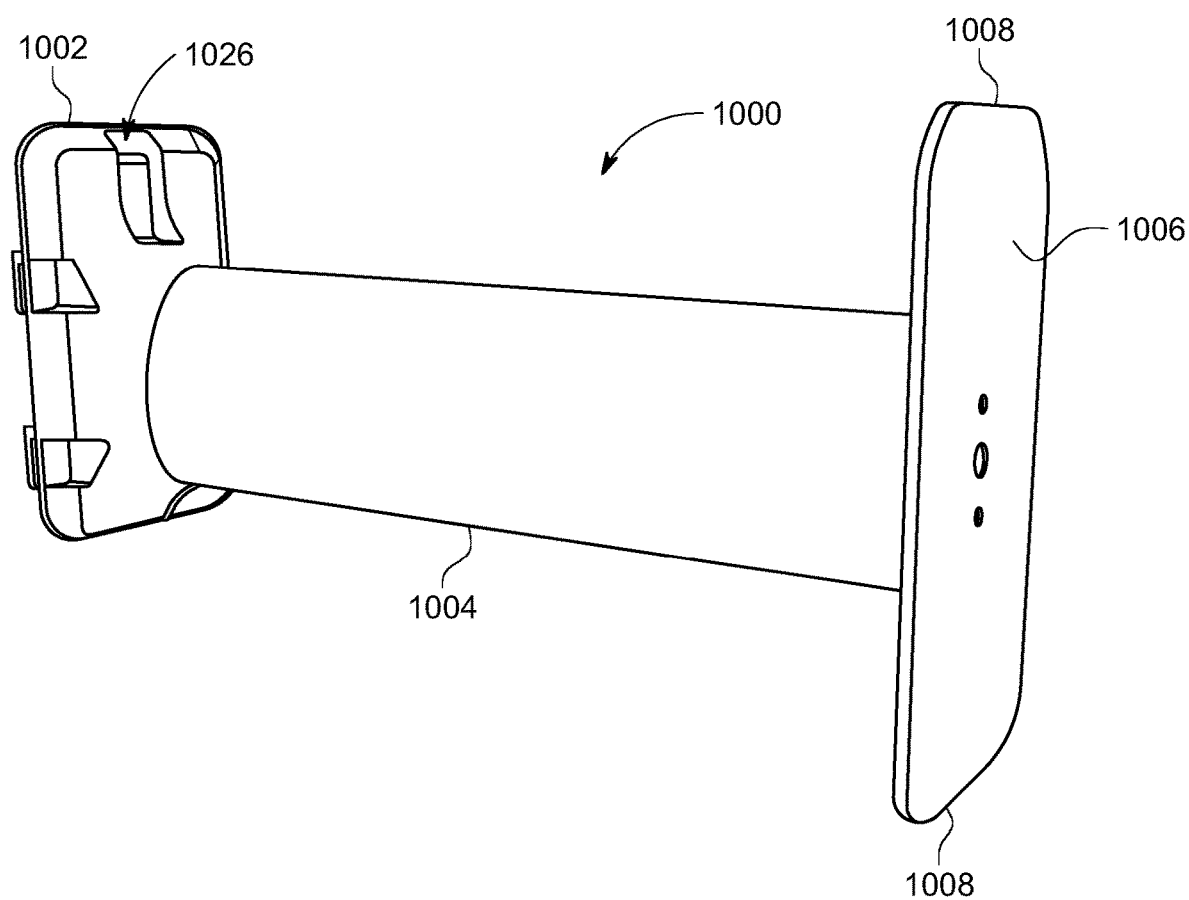
FIG. 70 illustrates a front perspective view of an example cable management structure that can be mounted to on certain locations of the various telecommunications frames shown in FIGS. 1-69.
Figure 71:
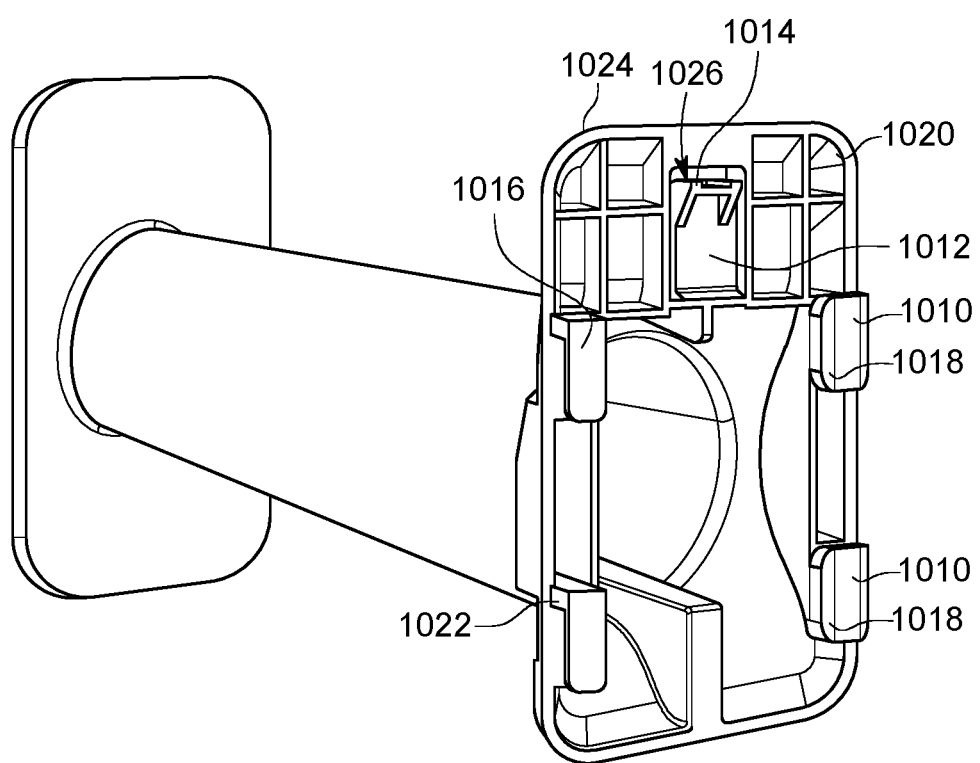
FIG. 71 illustrates a rear perspective view of the cable management structure of FIG. 70.
Figure 72:
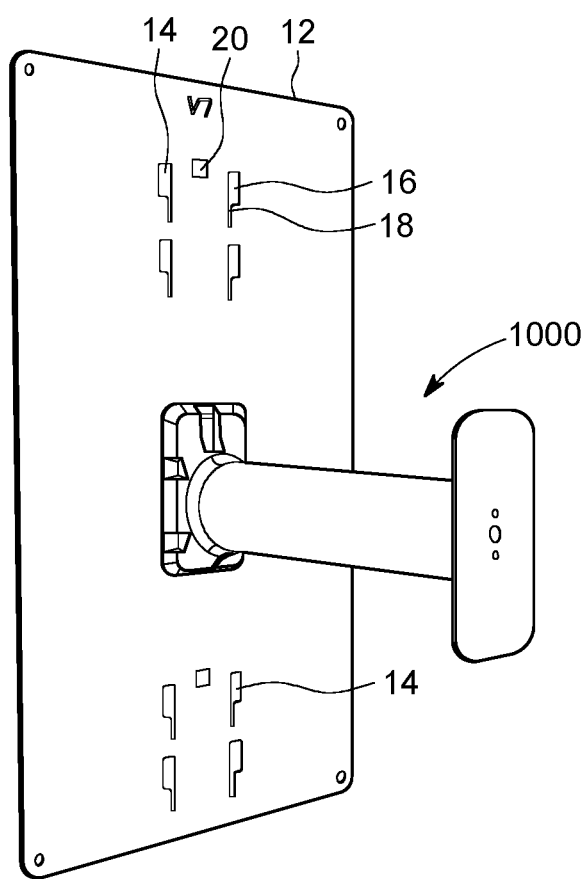
FIG. 72 illustrates the cable management structure of FIG. 70 mounted on a wall defined by the various telecommunications frames of FIGS. 1-69.
Figure 73:
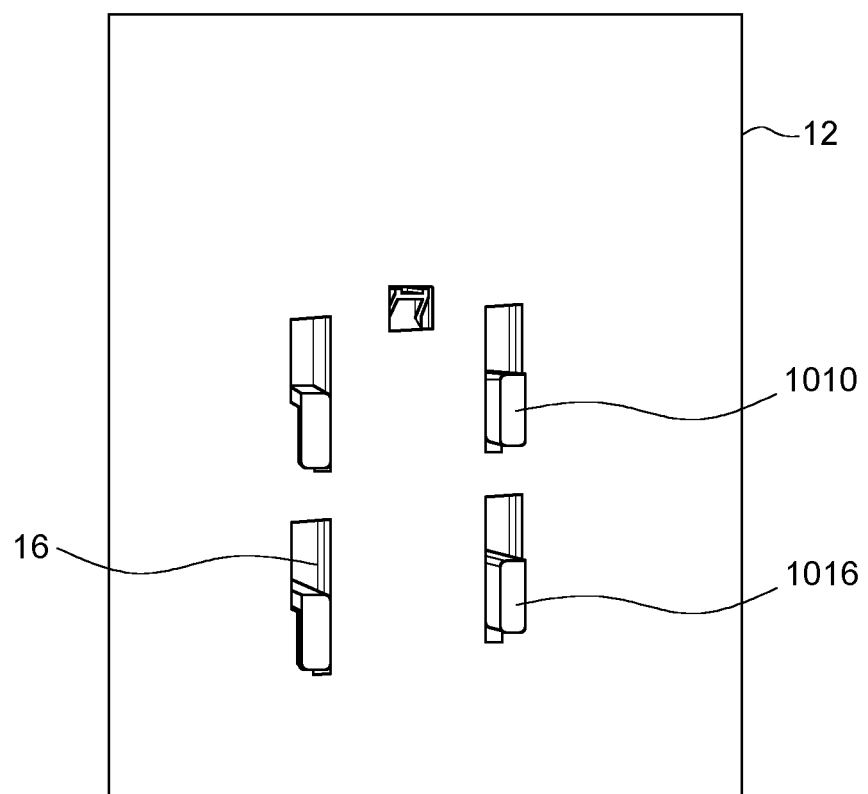
FIG. 73 illustrates a rear side of the wall of FIG. 72 illustrating the mounting interface between the wall and the cable management structure.
Figure 74:
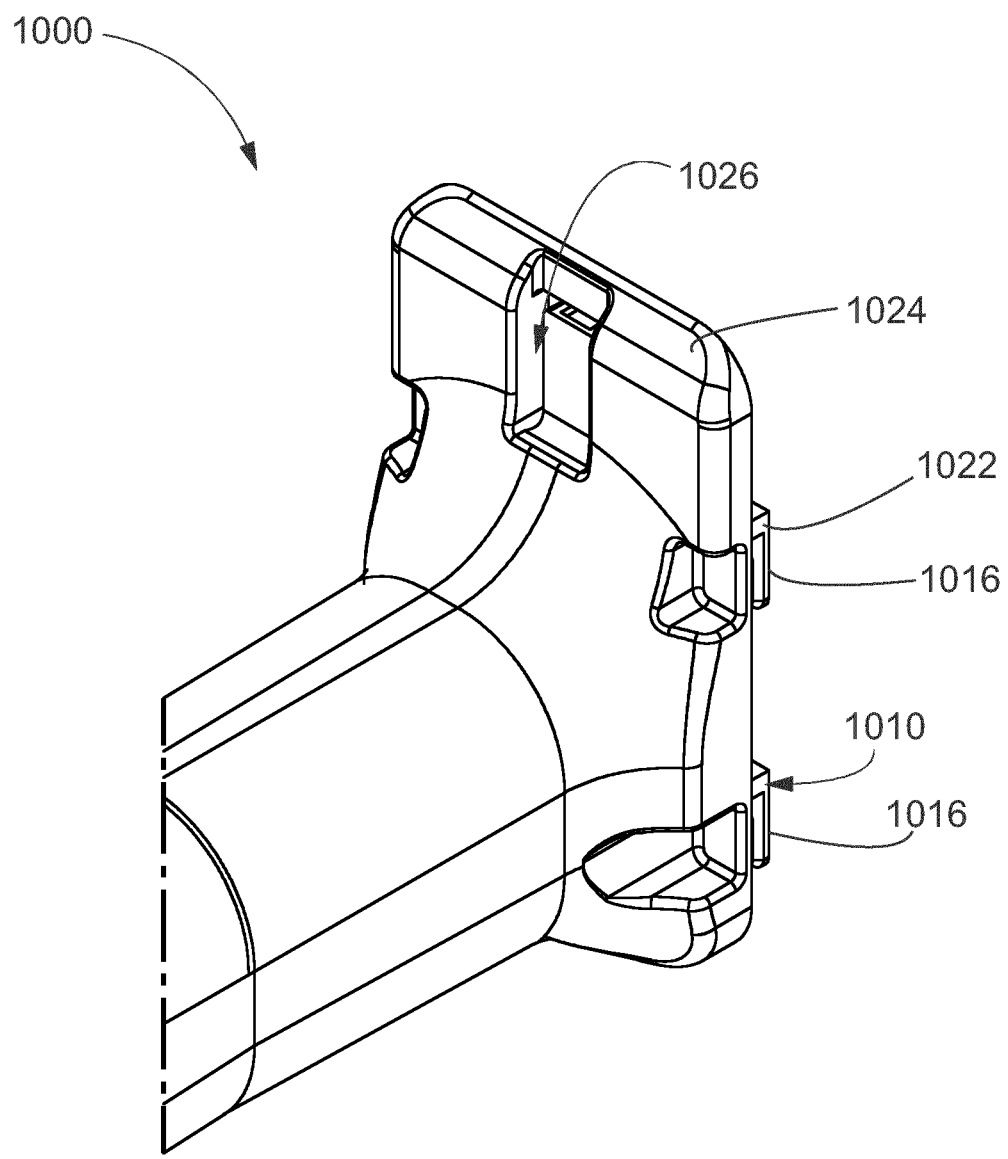
FIG. 74 illustrates a front perspective view of the fixation portion of the cable management structure of FIG. 70.
Figure 75:
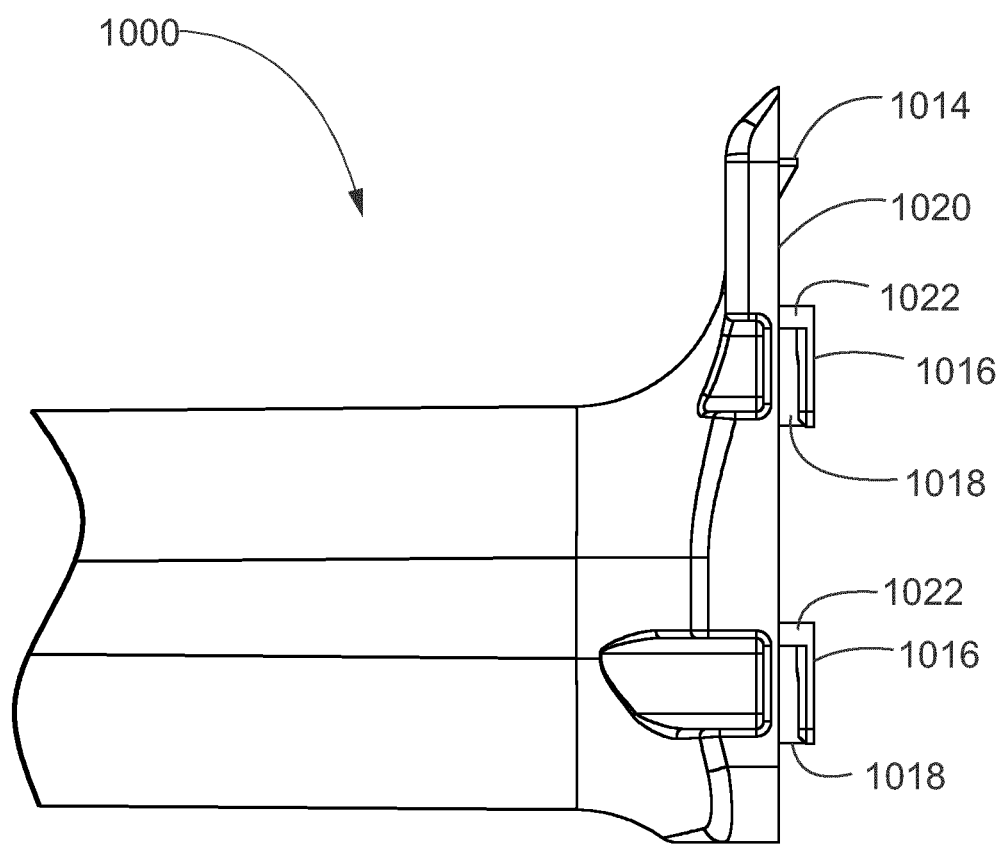
FIG. 75 illustrates a side view of the fixation portion of the cable management structure of FIG. 70.
Figure 76:
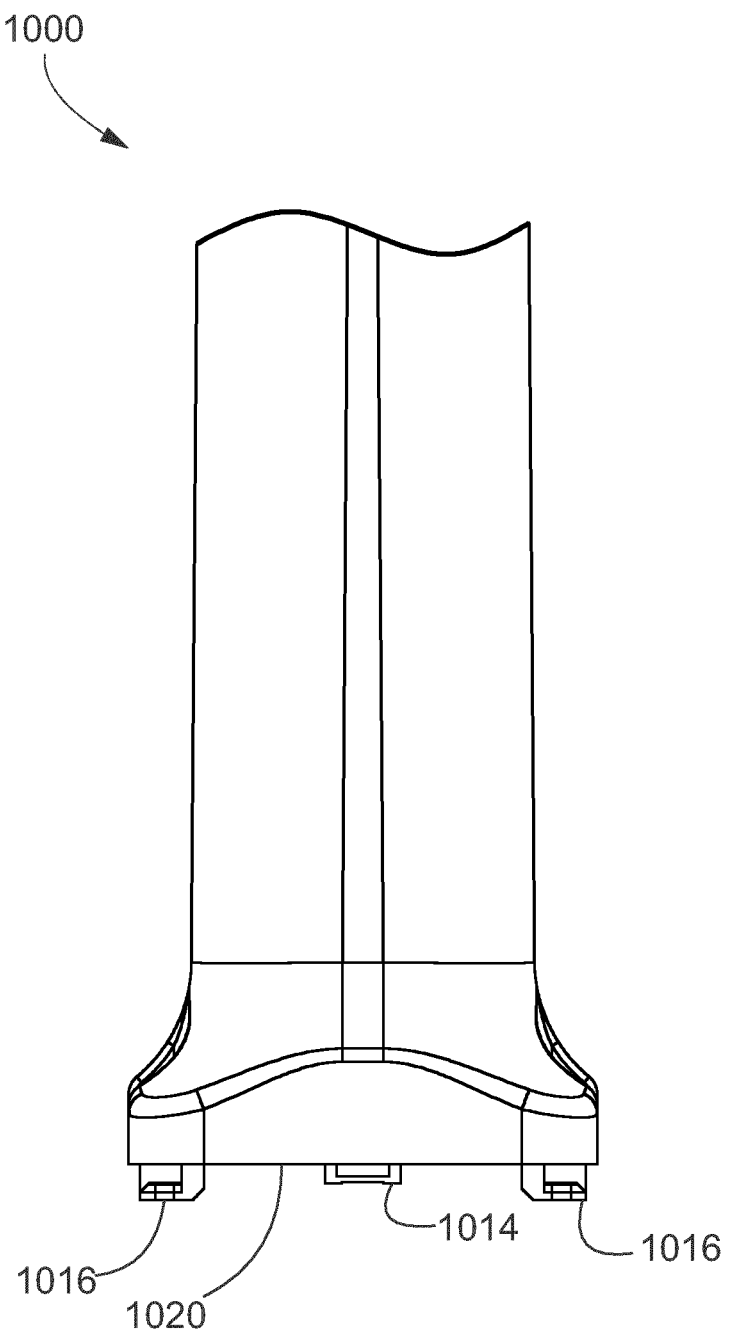
FIG. 76 is a bottom view of the fixation portion of the cable management structure of FIG. 70.

FIG. 69 illustrates a color-coding concept that can be used to keep track of the cable routings between the flexible sides of the frames 312, 314 on another example of a cross-connect frame assembly 310. According to this concept, different colored cabling may be used for designating different routing directions. For example, according to one example, a color such as white may be used for cabling 5 going to or coming from the bottom trough. Red could be used for cabling 5 going to or coming from the top trough. Green could be used for internal return routing. Yellow could be used to indicate cabling 5 going to or coming from an adjacent frame. Pink could be used for cabling 5 going to or coming from a back side frame.

Referring now to FIGS. 70-100, the various cable management structures that are used in certain locations throughout the frame assemblies 110/120 or on the overlength bay 130 are shown in closer detail.

FIGS. 70-76 illustrate one example of the overlength drum 1000 that is used on the frame assemblies 110/120 or on the overlength bay 130. The overlength drum 1000 is configured to be removably mounted to certain locations on the frame assemblies 110/120 or on the overlength bay 130 and is used to manage or support extra cable length or slack.

The designated frame walls 12 may be designed with a universal type mounting interface such that a given wall 12 can removably receive different types of cable management structures depending on the cable management need.

One example of a mounting interface between a given frame wall 12 and an example overlength drum 1000 will be described with reference to FIGS. 70-76. As shown in FIGS. 70-76, the mounting features that are provided on a frame wall 12 include a plurality of slots 14, each defining an upper wider portion 16 (i.e., receiver portion) and a lower narrower portion 18 (i.e., retention portion). In the depicted example, two such slots 14 are vertically aligned in a first column on the frame wall 12 and two such slots 14 are vertically aligned on a second column spaced apart from the first column. Between the two columns is positioned a latch opening 20, the significance of which will be described in further detail below.

The example of the overlength drum 1000 that will be used to describe the mounting mechanism between a frame wall 12 and the drum 1000 is shown in FIGS. 70-76.

As shown, the depicted overlength drum 1000 defines a fixation portion 1002, a bend radius protection portion 1004 extending from the fixation portion 1002, and a cable retention portion 1006 positioned at the end of the bend radius protection portion 1004. With the cable retention portion 1006 having both upward and downward extensions 1008, the depicted overlength drum 1000 provides a generally T-shaped configuration.

The bend radius protection portion 1004 defines a generally cylindrical profile providing the curvature needed for radius protection for cables routed on the overlength drum 1000.

The fixation portion 1002 defines the mating mounting features that are designed to mate with the mounting features that are provided on a frame wall 12. The fixation portion 1002 includes a plurality of hook-like members 1010. Two hook-like members 1010 are vertically aligned in a first column and two hook-like members 1010 are vertically aligned in a second column spaced apart from the first column. Between the two columns is positioned a flexible latch 1012 with a retaining tab 1014 extending rearward from the latch 1012.

Each hook-like member 1010 defines a vertical retention portion 1016 that defines a larger profile. Each hook-like member 1010 also defines a vertical slide portion 1018 that has a thinner profile than the vertical retention portion 1016, wherein the slide portion 1018 is oriented perpendicular to the retention portion 1016 and connects the retention portion 1016 to a rear wall 1020 defined by the fixation portion 1002 of the overlength drum 1000. Each hook-like member 1010 also defines a horizontal stop portion 1022 that is oriented perpendicular to both the slide portion 108 and the retention portion 1016, where the horizontal stop portion 1022 also connects the larger retention portion 1016 to the rear wall 1020.

As shown, the vertical slide portion 1018 and the horizontal stop portion 1022 are connected to the vertical retention portion 1016 of the hook-like members 1010 such that they meet at the inner, upper corner of the retention portion 1016.

When the overlength drum 1000 is being mounted to a frame wall 12, the larger vertical retention portions 1016 are aligned with and passed through the upper wider receiver portions 16 of the slots 14. The hook-like members 1010 are then slid downwardly with the vertical slide portions 1018 sliding within the lower narrower retention portions 18 of the slots 14. The hook-like members 1010 are slid downwardly until the horizontal stop portions 1022 abut the apertures forming the ends of the wider receiver portions 16 of the slots 14 to stop the slidable movement of the hook-like members 1010. When the hook-like members 1010 are being slidably mounted, the flexible latch 1012 of the fixation portion 1002 of the drum 1000 is elastically flexed, riding along the wall 12. At the point the horizontal stop portions 1022 abut the slot apertures, stopping the movement of the hook-like members 1010, the flexible latch 1012 can flex back under a bias with the retaining tab 1014 snapping into the latch opening 20 that is positioned in the middle of the two columns of slots 14 on the frame wall 12.

The mounting features essentially provide a dove-tail type mounting interface between the frame wall 12 and the overlength drum 1000. However, the thinner vertical slide portions 1018 and the horizontal stop portions 1022 are formed at the edges of the larger retention portion 1016 and meet at a corner of the retention portion 1016 to provide extra stiffness to the hook-like members 1010. The upper wider portions 16 and the lower narrower portions 18 of the slots 14 are provided to match the mounting features defined by the hook-like members 1010.

When the hook-like members 1010 have been slid all the way down, the larger retention portions 1016 overlap with the lower narrower portions 18 of the slots 14 and abut an opposing side of the frame wall 12 to retain the hook-like members 1010 against the frame wall 12. The retaining tab 1014 of the flexible latch 1012 abuts the upper edge 22 of the aperture defining the latching slot 14 to prevent unwanted upward movement of the drum 1000. If the drum 1000 needs to be removed, the retaining tab 1014 can be pushed away from the wall 12 toward the drum 1000, elastically flexing the latch 1012, until the tab 1014 clears the wall 12, and the drum 1000 can be slid upwardly.

It should be noted that in the depicted embodiment, the fixation portion 1002 of the drum 1000 defines a base 1024 that is large enough in perimeter to fully surround the mounting features of the fixation portion 1002. The base 1024 of the fixation portion 1002 abuts the frame wall 12 and provides extra stiffness for protection against bending forces on the drum 1000.

As shown, the flexible latch 1012 of the drum 1000 is fully surrounded by an aperture 1026 defined by the base 1024 of the fixation portion 1002. Only the retaining tab 1014 protrudes out of the aperture 1026. The base 1024 fully surrounding the flexible latch 1012 limits pinching of any fiber optic cables between the latch 1012 and the frame wall 12.

Figure 77:
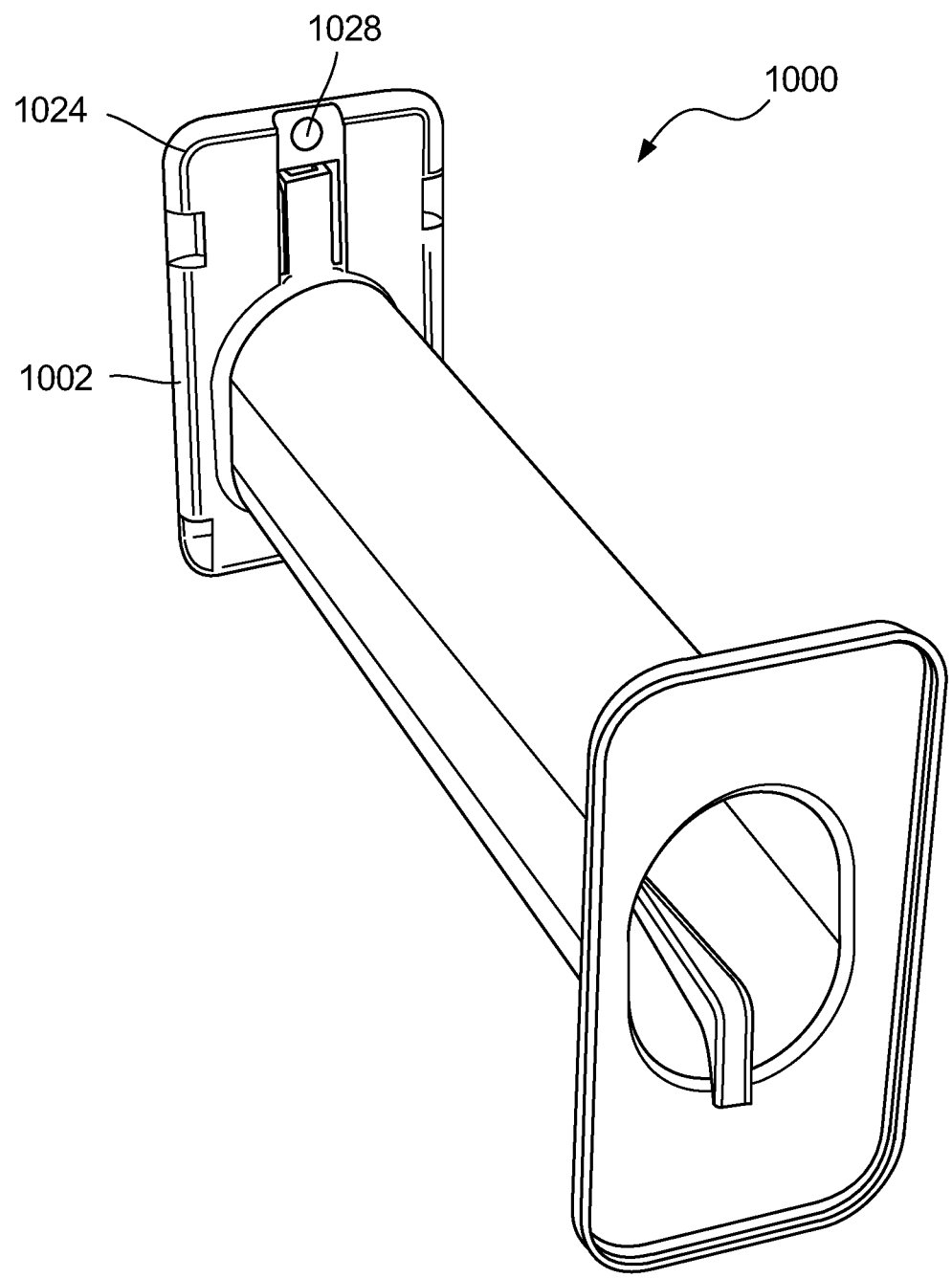
FIG. 77 illustrates an example of the cable management structure of FIG. 70 with a different fixation portion.

In certain examples, an additional fastener hole 1028 may be provided both on the base 1024 defined by the fixation portion 1002 of the drum 1000 and on the frame wall 12 for extra fastening and safety. Such an example is shown in FIG. 77.

Figure 78:
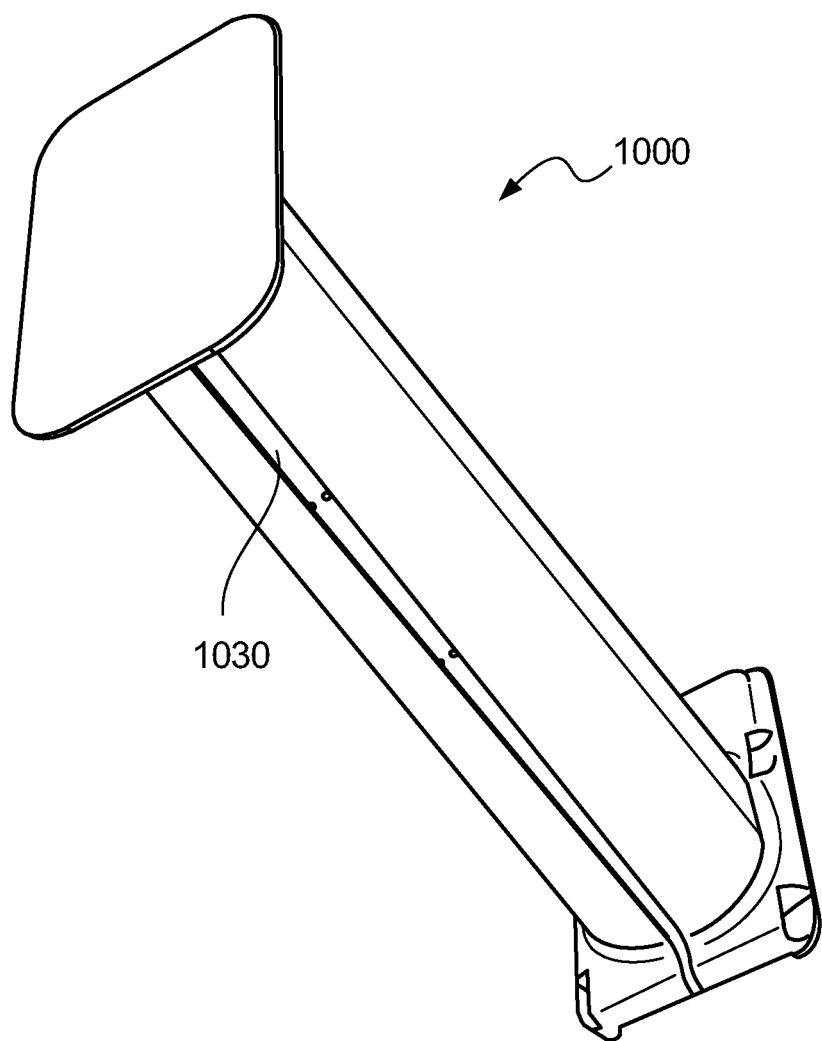
FIG. 78 illustrates the cable management structure of FIGS. 70-76 from a bottom perspective view.

As also shown in an example in FIG. 78, the overlength drum 1000 may also define a longitudinal slot 1030 extending from the rear of the drum 1000 toward the front. The longitudinal slot 1030 may be used to receive a central wall if the drum 1000 is going to be placed at the upper edge of a separator wall or a different transversely extending wall structure on one of the frame assemblies 110/120 or on the overlength bay 130.

Figure 79:
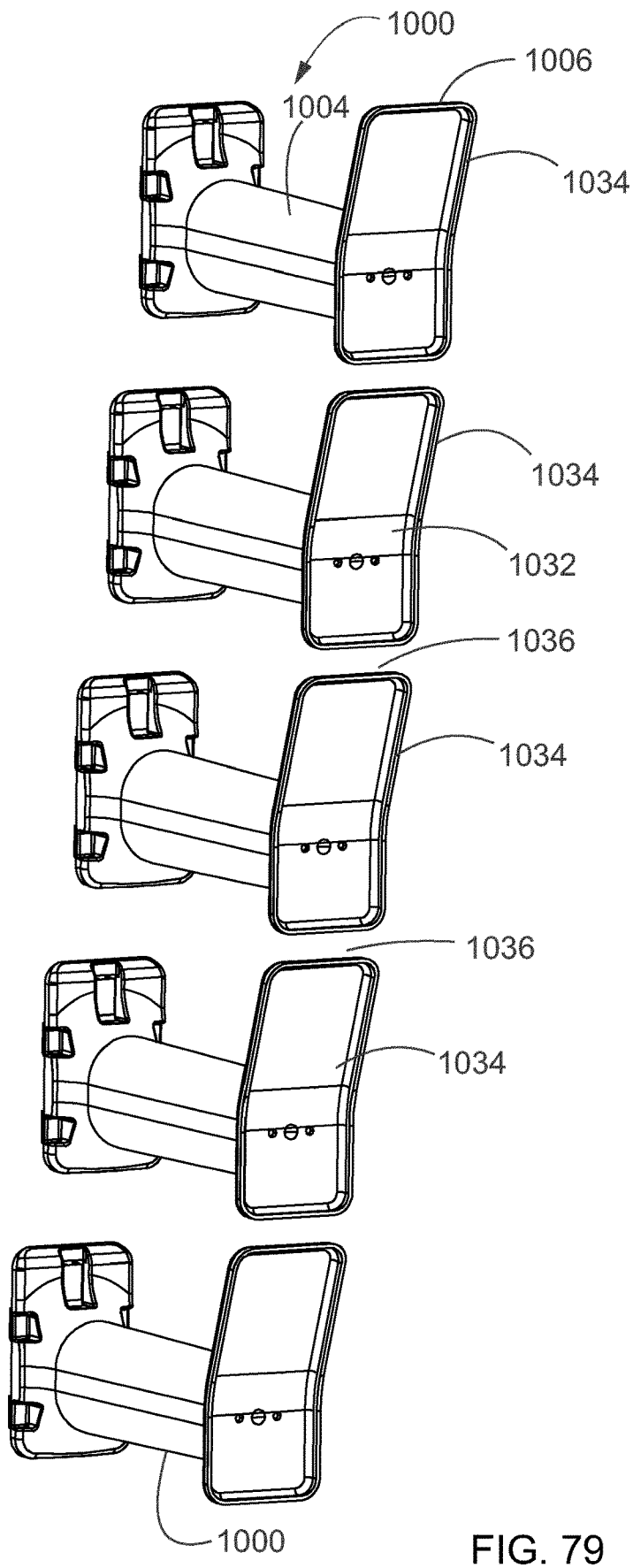
FIG. 79 illustrates a plurality of cable management structures similar to those shown in FIGS. 70-77, wherein the flanges thereof include bent portions forming staggered openings for facilitating insertion of cables when the drums are provided in a vertically stacked arrangement.

In certain other embodiments, flanges 1032 defined by the cable retention portions 1006 of the drums 1000 that are positioned at the ends of the bend radius protection portions 1004 may define different various shapes. As shown in FIG. 79, the flanges 1032 may include bent portions 1034 forming staggered openings 1036 for facilitating insertion of cables when the drums 1000 are provided in a vertically stacked arrangement.

Figure 80:
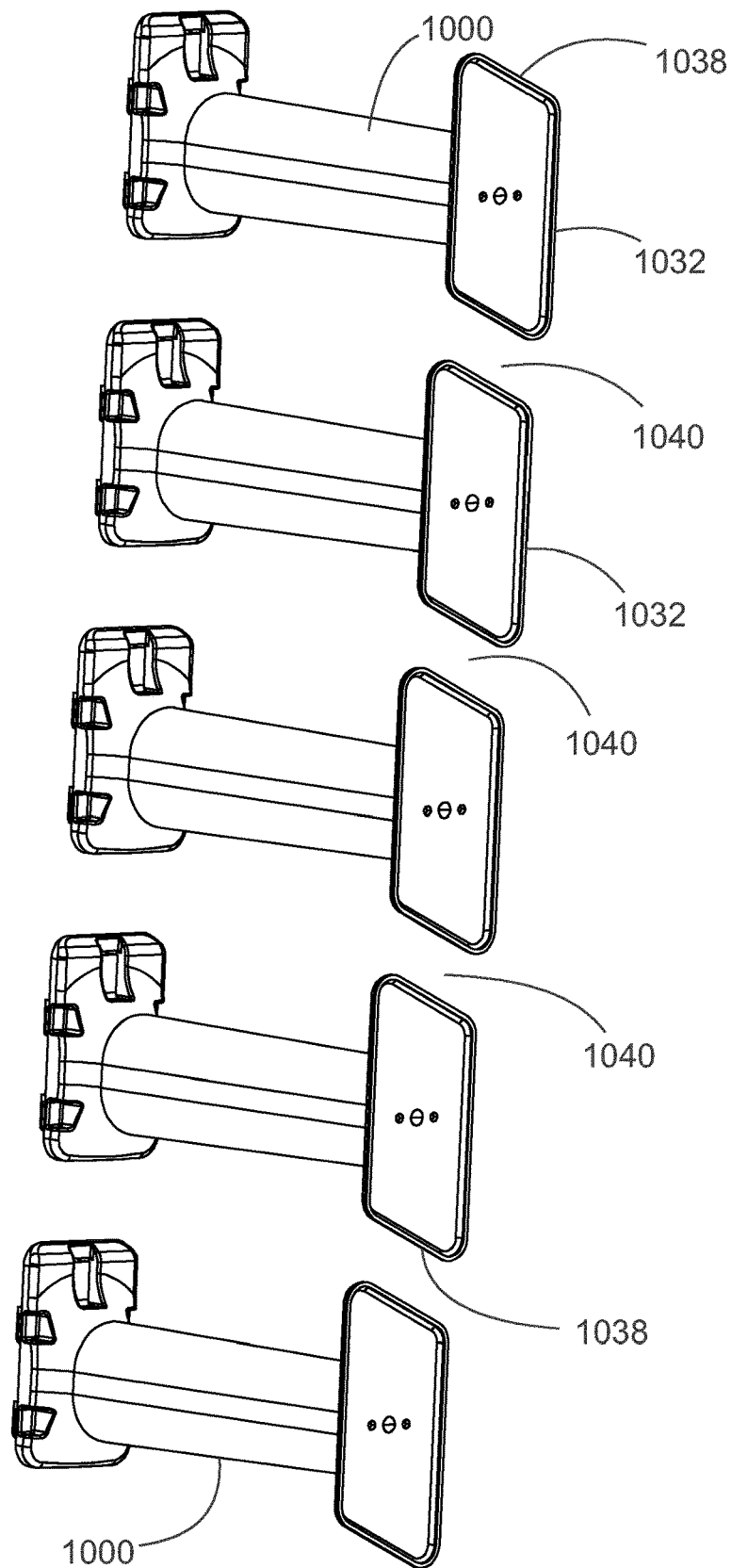
FIG. 80 illustrates a plurality of another set of cable management structures similar to those shown in FIGS. 70-77, wherein the flanges thereof include angled profiles to form angled openings for facilitating insertion of cables when the drums are provided in a vertically stacked arrangement.

As also shown in FIG. 80, the flanges 1032 may provide an angled profile 1038 to form angled openings 1040 for facilitating insertion of cables when the drums 1000 are provided in a vertically stacked arrangement.

Figure 81:
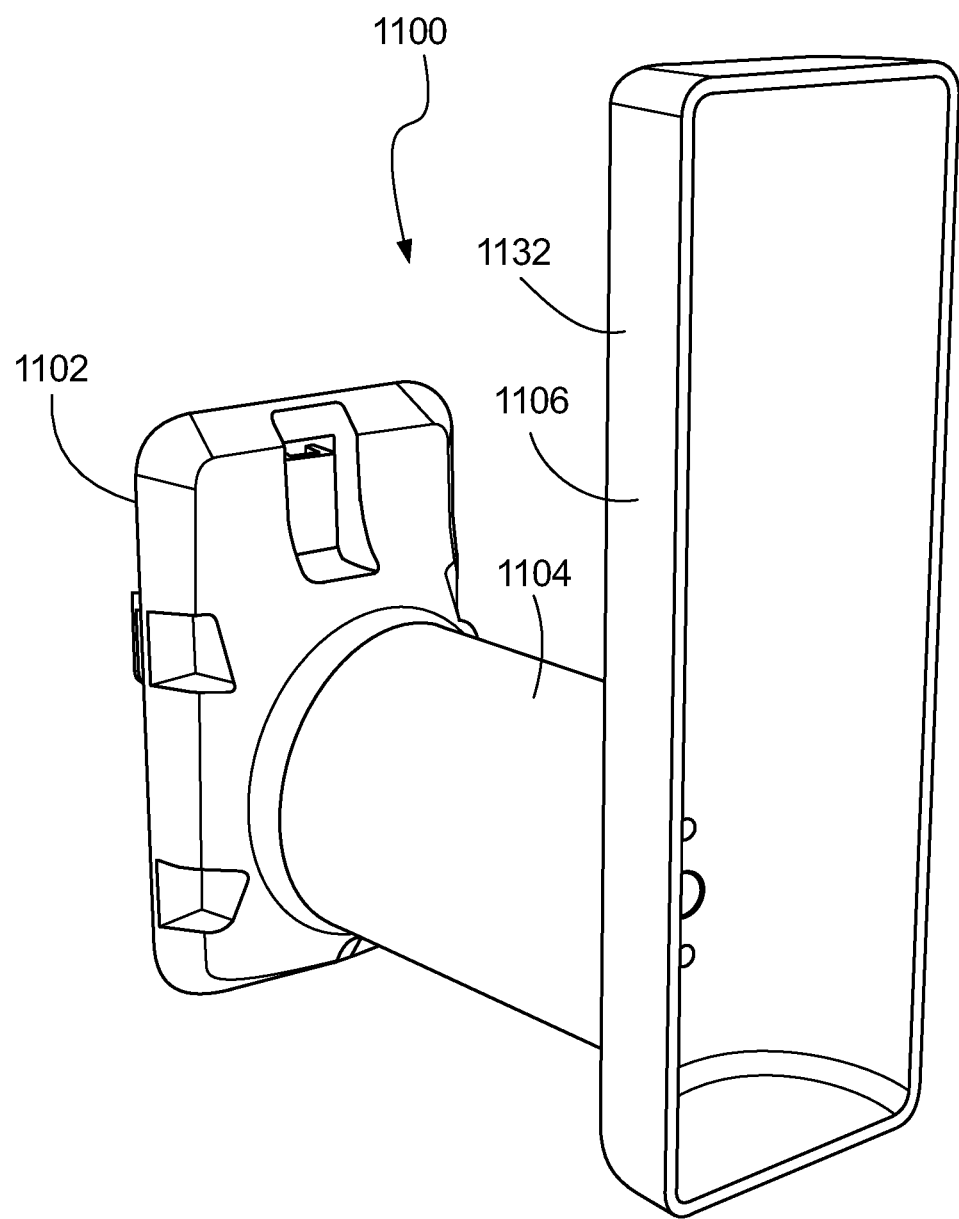
FIG. 81 illustrates another example of a cable management structure that can be mounted to on certain locations of the various telecommunications frames shown in FIGS. 1-69.
Figure 82:
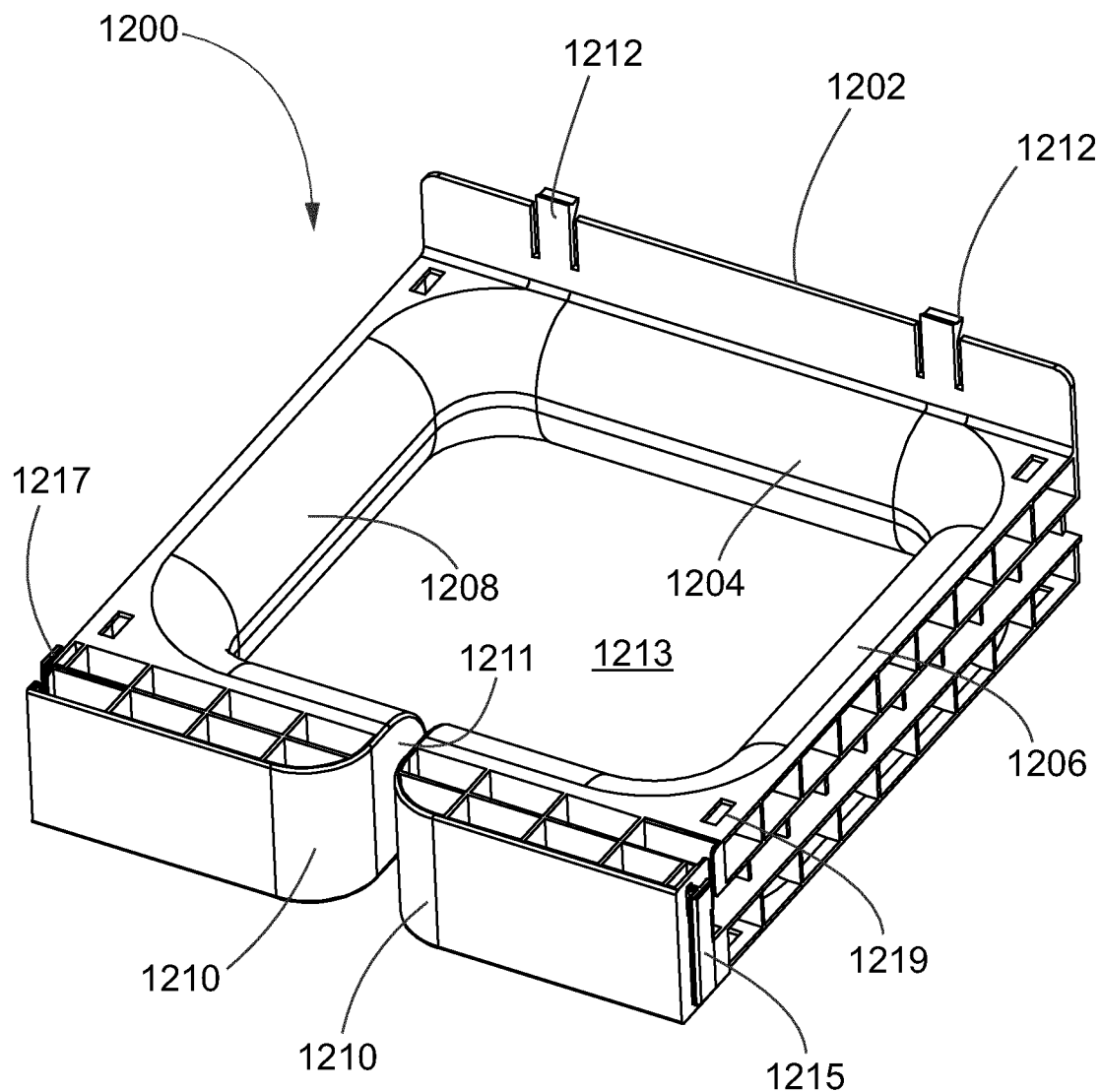
FIG. 82 illustrates a front perspective view of another example of a cable management structure that can be mounted to on certain locations of the various telecommunications frames shown in FIGS. 1-69.
Figure 83:
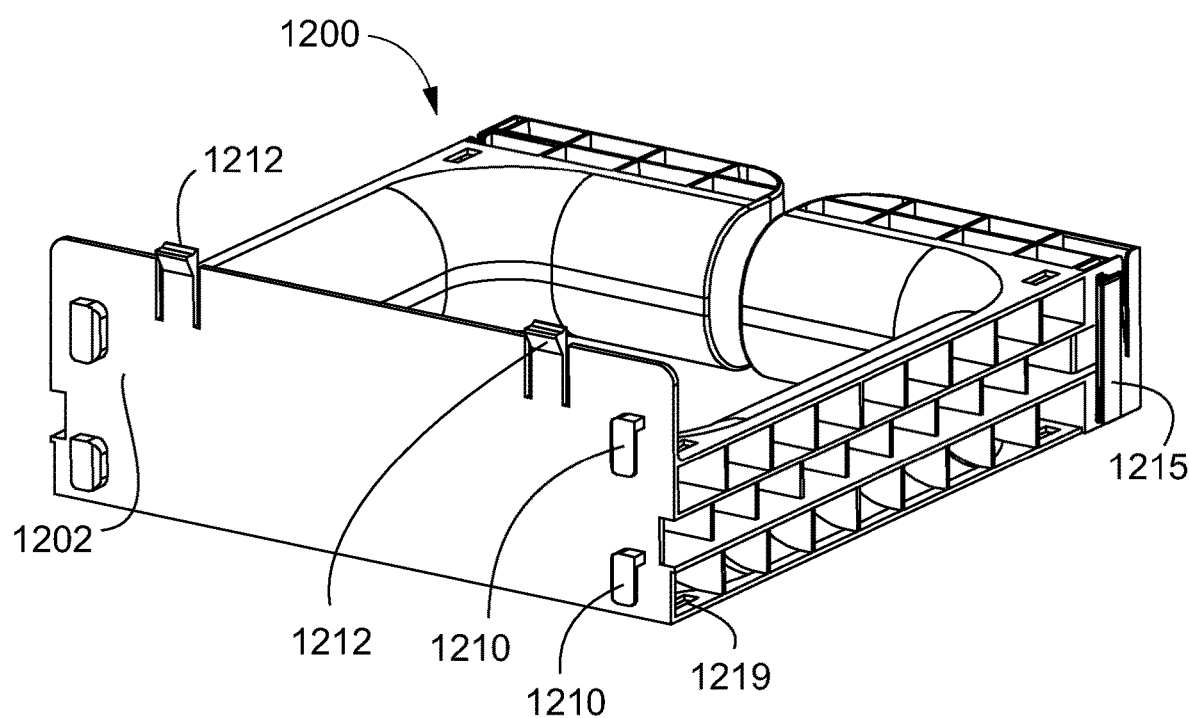
FIG. 83 illustrates the cable management structure of FIG. 82 from a rear perspective.
Figure 84:
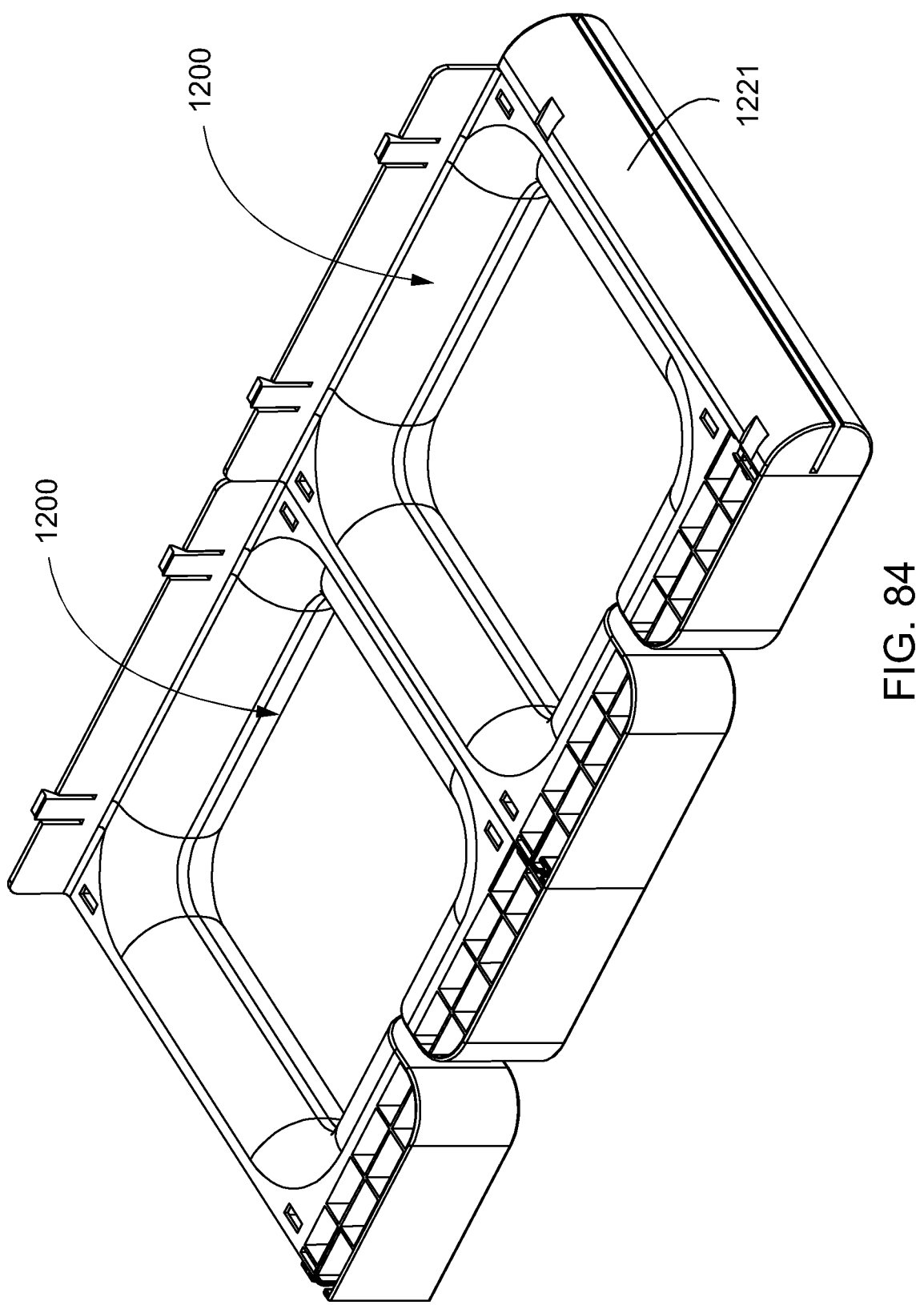
FIG. 84 illustrates two of the cable management structures of FIG. 82 snapped-together in a side-by-side configuration.
Figure 85:
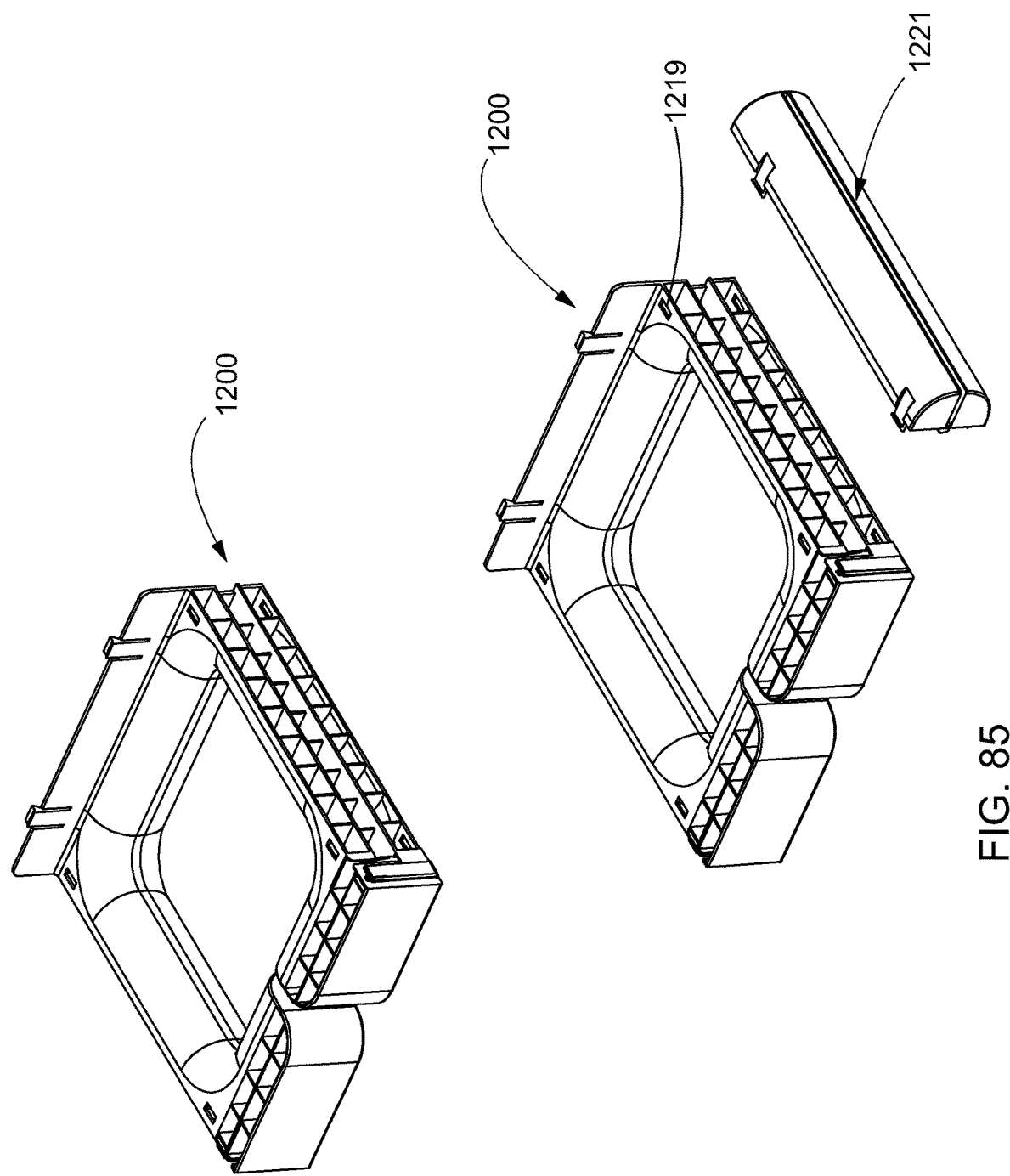
FIG. 85 illustrates the two cable management structures of FIG. 82 in a separated configuration along with a radius extender.

FIG. 81 illustrates an example of a hook-drum 1100 that can be used on certain locations throughout the telecommunications frame assembly 20 of the present disclosure. It should be noted that the hook drum 1100 includes the same mounting features that were discussed above with respect to the overlength drum 1000 such that it can interface with the universal type mounting features provided on a given frame wall 10.

As shown, the hook drum 1100 defines bend radius protection along two perpendicular planes. The bend radius protection portion 1104 extending from the fixation portion 1102 provides bend radius protection along a vertical plane. The flange 1132 defined by the cable retention portion 1106 is also curved to provide bend radius protection along a horizontal plane that is perpendicular to the vertical plane. The drum 1100 is referred to as a hook drum since essentially the entire cable retention portion 1106 extends upwardly from the bend radius protection portion 1104, forming a generally L-shaped configuration.

An example embodiment of the bundle collectors 1200 that are used throughout the cross-connect frame assemblies 110 or on the overlength bay 130 is illustrated in FIGS. 82-87. As shown, the depicted bundle collector 1200 defines a fixation portion 1202 that uses similar features to those described above with respect to the overlength drums 1000 and the hook drums 1100 for removably snap-fitting the bundle collectors 1200 to a frame wall 12. In the depicted example, each bundle collector 1200 includes two rows of hook-like members 1210 that are spaced apart further than those shown from the overlength and hook drums and also two flexible latches 1212 positioned in the middle of the hook-like members 1210. As such, the bundle collectors 1200 are designed to be mounted to frame walls 12 that have mating mounting features.

Each bundle collector 1200 defines a rear bend radius protection portion 1204 and right and left bend radius protection portions 1206, 1208 that extend from the rear bend radius protection portion 1204. The right and left bend radius protection portions 1206, 1208 define inwardly extending portions 1210 that cooperatively form a cable insertion slot 1211. As shown, with the rear portion 1204, the right and left portions 1206, 1208 and the inwardly extending portions 1210 thereof, the bundle collector 1200 defines a central cable channel 1213 with bend radius protection when leading cabling out in four different directions.

As shown in FIGS. 82-87, each bundle collector 1200 defines features for mating in a side-to-side relationship with another bundle collector 1200 to form a double bundle collector. Adjacent the front of each bundle collector 1200, on opposite sides, are provided a dovetail tab 1215 and a dovetail slot 1217, respectively, for slidable mounting of a bundle collector 1200 to a similarly configured bundle collector 1200.

Also, as shown, each of the right and left bend radius protection portions 1206, 1208 of the bundle collector 1200 define snap openings 1219 for selectively receiving radius extenders 1221 with a snap-fit interlock.

When two bundle collectors 1200 are mounted next to each other or a radius extender 1221 is mounted to one of the bundle collectors 1200, a full circular drum is formed for providing bend radius protection to cables.

Figure 86:
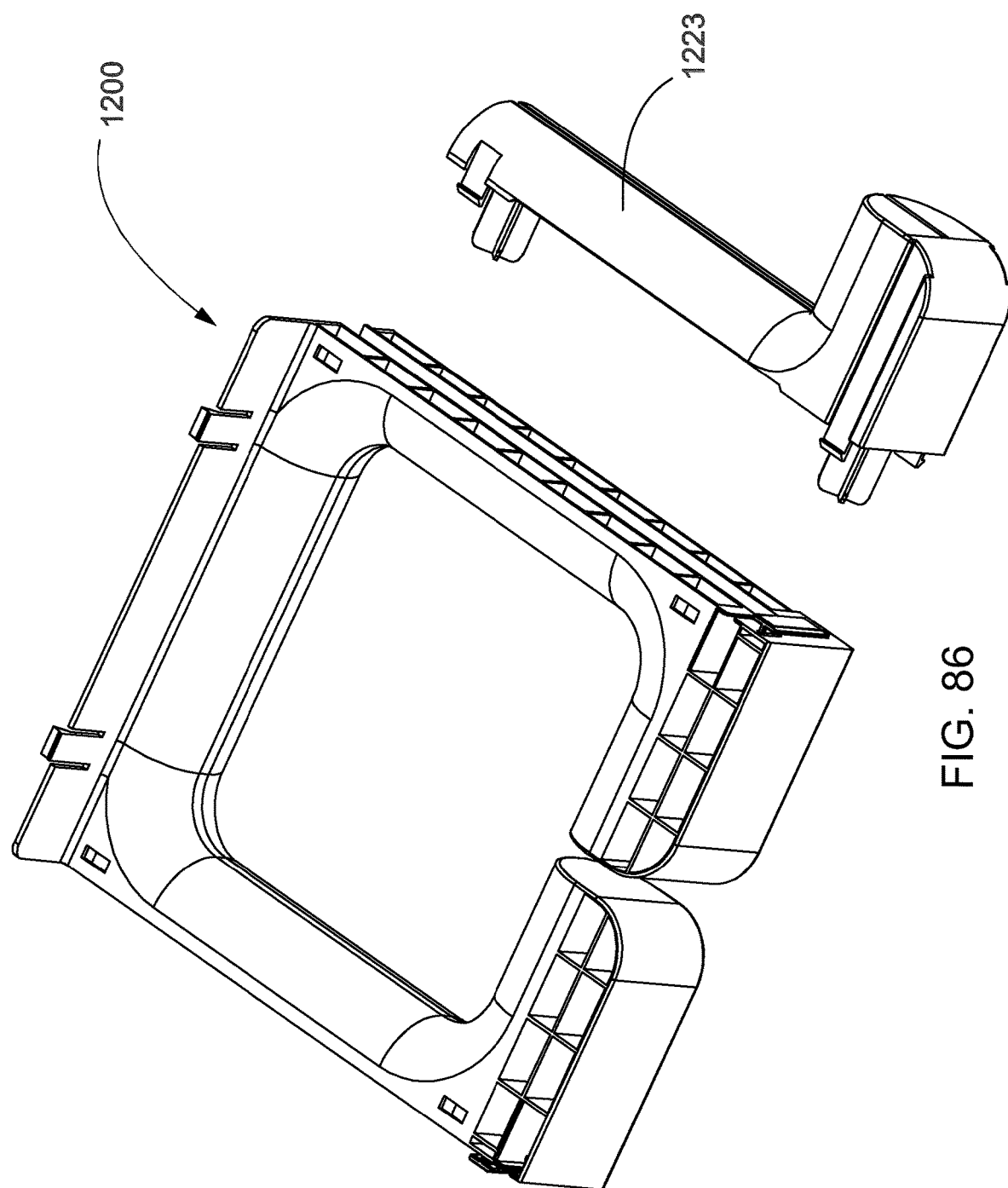
FIG. 86 illustrates the cable management structure of FIG. 82 with an alternative version of a radius extender.
Figure 87:
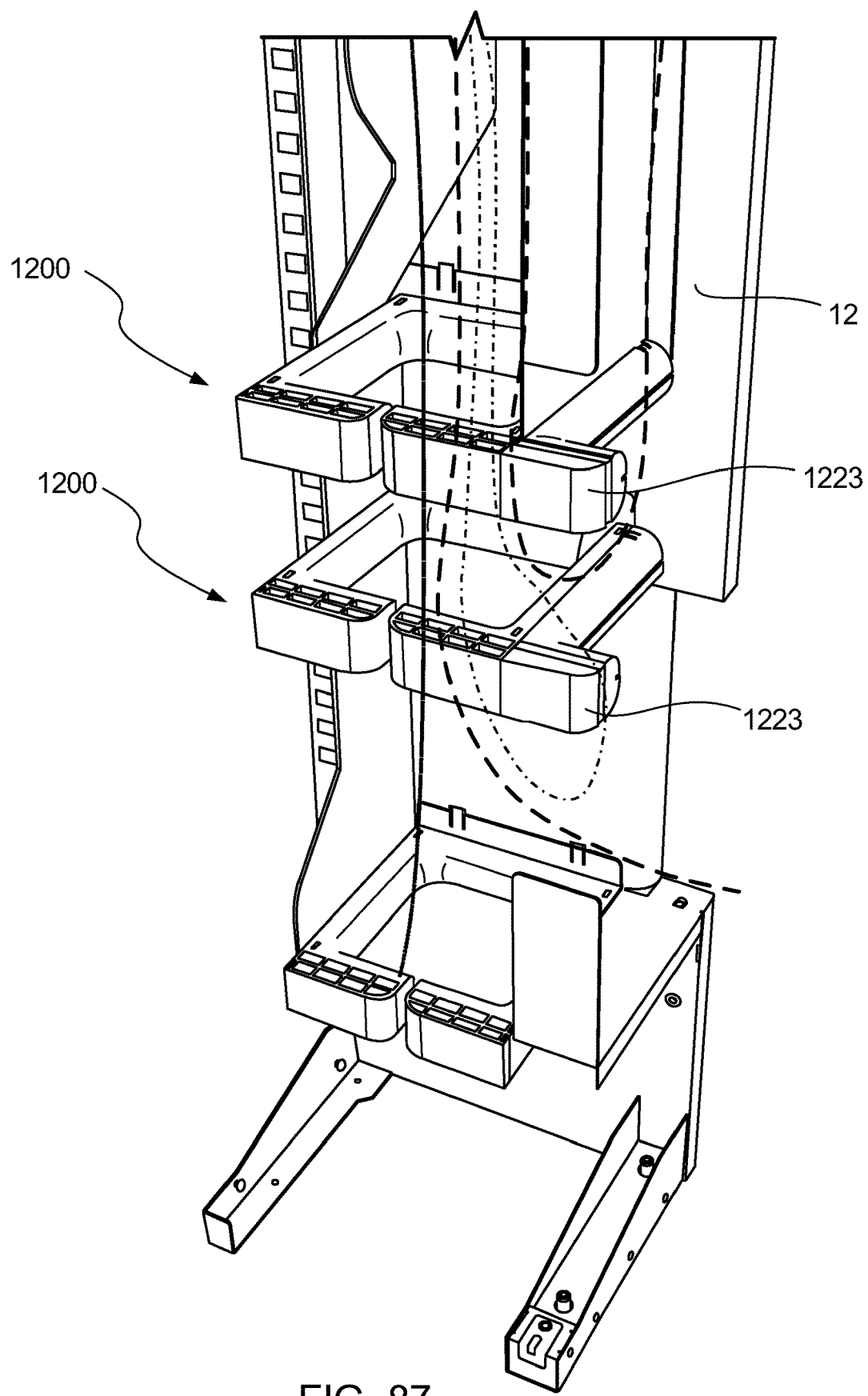
FIG. 87 illustrates a number of the cable management structures and radius extenders mounted on a part of the telecommunications frame of FIGS. 1-69.
Figure 88:
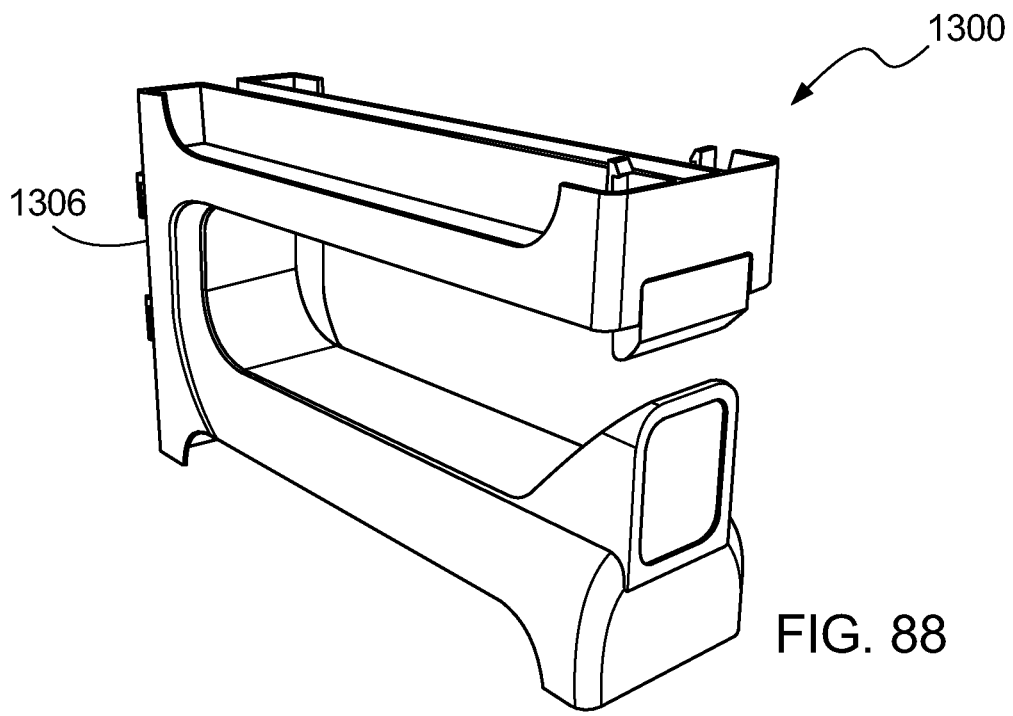
FIG. 88 illustrates another example of a cable management structure in the form of a slide drum that can be mounted to on certain locations of the various telecommunications frames shown in FIGS. 1-69.
Figure 89:
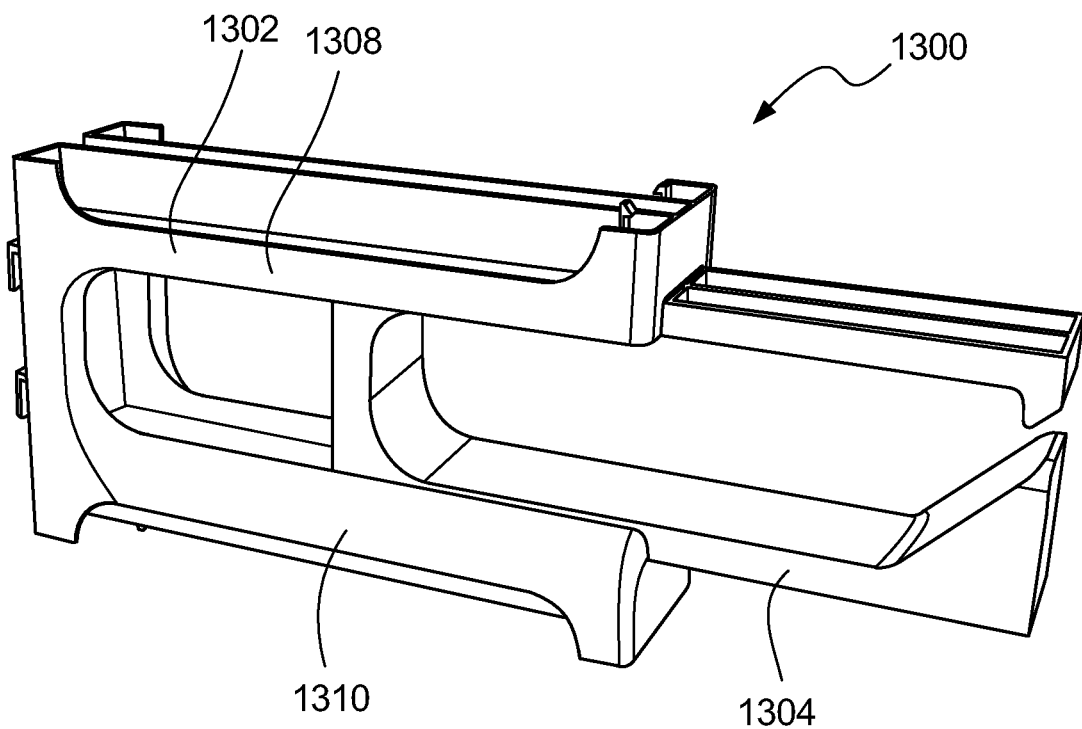
FIG. 89 illustrates the movable part of the slide drum of FIG. 88 in an extended position.
Figure 90:
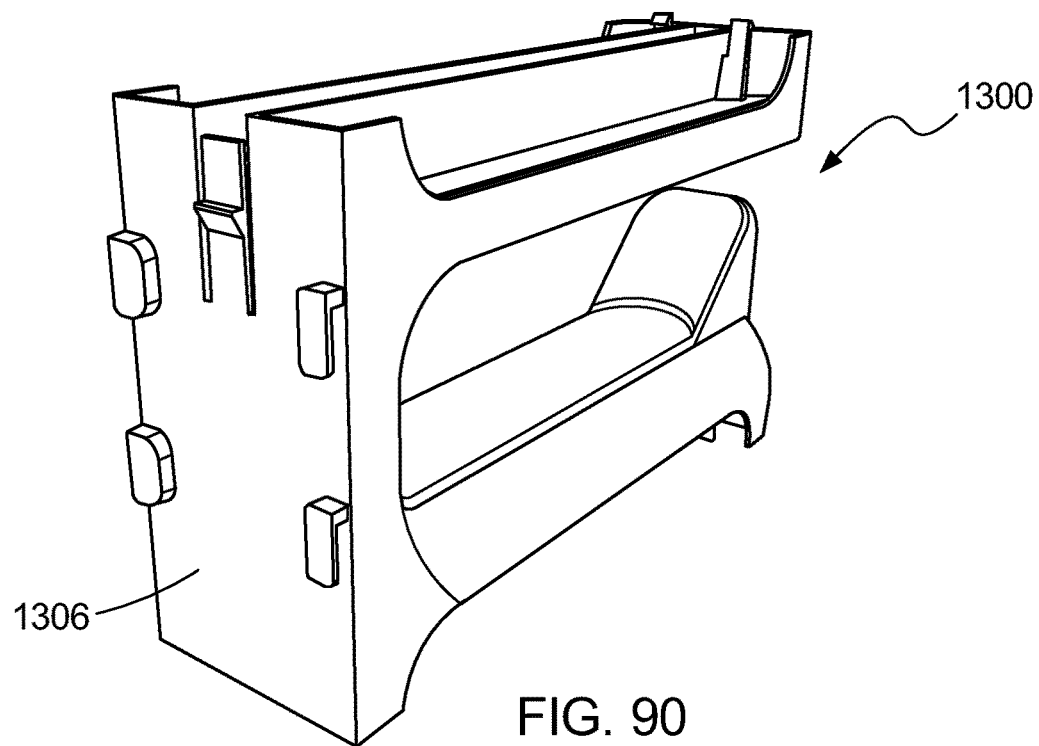
FIG. 90 is a rear perspective view of the slide drum of FIG. 88.
Figure 91:
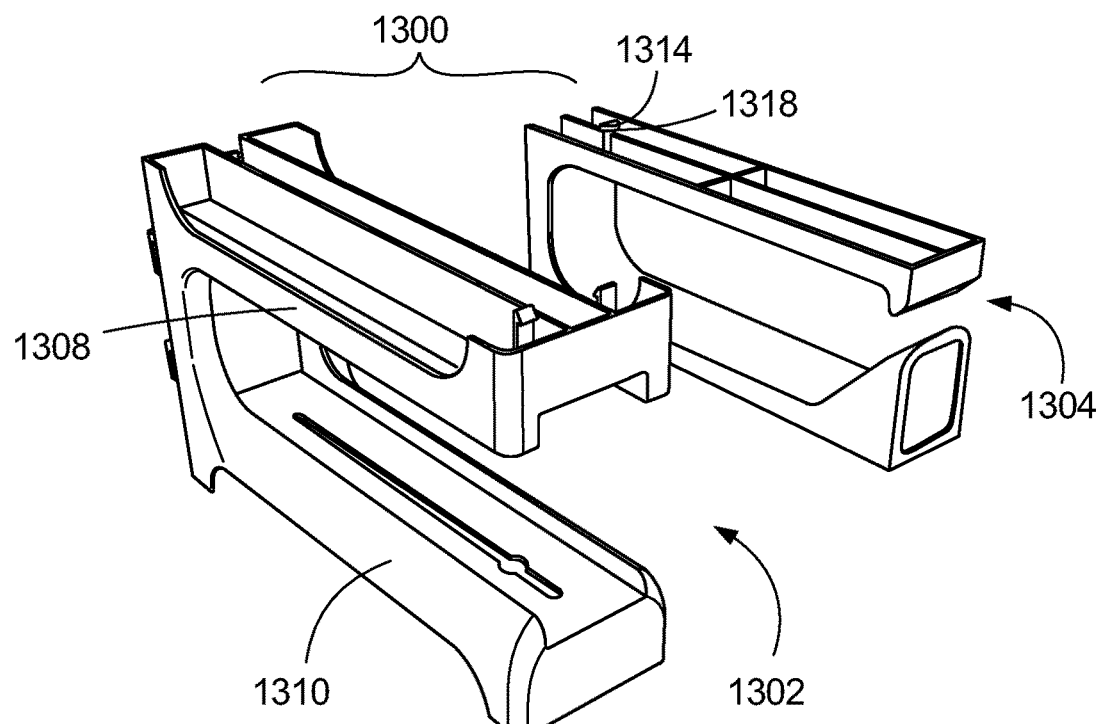
FIG. 91 illustrates the movable part of the slide drum removed from the fixed portion of the slide drum.
Figure 92:
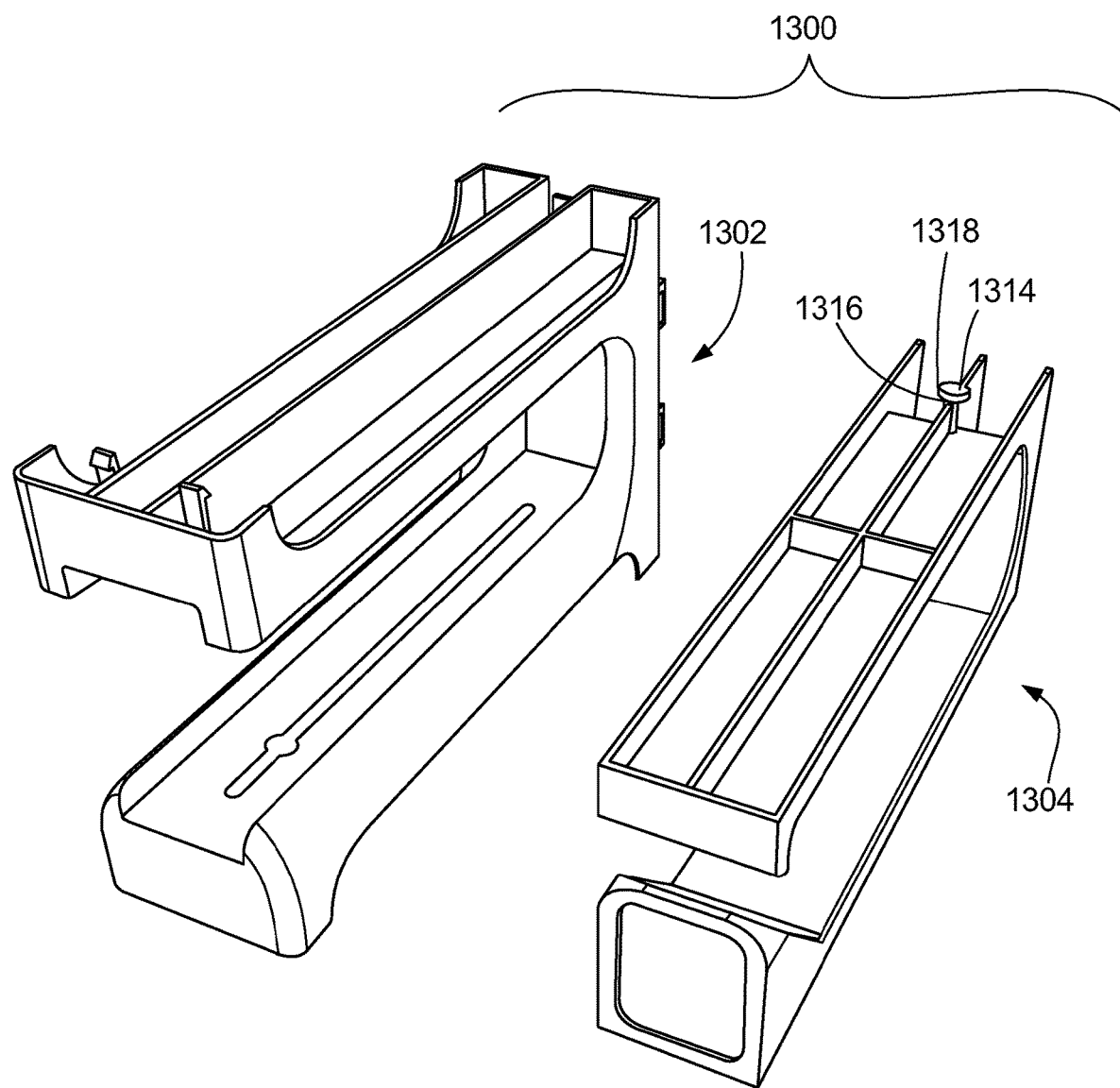
FIG. 92 is another perspective view of the movable part of the slide drum removed from the fixed portion of the slide drum.
Figure 93:
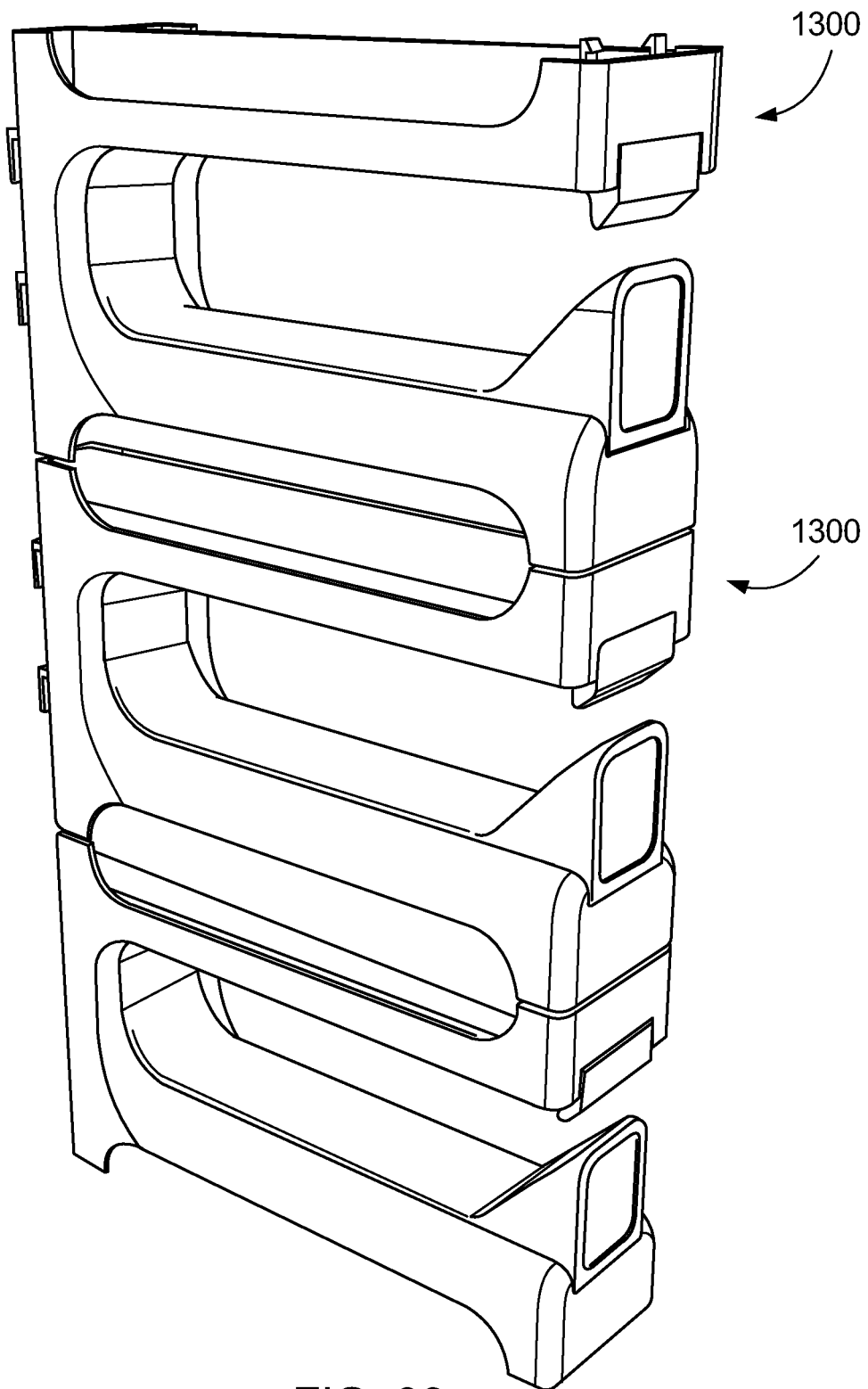
FIG. 93 illustrates a number of the slide drums of FIG. 88 mounted together in a vertically stacked configuration.
Figure 94:
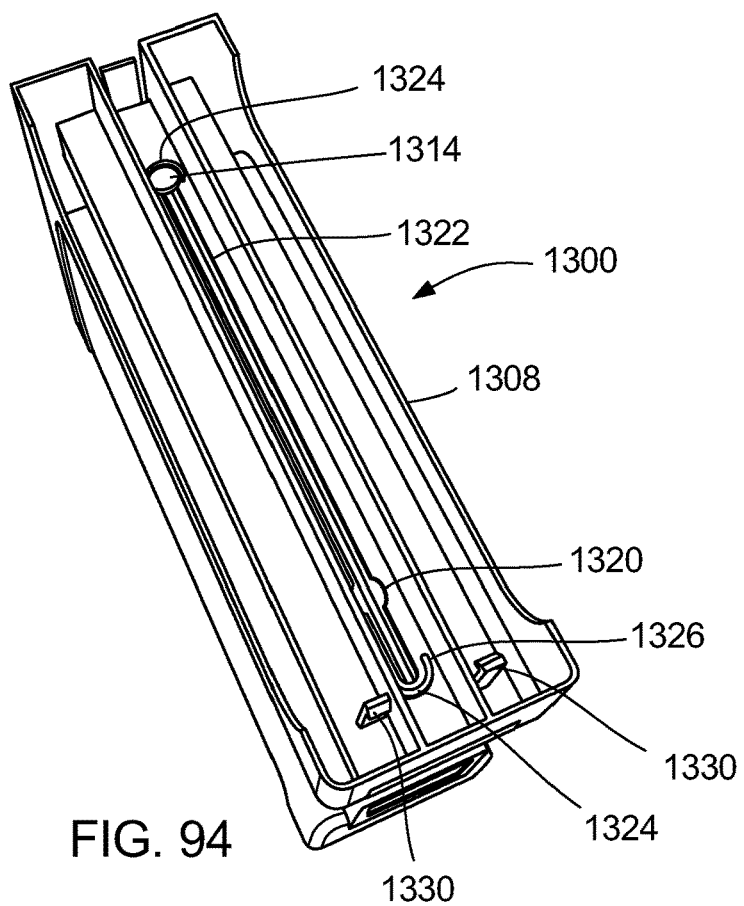
FIG. 94 is a top perspective view of the slide drum of FIG. 88.
Figure 95:
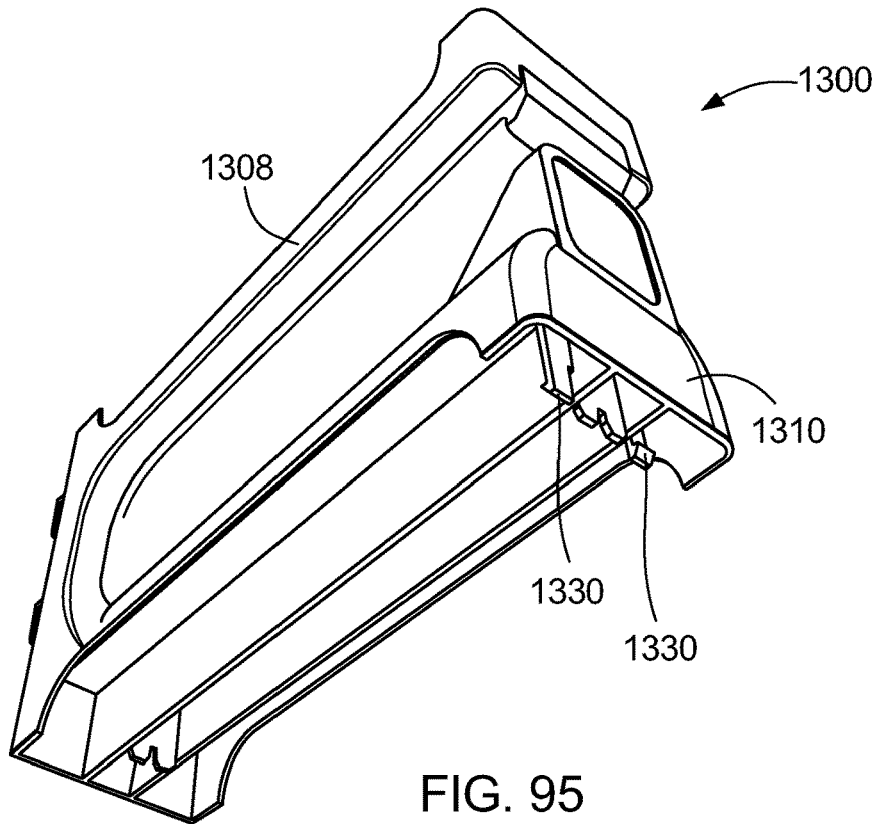
FIG. 95 is a bottom perspective view of the slide drum of FIG. 88.
Figure 96:
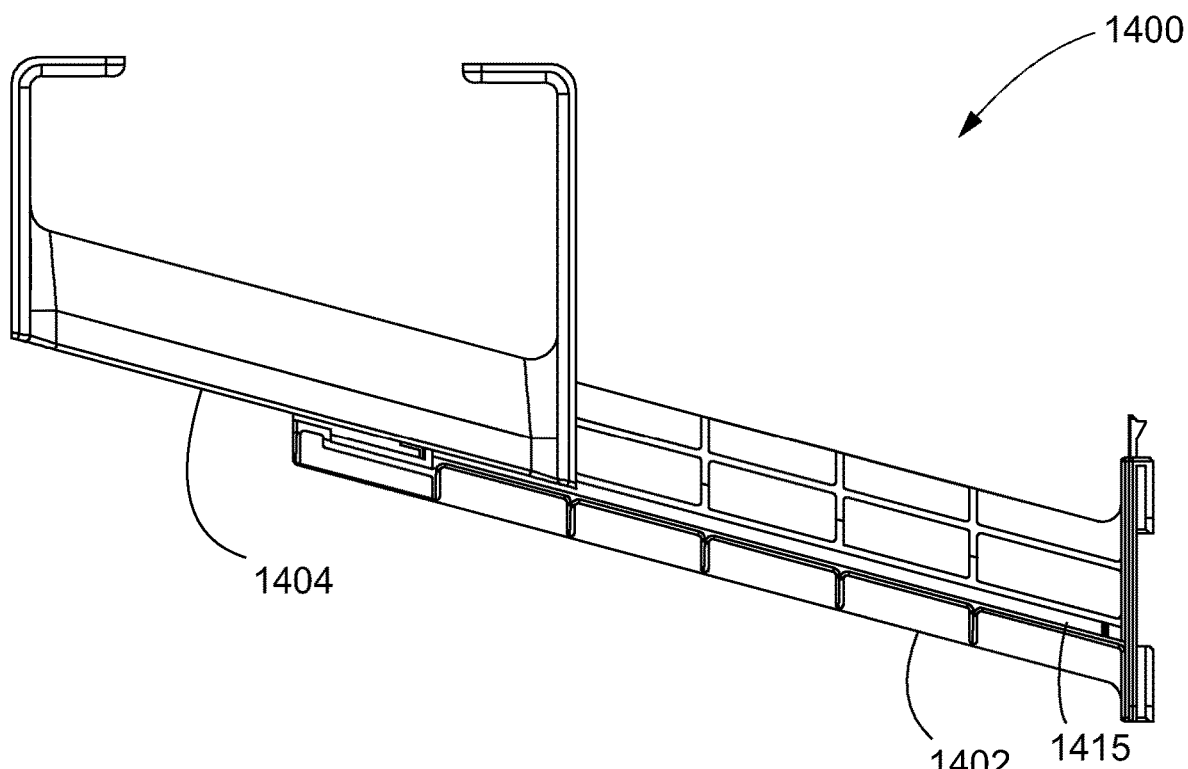
FIG. 96 illustrates another example of a cable management structure in the form of a slide drum that can be mounted to on certain locations of the various telecommunications frames shown in FIGS. 1-69, wherein the fixed part is provided with an angle to a vertical wall such that the movable part moves both outwardly and upwardly with respect to the fixed part of the slide drum, the movable part shown in an extended position.
Figure 97:
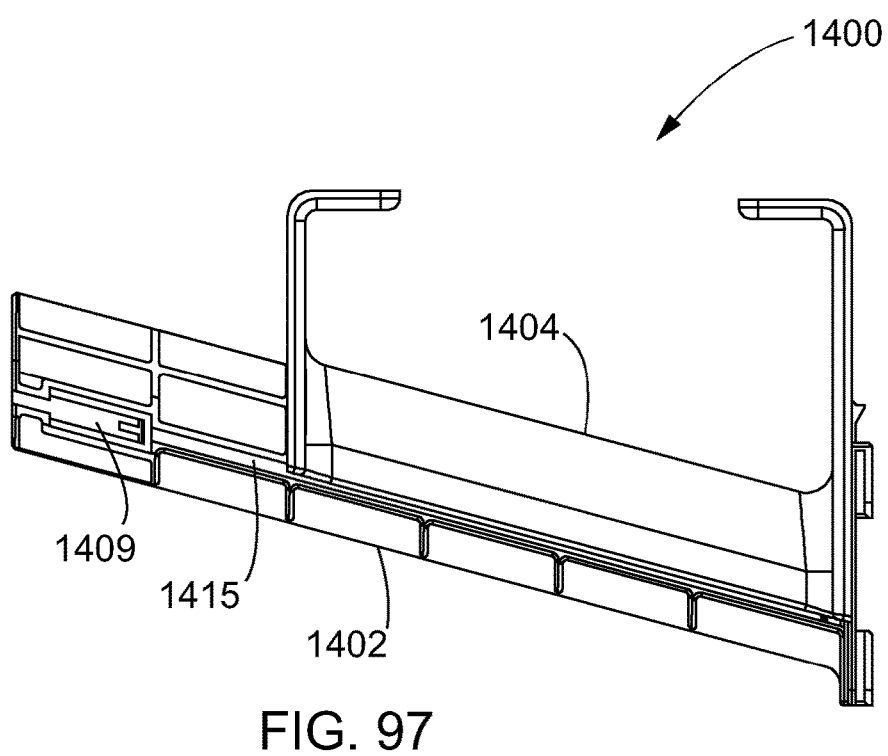
FIG. 97 illustrates a side view of the cable management structure of FIG. 96 with the movable part in a retracted position with respect to the fixed part.
Figure 98:
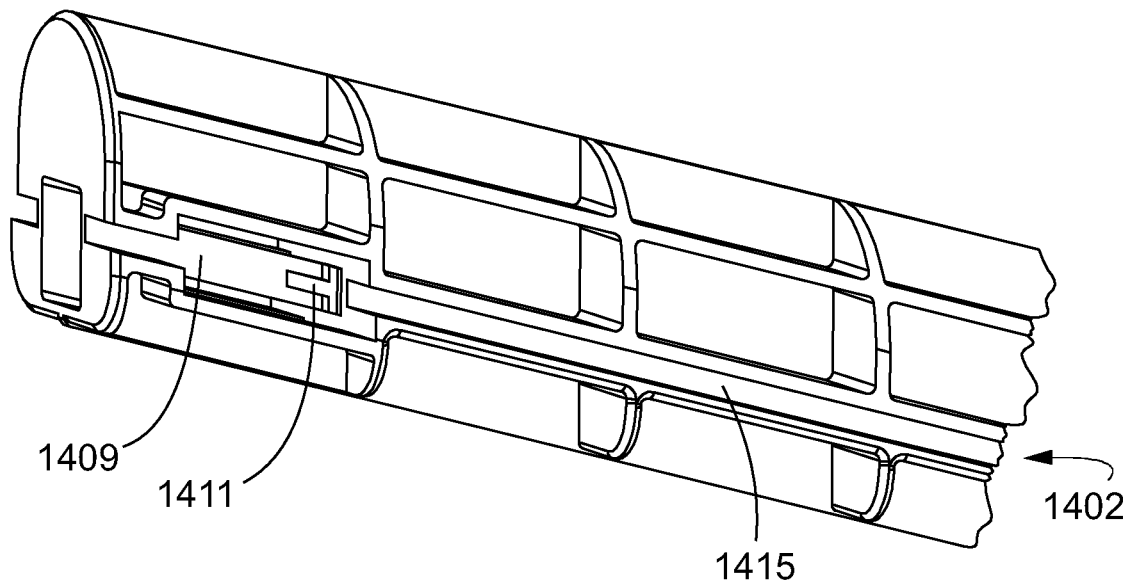
FIG. 98 illustrates the fixed part of the slide drum of FIG. 96 in isolation.
Figure 99:
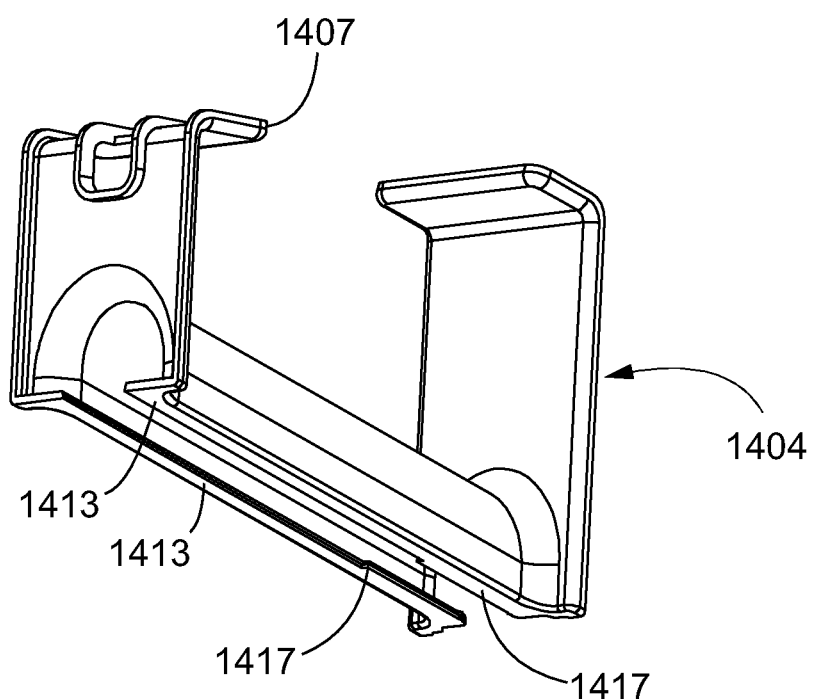
FIG. 99 illustrates the movable part of the slide drum of FIG. 96 in isolation.
Figure 100:
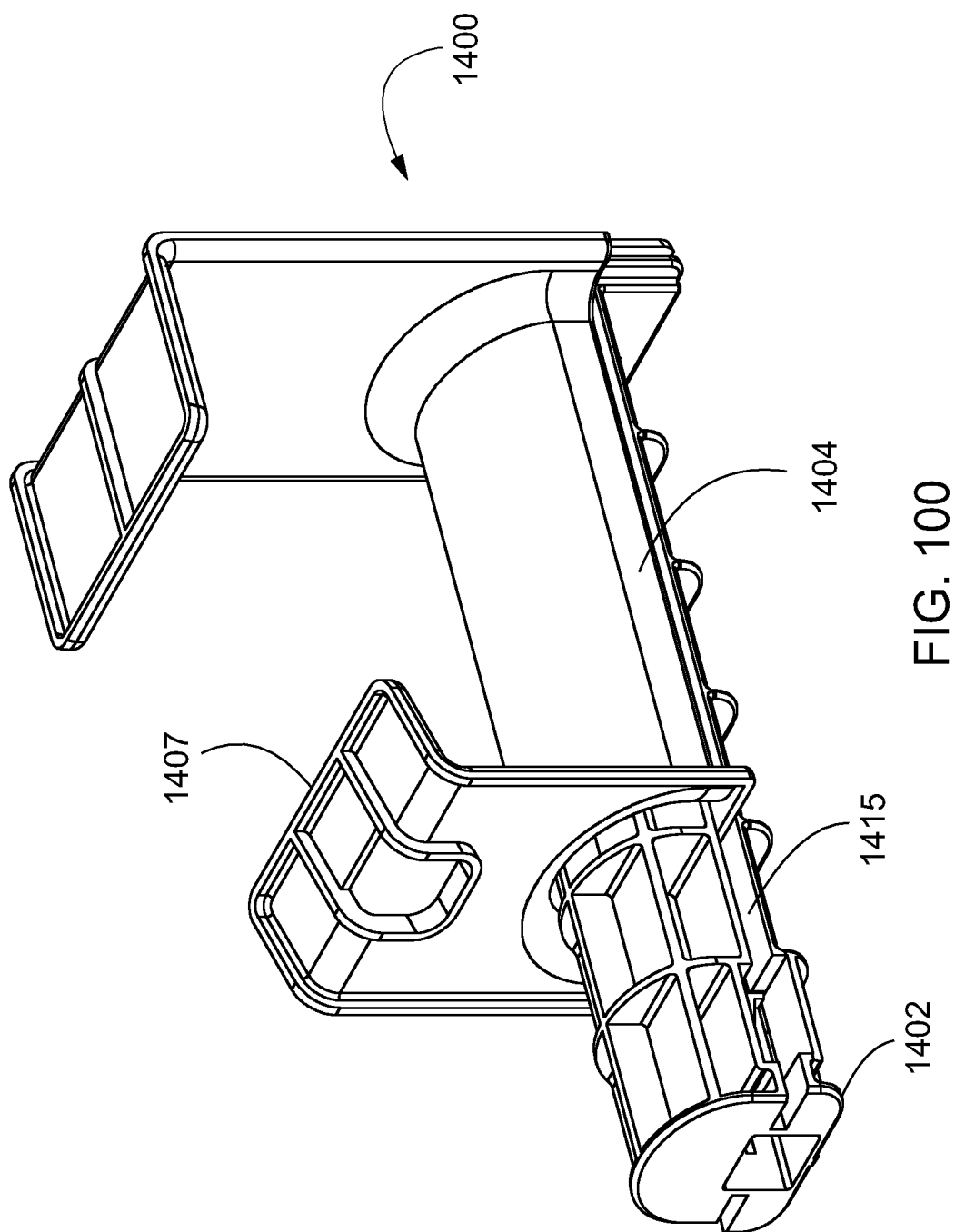
FIG. 100 is a front perspective view of the cable management structure of FIG. 96 with the movable part in a retracted position with respect to the fixed part.
Figure 101:
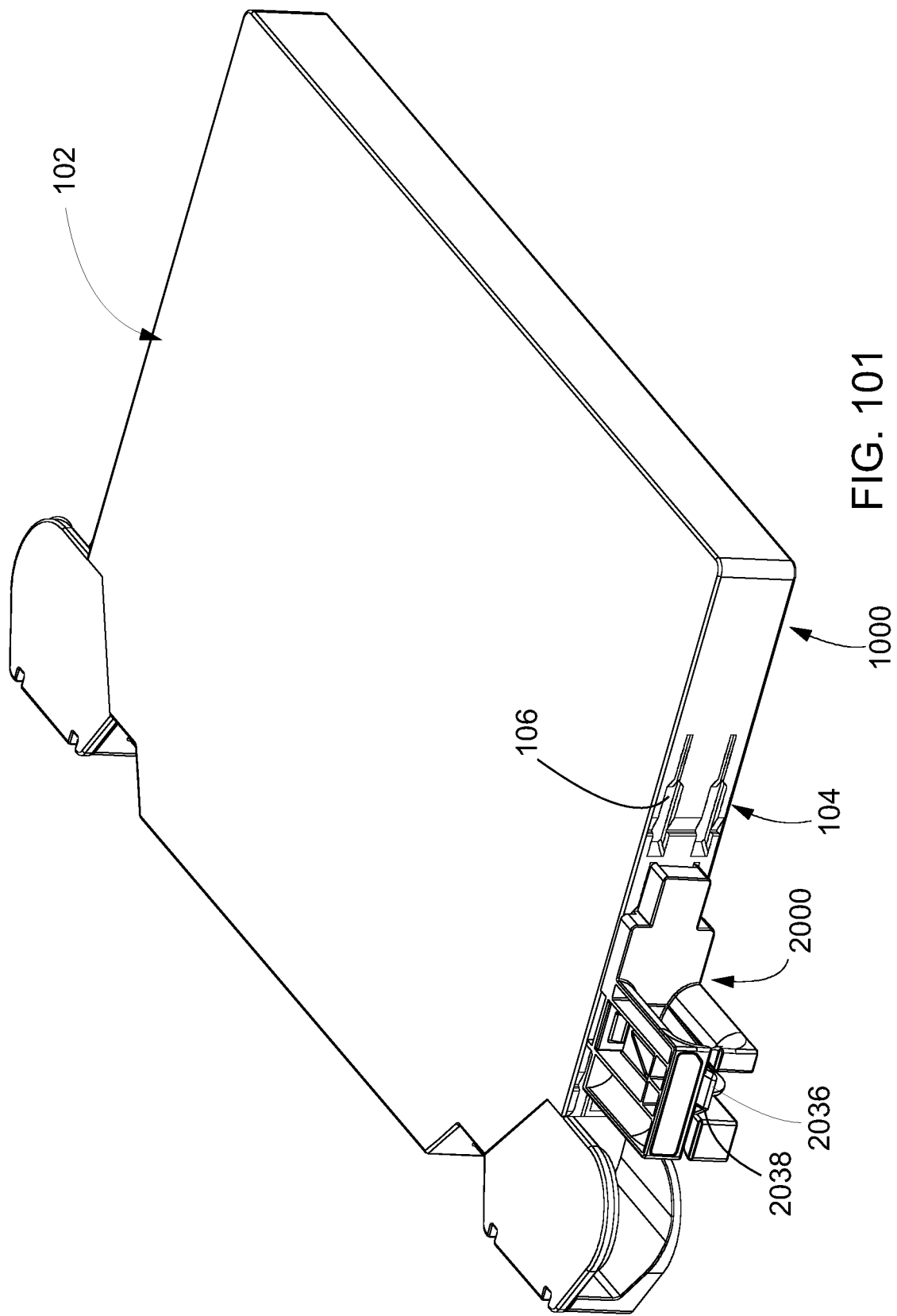
FIG. 101 illustrates one of the optical distribution elements that can be mounted on the various telecommunications frames shown in FIGS. 1-69 with an example cable management structure having features that are examples of inventive aspects in accordance with the present disclosure mounted to a side thereof, wherein the cable management structure is configured for use on either side of one of the optical distribution elements for directing cabling away from or toward the optical distribution element.
Figure 102:
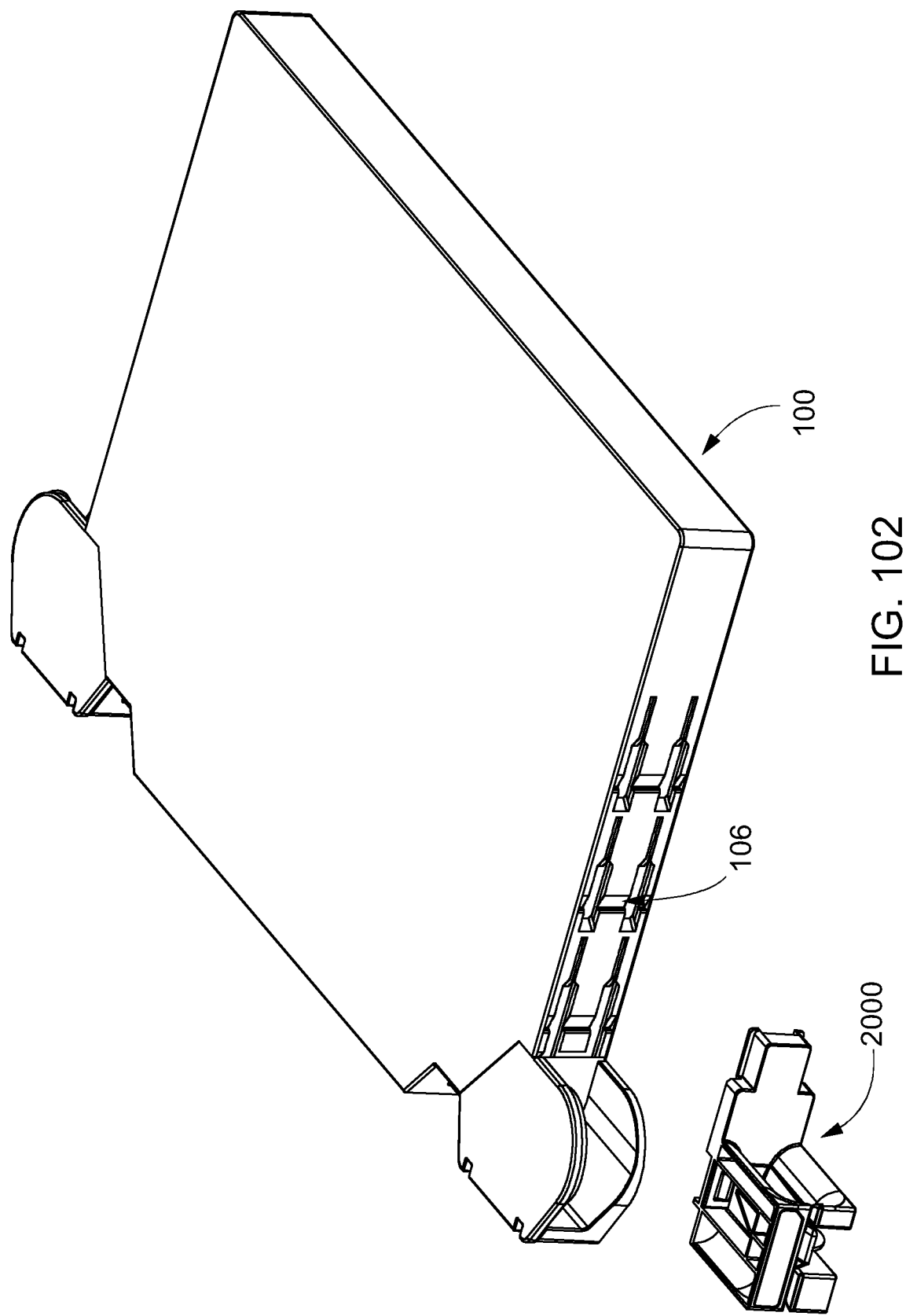
FIG. 102 illustrates the cable management structure of FIG. 101 exploded off the optical distribution element.
Figure 103:
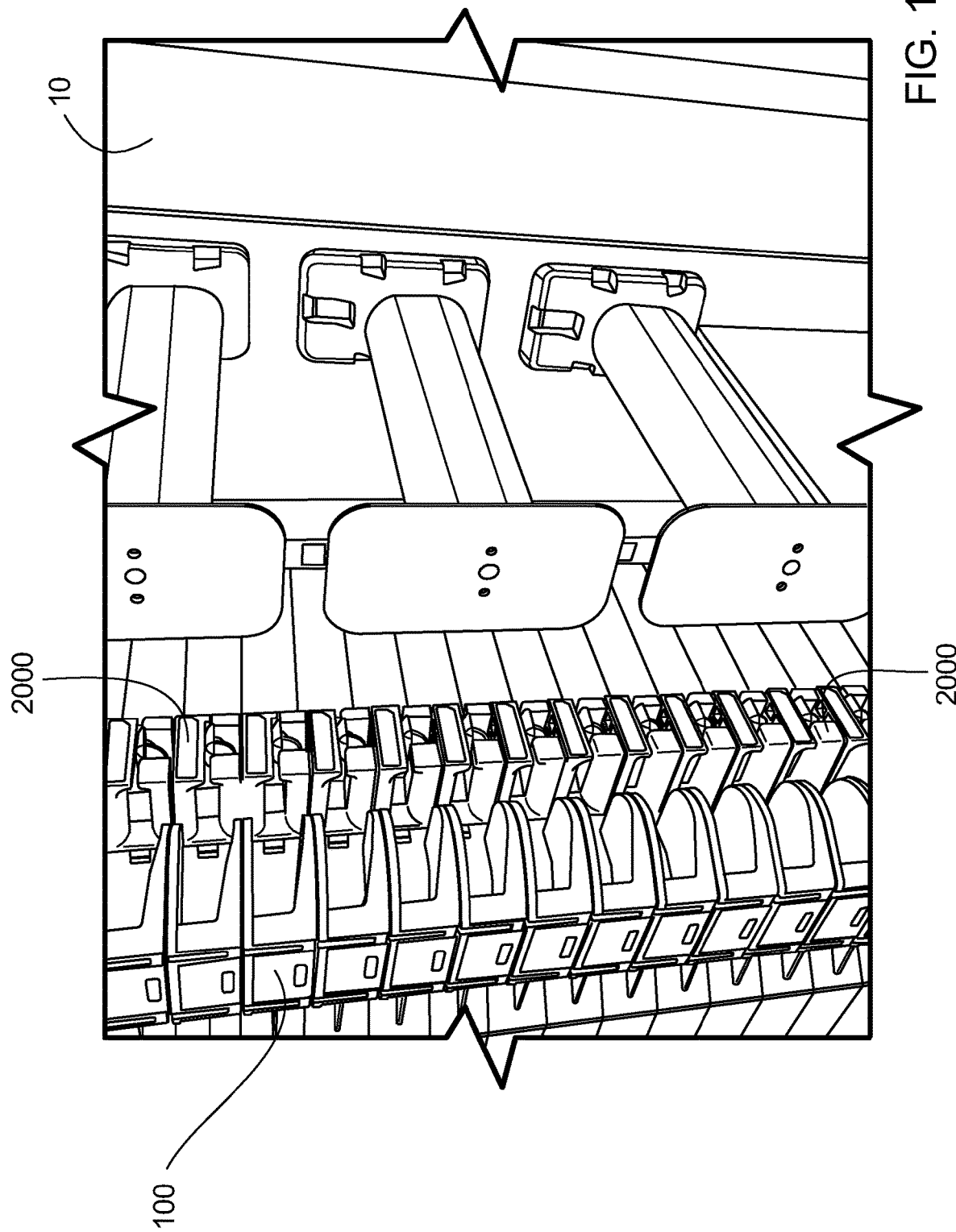
FIG. 103 illustrates a plurality of the cable management structures shown in FIG. 101 shown mounted to sides of optical distribution elements in a vertically stacked arrangement.
Figure 104:
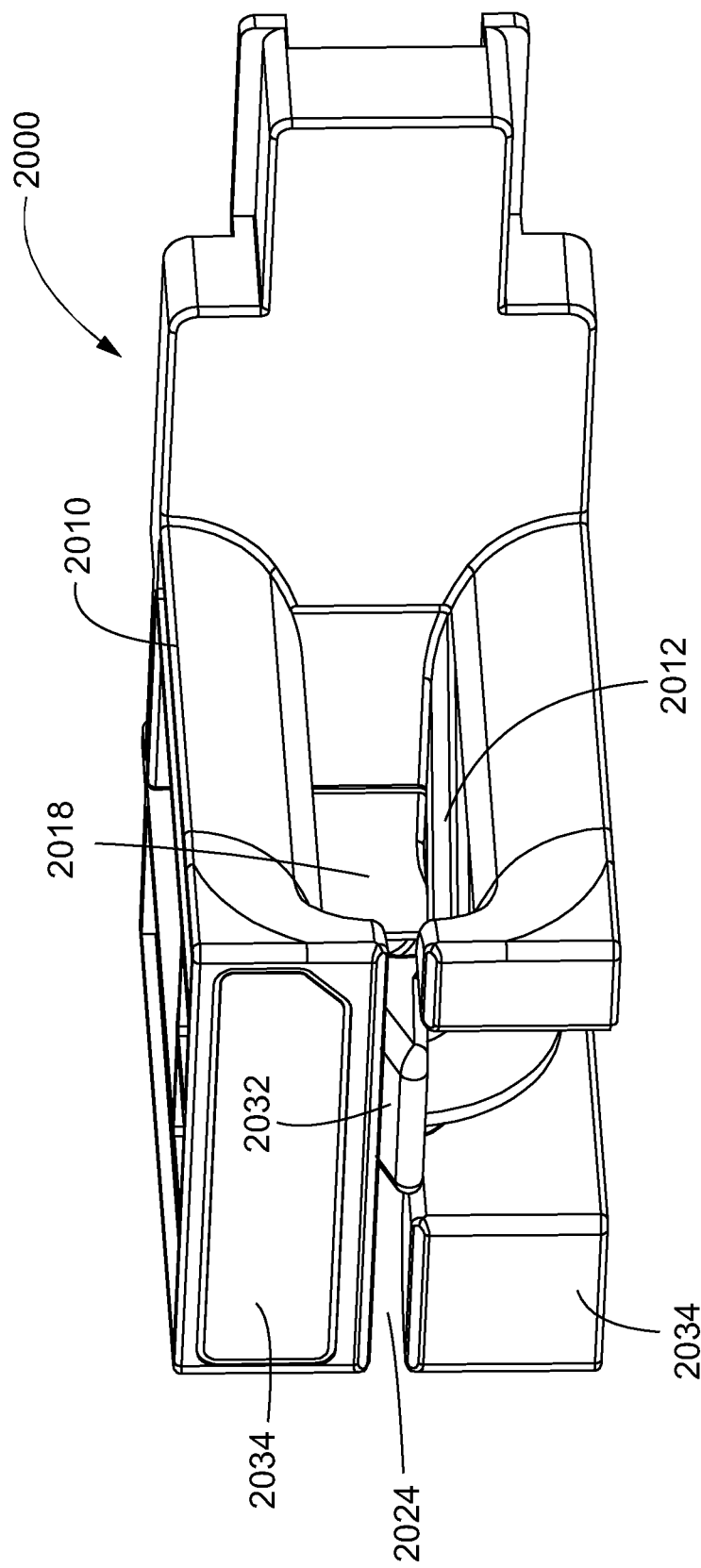
FIG. 104 illustrates a side perspective view of the cable management structure of FIG. 101 in isolation.
Figure 105:
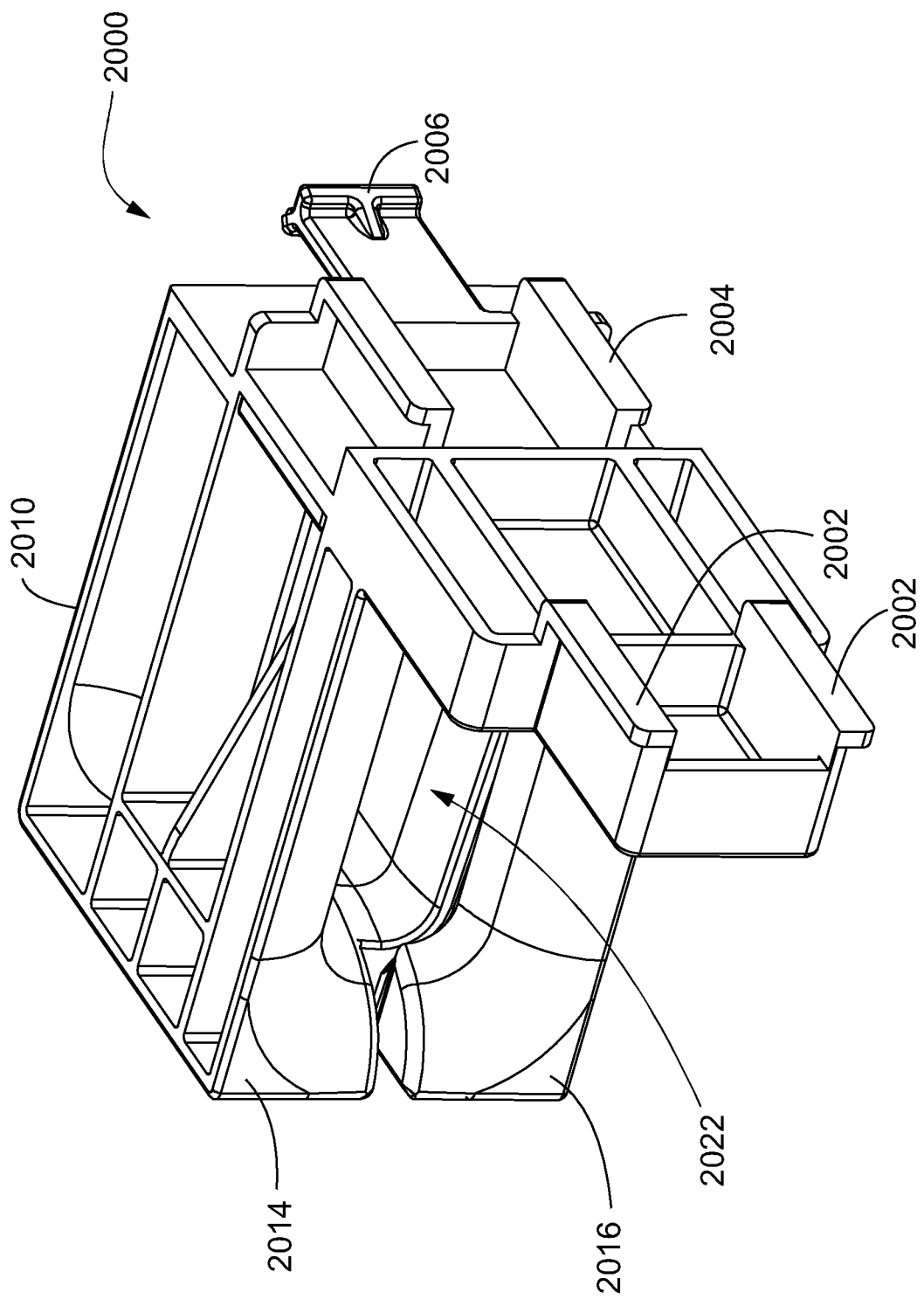
FIG. 105 illustrates a rear perspective view of the cable management structure of FIG. 101.
Figure 106:
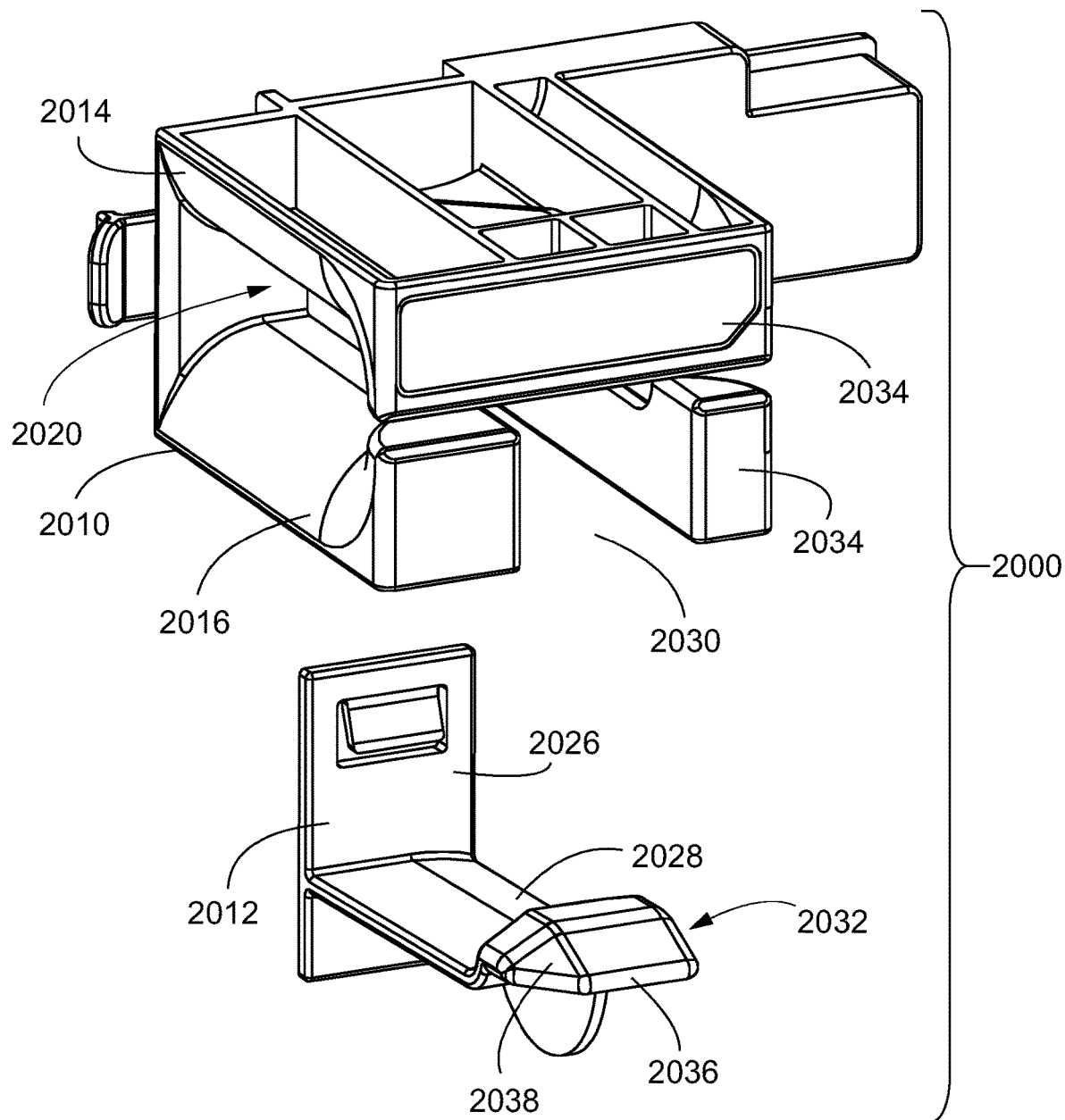
FIG. 106 illustrates the cable management structure of FIG. 101 in an exploded configuration to show the removable parts thereof.
Figure 107:
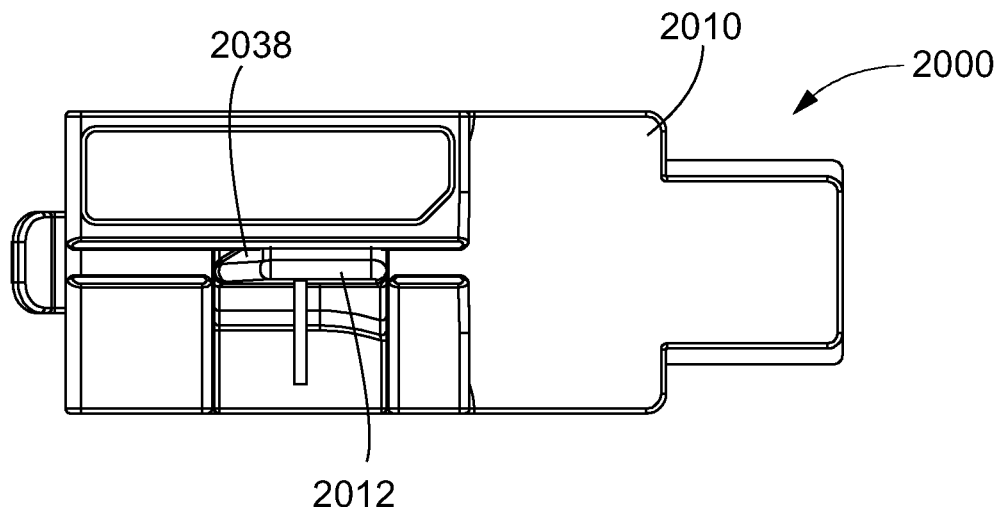
FIG. 107 is a side view of the cable management structure of FIG. 101.
Figure 108:
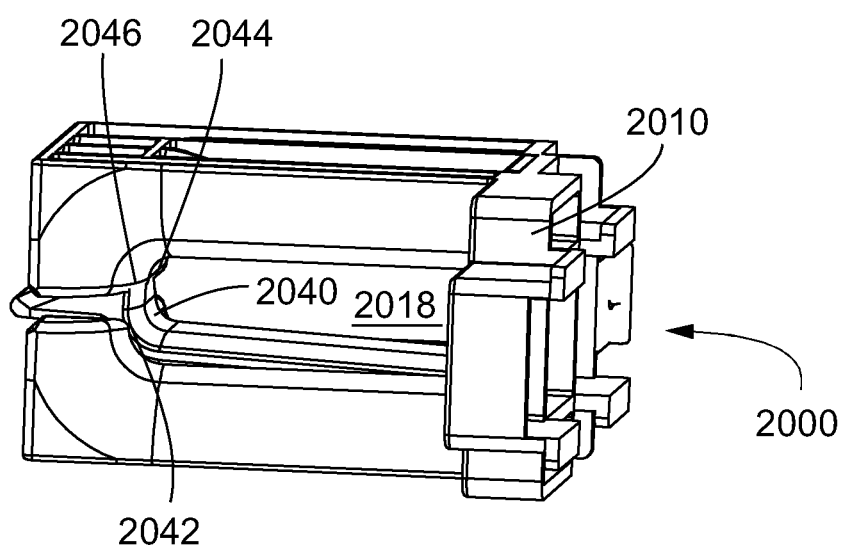
FIG. 108 is a rear view of the cable management structure of FIG. 101.

An alternative L-shaped edge protector or extender 1223 is shown in FIGS. 86-87, where the edge protector 1223 can be snap-fit to one of the bundle collectors 1200 using the snap openings 1219. The edge protectors 1223 can be used in the manner shown in FIG. 87 to provide extra protection for cable slack.

Now referring to FIGS. 88-95, one of the sliding drums 1300 that can alternatively be used throughout parts of the telecommunications frame assemblies 110/120 or on the overlength bay 130 is described in further detail. As shown, the sliding drum 1300 defines a fixed part 1302 that is configured to be mounted to a frame wall 12 and a movable part 1304 that can slidably move away from the fixed 1302 part to facilitate cable access.

It should be noted that the fixed part 1302 defines a fixation portion 1306 that may use similar mounting features to those described above with respect to the overlength drums 1000 and the hook drums 1100 for removably snap-fitting the sliding drums 1300 to a frame wall 12.

The fixed part 1302 of the slide drum 1300 defines upper and lower support portions 1308, 1310 that extend from the fixation portion 1306. The upper and lower support portions 1308, 1310 receive and guide the movable part 1304 of the drum 1300.

As shown in FIGS. 88-95, the movable part 1304 is removably mounted to the fixed part 1302 of the drum 1300 between the upper and lower support portions 1308, 1310. The movable part 1304 defines a slide tab 1314 that has a generally dovetail type structure (defining a connector portion 1316 and a larger retention portion 1318) that can be inserted through an opening 1320 at the upper support portion 1308. Once inserted through the opening 1320, the connector portion 1316 of the slide tab 1314 slides along a narrow slit 1322 defined by the upper support portion 1308. The retention portion 1318 of the slide tab 1314 prevents separation of the slide tab 1314 from the narrow slit 1322 until it is aligned with the opening 1320. The narrow slit 1322 essentially defines a longitudinal track for the movement movable part 1304 of the drum 1300.

The upper support portion 1308, at both ends of the narrow slit 1322, defines positive stops 1324 for abutting the retention portion 1318 of the slide tab 1314. The positive stops 1324 are also configured to form snap-fit interlock structures 1326 for retaining the slide tab 1314 at the ends of the track unless a force overcoming the frictional force provided by the snap-fit interlock structures 1326 starts moving the movable part 1304 of the drum 1300.

As shown, each of the upper and lower support portion 1308, 1310 defines intermating grip features 1330 for flexibly snap-fitting two of the drums 1300 in a vertically stacked configuration. As shown, the intermating grip features 1330 on a lower support portion 1310 of a given drum 1300 is oriented in an opposite orientation with respect to the grip features 1330 on an upper support portion 1308 of a given drum 1300 for providing the intermating capability.

As also shown, the lower support portion 1310 of the slide drum 1300 may define slots 1332 adjacent the front and the back that are used to receive a central wall if the slide drum 1300 is going to be placed at the upper edge of a separator wall or a different transversely extending wall structure on one of the frame assemblies 110/120 or on the overlength bay 130.

Another version of a slide drum 1400 is illustrated in FIGS. 96-100. In the version illustrated in FIGS. 96-100, the fixed part 1402 is provided with an angle to a vertical frame wall 12 such that the movable part 1404 moves both outwardly and upwardly with respect to the fixation portion 1406 of the drum 1400. In this manner, the movable part 1404, since it is at an angle, can automatically slide back to its unextended position under the weight of any cabling.

As shown, a finger grip 1407 could be added for facilitating movement of the movable part 1404. Also, a snap mechanism 1409 can be provided for retaining the movable part 1404 on the fixed part 1402 once the two parts have been assembled together. As shown, the snap mechanism 1409 may be formed by flexible cantilever arms 1411 that abut enlarged portions 1417 of a pair of rails 1413 of the movable part 1404, where the rails 1413 are designed to slide along slits 1415 provided on both sides of the fixed part 1402.

In other embodiments, instead of providing an angle for automatic movement of the movable part 1404, the movable part 1404 may include a spring-loaded design, where the spring provides a bias on the movable part 1404 for automatically pulling the movable part 1404 back to its original position when a technician is done loading the drum 1400 with cabling or unloading the drum 1400.

Even though the above described cable management structures have been illustrated and discussed herein as being used within the telecommunications frame assemblies 110/120 or on the overlength bay 130 of the present disclosure, it should be noted that the inventive aspects can be utilized in any telecommunications fixture, such as a frame, a panel, or a rack, where cable slack needs to be managed, as long as the walls of such fixtures are designed with the mounting features described above.

As discussed above, the cross-connect assembly 10 is designed to allow patching between elements 100 supported by a right frame and elements 100 supported by a left frame, where the first side 102 (e.g., left side) of each of the elements in the left frame and the second side 104 (e.g., right side) of each of the elements in the right frame are considered the fixed sides of the cross-connect assembly 10 and where the center portion of the cross-connect assembly 10 is designed as the flexible side allowing re-patching of cabling between the elements on the right and left frames.

FIGS. 101-108 illustrate one example embodiment of a cable management structure 2000 that can be used on the flexible patching side of one of the fiber distribution elements housed by the cross-connect assembly 10. It should be noted that the cable management structure 2000 can be designed to be mounted on either side 102/104 of an element 100, depending on whether the element 100 is mounted on the right frame or the left frame of the cross-connect assembly 10 since the flexible side of the cross-connect assembly is positioned toward the center. The cable management structures 2000 can also be used on either side of the inter-connect assembly 20 as discussed above.

The cable management structures 2000 are configured to be in a vertically stacked arrangement when mounted to vertically stacked optical fiber distribution elements 100.

As shown in FIGS. 101-108, each optical fiber distribution element 100 is provided with mounting features 106 (e.g., slots) for slidably receiving the cable management structures 2000. As shown in FIGS. 101-108, each cable management structure 2000 includes mounting features 2002 that are configured to mate with the mounting features in the form of slots 106 provided on the optical fiber distribution elements 100 for sliding in and snap-fitting the cable management structures 2000 to the optical fiber distribution elements 100. The mounting features 2002 of the cable management structure 2000 include a dovetail configuration 2004 and are slidably inserted into the slots 106 of the optical fiber distribution elements 100. A flexible tab 2006 provided at the rear side of the cable management structure 2000 is used to latch and fix the cable management structure 2000 relative to the optical fiber distribution element 100. The flexible tab 2006 is also used to unlatch the cable management structure 2000 from the optical fiber distribution element 100 before the dovetail structures 2004 are slid in a direction opposite to the insertion direction for removing the cable management structure 2000 from the slots 106 of the optical fiber distribution element 100. It should be noted that the intermating mounting features of the optical fiber distribution elements 100 and the cable management structures 2000 are similar in form and function to that described in PCT Patent Application Serial Number PCT/EP2014/063717, filed Jun. 27, 2014, the entirety of which is hereby incorporated by reference, and therefore, further details relating thereto will not be discussed herein.

Referring to FIGS. 101-108, each cable management structure 2000 defines a cable guiding base portion 2010 and a movable clip portion 2012 for retaining cables. As noted above, the base portion 2010 defines the mounting features 2002 for snap-fitting the cable management structure 2000 to an optical fiber distribution element 100. As shown, the base portion 2010 defines an upper guide portion 2014 and a lower guide portion 2016. Between the upper and lower guide portions 2014, 2016 is defined a cable channel 2018 that extends from a front opening 2020 to a rear opening 2022 of the cable management structure 2000. A slit 2024 is defined between the upper guide portion 2014 and the lower guide portion 2016 that allows cables to be inserted into the channel 2018. The slit 2024 communicates with the cable channel 2018 and allows entry of cables into the channel 2018. Each of the upper and lower guide portions 2014, 2016 defines radius limiting curves for leading fiber optic cabling either upwardly or downwardly while providing bend limit protection to the fibers of the cabling.

The movable clip portion 2012 is configured to close the slit 2024 for retaining the cables in the channel 2018. The movable clip portion 2012 is also designed to facilitate insertion of cables into the channel 2018 as will be discussed below.

The clip 2012 defines a fixation portion 2026 for snap fitting to the base 2010 of the cable management structure 2000. An elongate portion 2028 of the clip 2012 is elastically flexible with respect to the fixation portion 2026. The elongate portion 2028 allows the clip to be flexed under a bias. The clip 2012 is biased upwardly to close the slit 2024. As shown, the elongate portion 2028 of the clip 2012 is accommodated by a partition 2030 positioned at the lower guide portion 2016. The partition 2030 allows the elongate portion 2028 of the clip 2012 to be flexed between downward and upward directions.

A finger tab 2032 is defined at the end of the elongate portion 2028 of the clip 2012. The finger tab 2032 can be accessed by the finger of a technician for flexing the clip 2012 downwardly. The finger tab 2032 protrudes out slightly from side faces 2034 defined by the upper and lower guide portions 2014, 2016 for both facilitating the insertion of cabling into the cable management structure 2000 and for access by the finger of a technician in removal of cabling from the cable management structure 2000.

The finger tab 2032 defines a tapered side face 2036 and a tapered front face 2038. The tapered faces 2036, 2038 allow cables to be inserted into the slit 2024 and to automatically force the clip 2012 downwardly by contact there-with as the cables are being fed into the channel 2018. The tapered front face 2038 of the clip 2012 allows cabling that is being inserted into the channel 2018 from the front opening 2020 toward the rear opening 2022 to contact the clip 2012 and to start forcing the clip 2012 to flex downwardly. Thus, the tapered surfaces 2036, 2038 of the clip 2012 are designed such that, when contacted by cabling along a first direction, the tapered surfaces 2036, 2038 force movement of the flexible portion 2028 under a bias in a second direction that is different than the first direction. In the shown example, the first direction is a lateral direction of the cables being inserted and the second direction is along an upward to downward direction for the movement of the clip 2012.

After insertion of the cable into the channel 2018, the movable clip 2012 flexes upwardly under its inherent bias to retain the cables within the channel 2018. As shown, the elongate portion 2028 of the clip 2012 also defines a certain amount of curvature that mates with the curved portions of the upper and lower guide portions 2014, 2016 to assist with bend radius protection. As also shown, the clip 2012 defines a vertical wall 2040 at the opposing inner side 2042 of the finger tab 2032 that is configured to keep cables retained within the channel 2018. The vertical wall 2040 defines a lip 2044 that extends partially over the inner side 2046 of the upper guide portion 2014 to provide extra protection against unwanted removal of cables from the cable management structure 2000.

With the design thereof, including the flexible clip 2012, the cable management structure 2000 acts as a push-in structure for facilitating insertion of the cables into the channel 2018. Due to the tapered surfaces 2036, 2038 defined by the finger tab 2032, the cables simply have to be pushed toward the slit 2024 of the cable management structure 2000 to automatically contact and flex the elongate portion 2028 of the clip 2012 downwardly. And, as noted above, after the clip 2012 has biased back to its original position, if the cables need to be removed, the clip 2012 has to be acted on by a technician to flex it down to expose the slit 2024 for removal of the cables.

Figure 109:
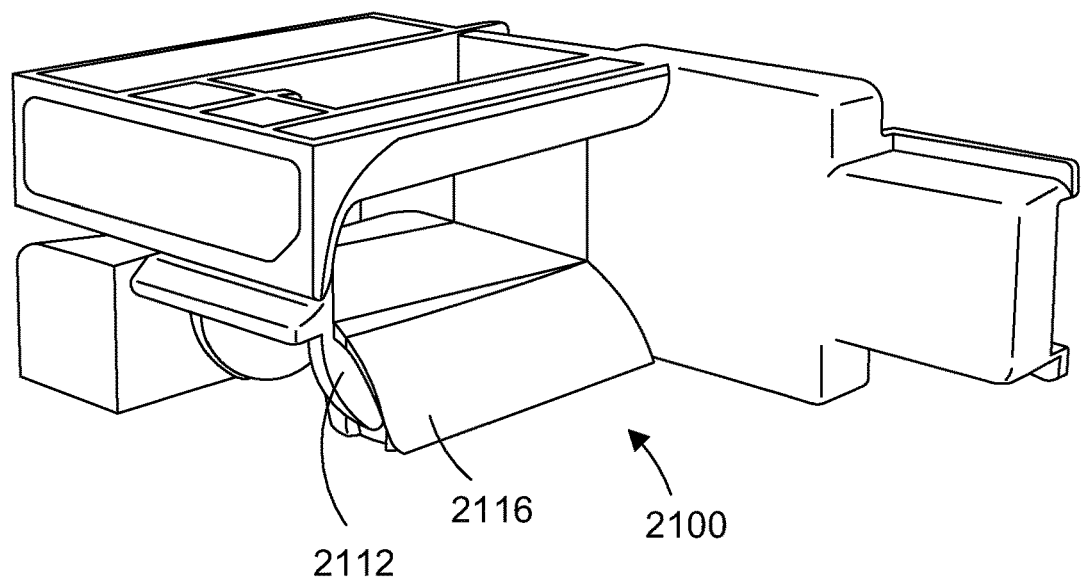
FIG. 109 is an example of another embodiment of a cable management structure having features that are similar to that shown in FIGS. 101-108.
Figure 110:
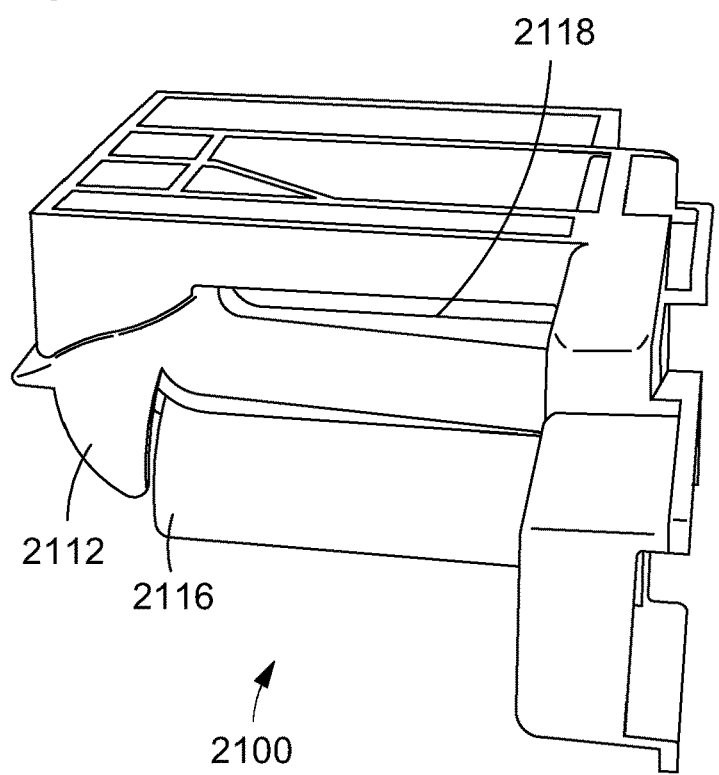
FIG. 110 is a rear view of the cable management structure of FIG. 109.

Referring now to FIGS. 109-110, an alternative embodiment of a cable management structure 2100 is shown. The cable management structure 2100 is similar in form and function to the cable management structure 2000 illustrated in FIGS. 101-108 and described above and also includes a flexible clip 2112. In the version shown in FIGS. 109-110, a portion of the flexible clip 2112 forms a part of the lower guide 2116 and includes curvature for guiding cables transversely out of the channel 2118.

Figure 111:
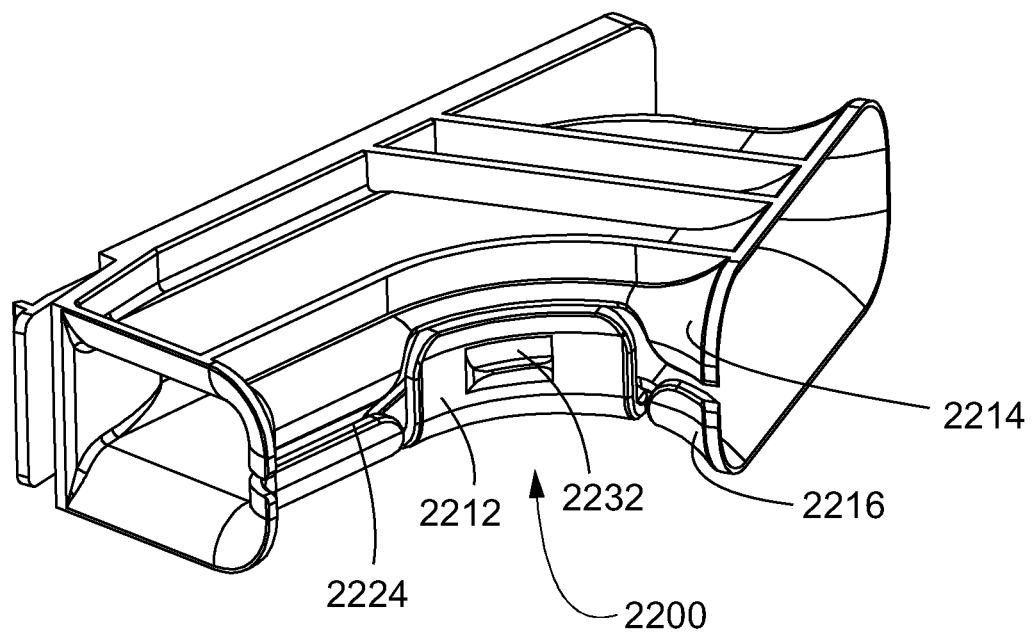
FIG. 111 is an example of another embodiment of a cable management structure having features that are similar to that shown in FIGS. 101-110.
Figure 112:
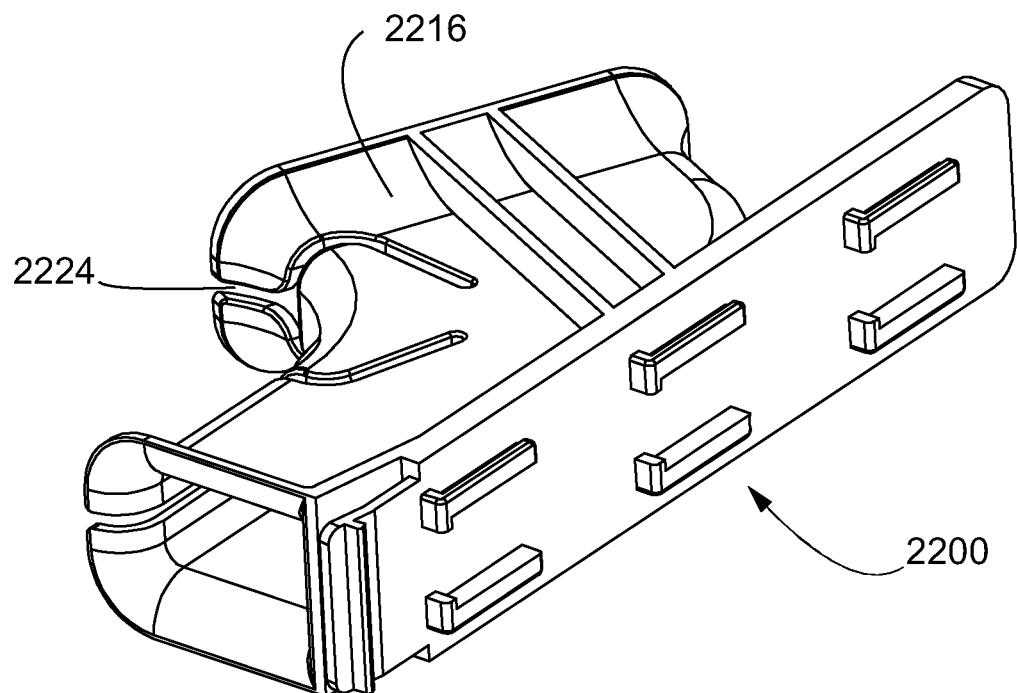
FIG. 112 is a bottom perspective view of the cable management structure of FIG. 111.

Another version of a cable management structure 2200 is illustrated in FIGS. 111-112, the version of the cable management structure 2200 shown in FIGS. 111-112 defines a cover portion 2212 with a finger tab 2232 that has to be manually flexed downwardly in exposing the slit 2224 for insertion of cables. The cable management structure 2200 does not defined a separately formed clip portion. The cover portion 2212 is designed as being integrally formed with the lower guide portion 2216 as shown, where the cover portion 2212 is flexible enough to elastically move with respect to the upper guide portion 2214 to expose the slit 2224.

Figure 113:
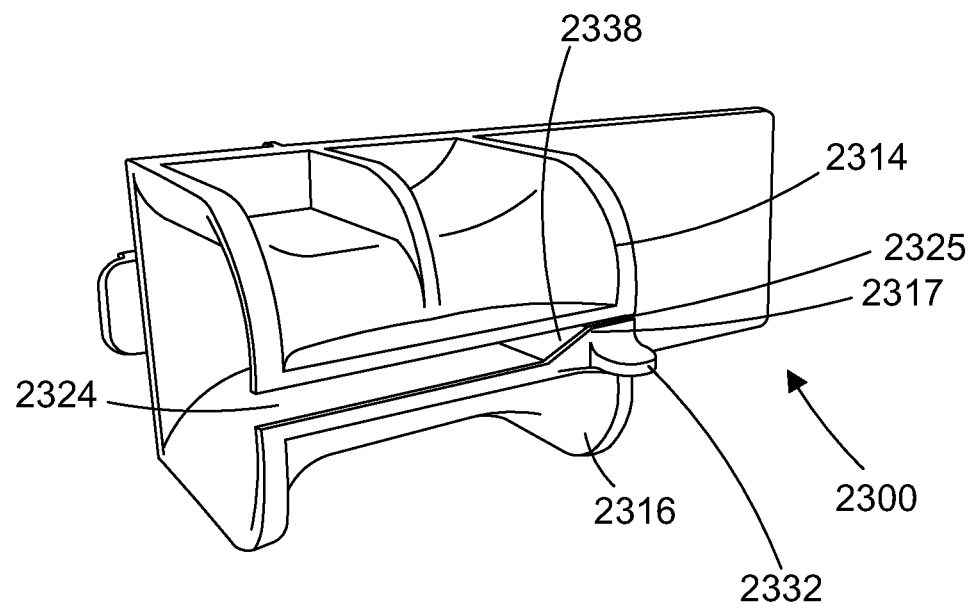
FIG. 113 is an example of another embodiment of a cable management structure that can be mounted to the sides of the optical distribution elements shown in FIGS. 101-102.

FIG. 113 illustrates another alternative embodiment of a cable management structure 2300. The version 2300 shown in FIG. 113 is designed as a push-in structure for insertion of the cables into the channel 2318. Similar to the management structure 2200 shown in FIGS. 111-112, the cable management structure 2300 does not have a separate flexible clip for covering the slit 2324. The lower guide portion 2316 is elastically flexible with respect to the upper guide portion 2314. The lower guide portion 2316 is designed with an integrally formed blocker 2317 toward the rear end thereof. The blocker 2317 defines a tapered face 2338 that tapers toward the front of the cable management structure 2300. The tapered face 2338 is designed to be automatically contacted by the cables for flexing of the lower guide portion 2316 during insertion of cables. Due to the tapered surface 2338, the cables simply have to be inserted into the slit 2324 and once the cables approach the rear end 2325 of the slit 2324, the lower guide portion 2316 is automatically contacted and flexed downwardly for complete insertion of the cables into the channel 2318. After insertion, the lower guide portion 2316 flexes upwardly with the blocker 2317 preventing unwanted removal of cables from the channel 2318. The lower guide portion 2316 defines a finger tab 2332 adjacent the blocker 2317 for manual flexing of the lower guide portion 2316 for removal of cables.

Figure 114:
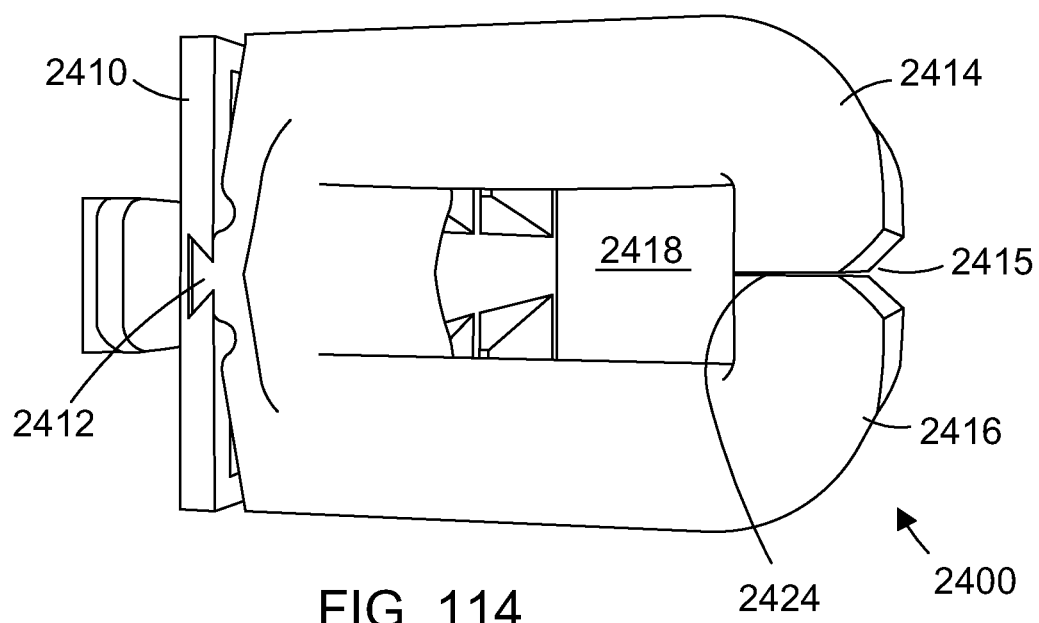
FIG. 114 is a front perspective view of another embodiment of a cable management structure that can be mounted to the sides of the optical distribution elements shown in FIGS. 101-102.

FIG. 114 illustrates another alternative embodiment of a cable management structure 2400 that is provided as a push-in structure. In the version shown in FIG. 114, both the upper and lower guide portions 2414, 2416 are flexible for receiving the cables into the channel 2418. The upper and lower guide portions 2414, 2416 cooperatively define a notch 2415 that guides the insertion of the cables into the channel 2418. When the upper and lower guide portions 2414, 2416 are allowed to bias back to their original position, the upper and lower guides 2414, 2416 abut each other to seal the side opening 2424 into the channel 2418. In the version shown in FIG. 114, the upper and lower guide portions 2414, 2416 may be integrally formed as a single piece and can be mounted to a base portion 2410 via a dovetail type interlock structure 2412.

Figure 115:
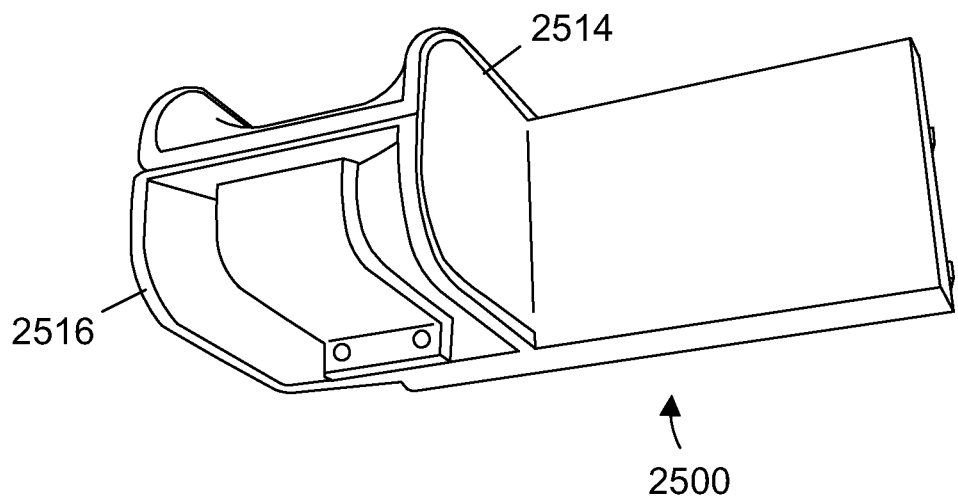
FIG. 115 is a side perspective view of another embodiment of a cable management structure that can be mounted to the sides of the optical distribution elements shown in FIGS. 101-102.
Figure 116:
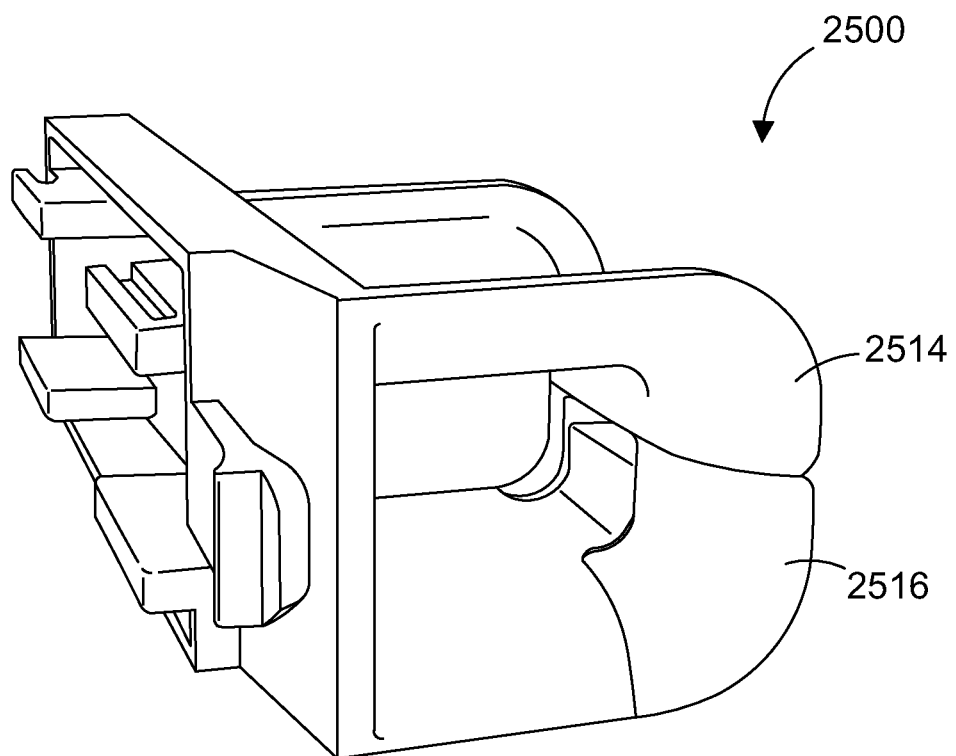
FIG. 116 is a rear perspective view of the cable management structure of FIG. 115.

FIGS. 115-116 illustrate another embodiment of a cable management structure 2500 that is similar in form and function to the version 2400 shown in FIG. 114. Similar to the version 2400 shown in FIG. 114, the cable management structure 2500 provides a push-in design where at least one of the upper guide portion 2514 and the lower guide portion 2516 are elastically flexible.

Figure 117:
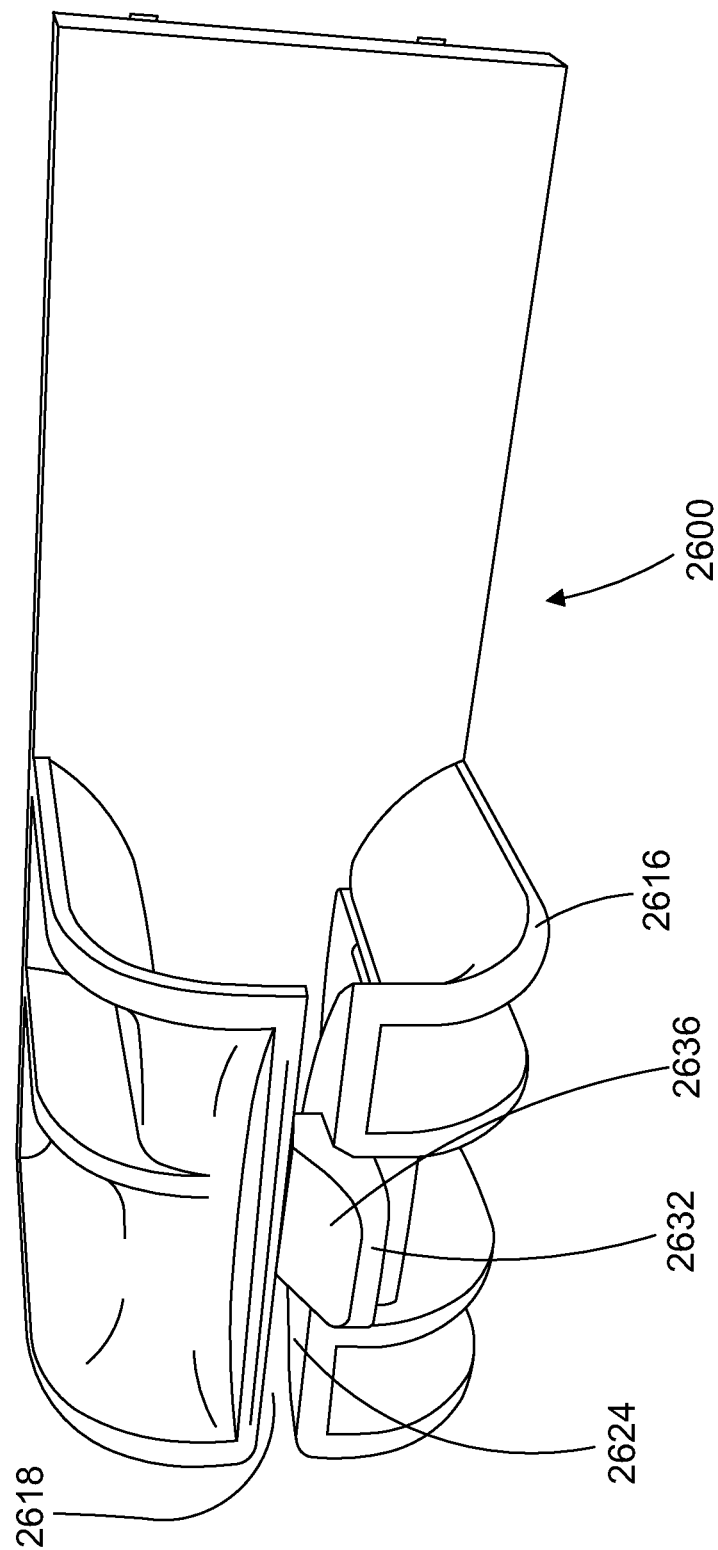
FIG. 117 is an example of another embodiment of a cable management structure that can be mounted to the sides of the optical distribution elements shown in FIGS. 101-102.

FIG. 117 illustrates yet another embodiment of a cable management structure 2600 where at least a portion of the lower guide 2616 is elastically flexible in exposing the channel 2618 for insertion of cables. As shown, the lower guide portion 2616 is provided with an integrally formed finger tab 2632 that facilitates guiding of the cables into the slit 2624 and into the channel 2618. The finger tab 2632 defines a face 2636 that tapers down sideways for contact with the cables. As the cables are pushed-in toward the slit 2624, the cables contact the finger tab 2632 and automatically move the tab 2632 downwardly for exposing channel 2618 for insertion of the cables.

Figure 118:
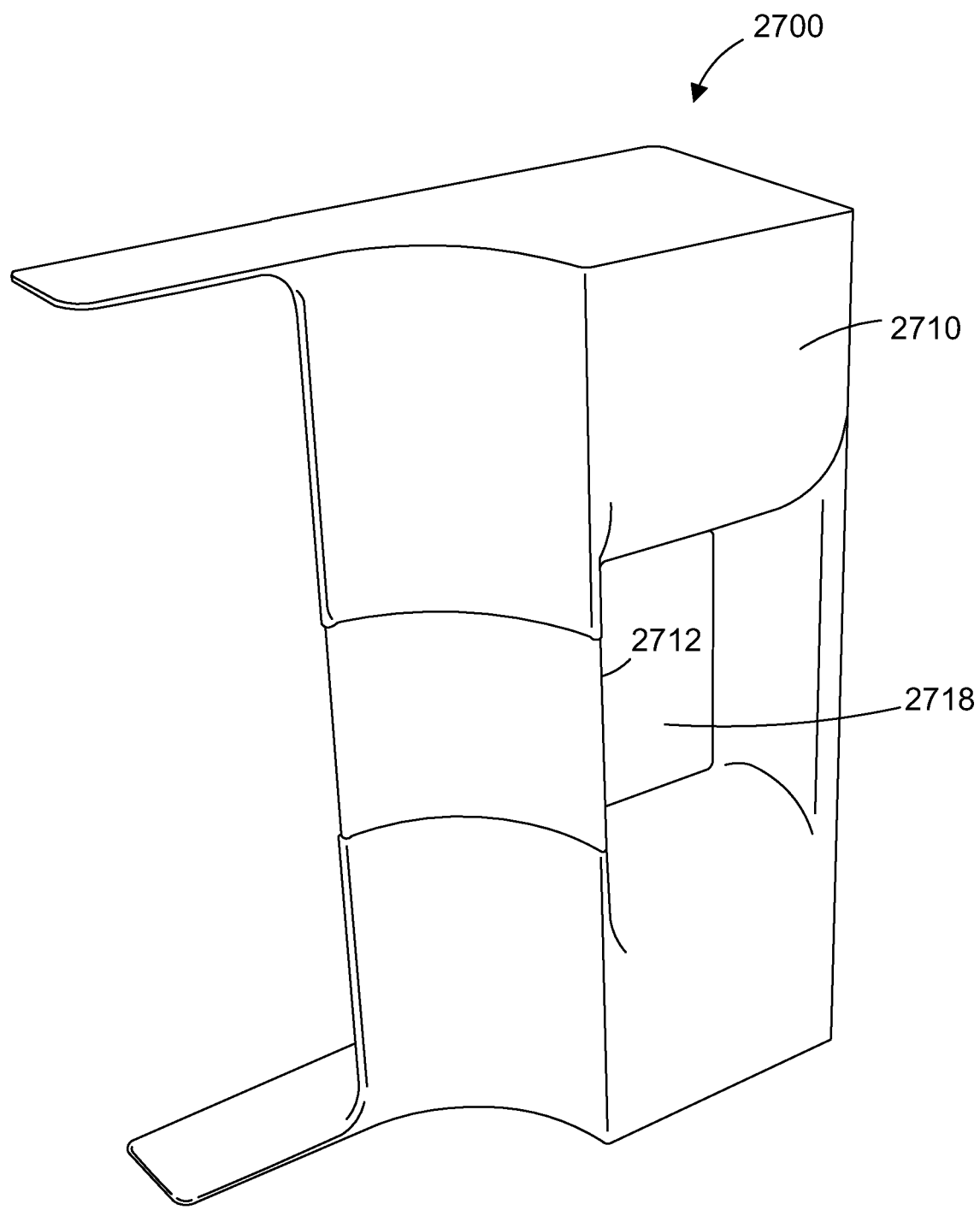
FIG. 118 is an example of a cable management structure that can be mounted to on certain locations of the various telecommunications frames shown in FIGS. 1-69.
Figure 119:
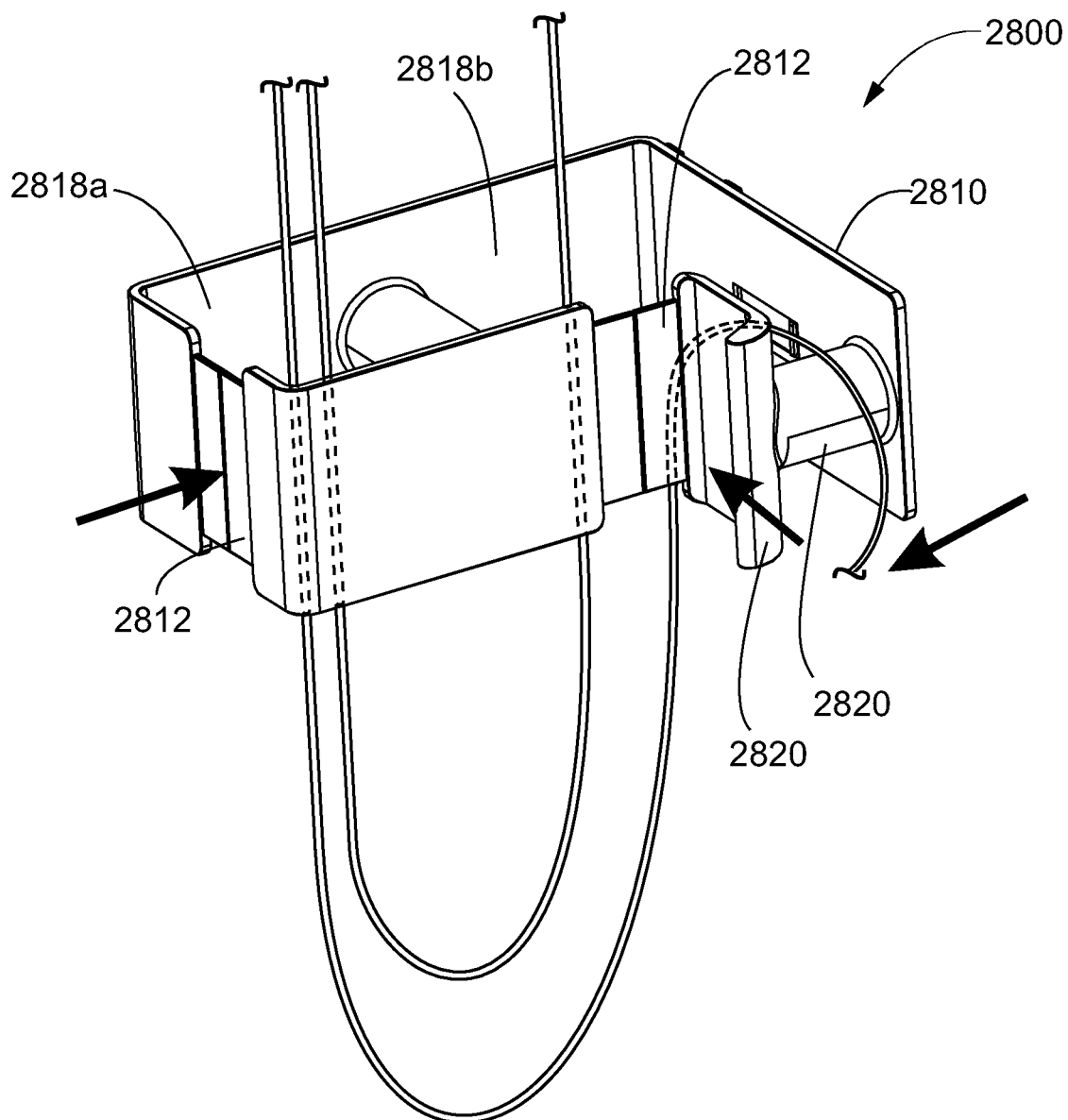
FIG. 119 is an example of another cable management structure that can be mounted to on certain locations of the various telecommunications frames shown in FIGS. 1-69.
Figure 120:
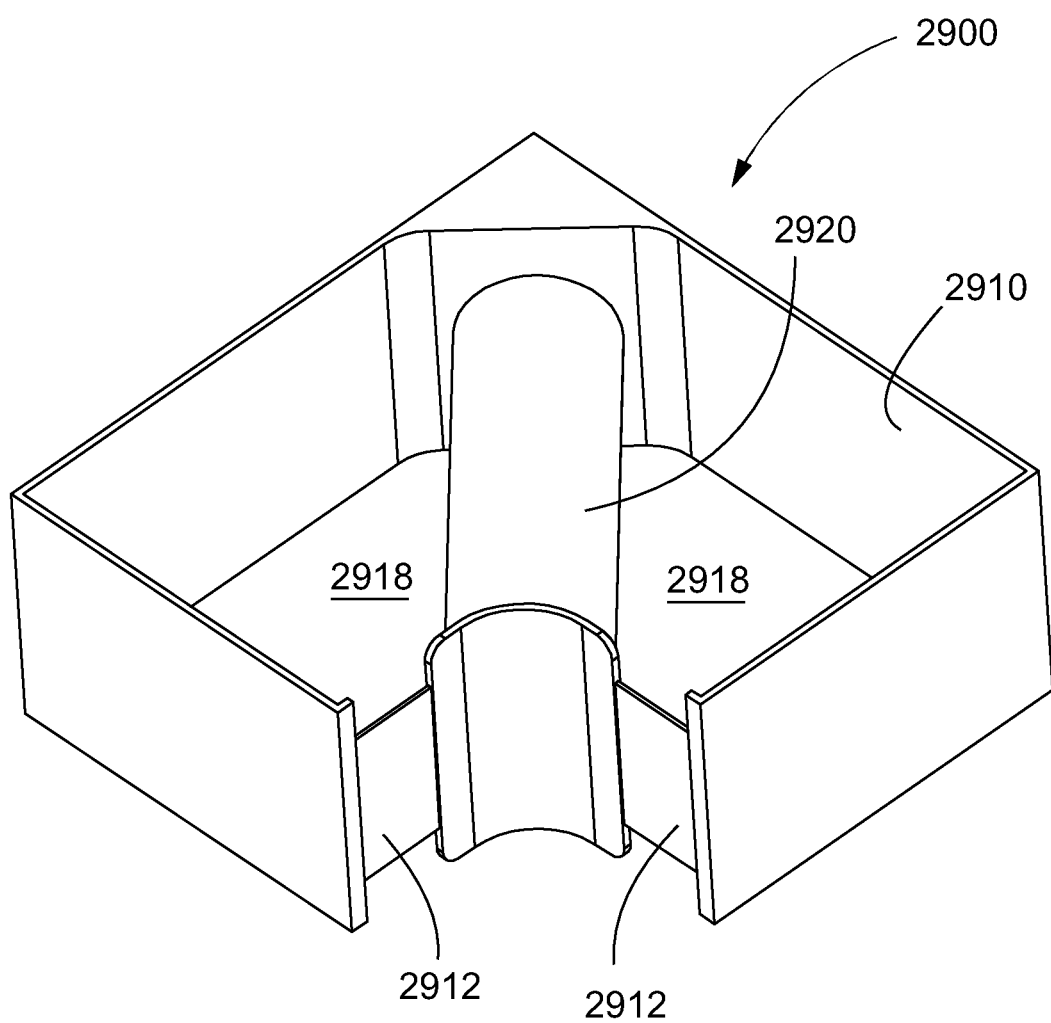
FIG. 120 is an example of yet another version of a cable management structure that can be mounted to on certain locations of the various telecommunications frames shown in FIGS. 1-69.
Figure 121:
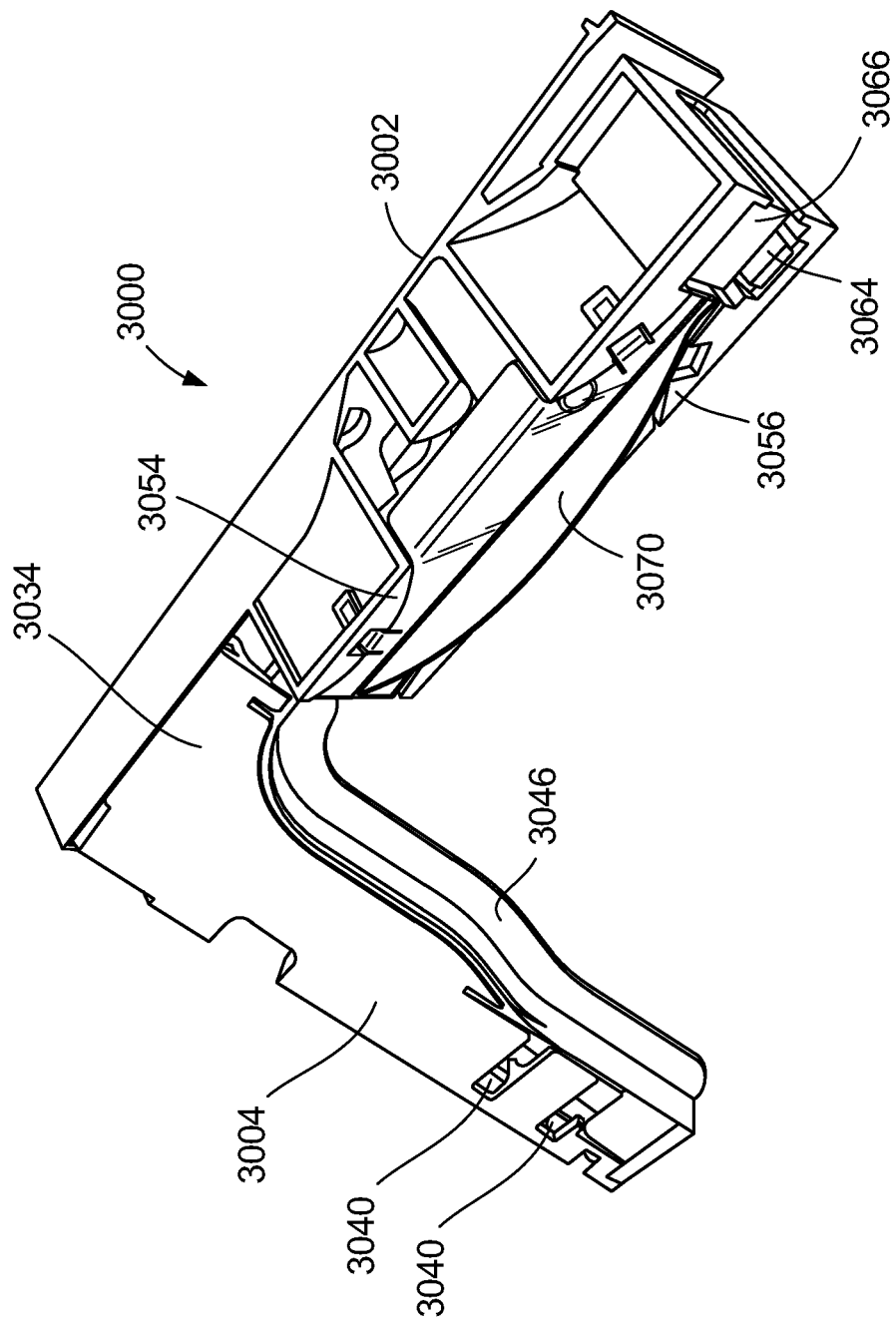
FIG. 121 is an example of a strength member fixation structure having features that are examples of inventive aspects in accordance with the present disclosure.
Figure 123:
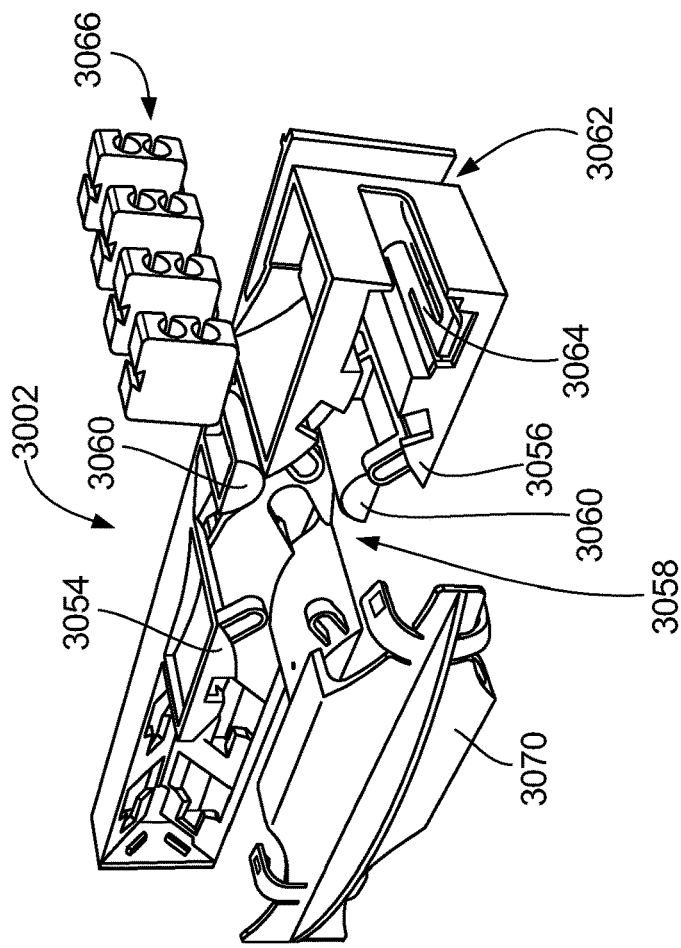
FIG. 123 illustrates the base portion of the fixation structure of FIG. 121 in an exploded configuration.

FIGS. 118-120 illustrate various alternative embodiments of cable management structures that utilize the push-through concept in automatic insertion of cables into a cable management channel and retaining therein. As discussed below, some of the cable management structures may be designed to be mounted to the optical fiber distribution elements 100 themselves and some may be designed to be mounted to various locations around the frame assemblies 110/120.

FIG. 118 illustrates a version of a cable management structure 2700 that has a rigid fixation portion 2710 that can be mounted to a fixture and a pair of rubber flaps 2712 forming a push through portion for insertion of cabling into a channel 2718 defined by the rigid fixation portion 2710.

FIG. 119 illustrates a version of a cable management structure 2800 where a rigid fixation portion 2810 defines two separate vertical cable channels 2818a, 2818b, each accessible via a push-through portion 2812 formed by two flexible rubber flaps. As shown, at the exit of the second channel 2818b are provided curved portions 2820 that provide bend radius protection both in the up and down direction and in the lateral direction.

FIG. 120 illustrates a version of a cable management structure 2900 that includes a rigid fixation portion 2910, where the rigid fixation portion 2910 is divided into two vertical channels 2918 separated by a curved radius limiter 2920. Each of the adjacent channels 2918 are accessed via push-through portions 2912 formed by two flexible rubber flaps similar to the embodiments discussed above.

As noted above, even though some of the cable management structures have been designed for routing cabling around the frame assemblies 110/120 housing the optical fiber distribution elements 100, the push-through concepts can be used on the elements 100 themselves.

Even though the above described cable management structures have been illustrated and discussed herein as being mounted to and used with the optical fiber distribution elements 100 of the present disclosure, it should be noted that the inventive cable management structures can be utilized in other telecommunications panels and fixtures. The specifically depicted devices are only exemplary and are used to convey the inventive concepts provided by the cable management structures.

FIGS. 121-158 illustrate some example embodiments of strength member fixation structures that can be used on the fixed side of one of the fiber distribution elements housed by either the cross-connect assembly 10 or the inter-connect assembly 20 for fixing cabling to a side of the element 100 and directing cabling into the elements. It should be noted that the fixation structures can be designed to be mounted on either side 102/104 of an element 100, depending on whether the element 100 is mounted on the right frame or the left frame of the cross-connect assembly 10 since the fixed sides of the cross-connect assembly is positioned toward the exterior. A similar scenario is applicable to the inter-connect assembly 20 depending upon which side of the element requires fixation.

In the depicted example, each optical fiber distribution element 100 is configured to receive an associated strength member fixation structure such that the fixation structures can be provided in a vertically stacked arrangement when mounted to vertically stacked optical fiber distribution elements 100. In this manner, a cable carrying a large number of fibers can be fixed to a single fixation structure and the individual fibers can be led to different elements 100 on the vertical stack utilizing the cable guiding features of the stacked fixation structures. An example of an assembly that shows a given cable fixed with respect to each element 100 is illustrated in FIG. 134. An example of an assembly where the fibers coming out of a single larger cable are distributed to a plurality of elements 100 in a vertical stack is illustrated in FIG. 135.

Referring now to FIGS. 121-126, one specific example embodiment of a strength member fixation structure 3000 is illustrated. The depicted fixation structure 3000 includes a base 3002 and a cable bracket 3004. In the depicted example, the cable bracket 3004 is configured to be mounted to the base 3002 in one of two different angled orientations. In a first orientation, the cable bracket 3004 is snap-fit such that the bracket 3004 is angled downwardly with respect to a longitudinal axis L defined by the base 3002 of the fixation structure 3000. In a second orientation, the same cable bracket 3004 can be snap-fit to the base 3002 such that the bracket 3004 is angled upwardly with respect to the longitudinal axis L defined by the base 3002. The angled mounting of the bracket 3004 can be determined and selected by the needed cable routing extending toward the entry point of the optical distribution elements 100. The angling of the cable bracket 3004 provides a smoother transition from a vertically extending cable to a horizontal entry position for the elements 1000.

According to one example embodiment, the cable brackets 3004 may be angled approximately 45 degrees with respect to the longitudinal axis L defined by the base 3002.

Still referring to FIGS. 121-126, the cable bracket 3004 defines mounting structures 3006 that intermate with mounting structures 3008 provided on the base 3002 for the selective angled mounting of the bracket 3004.

Figure 124:
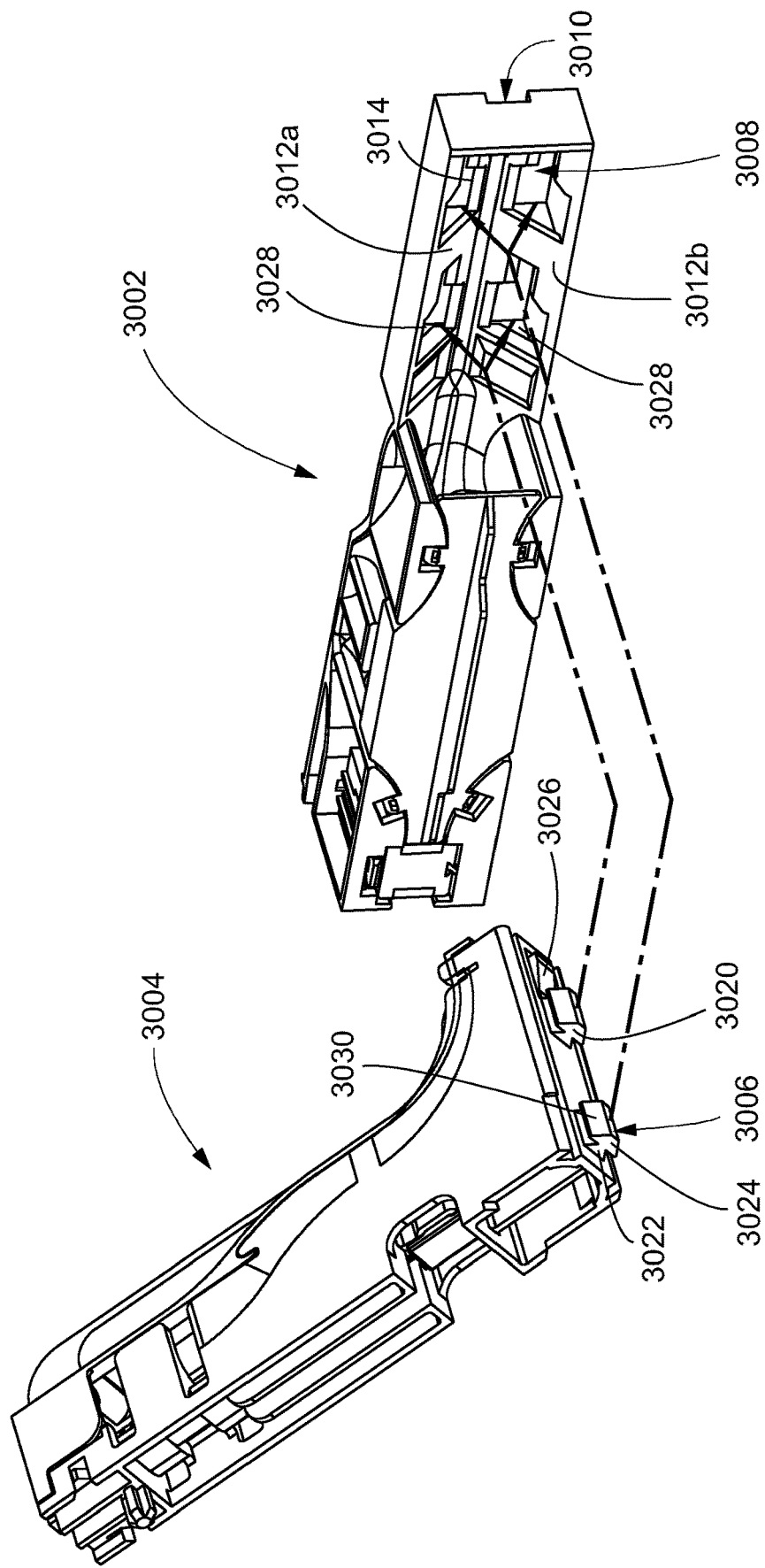
FIG. 124 schematically illustrates the mounting of the cable bracket to the base of the fixation structure of FIG. 121.
Figure 125:
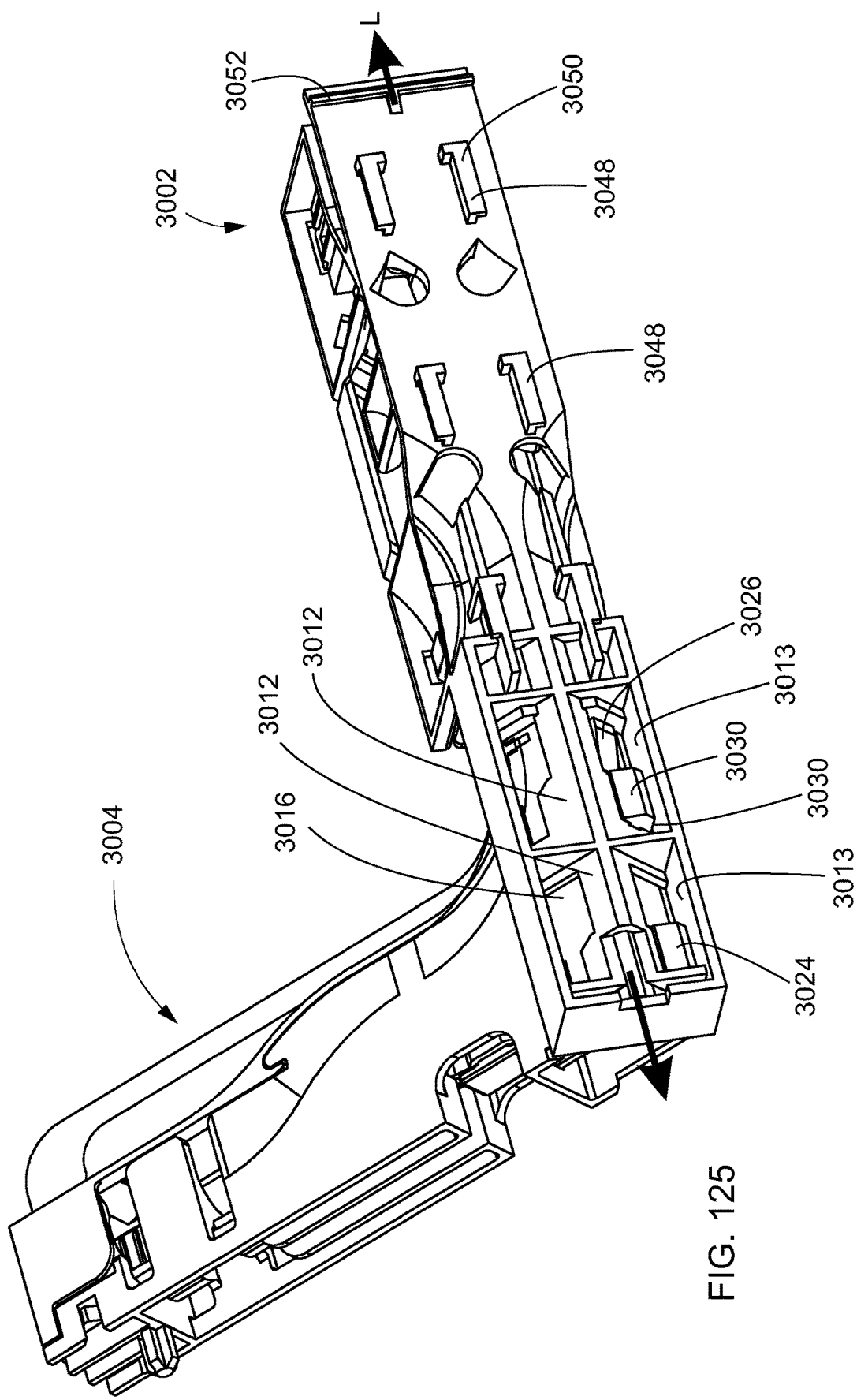
FIG. 125 illustrates the cable bracket and the base of FIG. 124 in a fully assembled configuration.

The intermating mounting structures provided by the cable bracket and the base for selective angled mounting of the cable bracket are illustrated in further detail in FIGS. 124-125. As shown, the rear end 3010 of the base 3002 is provided with two angles walls 3012, each defining a pair of mounting slots 3014. Each mounting slot 3014 defines a wider receiver portion 3016 and a narrower retention portion 3018. The cable bracket 3004 defines a pair of dovetail structures 3020 that are configured to align with the slots 3014 of a selected wall 3012 on the base 3002. Each dovetail structure 3020 defines a stem portion 3022 and a larger retention portion 3024. In addition to the dovetail structures 3022, the cable bracket 3004 also defines a flexible latch 3026 that is configured to snap fit into a latch opening 3028 provided on each of the two angled walls 3012 on the base 3002.

If the cable bracket 3004 needs to be angled down, the upper, downwardly-angled wall 3012a is selected on the base 3002. If the cable bracket 3004 needs to be angled up, the lower, upwardly-angled wall 3012b is selected on the base. Once the desired mounting wall 3012 is selected on the base 3002, the retention portions 3024 of the dovetail structures 3020 are aligned with and passed though the wider receiver portions 3016 of the slots 3014. The cable bracket 3004 is then slid in a front to rear direction bringing the retention portions 3024 of the dovetail structures 3020 out of alignment from the wider receiver portions 3016 of the slots 3014. In this manner, the cable bracket 3004 is prevented from being removed from the base 3002. The sliding occurs until the flexible latch 3026 flexes under a bias, snapping into the latch opening 3028 that is positioned on the base 3002, locking the cable bracket 3004 in the desired angled orientation relative to the base 3002.

It should be noted that the dovetail structures 3020 of the cable bracket 3004 define a generally triangular profile with opposing angled faces 3030. The angled faces 3030 are designed to abut upper or lower walls 3013 of the base 3002 in providing rigidity to the angled mounting of the cable bracket 3004 relative to the base 3002. A fully mounted configuration is shown in FIG. 125.

If the cable bracket 3004 needs to be removed from the base 3002 to reverse the angled orientation, the flexible latch 3026 is pressed until the latch 3026 clears the latch opening 3028 and the dovetail structures 3020 are slid in the rear to front direction.

Now referring back to FIGS. 121-123, as shown, the cable bracket 3004 is the portion that initially receives the cable jacket before the fibers or tubes carrying the fibers are routed out for entry into the elements 100. The cable bracket 3004 defines a cable channel 3032 that defines a turn portion 3034 for allowing cables to turn from a transverse direction toward the elements 100 to a parallel direction with respect to the elements 100. By the time the cable enters the base 3002 of the fixation structure 3000, the cable has transitioned to a position that is generally parallel to the side of the optical distribution element(s) 100.

The cable bracket 3004 may include an insert 3036 for providing grip to the cable jacket adjacent the outer end 3038 of the bracket 3004. In certain embodiments, the grip insert 3036 may be shaped to provide fixation to certain types of cable jackets (e.g., flexible tube holders having a diameter of about 16 mm). Slots 3040 are provided for accommodating cable-ties that may be used to fix various types of cable jackets of the cable to the bracket 3004.

Figure 122:
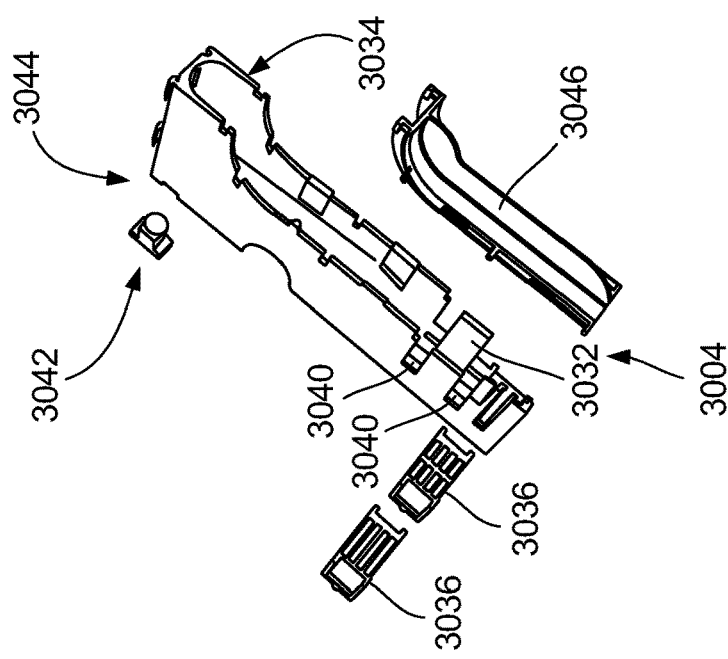
FIG. 122 illustrates the cable bracket portion of the fixation structure of FIG. 121 in an exploded configuration.

A fixation clamp portion 3042 of the cable bracket 3004 for fixing a strength member of a cable is illustrated in FIG. 122. It should be noted that the configuration and functionality of the fixation clamp 3042 is similar to that described in PCT Patent Application Serial Nos. PCT/EP2014/058196, filed Apr. 23, 2014 and PCT/EP2014/063717, filed Jun. 27, 2014, the entireties of which are hereby incorporated by reference, and therefore, further details relating thereto will not be discussed herein.

As shown, the fixation clamp 3042 is adjacent the inner end 3044 of the cable bracket 3004 and is positioned on the cable bracket 3004 prior to the turn portion 3034.

As shown, a cover 3046 may be used to help guide the cabling from a transverse direction toward a parallel direction while providing bend radius protection. According to certain examples, the cover 3046 may be transparent.

The cable bracket 3004 is designed such that one or more methods of cable fixation can be utilized using the cable bracket 3004. The grip insert 3036 may provide fixation to the jacket of the cable in addition to the cable-ties. The aramid yarns of the strength members may be additionally clamped by the fixation clamp 3042. In certain embodiments, simply the jacket of the cable can be fixed to the cable bracket 3004 using the grip insert 3036 and cable-ties.

For example according to certain embodiments, 1 or 2 cables having a diameter between about 5-8.5 mm may be fixed by the grip insert 3036 and the cable-ties, wherein the strength members may be clamped by the fixation clamp 3042. According to another example, if 3 or 4 of such cables are being led to the distribution elements, just the jackets may be fixed with the grip inserts 3036 and the cable-ties without the strength member fixation.

If a cable having a diameter between about 8-15 mm is used, the cable bracket 3004 may be able to only accommodate a single cable, where the jacket of the cable and the strength member is fixed to the cable bracket 3004.

A flexible tube having a diameter of about 16 mm may be snap fit to the cable channel 3032 defined by the cable bracket 3004 and further fixed therein by the cover 3046.

The base 3002 of the fixation structure 3000 is the part of the fixation structure that is mountable to a side of a given optical distribution element 100. As discussed above with respect to the cable management structures such as structures 2000 that are mounted at the exit side of the elements 100, each optical fiber distribution element 100 is provided with mounting features 106 (e.g., slots) for slidably receiving such structures. Similar to the cable management structures 2000 discussed above, the base 3002 of the fixation structure 3000 can include mounting features 3048 that are configured to mate with the mounting features in the form of slots 106 provided on the optical fiber distribution elements 100 for sliding in and snap-fitting the fixation structures 3000 to the optical fiber distribution elements 100. The mounting features 3048 provided on the base 3002 can include a dovetail configuration 3050 and can be slidably inserted into the slots 106 of the optical fiber distribution elements 100 as discussed above in detail for the cable management structures 2000. As shown, similarly, a flexible tab 3052 provided on the base 3002 may be used to latch and fix the fixation structure 3000 relative to the optical fiber distribution element 100. The flexible tab 3052 is also used to unlatch the fixation structure 3000 from the optical fiber distribution element 100 before the dovetail structures 3050 are slid in a direction opposite to the insertion direction for removing the fixation structure 3000 from the slots 106 of the optical fiber distribution element 100.

Still referring to the base portion 3002 of the fixation structure 3000, the base portion 3002 defines a set of rear groove plates 3054 and a set of front groove plates 3056. The base 3002 also defines a gap 3058 between the front and rear groove plates 3056, 3054. The gap 3058 can be used to route fibers or tubes holding fibers upwardly or downwardly to different elements 100 on different levels. An example is shown in FIG. 135 as noted previously. Radius limiters 3060 may be provided on the base 3002 at the gap 3058 for providing bend radius protection while leading fibers or tubes upwardly or downwardly.

Provided toward the front 3062 of the base 3002 is also a tube-holder receiver 3064. The receiver 3064 is configured to slidably receive a variety of different tube holders 3066, where the configuration of the tube holders 3066 can be selected based on the different sizes of tubes carrying the fibers.

Figure 127:
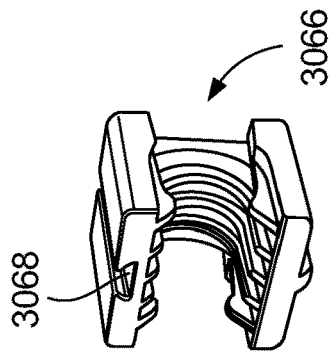
FIG. 127 illustrates one example of a tube holder that can be slidably received by the base of the fixation structure of FIG. 121.
Figure 128:
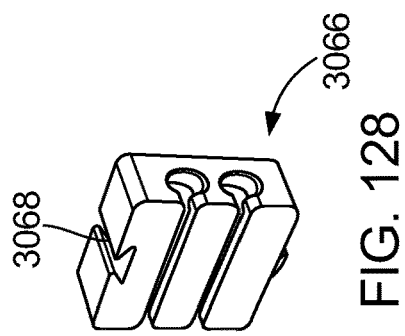
Figure 126:
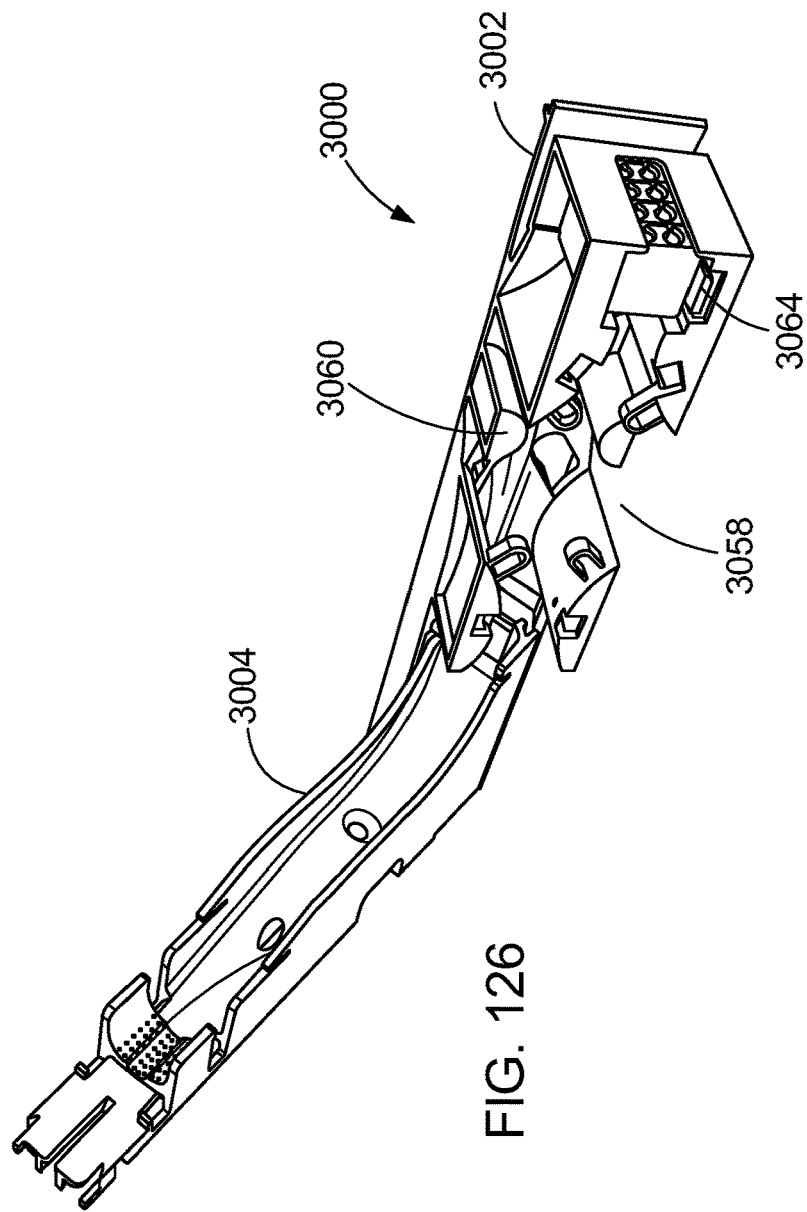
FIG. 126 illustrates a side perspective view of the fixation structure of FIG. 121 with the cable bracket in an upwardly angled orientation.

As shown in FIGS. 127-128, a plurality of tube holders 3066 can be slidably inserted into the tube-holder receiver 3064. The tube-holders 3066 may be coupled with a dovetail type interlock 3068.

Similar to the cover 3046 shown for the cable bracket 3004, a transparent cover 3070 can also be used on the base 3002 to protect the fibers or the fiber holding tubes. The cover 3070, in the depicted example, is snap fit to the base 3002 and is designed to generally cover the gap 3058 provided on the base 3002.

Another strength member fixation structure 3100 similar in shape and function to the fixation structure 3000 is illustrated in FIGS. 121-126. The version 3100 illustrated in FIGS. 129-137 does not include a cover for the base portion 3102 of the fixation structure 3100.

Now referring to FIG. 138, it should be noted that although the above-described fixation structures 3000/3100 include cable brackets 3004/3104 that are fixedly mounted to the base portions 3002/3102 at an angle, in certain other embodiments, the cable brackets and the bases may define a free-hinging configuration. In such an embodiment of a fixation structure 3200, the base 3202 and the cable bracket 3204 cooperatively define a hinge structure 3205 rather than fixed angled mounting for allowing rotation to the cable bracket 3204 along an axis that is parallel to the longitudinal axis L defined by the base 3202. In certain embodiments, the movement can cover about a 120-degree path, extending from −60 degrees below a horizontal plane to +60 degrees above a horizontal plane going through the longitudinal axis of the base 3202.

As shown, the cable bracket 3204 may include a covered tube or jacket holding portion 3233 adjacent the turn portion 3234. The jacket holding portion 3233 may define a slit 3235 for insertion of fibers extending out of the cable jacket once the jacket has been stripped and is designed to protect the fibers therein during pivotal movement of the cable bracket 3204.

Another similar free-hinging design is illustrated for the fixation structure 3300 in FIGS. 139-142. In the cable bracket 3304 of the fixation structure 3300 illustrated in FIGS. 139-142, a curved wall 3333 may be used to protect the fibers extending from the cable bracket 3304 to the base 3302 during pivotal movement of the bracket 3304 with respect to the base 3302.

In the free-hinging versions of the fixations structures 3200/3300 illustrated in FIGS. 138-142, the base 3202/3302 may define integrally formed tube holders adjacent the front end rather than a receiver for housing separately inserted individual tube holders.

Even though the earlier versions of the strength member fixation structure 3000/3100 shown in FIGS. 121-137 and described above provide a fixed angle for the cable bracket 3004/3104 relative to the base 3002/3102, the bracket 3004/3104 is still able to be removed from the base 3002/3102 and selectively mounted in one of two desired orientations. It should be noted that in certain embodiments, the cable bracket may simply be integrally formed with the base to provide a permanently angled mount. Such an example of a fixation structure 3400 is shown in FIGS. 143-146. It should be noted that the fixation structure 3400 may be provided in two versions, a downwardly angled version and an upwardly angled version, depending on the needed routing.

Another version of a fixed integrally formed strength member fixation structure 3500 is shown in FIGS. 147-149. In the version shown in FIGS. 147-149, the cable bracket portion 3504 may be angled with respect to the base 3502 but only along the same horizontal plane. This configuration still provides a smooth transition for cables coming from a transverse direction toward a parallel direction relative to the sides of the distribution elements 100. The fixation structure 3500 shown in FIGS. 147-149 essentially provides the same routing as when the free-hinging cable brackets 3204/3304 are horizontally aligned with the bases 3202/3302 in the versions shown in FIGS. 138-142. However, in this version, the routing is provided in a permanently fixed manner. Again, in the version of the fixation structure 3500 shown in FIGS. 147-149, the cable bracket 3504 may define a curved protection wall 3533 at the turn portion 3534 for protection and bend control of fibers or fiber holding tubes.

FIGS. 150-158 illustrate another version of a strength member fixation structure 3600 that may be used with the optical fiber distribution elements 100 of the present disclosure.

The version of the strength member fixation structure 3600 shown in FIGS. 150-158 is a universal type fixation structure that can be used to accommodate a variety of cable types, sizes, and diameters. The fixation structure 3600 can also be used to fix different numbers of cables as shown.

The strength member fixation structure 3600 is designed to provide strength member and jacket fixation without the use of friction based grip inserts or cable-ties.

In the depicted embodiment, the fixation structure 3600 defines a base 3602. The base 3602 is generally a U-shaped structure forming a longitudinal cable channel 3632 for receiving one or more cables. The walls 3612 of the U-shaped structure and the bottom 3614 of the cable channel 3632 can form clamping surfaces as will be discussed.

Adjacent the front end 3616 of the base 3602 is provided a strength member clamp structure 3642 that is formed from a downwardly biased metal member 3644. The metal member 3644 defines hook portions 3646 for clamping the strength members against a top surface 3648 of the base 3602 under the bias of the spring-based metal member 3644.

Along the sidewalls 3612 of the base are provided a series of pivot pins 3650 in a stepped configuration as shown. Spaced from the pivot pins 3650, toward the front end 3616 of the base 3602 are a series of latch pins 3652 provided in a matching stepped configuration similar to the pivot pins 3650.

A metallic clamp 3604 is configured to pivot about one of the pivot pins 3650 and latch into a corresponding latch pin 3652 at the front 3616 of the base 3602 to capture and fix the outer jacket of a given cable.

As shown in FIGS. 153-154, the metallic clamp 3604 may include a biased spring member 3605 for pushing on a cable. FIG. 153 illustrates a version of the metallic clamp 3604 with a biased spring member 3605 that has a snap-on insert 3607 for providing additional grip features 3609. Such grip features 3609, instead of being provided with a separate insert, can be integrated into the spring member 3605 itself.

The pivotable metallic clamp 3604 is positioned on the base 3602 depending upon the number of cables or the cable sizes that are being fixed. Once an appropriate pivot pin 3650 is selected based on the number of cables or cable size, the clamp 3604 is pivoted down with a latch 3660 of the metallic clamp 3604 latching to a corresponding latch pin 3652 at the front 3616 of the base 3602.

The fixation structure 3600 is shown in various configurations in clamping various numbers and sizes of cables in FIGS. 155-158. As shown, even though the bottom 3614 of the cable channel 3632 may form a clamping surface in clamping smaller diameter cables, the vertical sidewalls 3612 defining the cable channel 3632 may also have chamfered edges 3666 that are used to clamp either larger cables or cables provided in a side-by-side arrangement, as shown in FIGS. 155-158.

A fixation structure such as the structure 3600 shown in FIGS. 150-158 can be provided with mounting features for mounting to a side of an optical distribution element 100 similar to the versions discussed above.

Even though the above described strength member fixation structures have been illustrated and discussed herein as being mounted to and used with the optical fiber distribution elements 100 of the present disclosure, it should be noted that the inventive fixation structures can be utilized in other telecommunications panels and fixtures. The specifically depicted devices are only exemplary and are used to convey the inventive concepts provided by the strength member fixation structures.

Referring now to FIGS. 159-163, the fan-out fixation assemblies 4000 that can be used in certain locations throughout the frame assemblies 110/120 is shown in closer detail.

The fan-out fixation assembly 4000 includes a fixation bracket 4002 that is configured to be mounted to portions of the frame assemblies 110/120 at desired locations and fan-out holders 4004 that are configured to be removably attached to the fixation bracket 4002.

As shown, the fixation bracket 4002, according to one embodiment, defines a generally U-shaped configuration with a rear wall 4006 and a pair of sidewalls 4008 extending from the rear wall 4006. The rear wall 4006 defines fastener openings 4010 for mounting to a wall defined by one of the telecommunications frame assemblies 110/120. The sidewalls 4008 define upper and lower latching slots 4012, 4014 for receiving the fan-out holders 4004 with a snap-fit interlock as will be described in further detail.

In the example embodiment shown, the sidewalls 4008 extending from the rear wall 4006 of the bracket 4002 are spaced apart and provide room for accommodation of the fan-out holders 4004 that are coupled to the bracket 4002. In this manner, the fan-out holders 4004 can be horizontally stacked on each sidewall 4008, where the fan-outs are positioned toward the center of the bracket 4002.

The upper and lower slots 4012, 4014 provided on each sidewall 4008 may be large enough to accommodate the latching structures of a plurality of fan-out holders 4004 that are stacked along the sidewall 4008. And, as shown, a support divider 4016 may split a first upper slot 4012a from a second upper slot 4012b on each sidewall 4008. Similarly, a support divider 4016 may split a first lower slot 4014a from a second lower slot 4014b on each sidewall 4008. Each sidewall 4008 may also define a lateral lip 4018 at top and bottom portions thereof that can abut a wall defined by the frame assemblies 110/120 and provide extra support against bending.

Referring now specifically to the fan-out holders 4004, each fan-out holder 4004 defines a latch side 4020 and a fan-out holding side 4022. The fan-out holding side 4022 defines a generally curved pocket 4024 for nesting of the fan-out thereagainst. The pocket 4024 defines surface texturing 4026, in the form of a pin pattern according to the depicted example, that helps with gripping the jacket of a fan-out. The surface texturing 4026 can help provide protection against jacket slip during axial pull or cable torsion. It should be noted that the type of surface texturing depicted in the given embodiments are only exemplary and other types of surface texturing can be provided.

The fan-out holding side 4022 also defines openings 4028 for receiving cable-ties 4030 for securing the fan-outs against the fan-out holders 4004. Once the fan-outs are positioned within the pockets 4024, the cable-ties 4030 can be looped through the openings 4028 and around the fan-out jackets and tightened to secure the fan-outs to the holders 4004. An example embodiment illustrating the use of the cable-ties 4030 is shown in FIG. 170.

The latch side 4020 of the fan-out holder 4004 defines a pair of hook-like members 4032, each having a horizontal portion 4034 and a vertical portion 4036. The vertical portion 4036 is spaced apart from an abutment surface 4038 of the latch side 4020 such that the vertical portion 4036 forms a pocket 4040 for capturing the sidewall 4008 between the vertical portion 4036 and the abutment surface 4038. As shown, the upper hook-like member 4032 is for placement over an upper top edge 4042 defined by each sidewall 4008 and the lower hook-like member 4032 is spaced apart and positioned for placement over a lower top edge 4044 defined on each sidewall 4008, where the upper top edge 4042 defines the bottom end of each upper slot 4012 on the sidewalls 4008 and the lower top edge 4044 defines the bottom end of each lower slot 4014 on the sidewalls 4008.

Positioned between the spaced-apart hook-like members 4032 is a flexible latch 4046. The flexible latch 4046 extends past the abutment surface 4038 of the latch side 4020 of the fan-out holder 4004 and is configured to be flexed back against a bias when being mounted to the sidewall 4008.

As shown, when each fan-out holder 4004 is being placed on a sidewall 4008, the upper and the lower hook-like members 4032 are brought adjacent a sidewall 4008. The upper hook-like member 4032 is aligned with and passed through the upper slot 4012 and the lower hook-like member 4032 is aligned with and passed through the lower slot 4014. And, then, the fan-out holder 4004 is slid vertically downward with the flexible latch 4046, having been flexed back and riding along the inner side of the sidewall 4008. When the flexible latch 4046 arrives at the lower slot 4014, the latch 4046 snaps laterally to be captured against a lower bottom edge 4048 defined by the sidewall 4008, where the lower bottom edge 4048 defines the top end of each lower slot 4014 on the sidewalls 4008.

The cooperation of the flexible latch 4046 and the hook-like members 4032 keep the fan-out holders 4004 coupled to the sidewalls 4008. As noted above, a plurality of fan-out holders 4004 can be placed on each sidewall 4008 in a horizontally stacked configuration as shown in FIG. 163. In the depicted embodiment, the fan-out holding sides 4022 of the fan-out holders 4004 are positioned toward the center of the bracket 4002.

If a fan-out or fan-out holder needs to be removed from the bracket 4002, the latch 4046 can be flexed back laterally until the latch 4046 clears the lower bottom edge 4048 of the sidewall 4008. Once the latch 4046 clears the lower bottom edge 4048, the fan-out holder 4004 can be slidably lifted vertically to free the upper and lower hook-like members 4032 from the sidewall 4008.

FIG. 164 illustrates an alternative embodiment of a fan-out holder 4104 that can be used with a bracket 4002 such as that shown in FIGS. 159 and 163. The fan-out holder 4104 is similar in form and function to the version illustrated in FIGS. 159-163 and described above. In the version shown in FIG. 164, a single upper hook-like portion 4132 is provided while the bottom portion of the fan-out holder 4104 defines an elastically flexible latch 4146. The flexible latch 4146 is general biased upwardly and defines a tab 4148 for latching the fan-out holder 4104 against a bracket. When the fan-out holder 4104 is being mounted on a bracket such as the bracket 4002 shown in FIGS. 159 and 163, the hook-like portion 4132 is initially slid over a top edge of a sidewall 4008 and moved vertically downwardly until the tab 4148 clears a bottom edge 4048 of a sidewall 4008 and snaps back upwardly to capture the bottom edge 4048 of the sidewall 4008 between the tab 4148 and the abutment surface 4138 defined by the fan-out holder 4104.

In the version of the fan-out holder 4104 shown in FIG. 164, if there is any pull on the fan-out, the pulling force is directly transferred on the flexible latch 4146. The version of the fan-out holder 4004 shown in FIGS. 159-163 provides the advantage of transferring any pulling forces on the fan-out to the fixed portions of the fan-out holder 4004 such as the upper and lower hook-like members 4032, while the flexible latch 4046 is only used for latching the fan-out holder 4004 and does not experience any of the applied forces.

Another version of a fan-out holder 4204 is illustrated in FIG. 165. The version of the fan-out holder 4204 is similar in form and function to the version 4104 illustrated in FIG. 164 except that fixed stop surfaces 4206 are provided on both sides of the flexible latch 4246. This version provides the advantage of the fixed stop surfaces 4206 being able to absorb any axial pulling forces on the fan-out holder 4204 rather than transferring the entire force to a flexible portion of the fan-out holder 4204 such as the elastic latch 4246.

Both of the versions 4104, 4204 shown in FIGS. 164-165 are removed from a bracket 4002 by flexing down the elastic latch until the tab clears a bottom edge 4048 of a sidewall 4008.

Now referring to FIGS. 166-170, an alternative embodiment of a fan-out fixation assembly 4300 is illustrated. The fan-out fixation assembly 4300 is similar in form and function to the assembly 4000 shown in FIGS. 159-163 except for a few differences.

In the version of the fan-out fixation assembly 4300 shown in FIGS. 166-170, the bracket 4302 is defined by a generally L-shaped structure, each defining a rear wall 4306 and a sidewall 4308 extending therefrom.

The rear wall 4306 defines fastener openings 4310 for mounting to a wall 12 defined by the telecommunications frame assemblies 110/120. The sidewall 4308 defines a plurality of latching slots 4312 that are discretely spaced apart extending from the front toward the rear of the sidewall 4308.

The generally L-shaped bracket 4302 is designed such that two of the brackets 4302 can be used in adjacent relationship together in an opposing configuration as shown in FIG. 166. The rear walls 4306 are positioned in opposing directions while the sidewalls 4308 are positioned adjacent together, leaving enough room therebetween for the accommodation of the fan-out holders 4304, as will be discussed below.

In the use of the fan-out fixation assembly 4300 shown in FIGS. 166-170, the brackets 4302 and the fan-out holders 4304 are designed such that the fan-outs are generally positioned away from the sidewalls 4308, rather than toward the center of the bracket 4302 as in the embodiment of FIGS. 159-163.

Referring specifically to the fan-out holder 4304 in FIGS. 167-168 that is used with the bracket 4302, each fan-out holder 4304 again defines a latch side 4320 and a fan-out holding side 4322. The fan-out holding side 4322 defines a generally curved pocket 4324 for nesting of the fan-out thereagainst. The pocket 4324 defines surface texturing 4326, in the form of ribs according to the depicted example, that helps with gripping the jacket of a fan-out. As noted above, the surface texturing 4326 can help provide protection against jacket slip during axial pull or cable torsion. And, as also noted above, the type of surface texturing depicted in the given embodiments are only exemplary and other types of surface texturing can be provided.

Similar to the fan-out holders 4004, 4104, 4204 depicted in FIGS. 159-165, the fan-out holding side 4322 also defines openings 4328 for receiving cable-ties 4030 for securing the fan-outs against the fan-out holders 4304. Once the fan-outs are positioned within the pockets 4324, the cable-ties 4030 can be looped through the openings 4328 and around the fan-out jackets and tightened to secure the fan-outs to the holders 4304.

The latch side 4320 of the fan-out holder 4304 in FIGS. 167-168 defines a central slot 4340. A flexible latch 4346 extends partially into the slot 4340. The fan-out holder 4304 is designed such that the slot 4340 receives the entire sidewall 4308 of the bracket 4302 as the fan-out holder 4304 is slid horizontally across the bracket 4302. The flexible latch 4346 defines a tab 4348 with a tapered face 4350 and a flat retention face 4352. The tapered face 4350 is configured for contacting portions of the sidewall 4308 of the bracket 4302 for flexing of the latch 4346 while allowing sliding of the fan-out holder 4304 to a desired position on the sidewall 4308. Once the desired position is reached, the latch 4346 snaps back under a bias into one of the latching slots 4312 with the flat retention face 4352 holding the fan-out holder 4304 against the aperture defining the latching slot 4312.

A fully mounted fan-out holder 4304 is shown in FIG. 170 with the cable-ties 4030 used to fix the fan-out to the holder 4304.

Another alternative embodiment of a fan-out fixation assembly 4400 is illustrated in FIGS. 171-172. In the version illustrated in FIGS. 171-172, the fan-out holder 4404 is provided as a double fan-out holder with fan-out holding features on opposite sides of the holder 4404 and a central slot 4440 for slidably receiving a sidewall 4408 of a bracket 4402 as shown in FIG. 172. It should be noted that although the double fan-out holder 4404 of FIGS. 171-172 has been depicted without a latch structure, in certain embodiments, a latch structure may be incorporated into the holder 4404 similar to that shown in the version 4304 shown in FIGS. 167-168, if a respective slotted bracket is utilized.

Another alternative embodiment of a fan-out holder 4504 is illustrated in FIGS. 173-175. In the version shown in FIGS. 173-175, the fan-out holder 4504 and a cable-tie 4530 are integrated together. As shown, the fan-out holder 4504 may define upper and lower notches 4532 for mounting against opposing edges of a bracket or within vertically spaced-apart latching slots. The body 4505 of the fan-out holder 4504 may be flexible enough to bend portions of the holder 4504 when placing on a bracket. As shown, an integrated cable-tie 4530 may be positioned to wrap-around a fan-out that has been placed within the pocket 4524 defined at the fan-out holding side 4522 and inserted through a retaining structure 4546 at the opposing side. Once the cable-tie 4530 has been wrapped around the fan-out and inserted through the retaining structure 4546, the cable-tie 4530 may be cut to remove any excess length.

Even though the above described fan-out fixation assemblies and the associated brackets and holders have been illustrated and discussed herein as being used within the telecommunications frame assemblies 110/120 of the present disclosure, it should be noted that the inventive aspects can be utilized in any telecommunications fixture, such as a frame, a panel, or a rack, where cable fan-outs are utilized, as long as such fixtures are configured to receive the described brackets.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A telecommunications device fixation assembly comprising:
   a bracket configured to be mounted to a telecommunications fixture, the bracket defining at least one planar wall and at least one slot defined by the at least one planar wall; and
   a device holder configured to be removably mounted to the bracket, the device holder defining a device holding portion and a fixation portion, wherein the fixation portion defines at least one pocket configured to receive an edge of the planar wall of the bracket, the fixation portion further including an elastically flexible latch configured to snap fit to another edge that defines the at least one slot of the planar wall of the bracket and that is spaced apart from the edge of the planar wall received by the at least one pocket for fixing the device holder to the bracket, wherein the device holding portion of the device holder includes a curved profile that is configured to accommodate a curved profile of a cable jacket.

2. The assembly of claim 1, wherein the device holding portion of the device holder is configured to hold a cable fan-out.

3. The assembly of claim 1, wherein the at least one pocket is defined by a hook-like member defining a horizontal portion and a vertical portion, the horizontal and vertical portions cooperatively defining the at least one pocket that is configured to receive the edge of the planar wall.

4. The assembly of claim 3, wherein the device holder defines at least two hook-like members that are spaced apart for receiving two spaced-apart edges of the at least one planar wall of the bracket, wherein the elastically flexible latch is provided between the two hook-like members.

5. The assembly of claim 1, wherein the device holding portion includes surface texturing to limit slip of the telecommunications device.

6. The assembly of claim 1, wherein the device holding portion is provided with a cable tie receiving structure for wrapping a cable-tie around a mounted telecommunications device.

7. The assembly of claim 1, wherein the planar wall of the bracket defines a plurality of slots, each one for receiving a separate device holder.

8. The assembly of claim 1, wherein the planar wall of the bracket defines a plurality of slots, each one for receiving a plurality of device holders.

9. A telecommunications device holder for fixedly mounting a telecommunications device to a fixture, the device holder comprising:
   a device holding portion; and
   a fixation portion, wherein the fixation portion defines at least one pocket configured to receive an edge of a wall, the fixation portion further including an elastically flexible latch configured to abut against another edge of the wall that is spaced apart from the edge of the wall received by the at least one pocket, wherein the device holding portion includes a curved profile that is configured to accommodate a curved profile of a cable jacket, wherein the at least one pocket of the fixation portion is defined by a hook-like member defining a horizontal portion and a vertical portion, wherein the horizontal and vertical portions cooperatively define the at least one pocket that is configured to receive the edge of the wall.

10. The device holder of claim 9, wherein the device holding portion of the device holder is configured to hold a cable fan-out.

11. The device holder of claim 9, further defining at least two hook-like members that are spaced apart for receiving two spaced-apart edges of the wall, wherein the elastically flexible latch is provided between the two hook-like members.

12. The device holder of claim 9, wherein the device holding portion includes surface texturing to limit slip of the telecommunications device.

13. The device holder of claim 9, wherein the device holding portion is provided with a cable tie receiving structure for wrapping a cable-tie around a mounted telecommunications device.

14. The assembly of claim 1, wherein the bracket defines a generally U-shaped configuration with a rear wall that is configured for mounting to the telecommunications fixture and a pair of sidewalls extending from the rear wall, at least one of the sidewalls defining the at least one planar wall and the at least one slot defined by the planar wall of the bracket.

15. The assembly of claim 14, wherein both of the sidewalls define slots configured to receive the elastically flexible latch of the device holder.

16. The assembly of claim 1, wherein the bracket defines fastener openings for mounting to a wall defined by the telecommunications fixture.

* * * * *